US012737093B2

(12) United States Patent
Yu et al.

(10) Patent No.: US 12,737,093 B2
(45) Date of Patent: Sep. 15, 2026

(54) METHODS FOR DISPLAYING OBJECTS RELATIVE TO VIRTUAL SURFACES

(71) Applicant: Apple Inc., Cupertino, CA (US)

(72) Inventors: Agatha Y. Yu, Oakland, CA (US); Benjamin H. Boesel, Cornelius, NC (US); Stephen O. Lemay, Palo Alto, CA (US); Matthew J. Sundstrom, Campbell, CA (US); Matan Stauber, San Francisco, CA (US); Evgenii Krivoruchko, San Francisco, CA (US); Zoey C. Taylor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 18/473,155

(22) Filed: Sep. 22, 2023

(65) Prior Publication Data

US 2024/0103684 A1 Mar. 28, 2024

Related U.S. Application Data

(60) Provisional application No. 63/505,389, filed on May 31, 2023, provisional application No. 63/377,004, filed on Sep. 23, 2022.

(51) Int. Cl.
*G06F 3/04815* (2022.01)
*G06F 3/04845* (2022.01)
(Continued)

(52) U.S. Cl.
CPC ...... *G06F 3/04815* (2013.01); *G06F 3/04845* (2013.01); *G06T 15/60* (2013.01);
(Continued)

(58) Field of Classification Search
None
See application file for complete search history.

(56) References Cited

U.S. PATENT DOCUMENTS

| | | | |
|---|---|---|---|
| 1,173,824 | A | 2/1916 | Mckee |
| 5,015,188 | A | 5/1991 | Pellosie et al. |

(Continued)

FOREIGN PATENT DOCUMENTS

| | | | |
|---|---|---|---|
| CA | 3033344 | A1 | 2/2018 |
| CN | 102298493 | A | 12/2011 |

(Continued)

OTHER PUBLICATIONS

Mendes D, Fonseca F, Araujo B, Ferreira A, Jorge J. Mid-air interactions above stereoscopic interactive tables. In2014 IEEE Symposium on 3D User Interfaces (3DUI) Mar. 29, 2014 (pp. 3-10). IEEE. (Year: 2014).*

(Continued)

*Primary Examiner* — Zhengxi Liu
(74) *Attorney, Agent, or Firm* — Kubota & Basol LLP

(57) ABSTRACT

In some embodiments, a computer system displays a virtual surface for containing one or more virtual objects in a three-dimensional environment. In some embodiments, a computer system automatically resizes virtual surfaces that contain objects. In some embodiments, a computer system displays feedback related to removal and/or addition of objects to virtual surfaces.

44 Claims, 64 Drawing Sheets

(51) Int. Cl.
*G06T 15/60* (2006.01)
*G06T 19/20* (2011.01)
(52) U.S. Cl.
CPC .......... *G06T 19/20* (2013.01); *G06T 2200/24* (2013.01); *G06T 2219/2016* (2013.01)

(56) References Cited

U.S. PATENT DOCUMENTS 5,422,812 A 6/1995 Knoll et al.
5,515,488 A 5/1996 Hoppe et al.
5,524,195 A 6/1996 Clanton et al.
5,610,828 A 3/1997 Kodosky et al.
5,731,805 A 3/1998 Tognazzini et al.
5,737,553 A 4/1998 Bartok
5,740,440 A 4/1998 West
5,751,287 A 5/1998 Hahn et al.
5,758,122 A 5/1998 Corda et al.
5,794,178 A 8/1998 Caid et al.
5,809,267 A 9/1998 Moran et al.
5,877,766 A 3/1999 Bates et al.
5,900,849 A 5/1999 Gallery
5,933,143 A 8/1999 Kobayashi
5,990,886 A 11/1999 Serdy et al.
6,061,060 A 5/2000 Berry et al.
6,078,310 A 6/2000 Tognazzini
6,108,004 A 8/2000 Medl
6,112,015 A 8/2000 Planas et al.
6,154,559 A 11/2000 Beardsley
6,167,433 A 12/2000 Maples et al.
6,295,069 B1 9/2001 Shirur
6,426,745 B1 7/2002 Isaacs et al.
6,456,296 B1 9/2002 Cataudella et al.
6,570,557 B1 5/2003 Westerman et al.
6,584,465 B1 6/2003 Zhu et al.
6,677,932 B1 1/2004 Westerman
6,714,201 B1 * 3/2004 Grinstein ................ G06T 13/20
700/61
6,750,873 B1 6/2004 Bernardini et al.
6,756,997 B1 6/2004 Ward et al.
7,035,903 B1 4/2006 Baldonado
7,096,120 B2 8/2006 Hull
7,134,130 B1 11/2006 Thomas
7,137,074 B1 11/2006 Newton et al.
7,230,629 B2 6/2007 Reynolds et al.
7,298,370 B1 11/2007 Middler et al.
7,580,576 B2 8/2009 Wang et al.
7,614,008 B2 11/2009 Ording
7,633,076 B2 12/2009 Huppi et al.
7,634,718 B2 12/2009 Nakajima
7,653,883 B2 1/2010 Hotelling et al.
7,657,849 B2 2/2010 Chaudhri et al.
7,706,579 B2 4/2010 Oijer
7,721,226 B2 5/2010 Barabe et al.
7,844,914 B2 11/2010 Andre et al.
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,341,541 B2 12/2012 Holecek et al.
8,381,135 B2 2/2013 Hotelling et al.
8,436,872 B2 5/2013 Wright et al.
8,593,558 B2 11/2013 Gardiner et al.
8,724,856 B1 5/2014 King
8,730,156 B2 5/2014 Weising et al.
8,767,045 B2 7/2014 Kitazato et al.
8,793,620 B2 7/2014 Stafford
8,793,729 B2 7/2014 Adimatyam et al.
8,803,873 B2 8/2014 Yoo et al.
8,805,690 B1 8/2014 Lebeau et al.
8,866,880 B2 10/2014 Tan et al.
8,896,632 B2 11/2014 Macdougall et al.
8,947,323 B1 2/2015 Raffle et al.
8,970,478 B2 3/2015 Johansson
8,970,629 B2 3/2015 Kim et al.
8,994,718 B2 3/2015 Latta et al.
9,007,301 B1 4/2015 Raffle et al.
9,108,109 B2 8/2015 Pare et al.
9,158,115 B1 10/2015 Worley et al.
9,164,975 B2 10/2015 Milewski et al.
9,183,672 B1 11/2015 Hickman et al.
9,185,062 B1 11/2015 Yang et al.
9,189,611 B2 11/2015 Wssingbo
9,196,072 B2 11/2015 Oh et al.
9,201,500 B2 12/2015 Srinivasan et al.
9,214,137 B2 12/2015 Bala et al.
9,222,787 B2 12/2015 Blumenberg et al.
9,230,368 B2 1/2016 Keane et al.
9,237,334 B2 1/2016 Cheng et al.
9,241,149 B2 1/2016 Redmann
9,245,388 B2 1/2016 Poulos et al.
9,256,785 B2 2/2016 Qvarfordt
9,293,118 B2 3/2016 Matsui
9,294,757 B1 3/2016 Lewis et al.
9,298,334 B1 3/2016 Zimmerman et al.
9,316,827 B2 4/2016 Lindley et al.
9,348,458 B2 5/2016 Hotelling et al.
9,383,189 B2 7/2016 Bridges et al.
9,384,594 B2 7/2016 Maciocci et al.
9,396,580 B1 7/2016 Nowrouzezahrai et al.
9,400,559 B2 7/2016 Latta et al.
9,426,193 B2 8/2016 Goodman
9,436,357 B2 9/2016 Pallakoff et al.
9,437,047 B2 9/2016 Chang et al.
9,448,635 B2 9/2016 Macdougall et al.
9,448,687 B1 9/2016 Mckenzie et al.
9,465,479 B2 10/2016 Cho et al.
9,519,371 B2 12/2016 Nishida
9,526,127 B1 12/2016 Taubman et al.
9,544,257 B2 1/2017 Ogundokun et al.
9,563,331 B2 2/2017 Poulos et al.
9,575,559 B2 2/2017 Andrysco
9,588,651 B1 3/2017 Buchanan et al.
9,612,722 B2 4/2017 Miller et al.
9,619,105 B1 4/2017 Dal Mutto
9,619,519 B1 4/2017 Dorner
9,672,588 B1 6/2017 Doucette et al.
9,681,112 B2 6/2017 Son
9,684,372 B2 6/2017 Xun et al.
9,704,230 B2 7/2017 Hofmann et al.
9,734,402 B2 8/2017 Jang et al.
9,778,814 B2 10/2017 Ambrus et al.
9,779,512 B2 10/2017 Tomlin et al.
9,829,708 B1 11/2017 Asada
9,851,866 B2 12/2017 Goossens et al.
9,864,498 B2 1/2018 Olsson et al.
9,870,130 B2 1/2018 Schubert et al.
9,886,087 B1 2/2018 Wald et al.
9,911,232 B2 3/2018 Shapira et al.
9,933,833 B2 4/2018 Tu et al.
9,933,937 B2 4/2018 Lemay et al.
9,934,614 B2 4/2018 Ramsby et al.
9,952,042 B2 4/2018 Abovitz et al.
10,026,209 B1 7/2018 Dagley et al.
10,049,460 B2 8/2018 Romano et al.
10,101,803 B2 10/2018 Faaborg et al.
10,139,985 B2 11/2018 Mildrew et al.
10,163,198 B2 12/2018 Rochford et al.
10,175,483 B2 1/2019 Salter et al.
10,186,086 B2 1/2019 Giraldi et al.
10,192,347 B2 1/2019 Bui et al.
10,203,764 B2 2/2019 Katz et al.
10,210,664 B1 2/2019 Chaturvedi
10,303,427 B2 5/2019 Shintani et al.
10,307,671 B2 6/2019 Barney et al.
10,318,034 B1 6/2019 Hauenstein et al.
10,331,205 B2 6/2019 Kim et al.
10,339,721 B1 7/2019 Dascola et al.
10,353,532 B1 7/2019 Holz et al.
10,373,381 B2 8/2019 Nuernberger et al.
10,394,320 B2 8/2019 George-svahn et al.
10,401,958 B2 9/2019 Peana et al.
10,402,081 B1 9/2019 Andersen et al.
10,424,124 B2 9/2019 Takahashi
10,431,216 B1 10/2019 Lemon et al.

(56) References Cited

U.S. PATENT DOCUMENTS 10,448,189 B2 10/2019 Link
10,484,641 B2 11/2019 Zhou et al.
10,488,941 B2 11/2019 Lam et al.
10,499,044 B1 12/2019 Giokaris et al.
10,530,731 B1 1/2020 Wu et al.
10,534,439 B2 1/2020 Raffa et al.
10,540,005 B2 1/2020 Yoon et al.
10,545,584 B2 1/2020 Tome et al.
10,564,714 B2 2/2020 Marggraff et al.
10,565,448 B2 2/2020 Bell et al.
10,565,761 B2 2/2020 Deluca et al.
10,573,067 B1 2/2020 Naik et al.
10,630,803 B2 4/2020 Hwang et al.
10,642,368 B2 5/2020 Chen
10,645,332 B2 5/2020 Zhang
10,664,043 B2 5/2020 Ikuta et al.
10,664,048 B2 5/2020 Cieplinski et al.
10,664,050 B2 5/2020 Alcaide et al.
10,671,241 B1 6/2020 Jia et al.
10,671,243 B2 6/2020 Ryu et al.
10,678,403 B2 6/2020 Duarte et al.
10,691,216 B2 6/2020 Geisner et al.
10,698,562 B1 6/2020 Zhou et al.
10,699,488 B1 6/2020 Terrano
10,708,965 B1 7/2020 Subramanian et al.
10,712,900 B2 7/2020 Osman et al.
10,732,721 B1 8/2020 Clements
10,754,434 B2 8/2020 Hall et al.
10,762,716 B1 9/2020 Paul et al.
10,768,421 B1 9/2020 Rosenberg et al.
10,768,693 B2 9/2020 Powderly et al.
10,776,933 B2 9/2020 Faulkner
10,846,864 B2 11/2020 Kim et al.
10,852,814 B1 12/2020 Caron et al.
10,861,242 B2 12/2020 Lacey et al.
10,877,645 B2 12/2020 Lee et al.
10,885,701 B1 1/2021 Patel
10,890,967 B2 1/2021 Stellmach et al.
10,922,744 B1 2/2021 Mahajan
10,929,099 B2 2/2021 Querze et al.
10,936,148 B1 3/2021 Merkl et al.
10,956,724 B1 3/2021 Terrano
10,983,663 B2 4/2021 Iglesias
11,003,308 B1 5/2021 Dryer et al.
11,017,611 B1 5/2021 Mount et al.
11,023,035 B1 6/2021 Atlas et al.
11,055,920 B1 7/2021 Bramwell et al.
11,079,995 B1 8/2021 Hulbert et al.
11,082,463 B2 8/2021 Felman
11,095,857 B1 8/2021 Krol et al.
11,112,875 B1 9/2021 Zhou et al.
11,126,850 B1 9/2021 Ichim et al.
11,132,840 B2 9/2021 Sarangdhar et al.
11,138,798 B2 10/2021 Paul et al.
11,146,909 B1 10/2021 Pinto et al.
11,175,791 B1 11/2021 Patnaikuni et al.
11,176,755 B1 11/2021 Tichenor et al.
11,199,898 B2 12/2021 Blume et al.
11,200,742 B1 12/2021 Post et al.
11,204,678 B1 12/2021 Baker et al.
11,232,643 B1 1/2022 Stevens et al.
11,243,734 B2 2/2022 Boissière et al.
11,249,556 B1 2/2022 Schwarz et al.
11,262,885 B1 3/2022 Burckel
11,266,919 B2 3/2022 Bear et al.
11,294,472 B2 4/2022 Tang et al.
11,294,475 B1 4/2022 Pinchon et al.
11,307,653 B1 4/2022 Qian et al.
11,340,756 B2 5/2022 Faulkner et al.
11,343,420 B1 5/2022 Herz et al.
11,347,319 B2 5/2022 Goel et al.
11,348,300 B2 5/2022 Zimmermann et al.
11,379,033 B2 7/2022 O'Hern et al.
11,380,323 B2 7/2022 Shin et al.
11,382,611 B1 7/2022 Westling et al.
11,406,896 B1 8/2022 Cheung et al.
11,409,363 B2 8/2022 Chen et al.
11,416,080 B2 8/2022 Heo et al.
11,432,095 B1 8/2022 Satongar et al.
11,461,973 B2 10/2022 Pinchon
11,496,571 B2 11/2022 Berliner et al.
11,500,510 B2 11/2022 Tokuchi et al.
11,531,402 B1 12/2022 Stolzenberg
11,531,459 B2 12/2022 Poupyrev et al.
11,557,102 B2 1/2023 Palangie et al.
11,567,625 B2 1/2023 Faulkner et al.
11,573,363 B2 2/2023 Zou et al.
11,574,452 B2 2/2023 Berliner et al.
11,599,239 B2 3/2023 Rockel et al.
11,604,080 B2 3/2023 Paoletti et al.
11,615,596 B2 3/2023 Faulkner et al.
11,641,460 B1 5/2023 Geusz et al.
11,669,155 B2 6/2023 Bowman et al.
11,689,632 B2 6/2023 Raisher et al.
11,720,171 B2 8/2023 Pastrana Vicente et al.
11,726,577 B2 8/2023 Katz
11,730,226 B2 8/2023 Stolarz et al.
11,733,824 B2 8/2023 Iskandar et al.
11,743,215 B1 8/2023 Murillo et al.
11,762,457 B1 9/2023 Ikkai et al.
11,762,473 B2 9/2023 Cipoletta et al.
11,768,544 B2 9/2023 Schwarz et al.
11,842,454 B1 12/2023 Lin et al.
11,847,748 B2 12/2023 Liu et al.
11,861,056 B2 1/2024 Burns et al.
11,861,136 B1 1/2024 Faulkner et al.
11,868,582 B2 1/2024 Kim et al.
11,875,013 B2 1/2024 Lemay et al.
11,875,162 B2 1/2024 Garstenauer et al.
11,886,643 B2 1/2024 Irie et al.
11,899,845 B2 2/2024 Chung et al.
11,909,453 B2 2/2024 Javaudin et al.
11,914,759 B2 2/2024 Klein et al.
11,922,588 B2 3/2024 Fillhardt et al.
11,928,263 B2 3/2024 Jung et al.
11,934,569 B2 3/2024 Pastrana Vicente et al.
11,948,263 B1 4/2024 Rudman et al.
11,954,242 B2 4/2024 Dascola et al.
11,972,092 B2 4/2024 Zurmoehle et al.
11,983,326 B2 5/2024 Lacey
11,988,832 B2 5/2024 Singh et al.
11,989,965 B2 5/2024 Tarighat Mehrabani
11,995,301 B2 5/2024 Hylak et al.
12,020,387 B2 6/2024 Maharaja
12,023,579 B2 7/2024 Azmandian et al.
12,032,803 B2 7/2024 Pastrana Vicente et al.
12,062,127 B2 8/2024 Park et al.
12,099,653 B2 9/2024 Chawda et al.
12,099,695 B1 9/2024 Smith et al.
12,112,011 B2 10/2024 Smith et al.
12,113,948 B1 10/2024 Smith et al.
12,118,200 B1 10/2024 Shutzberg et al.
12,154,236 B1 11/2024 Herman et al.
12,182,325 B2 12/2024 Calderone et al.
12,236,546 B1 2/2025 Lipton
12,254,127 B2 3/2025 Burns et al.
12,321,515 B2 6/2025 Calderone et al.
12,394,167 B1 8/2025 Scully et al.
12,408,804 B2 9/2025 Schneider et al.
2001/0047250 A1 11/2001 Schuller et al.
2002/0015024 A1 2/2002 Westerman et al.
2002/0024675 A1 2/2002 Foxlin
2002/0030692 A1 3/2002 Griesert
2002/0044152 A1 4/2002 Abbott et al.
2002/0065778 A1 5/2002 Bouet et al.
2003/0038754 A1 2/2003 Goldstein et al.
2003/0151611 A1 8/2003 Turpin et al.
2003/0222924 A1 12/2003 Baron
2004/0059784 A1 3/2004 Caughey
2004/0104806 A1 6/2004 Yui et al.
2004/0230912 A1 11/2004 Clow et al.
2004/0243926 A1 12/2004 Trenbeath et al.
2005/0044510 A1 2/2005 Yi
2005/0062738 A1 3/2005 Handley et al.

(56) References Cited

U.S. PATENT DOCUMENTS

2005/0100210 A1 5/2005 Rice et al.
2005/0138572 A1 6/2005 Good et al.
2005/0144570 A1 6/2005 Loverin et al.
2005/0144571 A1 6/2005 Loverin et al.
2005/0175218 A1 8/2005 Vertegaal et al.
2005/0190059 A1 9/2005 Wehrenberg
2005/0198143 A1 9/2005 Moody et al.
2005/0216866 A1 9/2005 Rosen et al.
2005/0231532 A1 10/2005 Suzuki et al.
2005/0248299 A1 11/2005 Chemel et al.
2006/0017692 A1 1/2006 Wehrenberg et al.
2006/0028400 A1 2/2006 Lapstun et al.
2006/0033724 A1 2/2006 Chaudhri et al.
2006/0034590 A1 2/2006 Teramoto
2006/0080702 A1 4/2006 Diez et al.
2006/0156228 A1 7/2006 Gallo et al.
2006/0256083 A1 11/2006 Rosenberg
2006/0283214 A1 12/2006 Donadon et al.
2007/0172112 A1 7/2007 Paley et al.
2007/0259716 A1 11/2007 Mattice et al.
2008/0132249 A1 6/2008 Hamilton
2008/0181502 A1 7/2008 Yang
2008/0186255 A1 8/2008 Cohen et al.
2008/0211771 A1 9/2008 Richardson
2008/0222710 A1 9/2008 Blagsvedt et al.
2008/0310707 A1 12/2008 Kansal et al.
2009/0037844 A1 2/2009 Kim et al.
2009/0049408 A1 2/2009 Naaman et al.
2009/0064035 A1 3/2009 Shibata et al.
2009/0146779 A1 6/2009 Kumar et al.
2009/0146961 A1 6/2009 Cheung et al.
2009/0164219 A1 6/2009 Yeung et al.
2009/0231356 A1 9/2009 Barnes et al.
2009/0254843 A1 10/2009 Van et al.
2009/0319181 A1 12/2009 Khosravy et al.
2009/0326810 A1 12/2009 Callaghan et al.
2010/0097375 A1 4/2010 Tadaishi et al.
2010/0115459 A1 5/2010 Kinnunen et al.
2010/0150526 A1 6/2010 Rose et al.
2010/0177049 A1 7/2010 Levy et al.
2010/0185949 A1 7/2010 Jaeger
2010/0188503 A1 7/2010 Tsai et al.
2010/0188572 A1 7/2010 Card, II
2010/0269145 A1 10/2010 Ingrassia et al.
2010/0293504 A1 11/2010 Hachiya
2010/0302245 A1 12/2010 Best
2010/0328432 A1 12/2010 Tanaka
2010/0332196 A1 12/2010 Fisker et al.
2011/0018895 A1 1/2011 Buzyn et al.
2011/0018896 A1 1/2011 Buzyn et al.
2011/0029185 A1 2/2011 Aoki et al.
2011/0032365 A1 2/2011 Yett
2011/0066981 A1 3/2011 Chmielewski et al.
2011/0098029 A1 4/2011 Rhoads et al.
2011/0142321 A1 6/2011 Huffman
2011/0156879 A1 6/2011 Matsushita et al.
2011/0164163 A1 7/2011 Bilbrey et al.
2011/0169927 A1 7/2011 Mages et al.
2011/0175932 A1 7/2011 Yu et al.
2011/0216060 A1 9/2011 Weising et al.
2011/0243448 A1 10/2011 Kawabuchi et al.
2011/0254865 A1 10/2011 Yee et al.
2011/0289691 A1 12/2011 Laflèche et al.
2011/0304557 A1 12/2011 Wilburn et al.
2011/0310001 A1 12/2011 Madau et al.
2011/0320969 A1 12/2011 Hwang et al.
2012/0038751 A1 2/2012 Yuan et al.
2012/0066638 A1 3/2012 Ohri
2012/0075496 A1 3/2012 Akifusa et al.
2012/0086624 A1 4/2012 Thompson et al.
2012/0113223 A1 5/2012 Hilliges et al.
2012/0124525 A1 5/2012 Kang
2012/0131631 A1 5/2012 Bhogal et al.
2012/0151416 A1 6/2012 Bell et al.
2012/0170089 A1 7/2012 Kim et al.
2012/0170840 A1 7/2012 Caruso et al.
2012/0184372 A1 7/2012 Laarakkers et al.
2012/0194547 A1 8/2012 Johnson et al.
2012/0218395 A1 8/2012 Andersen et al.
2012/0223885 A1 9/2012 Perez
2012/0249416 A1 10/2012 Maciocci et al.
2012/0249741 A1 10/2012 Maciocci et al.
2012/0256956 A1 10/2012 Kasahara
2012/0256967 A1 10/2012 Baldwin et al.
2012/0257035 A1 10/2012 Larsen
2012/0272179 A1 10/2012 Stafford
2012/0304087 A1 11/2012 Walkin et al.
2013/0010062 A1 1/2013 Redmann
2013/0027860 A1 1/2013 Masaki et al.
2013/0088516 A1 4/2013 Ota et al.
2013/0093727 A1 4/2013 Eriksson et al.
2013/0127850 A1 5/2013 Bindon
2013/0147820 A1 6/2013 Kalai et al.
2013/0148850 A1 6/2013 Matsuda et al.
2013/0169533 A1 7/2013 Jahnke
2013/0190044 A1 7/2013 Kulas
2013/0191160 A1 7/2013 Oran
2013/0207963 A1 8/2013 Stirbu et al.
2013/0211843 A1 8/2013 Clarkson
2013/0212470 A1 8/2013 Karunamuni et al.
2013/0222227 A1 8/2013 Johansson et al.
2013/0229345 A1 9/2013 Day et al.
2013/0232430 A1 9/2013 Reitan
2013/0246955 A1 9/2013 Schwesig et al.
2013/0249922 A1 9/2013 Hachiya
2013/0263016 A1 10/2013 Lehtiniemi et al.
2013/0265227 A1 10/2013 Julian
2013/0271397 A1 10/2013 Hildreth et al.
2013/0278501 A1 10/2013 Bulzacki
2013/0286004 A1 10/2013 Mcculloch et al.
2013/0293456 A1 11/2013 Son et al.
2013/0300648 A1 11/2013 Kim et al.
2013/0300654 A1 11/2013 Seki
2013/0307945 A1 11/2013 Cheng et al.
2013/0321462 A1 12/2013 Salter et al.
2013/0325326 A1 12/2013 Blumenberg et al.
2013/0326341 A1 12/2013 Nonaka
2013/0326364 A1 12/2013 Latta et al.
2013/0328925 A1 12/2013 Latta et al.
2013/0332890 A1 12/2013 Ramic et al.
2013/0342564 A1 12/2013 Kinnebrew et al.
2013/0342570 A1 12/2013 Kinnebrew et al.
2013/0345975 A1 12/2013 Vulcano et al.
2014/0002338 A1 1/2014 Raffa et al.
2014/0002444 A1 1/2014 Bennett et al.
2014/0024324 A1 1/2014 Mumick
2014/0028548 A1 1/2014 Bychkov et al.
2014/0040832 A1 2/2014 Regelous
2014/0049462 A1 2/2014 Weinberger et al.
2014/0063058 A1 3/2014 Fialho et al.
2014/0068692 A1 3/2014 Archibong et al.
2014/0071241 A1 3/2014 Yang et al.
2014/0075361 A1 3/2014 Reynolds et al.
2014/0078176 A1 3/2014 Kim et al.
2014/0092018 A1 4/2014 Geithner
2014/0104206 A1 4/2014 Anderson
2014/0108942 A1 4/2014 Freeman et al.
2014/0114845 A1 4/2014 Rogers et al.
2014/0125584 A1 5/2014 Xun et al.
2014/0126782 A1 5/2014 Takai et al.
2014/0129990 A1 5/2014 Xin et al.
2014/0132499 A1 5/2014 Schwesinger et al.
2014/0132633 A1 5/2014 Fekete et al.
2014/0139426 A1 5/2014 Kryze et al.
2014/0164928 A1 6/2014 Kim
2014/0168453 A1 6/2014 Shoemake et al.
2014/0181683 A1 6/2014 Lim et al.
2014/0198017 A1 7/2014 Lamb et al.
2014/0232639 A1 8/2014 Hayashi et al.
2014/0237366 A1 8/2014 Poulos et al.
2014/0247210 A1 9/2014 Henderek et al.
2014/0258942 A1 9/2014 Kutliroff et al.
2014/0267046 A1 9/2014 Ellsworth et al.
2014/0267400 A1 9/2014 Mabbutt et al.

(56) References Cited

U.S. PATENT DOCUMENTS

2014/0268054 A1 9/2014 Olsson et al.
2014/0268925 A1 9/2014 Lee et al.
2014/0282272 A1 9/2014 Kies et al.
2014/0285641 A1 9/2014 Kato et al.
2014/0298273 A1 10/2014 Blackstone et al.
2014/0304612 A1 10/2014 Collin
2014/0320404 A1 10/2014 Kasahara
2014/0331187 A1 11/2014 Hicks et al.
2014/0333666 A1 11/2014 Poulos et al.
2014/0347391 A1 11/2014 Keane et al.
2014/0351727 A1 11/2014 Danton et al.
2014/0351753 A1 11/2014 Shin et al.
2014/0362111 A1 12/2014 Kim
2014/0363074 A1 12/2014 Dolfing et al.
2014/0368537 A1 12/2014 Salter et al.
2014/0368620 A1 12/2014 Li et al.
2014/0372957 A1 12/2014 Keane et al.
2014/0375683 A1 12/2014 Salter et al.
2015/0009118 A1 1/2015 Thomas et al.
2015/0035822 A1 2/2015 Arsan et al.
2015/0035832 A1 2/2015 Sugden et al.
2015/0042679 A1 2/2015 Järvenpää
2015/0058718 A1 2/2015 Kim et al.
2015/0067580 A1 3/2015 Um et al.
2015/0077335 A1 3/2015 Taguchi et al.
2015/0082180 A1 3/2015 Ames et al.
2015/0095844 A1 4/2015 Cho et al.
2015/0121466 A1 4/2015 Brands et al.
2015/0123890 A1 5/2015 Kapur et al.
2015/0123901 A1 5/2015 Schwesinger et al.
2015/0128075 A1 5/2015 Kempinski
2015/0131850 A1 5/2015 Qvarfordt
2015/0135108 A1 5/2015 Pope et al.
2015/0145887 A1 5/2015 Forutanpour et al.
2015/0149929 A1 5/2015 Shepherd et al.
2015/0149961 A1 5/2015 Karakotsios
2015/0153833 A1 6/2015 Pinault et al.
2015/0177937 A1 6/2015 Poletto et al.
2015/0187093 A1 7/2015 Chu et al.
2015/0193982 A1 7/2015 Mihelich et al.
2015/0199081 A1 7/2015 Wheeler
2015/0205106 A1 7/2015 Norden
2015/0212576 A1 7/2015 Ambrus et al.
2015/0220152 A1 8/2015 Tait et al.
2015/0221132 A1 8/2015 Kruglick
2015/0227285 A1 8/2015 Lee et al.
2015/0242095 A1 8/2015 Sonnenberg
2015/0253957 A1 9/2015 Crocker
2015/0254905 A1 9/2015 Ramsby et al.
2015/0255067 A1 9/2015 White et al.
2015/0262428 A1 9/2015 Tatzgern et al.
2015/0287403 A1 10/2015 Holzer Zaslansky et al.
2015/0312561 A1 10/2015 Hoof et al.
2015/0317831 A1 11/2015 Ebstyne et al.
2015/0317832 A1 11/2015 Ebstyne et al.
2015/0331240 A1 11/2015 Poulos et al.
2015/0331576 A1* 11/2015 Piya .................... G06F 3/04815
715/850
2015/0332091 A1 11/2015 Kim et al.
2015/0350141 A1 12/2015 Yang et al.
2015/0370323 A1 12/2015 Cieplinski et al.
2015/0370404 A1 12/2015 Hu et al.
2015/0381974 A1 12/2015 Hoffman et al.
2016/0015470 A1 1/2016 Border
2016/0018898 A1 1/2016 Tu et al.
2016/0018900 A1 1/2016 Tu et al.
2016/0025971 A1 1/2016 Crow et al.
2016/0026242 A1 1/2016 Burns et al.
2016/0026243 A1 1/2016 Bertram et al.
2016/0026253 A1 1/2016 Bradski et al.
2016/0028961 A1 1/2016 Thurairatnam
2016/0050642 A1 2/2016 Brown et al.
2016/0062636 A1 3/2016 Jung et al.
2016/0085301 A1 3/2016 Lopez
2016/0093108 A1 3/2016 Mao et al.
2016/0098093 A1 4/2016 Cheon et al.
2016/0098094 A1 4/2016 Minkkinen
2016/0098972 A1* 4/2016 Feit ....................... G06T 11/001
345/593
2016/0127690 A1 5/2016 Kaehler et al.
2016/0133044 A1 5/2016 Lynch
2016/0133052 A1 5/2016 Choi et al.
2016/0171304 A1 6/2016 Golding et al.
2016/0179191 A1 6/2016 Kim et al.
2016/0179336 A1 6/2016 Ambrus et al.
2016/0189426 A1 6/2016 Thomas et al.
2016/0196692 A1 7/2016 Kjallstrom et al.
2016/0210784 A1 7/2016 Ramsby et al.
2016/0216768 A1 7/2016 Goetz et al.
2016/0224122 A1 8/2016 Dietz et al.
2016/0225012 A1 8/2016 Ha et al.
2016/0225164 A1 8/2016 Tomlin et al.
2016/0227267 A1 8/2016 Tsurutani et al.
2016/0239165 A1 8/2016 Chen et al.
2016/0253063 A1 9/2016 Critchlow
2016/0253821 A1 9/2016 Romano et al.
2016/0275702 A1 9/2016 Reynolds et al.
2016/0279516 A1 9/2016 Gupta et al.
2016/0291922 A1 10/2016 Montgomerie et al.
2016/0306434 A1 10/2016 Ferrin
2016/0313890 A1 10/2016 Walline et al.
2016/0334940 A1 11/2016 Kandadai et al.
2016/0349063 A1 12/2016 Maurer et al.
2016/0350973 A1 12/2016 Shapira et al.
2016/0357266 A1 12/2016 Patel et al.
2016/0363774 A1 12/2016 Kawasima
2016/0370858 A1 12/2016 Leppänen et al.
2016/0373647 A1 12/2016 García Morate et al.
2016/0373714 A1 12/2016 Lee et al.
2016/0379409 A1 12/2016 Gavriliuc et al.
2016/0379418 A1 12/2016 Osborn et al.
2017/0032568 A1 2/2017 Gharpure et al.
2017/0038829 A1 2/2017 Lanier et al.
2017/0038837 A1 2/2017 Faaborg et al.
2017/0038849 A1 2/2017 Hwang
2017/0039770 A1 2/2017 Lanier et al.
2017/0046872 A1 2/2017 Geselowitz et al.
2017/0052393 A1 2/2017 Kweon
2017/0052595 A1 2/2017 Poulos et al.
2017/0053383 A1 2/2017 Heo
2017/0060230 A1 3/2017 Faaborg et al.
2017/0061694 A1 3/2017 Giraldi et al.
2017/0090566 A1 3/2017 George-svahn et al.
2017/0109930 A1 4/2017 Holzer et al.
2017/0115728 A1 4/2017 Park et al.
2017/0123487 A1 5/2017 Hazra et al.
2017/0131964 A1 5/2017 Baek et al.
2017/0132694 A1 5/2017 Damy
2017/0132822 A1 5/2017 Marschke et al.
2017/0147180 A1 5/2017 Yoon et al.
2017/0153866 A1 6/2017 Grinberg et al.
2017/0154326 A1 6/2017 Jo et al.
2017/0162177 A1 6/2017 Lebeck et al.
2017/0169616 A1 6/2017 Wiley et al.
2017/0178392 A1 6/2017 Zuccarino et al.
2017/0185276 A1 6/2017 Lee et al.
2017/0206691 A1 7/2017 Harrises et al.
2017/0206692 A1 7/2017 Sheaffer et al.
2017/0212583 A1 7/2017 Krasadakis
2017/0213388 A1 7/2017 Margolis et al.
2017/0214782 A1 7/2017 Brinda
2017/0221264 A1 8/2017 Perry
2017/0228130 A1 8/2017 Palmaro
2017/0236332 A1 8/2017 Kipman et al.
2017/0243352 A1 8/2017 Kutliroff et al.
2017/0251143 A1 8/2017 Peruch et al.
2017/0256096 A1 9/2017 Faaborg et al.
2017/0270715 A1 9/2017 Lindsay et al.
2017/0285737 A1 10/2017 Khalid et al.
2017/0287215 A1 10/2017 Lalonde et al.
2017/0302903 A1 10/2017 Ng et al.
2017/0308163 A1 10/2017 Cieplinski et al.
2017/0315715 A1 11/2017 Fujita et al.
2017/0326457 A1 11/2017 Tilton et al.

(56) References Cited

U.S. PATENT DOCUMENTS

2017/0344223 A1 11/2017 Holzer et al.
2017/0351094 A1 12/2017 Poulos et al.
2017/0357389 A1 12/2017 Fleizach et al.
2017/0357390 A1 12/2017 Alonso Ruiz et al.
2017/0358141 A1 12/2017 Stafford et al.
2017/0364198 A1 12/2017 Yoganandan et al.
2018/0005433 A1 1/2018 Kohler et al.
2018/0045963 A1 2/2018 Hoover et al.
2018/0046363 A1 2/2018 Miller et al.
2018/0075658 A1 3/2018 Lanier et al.
2018/0077383 A1 3/2018 Akao et al.
2018/0081519 A1 3/2018 Kim
2018/0084287 A1 3/2018 Shimura
2018/0088787 A1 3/2018 Bereza et al.
2018/0095542 A1 4/2018 Mallinson
2018/0095634 A1 4/2018 Alexander
2018/0095635 A1 4/2018 Valdivia et al.
2018/0095636 A1 4/2018 Valdivia et al.
2018/0101223 A1 4/2018 Ishihara et al.
2018/0103209 A1 4/2018 Fischler et al.
2018/0114364 A1 4/2018 Mcphee et al.
2018/0114370 A1* 4/2018 Cullum ............... G06F 3/04845
2018/0120944 A1 5/2018 Wang et al.
2018/0122043 A1* 5/2018 Energin ................. G06F 3/017
2018/0122138 A1 5/2018 Piya et al.
2018/0130255 A1 5/2018 Hazeghi et al.
2018/0136815 A1 5/2018 Tomizuka et al.
2018/0143693 A1 5/2018 Calabrese et al.
2018/0150204 A1 5/2018 Macgillivray
2018/0150997 A1 5/2018 Austin
2018/0157332 A1 6/2018 Nie
2018/0158222 A1 6/2018 Hayashi
2018/0165853 A1 6/2018 Inagi et al.
2018/0173404 A1 6/2018 Smith
2018/0181199 A1 6/2018 Harvey et al.
2018/0181272 A1 6/2018 Olsson et al.
2018/0183986 A1 6/2018 Smith et al.
2018/0188048 A1 7/2018 Ding et al.
2018/0188802 A1 7/2018 Okumura
2018/0190003 A1 7/2018 Upadhyay et al.
2018/0197336 A1 7/2018 Rochford et al.
2018/0197341 A1 7/2018 Loberg et al.
2018/0210628 A1 7/2018 Mcphee et al.
2018/0218214 A1 8/2018 Pestun et al.
2018/0220195 A1 8/2018 Panchaksharaiah et al.
2018/0239144 A1 8/2018 Woods et al.
2018/0247449 A1 8/2018 Park et al.
2018/0275753 A1 9/2018 Publicover et al.
2018/0286126 A1 10/2018 Schwarz et al.
2018/0288206 A1 10/2018 Stimpson et al.
2018/0300023 A1 10/2018 Hein
2018/0300952 A1 10/2018 Evans et al.
2018/0302687 A1 10/2018 Bhattacharjee et al.
2018/0315248 A1 11/2018 Bastov et al.
2018/0322701 A1 11/2018 Pahud et al.
2018/0330544 A1 11/2018 Corso et al.
2018/0330550 A1 11/2018 Takahashi
2018/0348010 A1 12/2018 Coleman et al.
2018/0348861 A1 12/2018 Uscinski et al.
2018/0348986 A1 12/2018 Sawaki
2018/0350099 A1 12/2018 Yerkes et al.
2018/0350119 A1 12/2018 Kocharlakota et al.
2018/0352374 A1 12/2018 Ball et al.
2019/0004683 A1 1/2019 Pahud et al.
2019/0005055 A1 1/2019 Andrew et al.
2019/0018479 A1 1/2019 Minami
2019/0018498 A1* 1/2019 West ....................... G06F 3/012
2019/0034076 A1 1/2019 Vinayak et al.
2019/0037137 A1 1/2019 Toksvig et al.
2019/0043259 A1 2/2019 Wang et al.
2019/0050062 A1 2/2019 Chen et al.
2019/0056785 A1 2/2019 Suk
2019/0065027 A1 2/2019 Hauenstein et al.
2019/0073109 A1 3/2019 Zhang et al.
2019/0080572 A1 3/2019 Kim et al.
2019/0088149 A1 3/2019 Fink et al.
2019/0094963 A1 3/2019 Nijs
2019/0094979 A1 3/2019 Hall et al.
2019/0096134 A1 3/2019 Amacker et al.
2019/0101991 A1 4/2019 Brennan
2019/0102953 A1 4/2019 Lindsay et al.
2019/0130622 A1 5/2019 Hoover et al.
2019/0130633 A1 5/2019 Haddad et al.
2019/0130733 A1 5/2019 Hodge
2019/0138183 A1 5/2019 Rosas et al.
2019/0146128 A1 5/2019 Cao et al.
2019/0155495 A1 5/2019 Klein et al.
2019/0164340 A1 5/2019 Pejic et al.
2019/0172261 A1 6/2019 Alt et al.
2019/0172262 A1 6/2019 Mchugh et al.
2019/0180504 A1 6/2019 Pomerantz et al.
2019/0188895 A1 6/2019 Miller et al.
2019/0188918 A1 6/2019 Brewer et al.
2019/0204906 A1 7/2019 Ross et al.
2019/0212827 A1 7/2019 Kin et al.
2019/0213389 A1 7/2019 Peruch et al.
2019/0227763 A1 7/2019 Kaufthal
2019/0228503 A1 7/2019 Tokuchi
2019/0228589 A1 7/2019 Dascola et al.
2019/0238818 A1 8/2019 Held et al.
2019/0244434 A1 8/2019 Pahud et al.
2019/0251884 A1 8/2019 Burns et al.
2019/0258365 A1 8/2019 Zurmoehle et al.
2019/0265828 A1 8/2019 Hauenstein et al.
2019/0266774 A1 8/2019 Sommerlade et al.
2019/0277651 A1 9/2019 Ruikar
2019/0278432 A1* 9/2019 Bennett ................. G06F 3/0484
2019/0279407 A1 9/2019 Mchugh et al.
2019/0287307 A1 9/2019 Rogers et al.
2019/0294312 A1 9/2019 Rohrbacher
2019/0302977 A1 10/2019 Pendergast et al.
2019/0310757 A1 10/2019 Lee et al.
2019/0311547 A1 10/2019 Ohmori
2019/0324529 A1 10/2019 Stellmach et al.
2019/0325654 A1 10/2019 Stisser et al.
2019/0332244 A1 10/2019 Beszteri et al.
2019/0332250 A1 10/2019 Lee et al.
2019/0339770 A1 11/2019 Kurlethimar et al.
2019/0340816 A1 11/2019 Rogers
2019/0340832 A1 11/2019 Srinivasan et al.
2019/0346678 A1 11/2019 Nocham
2019/0346922 A1 11/2019 Young et al.
2019/0349575 A1 11/2019 Knepper et al.
2019/0354259 A1 11/2019 Park
2019/0361521 A1 11/2019 Stellmach et al.
2019/0362557 A1 11/2019 Lacey et al.
2019/0362560 A1 11/2019 Choi et al.
2019/0369569 A1 12/2019 Olsen et al.
2019/0370492 A1 12/2019 Falchuk et al.
2019/0371072 A1 12/2019 Lindberg et al.
2019/0371279 A1 12/2019 Mak
2019/0377487 A1 12/2019 Bailey et al.
2019/0379765 A1 12/2019 Fajt et al.
2019/0384406 A1 12/2019 Smith et al.
2019/0392830 A1 12/2019 Abdollahian
2020/0004401 A1 1/2020 Hwang et al.
2020/0005539 A1 1/2020 Hwang et al.
2020/0012341 A1 1/2020 Stellmach et al.
2020/0020157 A1 1/2020 Powers et al.
2020/0026349 A1 1/2020 Fontanel et al.
2020/0026922 A1 1/2020 Pekelny et al.
2020/0038120 A1 2/2020 Ziraknejad et al.
2020/0043243 A1 2/2020 Bhushan et al.
2020/0045249 A1 2/2020 Francois et al.
2020/0048825 A1 2/2020 Schultz et al.
2020/0051527 A1 2/2020 Ngo
2020/0073521 A1* 3/2020 Peebler ................. G06F 3/0481
2020/0081526 A1 3/2020 Walker et al.
2020/0082602 A1 3/2020 Jones
2020/0089314 A1 3/2020 Poupyrev et al.
2020/0092537 A1 3/2020 Sutter et al.
2020/0097077 A1 3/2020 Nguyen et al.
2020/0098140 A1 3/2020 Jagnow et al.
2020/0098173 A1 3/2020 Mccall

(56) References Cited

U.S. PATENT DOCUMENTS

2020/0099989 A1 3/2020 Niemirska et al.
2020/0106965 A1 4/2020 Malia et al.
2020/0111267 A1* 4/2020 Stauber .................. G06F 3/011
2020/0112711 A1 4/2020 Enriquez et al.
2020/0117213 A1 4/2020 Tian et al.
2020/0128227 A1 4/2020 Chavez et al.
2020/0128232 A1 4/2020 Hwang et al.
2020/0129850 A1 4/2020 Ohashi
2020/0135141 A1 4/2020 Day et al.
2020/0159017 A1 5/2020 Lin et al.
2020/0201444 A1 6/2020 Stoyles et al.
2020/0214682 A1 7/2020 Zaslavsky et al.
2020/0218074 A1 7/2020 Hoover et al.
2020/0225735 A1 7/2020 Schwarz
2020/0225746 A1 7/2020 Bar-zeev et al.
2020/0225747 A1 7/2020 Bar-zeev et al.
2020/0225830 A1 7/2020 Tang et al.
2020/0226814 A1 7/2020 Tang et al.
2020/0226823 A1 7/2020 Stachniak et al.
2020/0242844 A1 7/2020 Bae et al.
2020/0257245 A1 8/2020 Linville et al.
2020/0257484 A1 8/2020 Qian et al.
2020/0258481 A1 8/2020 Woo et al.
2020/0267326 A1 8/2020 Yim
2020/0272303 A1 8/2020 Jia et al.
2020/0285314 A1 9/2020 Cieplinski et al.
2020/0286299 A1 9/2020 Wang et al.
2020/0301513 A1 9/2020 Mejia Cobo
2020/0318955 A1 10/2020 Sharapov et al.
2020/0319704 A1 10/2020 Kathuria et al.
2020/0328913 A1 10/2020 Wyas et al.
2020/0356221 A1 11/2020 Behzadi et al.
2020/0357184 A1 11/2020 Paul et al.
2020/0357374 A1 11/2020 Verweij et al.
2020/0363867 A1 11/2020 Azimi et al.
2020/0371602 A1 11/2020 Kanda
2020/0371673 A1 11/2020 Faulkner
2020/0379626 A1 12/2020 Guyomard et al.
2020/0387214 A1 12/2020 Ravasz et al.
2020/0387228 A1 12/2020 Ravasz et al.
2020/0387287 A1 12/2020 Ravasz et al.
2020/0401687 A1 12/2020 Mak
2020/0412862 A1 12/2020 Oh et al.
2021/0011556 A1 1/2021 Atlas et al.
2021/0019036 A1 1/2021 Wang et al.
2021/0034163 A1 2/2021 Goel et al.
2021/0034319 A1 2/2021 Wang et al.
2021/0049826 A1 2/2021 Takahashi
2021/0055789 A1 2/2021 Tsai et al.
2021/0056748 A1 2/2021 Pritchett
2021/0067418 A1 3/2021 Ely et al.
2021/0074062 A1 3/2021 Madonna et al.
2021/0090222 A1 3/2021 Lee et al.
2021/0090337 A1 3/2021 Ravasz et al.
2021/0090348 A1 3/2021 Croxford et al.
2021/0096726 A1 4/2021 Faulkner et al.
2021/0097766 A1 4/2021 Palangie et al.
2021/0102820 A1 4/2021 Le et al.
2021/0103333 A1 4/2021 Cieplinski et al.
2021/0125414 A1 4/2021 Berkebile
2021/0132687 A1 5/2021 Luo et al.
2021/0134069 A1 5/2021 Sorrento
2021/0134248 A1 5/2021 Wan et al.
2021/0142552 A1 5/2021 Kimura et al.
2021/0158624 A1 5/2021 Moon et al.
2021/0165484 A1 6/2021 Suguhara et al.
2021/0165923 A1 6/2021 Johnston
2021/0166437 A1 6/2021 Legendre et al.
2021/0173340 A1 6/2021 Kim
2021/0173536 A1 6/2021 Kondo
2021/0191600 A1 6/2021 Lemay et al.
2021/0225043 A1 7/2021 Tang et al.
2021/0227601 A1 7/2021 Eom et al.
2021/0241483 A1 8/2021 Dryer et al.
2021/0248674 A1 8/2021 Ogunbunmi
2021/0272367 A1 9/2021 Richter
2021/0272537 A1 9/2021 Mak
2021/0279957 A1 9/2021 Eder et al.
2021/0279967 A1 9/2021 Gernoth et al.
2021/0287439 A1 9/2021 Goodrich et al.
2021/0295592 A1 9/2021 Von Cramon
2021/0295602 A1 9/2021 Scapel et al.
2021/0303074 A1 9/2021 Vanblon et al.
2021/0303107 A1 9/2021 Pla I Conesa et al.
2021/0312713 A1 10/2021 Peri et al.
2021/0312717 A1 10/2021 Mao
2021/0319617 A1 10/2021 Ahn et al.
2021/0326094 A1 10/2021 Buerli et al.
2021/0327140 A1 10/2021 Rothkopf et al.
2021/0331069 A1 10/2021 Gustafson et al.
2021/0333864 A1 10/2021 Harvey et al.
2021/0339134 A1 11/2021 Knoppert
2021/0350564 A1 11/2021 Peuhkurinen et al.
2021/0350604 A1 11/2021 Pejsa et al.
2021/0350634 A1 11/2021 Major et al.
2021/0352172 A1 11/2021 Kim et al.
2021/0358294 A1 11/2021 Parashar et al.
2021/0366440 A1 11/2021 Burns et al.
2021/0368136 A1 11/2021 Chalmers et al.
2021/0374221 A1 12/2021 Markhasin et al.
2021/0375022 A1 12/2021 Lee et al.
2021/0383097 A1 12/2021 Guerard et al.
2021/0400744 A1 12/2021 Chen et al.
2021/0402306 A1 12/2021 Huang
2021/0405760 A1 12/2021 Schoen
2022/0011577 A1 1/2022 Lawver et al.
2022/0011855 A1 1/2022 Hazra et al.
2022/0012002 A1 1/2022 Bar-zeev et al.
2022/0027115 A1 1/2022 Haapoja et al.
2022/0028108 A1 1/2022 Haapoja et al.
2022/0030197 A1 1/2022 Ishimoto
2022/0070241 A1 3/2022 Yerli
2022/0076496 A1 3/2022 Palangie et al.
2022/0083145 A1 3/2022 Matsunaga et al.
2022/0083197 A1 3/2022 Rockel et al.
2022/0084279 A1 3/2022 Lindmeier et al.
2022/0086203 A1 3/2022 Morris et al.
2022/0086205 A1 3/2022 Lebeau et al.
2022/0091722 A1 3/2022 Faulkner et al.
2022/0091723 A1 3/2022 Faulkner et al.
2022/0092862 A1 3/2022 Faulkner et al.
2022/0100265 A1 3/2022 Kies et al.
2022/0100270 A1 3/2022 Pastrana Vicente et al.
2022/0101593 A1 3/2022 Rockel et al.
2022/0101612 A1 3/2022 Palangie et al.
2022/0104910 A1 4/2022 Shelton et al.
2022/0121344 A1 4/2022 Pastrana Vicente et al.
2022/0122303 A1 4/2022 Sasikumar et al.
2022/0124286 A1 4/2022 Punwani et al.
2022/0130107 A1 4/2022 Lindh
2022/0130126 A1 4/2022 Delgado et al.
2022/0137701 A1 5/2022 Bowman et al.
2022/0137705 A1 5/2022 Hashimoto et al.
2022/0148257 A1 5/2022 Boubekeur et al.
2022/0155863 A1 5/2022 Wang et al.
2022/0155909 A1 5/2022 Kawashima et al.
2022/0157029 A1* 5/2022 Horita ..................... G06T 19/20
2022/0157083 A1 5/2022 Jandhyala et al.
2022/0165013 A1 5/2022 Velez et al.
2022/0179503 A1 6/2022 Timonen et al.
2022/0187907 A1 6/2022 Lee et al.
2022/0191570 A1 6/2022 Reid et al.
2022/0197403 A1 6/2022 Hughes et al.
2022/0198755 A1 6/2022 Pinchon
2022/0206298 A1 6/2022 Goodman
2022/0206588 A1 6/2022 Canberk et al.
2022/0207840 A1 6/2022 Cansizoglu et al.
2022/0214743 A1 7/2022 Dascola et al.
2022/0221976 A1 7/2022 Agarwal et al.
2022/0229524 A1 7/2022 Mckenzie et al.
2022/0229534 A1 7/2022 Terre et al.
2022/0232191 A1 7/2022 Kawakami et al.
2022/0236801 A1 7/2022 Serbanati et al.
2022/0239718 A1 7/2022 Song et al.

(56) References Cited

U.S. PATENT DOCUMENTS

| | | | |
|---|---|---|---|
| 2022/0244536 | A1 | 8/2022 | Sha et al. |
| 2022/0245888 | A1 | 8/2022 | Singh et al. |
| 2022/0253125 | A1 | 8/2022 | Wallen et al. |
| 2022/0253136 | A1 | 8/2022 | Holder et al. |
| 2022/0253149 | A1 | 8/2022 | Berliner et al. |
| 2022/0253194 | A1 | 8/2022 | Berliner et al. |
| 2022/0255995 | A1 | 8/2022 | Berliner et al. |
| 2022/0276720 | A1 | 9/2022 | Yasui |
| 2022/0277533 | A1 | 9/2022 | Park |
| 2022/0279303 | A1 | 9/2022 | Marculescu et al. |
| 2022/0286488 | A1 | 9/2022 | Berliner et al. |
| 2022/0287676 | A1 | 9/2022 | Steines et al. |
| 2022/0291808 | A1 | 9/2022 | Stevens et al. |
| 2022/0292783 | A1 | 9/2022 | Jayaram et al. |
| 2022/0292784 | A1 | 9/2022 | Jayaram et al. |
| 2022/0292785 | A1 | 9/2022 | Jayaram et al. |
| 2022/0295032 | A1 | 9/2022 | Jayaram et al. |
| 2022/0295040 | A1 | 9/2022 | Jayaram et al. |
| 2022/0295139 | A1 | 9/2022 | Jayaram et al. |
| 2022/0301264 | A1 | 9/2022 | O'Leary et al. |
| 2022/0303680 | A1 | 9/2022 | Ahmed et al. |
| 2022/0311950 | A1 | 9/2022 | Ith et al. |
| 2022/0317776 | A1 | 10/2022 | Sundstrom et al. |
| 2022/0319134 | A1 | 10/2022 | Rodrigues et al. |
| 2022/0326837 | A1 | 10/2022 | Dessero et al. |
| 2022/0335697 | A1 | 10/2022 | Harding et al. |
| 2022/0365595 | A1 | 11/2022 | Cieplinski et al. |
| 2022/0365740 | A1 | 11/2022 | Chang et al. |
| 2022/0374136 | A1 | 11/2022 | Chang et al. |
| 2022/0382385 | A1 | 12/2022 | Chen et al. |
| 2022/0383592 | A1 | 12/2022 | Hare et al. |
| 2022/0391158 | A1 | 12/2022 | Lemmens et al. |
| 2022/0392169 | A1 | 12/2022 | Simpson et al. |
| 2022/0397962 | A1 | 12/2022 | Goel et al. |
| 2022/0408164 | A1 | 12/2022 | Lee et al. |
| 2022/0413691 | A1 | 12/2022 | Becker et al. |
| 2022/0414975 | A1 | 12/2022 | Becker et al. |
| 2022/0414999 | A1 | 12/2022 | Ravasz et al. |
| 2022/0415094 | A1 | 12/2022 | Kim et al. |
| 2023/0004216 | A1 | 1/2023 | Rodgers et al. |
| 2023/0007335 | A1 | 1/2023 | Gupta et al. |
| 2023/0008537 | A1 | 1/2023 | Henderson et al. |
| 2023/0009683 | A1* | 1/2023 | Biran .................... G06T 19/006 |
| 2023/0021861 | A1 | 1/2023 | Fujiwara et al. |
| 2023/0027040 | A1 | 1/2023 | Wang et al. |
| 2023/0030699 | A1 | 2/2023 | Zion et al. |
| 2023/0031832 | A1 | 2/2023 | Lipton et al. |
| 2023/0032545 | A1 | 2/2023 | Mindlin et al. |
| 2023/0032771 | A1 | 2/2023 | Zion et al. |
| 2023/0068660 | A1 | 3/2023 | Brent et al. |
| 2023/0069764 | A1 | 3/2023 | Jonker et al. |
| 2023/0074080 | A1 | 3/2023 | Miller et al. |
| 2023/0076326 | A1 | 3/2023 | Xu et al. |
| 2023/0092282 | A1 | 3/2023 | Boesel et al. |
| 2023/0092874 | A1 | 3/2023 | Krivoruchko et al. |
| 2023/0093979 | A1 | 3/2023 | Stauber et al. |
| 2023/0100610 | A1 | 3/2023 | Pastrana Vicente et al. |
| 2023/0100689 | A1 | 3/2023 | Chiu et al. |
| 2023/0103161 | A1 | 3/2023 | Li et al. |
| 2023/0114080 | A1 | 4/2023 | Yang et al. |
| 2023/0119162 | A1 | 4/2023 | Lipton et al. |
| 2023/0120052 | A1 | 4/2023 | Wallen et al. |
| 2023/0130520 | A1 | 4/2023 | Kaptelinin |
| 2023/0133579 | A1 | 5/2023 | Chang et al. |
| 2023/0152889 | A1 | 5/2023 | Cieplinski et al. |
| 2023/0152935 | A1 | 5/2023 | Mckenzie et al. |
| 2023/0154122 | A1 | 5/2023 | Dascola et al. |
| 2023/0163987 | A1 | 5/2023 | Young et al. |
| 2023/0168745 | A1 | 6/2023 | Yoda |
| 2023/0168788 | A1 | 6/2023 | Faulkner et al. |
| 2023/0176806 | A1 | 6/2023 | Chen et al. |
| 2023/0185426 | A1 | 6/2023 | Rockel et al. |
| 2023/0186577 | A1 | 6/2023 | Rockel et al. |
| 2023/0206572 | A1 | 6/2023 | Pazmino et al. |
| 2023/0206921 | A1 | 6/2023 | Edelsburg et al. |

| | | | |
|---|---|---|---|
| 2023/0221833 | A1 | 7/2023 | Holder et al. |
| 2023/0236660 | A1 | 7/2023 | Kundu |
| 2023/0244857 | A1 | 8/2023 | Weiss et al. |
| 2023/0259265 | A1 | 8/2023 | Krivoruchko et al. |
| 2023/0260240 | A1 | 8/2023 | Jayaram et al. |
| 2023/0266859 | A1 | 8/2023 | Day et al. |
| 2023/0273706 | A1 | 8/2023 | Smith et al. |
| 2023/0274504 | A1 | 8/2023 | Ren et al. |
| 2023/0290042 | A1 | 9/2023 | Casella et al. |
| 2023/0308610 | A1 | 9/2023 | Henderson et al. |
| 2023/0308630 | A1 | 9/2023 | Delgado |
| 2023/0314801 | A1 | 10/2023 | Bove et al. |
| 2023/0315385 | A1 | 10/2023 | Akmal et al. |
| 2023/0316634 | A1 | 10/2023 | Chiu et al. |
| 2023/0325004 | A1 | 10/2023 | Burns et al. |
| 2023/0325046 | A1 | 10/2023 | De Almeida E De Vincenzo et al. |
| 2023/0333646 | A1 | 10/2023 | Pastrana Vicente et al. |
| 2023/0334808 | A1 | 10/2023 | Sundstrom et al. |
| 2023/0341932 | A1 | 10/2023 | Silva et al. |
| 2023/0343049 | A1 | 10/2023 | Boesel et al. |
| 2023/0350539 | A1 | 11/2023 | Owen et al. |
| 2023/0351702 | A1 | 11/2023 | Tan et al. |
| 2023/0353398 | A1 | 11/2023 | White |
| 2023/0359199 | A1 | 11/2023 | Adachi et al. |
| 2023/0368475 | A1 | 11/2023 | Chan et al. |
| 2023/0377259 | A1 | 11/2023 | Becker et al. |
| 2023/0377268 | A1 | 11/2023 | Hopkins et al. |
| 2023/0377295 | A1 | 11/2023 | Angevine et al. |
| 2023/0377299 | A1 | 11/2023 | Becker et al. |
| 2023/0377300 | A1 | 11/2023 | Becker et al. |
| 2023/0384907 | A1 | 11/2023 | Boesel et al. |
| 2023/0385532 | A1 | 11/2023 | Mcveigh et al. |
| 2023/0388357 | A1 | 11/2023 | Faulkner et al. |
| 2023/0394755 | A1 | 12/2023 | Negoita et al. |
| 2023/0396854 | A1 | 12/2023 | Sanders et al. |
| 2023/0400958 | A1 | 12/2023 | Morrison et al. |
| 2024/0012530 | A1* | 1/2024 | Lin ....................... G06F 3/0482 |
| 2024/0037886 | A1 | 2/2024 | Chiu et al. |
| 2024/0062279 | A1 | 2/2024 | Scully et al. |
| 2024/0070948 | A1 | 2/2024 | Bradley et al. |
| 2024/0086031 | A1 | 3/2024 | Palangie et al. |
| 2024/0086032 | A1 | 3/2024 | Palangie et al. |
| 2024/0087256 | A1 | 3/2024 | Hylak et al. |
| 2024/0094863 | A1 | 3/2024 | Smith et al. |
| 2024/0094866 | A1 | 3/2024 | Lemay et al. |
| 2024/0094882 | A1 | 3/2024 | Brewer et al. |
| 2024/0095984 | A1 | 3/2024 | Ren et al. |
| 2024/0102821 | A1 | 3/2024 | Vallet et al. |
| 2024/0103613 | A1 | 3/2024 | Chawda et al. |
| 2024/0103616 | A1 | 3/2024 | Yerkes et al. |
| 2024/0103636 | A1 | 3/2024 | Lindmeier et al. |
| 2024/0103676 | A1 | 3/2024 | Pastrana Vicente et al. |
| 2024/0103681 | A1 | 3/2024 | Broughton et al. |
| 2024/0103685 | A1 | 3/2024 | Pazmino et al. |
| 2024/0103686 | A1 | 3/2024 | Pazmino et al. |
| 2024/0103687 | A1 | 3/2024 | Pastrana Vicente et al. |
| 2024/0103701 | A1 | 3/2024 | Pastrana Vicente et al. |
| 2024/0103704 | A1 | 3/2024 | Pastrana Vicente et al. |
| 2024/0103707 | A1 | 3/2024 | Henderson et al. |
| 2024/0103716 | A1 | 3/2024 | Pastrana Vicente et al. |
| 2024/0103803 | A1 | 3/2024 | Krivoruchko et al. |
| 2024/0104836 | A1 | 3/2024 | Dessero et al. |
| 2024/0104843 | A1 | 3/2024 | Mckenzie et al. |
| 2024/0104870 | A1 | 3/2024 | Fuste Lleixa et al. |
| 2024/0104873 | A1 | 3/2024 | Pastrana Vicente et al. |
| 2024/0104875 | A1 | 3/2024 | Couche et al. |
| 2024/0104876 | A1 | 3/2024 | Couche et al. |
| 2024/0104877 | A1 | 3/2024 | Henderson et al. |
| 2024/0111479 | A1 | 4/2024 | Paul |
| 2024/0119682 | A1 | 4/2024 | Rudman et al. |
| 2024/0126362 | A1 | 4/2024 | Burns et al. |
| 2024/0135612 | A1 | 4/2024 | Hold-geoffroy et al. |
| 2024/0152245 | A1 | 5/2024 | Broughton et al. |
| 2024/0152256 | A1 | 5/2024 | Dascola et al. |
| 2024/0185514 | A1 | 6/2024 | Singh et al. |
| 2024/0192764 | A1 | 6/2024 | Dascola et al. |
| 2024/0193892 | A1 | 6/2024 | Lutter et al. |
| 2024/0200967 | A1 | 6/2024 | Arroyo et al. |

(56) References Cited

U.S. PATENT DOCUMENTS

| | | | |
|---|---|---|---|
| 2024/0203066 | A1 | 6/2024 | Kawashima et al. |
| 2024/0205509 | A1 | 6/2024 | Kim et al. |
| 2024/0221273 | A1 | 7/2024 | Dusseau et al. |
| 2024/0221291 | A1 | 7/2024 | Henderson et al. |
| 2024/0233097 | A1 | 7/2024 | Ngo et al. |
| 2024/0233288 | A1 | 7/2024 | Stauber et al. |
| 2024/0265656 | A1 | 8/2024 | Victor-faichney et al. |
| 2024/0265796 | A1 | 8/2024 | Ippadi Veerabhadre Gowda et al. |
| 2024/0272722 | A1 | 8/2024 | Gitter et al. |
| 2024/0272782 | A1 | 8/2024 | Pastrana Vicente et al. |
| 2024/0273838 | A1 | 8/2024 | Palangie et al. |
| 2024/0281108 | A1 | 8/2024 | Krivoruchko et al. |
| 2024/0281109 | A1 | 8/2024 | Manjunath et al. |
| 2024/0291953 | A1 | 8/2024 | Cerra et al. |
| 2024/0297919 | A1 | 9/2024 | Berliner et al. |
| 2024/0310971 | A1 | 9/2024 | Kawashima et al. |
| 2024/0338104 | A1 | 10/2024 | Salter et al. |
| 2024/0338921 | A1 | 10/2024 | Burgner et al. |
| 2024/0361832 | A1 | 10/2024 | Calderone et al. |
| 2024/0361833 | A1 | 10/2024 | Calderone et al. |
| 2024/0361835 | A1 | 10/2024 | Hylak et al. |
| 2024/0393876 | A1 | 11/2024 | Chawda et al. |
| 2024/0402800 | A1 | 12/2024 | Shutzberg et al. |
| 2024/0402821 | A1 | 12/2024 | Meyer et al. |
| 2024/0403080 | A1 | 12/2024 | Laurita et al. |
| 2024/0404206 | A1 | 12/2024 | Chiu et al. |
| 2024/0404207 | A1 | 12/2024 | Laurita et al. |
| 2024/0404232 | A1 | 12/2024 | Rockwell et al. |
| 2024/0404233 | A1 | 12/2024 | Boesel et al. |
| 2024/0411444 | A1 | 12/2024 | Shutzberg et al. |
| 2024/0420435 | A1 | 12/2024 | Gitter et al. |
| 2024/0428488 | A1 | 12/2024 | Ren et al. |
| 2025/0005855 | A1 | 1/2025 | Holder et al. |
| 2025/0005864 | A1 | 1/2025 | Dessero et al. |
| 2025/0008057 | A1 | 1/2025 | Chiu et al. |
| 2025/0013343 | A1 | 1/2025 | Smith et al. |
| 2025/0013344 | A1 | 1/2025 | Smith et al. |
| 2025/0024008 | A1 | 1/2025 | Cerra et al. |
| 2025/0028423 | A1 | 1/2025 | Dessero et al. |
| 2025/0029319 | A1 | 1/2025 | Boesel et al. |
| 2025/0029328 | A1 | 1/2025 | Smith et al. |
| 2025/0031002 | A1 | 1/2025 | Hawkins et al. |
| 2025/0036253 | A1 | 1/2025 | Stauber et al. |
| 2025/0036255 | A1 | 1/2025 | Pastrana Vicente et al. |
| 2025/0069328 | A1 | 2/2025 | Herscher et al. |
| 2025/0077060 | A1 | 3/2025 | Becker et al. |
| 2025/0077066 | A1 | 3/2025 | Lutter |
| 2025/0078420 | A1 | 3/2025 | Dessero et al. |
| 2025/0078429 | A1 | 3/2025 | Dascola et al. |
| 2025/0103132 | A1 | 3/2025 | Rickwald et al. |
| 2025/0104335 | A1 | 3/2025 | Huang et al. |
| 2025/0104367 | A1 | 3/2025 | Huang et al. |
| 2025/0106581 | A1 | 3/2025 | Lutter et al. |
| 2025/0106582 | A1 | 3/2025 | Lutter et al. |
| 2025/0110605 | A1 | 4/2025 | Huang et al. |
| 2025/0111472 | A1 | 4/2025 | Lutter et al. |
| 2025/0111605 | A1 | 4/2025 | Huang et al. |
| 2025/0111622 | A1 | 4/2025 | Stern et al. |
| 2025/0111626 | A1 | 4/2025 | Deliz Centeno et al. |
| 2025/0117079 | A1 | 4/2025 | Chiu et al. |
| 2025/0118038 | A1 | 4/2025 | Sorrentino et al. |
| 2025/0130707 | A1 | 4/2025 | Stauber et al. |
| 2025/0156031 | A1 | 5/2025 | Holder et al. |
| 2025/0157136 | A1 | 5/2025 | Lindmeier et al. |
| 2025/0165069 | A1 | 5/2025 | Calderone et al. |
| 2025/0199656 | A1 | 6/2025 | Lipton et al. |
| 2025/0200901 | A1 | 6/2025 | Ren et al. |
| 2025/0209744 | A1 | 6/2025 | Piemonte et al. |
| 2025/0209753 | A1 | 6/2025 | Piemonte et al. |
| 2025/0224811 | A1 | 7/2025 | Lindmeier et al. |
| 2025/0232541 | A1 | 7/2025 | Chand et al. |
| 2025/0258577 | A1 | 8/2025 | Palangie et al. |
| 2025/0278134 | A1 | 9/2025 | Pastrana Vicente et al. |
| 2025/0278166 | A1 | 9/2025 | Mckenzie et al. |
| 2025/0278907 | A1 | 9/2025 | Pazmino et al. |
| 2025/0284344 | A1 | 9/2025 | Sundstrom et al. |
| 2025/0291470 | A1 | 9/2025 | Hylak et al. |
| 2025/0306727 | A1 | 10/2025 | Kawashima et al. |

FOREIGN PATENT DOCUMENTS

| | | | |
|---|---|---|---|
| CN | 104714771 | A | 6/2015 |
| CN | 104981681 | A | 10/2015 |
| CN | 105264461 | A | 1/2016 |
| CN | 105264478 | A | 1/2016 |
| CN | 106575149 | A | 4/2017 |
| CN | 106990838 | A | 7/2017 |
| CN | 108519818 | A | 9/2018 |
| CN | 108563335 | A | 9/2018 |
| CN | 108633307 | A | 10/2018 |
| CN | 110413171 | A | 11/2019 |
| CN | 110476142 | A | 11/2019 |
| CN | 110673718 | A | 1/2020 |
| CN | 110830786 | A | 2/2020 |
| CN | 111033572 | A | 4/2020 |
| CN | 111213183 | A | 5/2020 |
| CN | 111488056 | A | 8/2020 |
| CN | 111580652 | A | 8/2020 |
| CN | 111913565 | A | 11/2020 |
| CN | 112068757 | A | 12/2020 |
| CN | 113168737 | A | 7/2021 |
| CN | 109491508 | B | 8/2022 |
| CN | 115309271 | A | 11/2022 |
| CN | 116132905 | A | 5/2023 |
| CN | 117043722 | A | 11/2023 |
| CN | 117857981 | A | 4/2024 |
| CN | 118102204 | A | 5/2024 |
| DE | 102016125811 | A1 | 11/2017 |
| DE | 102020101675 | A1 | 7/2020 |
| DE | 102020128536 | A1 | 5/2021 |
| EP | 0816983 | A2 | 1/1998 |
| EP | 1530115 | A2 | 5/2005 |
| EP | 2393056 | A1 | 12/2011 |
| EP | 2458486 | A1 | 5/2012 |
| EP | 2551763 | A1 | 1/2013 |
| EP | 2741175 | A2 | 6/2014 |
| EP | 2893297 | A1 | 7/2015 |
| EP | 2947545 | A1 | 11/2015 |
| EP | 3088997 | A1 | 11/2016 |
| EP | 3118722 | A1 | 1/2017 |
| EP | 3249497 | A1 | 11/2017 |
| EP | 3306444 | A1 | 4/2018 |
| EP | 3316075 | A1 | 5/2018 |
| EP | 3336805 | A1 | 6/2018 |
| EP | 3451135 | A1 | 3/2019 |
| EP | 3503101 | A1 | 6/2019 |
| EP | 3506151 | A1 | 7/2019 |
| EP | 3570144 | A1 | 11/2019 |
| EP | 3588255 | A1 | 1/2020 |
| EP | 3654147 | A1 | 5/2020 |
| EP | 1562021 | A1 | 5/2021 |
| EP | 4155867 | A1 | 3/2023 |
| EP | 3688726 | B1 | 8/2023 |
| GB | 2540791 | A | 2/2017 |
| JP | H06-4596 | A | 1/1994 |
| JP | H10-51711 | A | 2/1998 |
| JP | H10-78845 | A | 3/1998 |
| JP | H11-289555 | A | 10/1999 |
| JP | 2004-510239 | A | 4/2004 |
| JP | 2005-215144 | A | 8/2005 |
| JP | 2005-333524 | A | 12/2005 |
| JP | 2006-4093 | A | 1/2006 |
| JP | 2006-107048 | A | 4/2006 |
| JP | 2006-146803 | A | 6/2006 |
| JP | 2006-295236 | A | 10/2006 |
| JP | 2011-203880 | A | 10/2011 |
| JP | 2012-234550 | A | 11/2012 |
| JP | 2013-178639 | A | 9/2013 |
| JP | 2013-196158 | A | 9/2013 |
| JP | 2013-254358 | A | 12/2013 |
| JP | 2013-257716 | A | 12/2013 |
| JP | 2014-021565 | A | 2/2014 |
| JP | 2014-059840 | A | 4/2014 |
| JP | 2014-071663 | A | 4/2014 |

(56) References Cited

FOREIGN PATENT DOCUMENTS

| | | | | |
|---|---|---|---|---|
| JP | 2014-099184 A | 5/2014 | | |
| JP | 2014-514652 A | 6/2014 | | |
| JP | 2014-514653 A | 6/2014 | | |
| JP | 2015-056173 A | 3/2015 | | |
| JP | 2015-515040 A | 5/2015 | | |
| JP | 2015-118332 A | 6/2015 | | |
| JP | 2015-222565 A | 12/2015 | | |
| JP | 2016-096513 A | 5/2016 | | |
| JP | 2016-194744 A | 11/2016 | | |
| JP | 2017-027206 A | 2/2017 | | |
| JP | 2017-058528 A | 3/2017 | | |
| JP | 2017-126009 A | 7/2017 | | |
| JP | 2017-525002 A | 8/2017 | | |
| JP | 2017-531221 A | 10/2017 | | |
| JP | 2018-005516 A | 1/2018 | | |
| JP | 2018-005517 A | 1/2018 | | |
| JP | 2018-041477 A | 3/2018 | | |
| JP | 2018-514005 A | 5/2018 | | |
| JP | 2018-88118 A | 6/2018 | | |
| JP | 2018-101019 A | 6/2018 | | |
| JP | 2018-106499 A | 7/2018 | | |
| JP | 2019-040333 A | 3/2019 | | |
| JP | 2019-515361 A | 6/2019 | | |
| JP | 2019-169154 A | 10/2019 | | |
| JP | 2019-175449 A | 10/2019 | | |
| JP | 2019-527881 A | 10/2019 | | |
| JP | 2019-532382 A | 11/2019 | | |
| JP | 2019-536131 A | 12/2019 | | |
| JP | 2020-503595 A | 1/2020 | | |
| JP | 2020-86913 A | 6/2020 | | |
| JP | 2022-053334 A | 4/2022 | | |
| JP | 2022-175629 A | 11/2022 | | |
| JP | 2023-52278 A | 4/2023 | | |
| KR | 10-2011-0017236 A | 2/2011 | | |
| KR | 10-2011-0128487 A | 11/2011 | | |
| KR | 10-2014-0097654 A | 8/2014 | | |
| KR | 2016-0012139 A | 2/2016 | | |
| KR | 10-2017-0027240 A | 3/2017 | | |
| KR | 10-2018-0102171 A | 9/2018 | | |
| KR | 2019-0100957 A | 8/2019 | | |
| KR | 10-2020-0010296 A | 1/2020 | | |
| KR | 10-2020-0035103 A | 4/2020 | | |
| KR | 10-2020-0110788 A | 9/2020 | | |
| KR | 10-2020-0135496 A | 12/2020 | | |
| KR | 10-2021-0083016 A | 7/2021 | | |
| KR | 10-2021-0123530 A | 10/2021 | | |
| WO | 2010/026519 A1 | 3/2010 | | |
| WO | 2011/008638 A1 | 1/2011 | | |
| WO | 2012/145180 A1 | 10/2012 | | |
| WO | 2013/169849 A2 | 11/2013 | | |
| WO | 2013/184447 A2 | 12/2013 | | |
| WO | 2014/105276 A1 | 7/2014 | | |
| WO | 2014/190106 A1 | 11/2014 | | |
| WO | 2014/203301 A1 | 12/2014 | | |
| WO | 2015/195216 A1 | 12/2015 | | |
| WO | 2016/014877 A1 | 1/2016 | | |
| WO | 2016/118344 A1 | 7/2016 | | |
| WO | 2016/126522 A1 | 8/2016 | | |
| WO | 2017/024142 A1 | 2/2017 | | |
| WO | 2017/088487 A1 | 6/2017 | | |
| WO | 2018/005557 A1 | 1/2018 | | |
| WO | 2018/046957 A2 | 3/2018 | | |
| WO | 2018/090060 A1 | 5/2018 | | |
| WO | 2018/116556 A1 | 6/2018 | | |
| WO | WO-2018106299 A1 * | 6/2018 | ............ | G06F 3/017 |
| WO | 2018/125428 A1 | 7/2018 | | |
| WO | 2018/175735 A1 | 9/2018 | | |
| WO | 2018/213801 A1 | 11/2018 | | |
| WO | 2019/074771 A1 | 4/2019 | | |
| WO | 2019/142560 A1 | 7/2019 | | |
| WO | 2019/152286 A2 | 8/2019 | | |
| WO | 2019/172678 A1 | 9/2019 | | |
| WO | 2019/213111 A1 | 11/2019 | | |
| WO | 2019/217163 A1 | 11/2019 | | |
| WO | 2020/066682 A1 | 4/2020 | | |
| WO | 2020/105349 A1 | 5/2020 | | |
| WO | 2020/121483 A1 | 6/2020 | | |
| WO | 2020/179027 A1 | 9/2020 | | |
| WO | 2021/061349 A1 | 4/2021 | | |
| WO | 2021/061351 A1 | 4/2021 | | |
| WO | 2021/133053 A1 | 7/2021 | | |
| WO | 2021/173839 A1 | 9/2021 | | |
| WO | 2021/202783 A1 | 10/2021 | | |
| WO | 2021/203856 A1 | 10/2021 | | |
| WO | 2022/046340 A1 | 3/2022 | | |
| WO | 2022/055821 A1 | 3/2022 | | |
| WO | 2022/055822 A1 | 3/2022 | | |
| WO | 2022/066399 A1 | 3/2022 | | |
| WO | 2022/066535 A2 | 3/2022 | | |
| WO | 2022/067075 A1 | 3/2022 | | |
| WO | 2022/067343 A2 | 3/2022 | | |
| WO | 2022/072187 A2 | 4/2022 | | |
| WO | 2022/146936 A1 | 7/2022 | | |
| WO | 2022/146938 A1 | 7/2022 | | |
| WO | 2022/147146 A1 | 7/2022 | | |
| WO | 2022/164881 A1 | 8/2022 | | |
| WO | 2022/192040 A1 | 9/2022 | | |
| WO | 2022/204664 A1 | 9/2022 | | |
| WO | 2022/208797 A1 | 10/2022 | | |
| WO | 2023/043646 A1 | 3/2023 | | |
| WO | 2023/096940 A2 | 6/2023 | | |
| WO | 2023/141535 A1 | 7/2023 | | |
| WO | 2024/064373 A1 | 3/2024 | | |

OTHER PUBLICATIONS

Kim MG, Ryu J, Son J, Han J. Virtual object sizes for efficient and convenient mid-air manipulation. The Visual Computer. Sep. 2022;38(9):3463-74. (Year: 2022).*

Nunez Angulo et al., “Manual for the Design of Didactic Units in Augmented Reality Using the Cospaces EDU Application”, 2020 (Year: 2020).*

AquaSnap Window Manager: dock, snap, tile, organize [online], Nurgo Software, Available online at: <https://www.nurgo-software.com/products/aquasnap>, [retrieved on Jun. 27, 2023], 5 pages.

Corrected Notice of Allowability received for U.S. Appl. No. 17/448,875, mailed on Apr. 24, 2024, 4 pages.

Corrected Notice of Allowability received for U.S. Appl. No. 17/479,791, mailed on May 19, 2023, 2 pages.

Corrected Notice of Allowability received for U.S. Appl. No. 17/659,147, mailed on Feb. 14, 2024, 6 pages.

Corrected Notice of Allowability received for U.S. Appl. No. 17/932,655, mailed on Oct. 12, 2023, 2 pages.

Corrected Notice of Allowability received for U.S. Appl. No. 18/154,757, mailed on Aug. 30, 2024, 2 pages.

Corrected Notice of Allowability received for U.S. Appl. No. 18/421,827, mailed on Aug. 29, 2024, 2 pages.

Corrected Notice of Allowability received for U.S. Appl. No. 18/463,739, mailed on Oct. 4, 2024, 2 pages.

Corrected Notice of Allowability received for U.S. Appl. No. 18/465,098, mailed on Mar. 13, 2024, 3 pages.

Corrected Notice of Allowability received for U.S. Appl. No. 17/935,095, mailed on Oct. 18, 2024, 3 Pages.

Corrected Notice of Allowance received for U.S. Appl. No. 17/478,593, mailed on Dec. 21, 2022, 2 pages.

European Search Report received for European Patent Application No. 21791153.6, mailed on Mar. 22, 2024, 5 pages.

European Search Report received for European Patent Application No. 21801378.7, mailed on Jul. 10, 2024, 5 pages.

Extended European Search Report received for European Patent Application No. 23158818.7, mailed on Jul. 3, 2023, 12 pages.

Extended European Search Report received for European Patent Application No. 23158929.2, mailed on Jun. 27, 2023, 12 pages.

Extended European Search Report received for European Patent Application No. 23197572.3, mailed on Feb. 19, 2024, 7 pages.

Extended European Search Report received for European Patent Application No. 24159868.9, mailed on Oct. 9, 2024, 13 pages.

Extended European Search Report received for European Patent Application No. 24179233.2, mailed on Oct. 2, 2024, 10 pages.

(56) References Cited

OTHER PUBLICATIONS

Extended European Search Report received for European Patent Application No. 24179830.5, mailed on Nov. 5, 2024, 11 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html>[Search Date Aug. 22, 2023], Sep. 20, 2021, 8 pages (1 page of English Abstract and 7 pages of Official Copy).
International Search Report received for PCT Patent Application No. PCT/US2021/050948, mailed on Mar. 4, 2022, 6 pages.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Schenk et al., "SPOCK: A Smooth Pursuit Oculomotor Control Kit", CHI'16 Extended Abstracts, San Jose, CA, USA, ACM, May 7-12, 2016, pp. 2681-2687.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076985, mailed on Feb. 20, 2023, 5 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 17/935,095, mailed on Jun. 22, 2023, 15 pages.
Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/305,201, mailed on May 23, 2024, 11 pages.
Non-Final Office Action received for U.S. Appl. No. 18/322,469, mailed on Nov. 15, 2024, 34 pages.
Non-Final Office Action received for U.S. Appl. No. 18/327,318, mailed on Sep. 16, 2024, 13 pages.

(56) References Cited

OTHER PUBLICATIONS

Non-Final Office Action received for U.S. Appl. No. 18/336,770, mailed on Jun. 5, 2024, 12 pages.
Non-Final Office Action received for U.S. Appl. No. 18/473,196, mailed on Aug. 16, 2024, 21 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/816,314, mailed on Jan. 4, 2024, 6 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Restriction Requirement received for U.S. Appl. No. 17/932,999, mailed on Oct. 3, 2023, 6 pages.
Report received for Chinese Patent Application No. 202310873465.7, mailed on Feb. 1, 2024, 5 pages (2 pages of English Translation and 3 pages of Official Copy).
Supplemental Notice of Allowance received for U.S. Appl. No. 14/531,874, mailed on Jul. 26, 2017, 5 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought the Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Fatima et al., "Eye Movement Based Human Computer Interaction", 3rd International Conference on Recent Advances in Information Technology (RAIT), Mar. 3, 2016, pp. 489-494.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lin et al., "Towards Naturally Grabbing and Moving Objects in VR", IS&T International Symposium on Electronic Imaging and the Engineering Reality of Virtual Reality, 2016, 6 pages.
Mcgill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Pfeuffer et al., "Gaze and Touch Interaction on Tablets", UIST '16, Tokyo, Japan, ACM, Oct. 16-19, 2016, pp. 301-311.
Extended European Search Report received for European Patent Application No. 25179367.5, mailed on Jul. 1, 2025, 10 pages.
Extended European Search Report received for European Patent Application No. 25169060.8, mailed on May 12, 2025, 10 pages.
Notice of Allowance received for U.S. Appl. No. 18/427,434, mailed on Sep. 17, 2025, 10 pages.
Extended European Search Report received for European Patent Application No. 25169059.0, mailed on May 12, 2025, 11 pages.
Extended European Search Report received for European Patent Application No. 25174955.2, mailed on Jun. 25, 2025, 12 pages.
Non-Final Office Action received for U.S. Appl. No. 18/473,198, mailed on Jul. 15, 2025, 13 pages.
Notice of Allowance received for U.S. Appl. No. 18/174,403, mailed on Aug. 21, 2025, 13 pages.
Notice of Allowance received for U.S. Appl. No. 18/894,997, mailed on Aug. 12, 2025, 13 pages.

(56) References Cited

OTHER PUBLICATIONS

Non-Final Office Action received for U.S. Appl. No. 18/473,197, mailed on May 1, 2025, 14 pages.
Non-Final Office Action received for U.S. Appl. No. 18/896,227, mailed on May 29, 2025, 14 pages.
Notice of Allowance received for U.S. Appl. No. 18/322,469, mailed on Jul. 7, 2025, 14 pages.
Notice of Allowance received for U.S. Appl. No. 18/322,469, mailed on Mar. 19, 2025, 14 pages.
Non-Final Office Action received for U.S. Appl. No. 18/473,187, mailed on May 16, 2025, 15 pages.
Non-Final Office Action received for U.S. Appl. No. 18/473,195, mailed on Jun. 27, 2025, 16 pages.
Non-Final Office Action received for U.S. Appl. No. 18/587,815, mailed on Sep. 25, 2025, 16 pages.
Non-Final Office Action received for U.S. Appl. No. 18/473,242, mailed on Sep. 5, 2025, 17 pages.
Non-Final Office Action received for U.S. Appl. No. 18/916,583, mailed on Oct. 2, 2025, 18 pages.
Non-Final Office Action received for U.S. Appl. No. 18/467,523, mailed on Jun. 17, 2025, 19 pages.
Non-Final Office Action received for U.S. Appl. No. 18/471,729, mailed on Jun. 17, 2025, 19 pages.
Corrected Notice of Allowability received for U.S. Appl. No. 18/146,234, mailed on Mar. 20, 2025, 2 pages.
Corrected Notice of Allowability received for U.S. Appl. No. 18/152,656, mailed on Jul. 22, 2025, 2 pages.
Corrected Notice of Allowability received for U.S. Appl. No. 18/157,040, mailed on Sep. 25, 2025, 2 pages.
Corrected Notice of Allowability received for U.S. Appl. No. 18/473,180, mailed on Apr. 1, 2025, 2 pages.
Corrected Notice of Allowability received for U.S. Appl. No. 18/988,115, mailed on Jul. 15, 2025, 2 pages.
Corrected Notice of Allowance received for U.S. Appl. No. 18/424,644, mailed on Jun. 24, 2025, 2 pages.
Supplemental Notice of Allowability received for U.S. Appl. No. 18/473,261, mailed on Sep. 30, 2025, 2 pages.
Final Office Action received for U.S. Appl. No. 18/473,196, mailed on Jul. 16, 2025, 20 pages.
Non-Final Office Action received for U.S. Appl. No. 17/905,483, mailed on Jul. 15, 2025, 20 pages.
Non-Final Office Action received for U.S. Appl. No. 18/518,340, mailed on Jul. 22, 2025, 20 pages.
Final Office Action received for U.S. Appl. No. 18/317,890, mailed on Sep. 3, 2025, 22 pages.
Non-Final Office Action received for U.S. Appl. No. 18/473,176, mailed on May 14, 2025, 23 pages.
Final Office Action received for U.S. Appl. No. 18/149,640, mailed on May 21, 2025, 24 pages.
Non-Final Office Action received for U.S. Appl. No. 18/174,403, mailed on Mar. 20, 2025, 26 pages.
Non-Final Office Action received for U.S. Appl. No. 18/317,890, mailed on Apr. 17, 2025, 26 pages.
Non-Final Office Action received for U.S. Appl. No. 18/327,844, mailed on Mar. 24, 2025, 27 pages.
Final Office Action received for U.S. Appl. No. 17/933,020, mailed on May 21, 2025, 28 pages.
Non-Final Office Action received for U.S. Appl. No. 17/933,020, mailed on Oct. 1, 2025, 28 pages.
Final Office Action received for U.S. Appl. No. 18/298,994, mailed on Sep. 12, 2025, 32 pages.
Non-Final Office Action received for U.S. Appl. No. 18/317,886, mailed on Apr. 30, 2025, 34 pages.
Non-Final Office Action received for U.S. Appl. No. 18/587,739, mailed on Sep. 16, 2025, 34 pages.
Non-Final Office Action received for U.S. Appl. No. 18/473,260, mailed on Jun. 27, 2025, 35 pages.
Non-Final Office Action received for U.S. Appl. No. 18/473,239, mailed on Sep. 10, 2025, 38 pages.
European Search Report received for European Patent Application No. 22723527.2, mailed on May 12, 2025, 4 pages.
International Search Report received for PCT Patent Application No. PCT/US2023/074978, mailed on Apr. 4, 2024, 4 pages.
International Search Report received for PCT Patent Application No. PCT/US2024/012828, mailed on May 6, 2024, 4 pages.
International Search Report received for PCT Patent Application No. PCT/US2024/032109, mailed on Sep. 13, 2024, 4 pages.
International Search Report received for PCT Patent Application No. PCT/US2024/043470, mailed on Oct. 29, 2024, 4 pages.
International Search Report received for PCT Patent Application No. PCT/US2025/011189, mailed on Apr. 23, 2025, 4 pages.
Non-Final Office Action received for U.S. Appl. No. 17/202,034, mailed on Jun. 4, 2025, 40 pages.
Non-Final Office Action received for U.S. Appl. No. 18/473,184, mailed on Jul. 25, 2025, 40 pages.
Final Office Action received for U.S. Appl. No. 18/645,292, mailed on Jun. 2, 2025, 41 pages.
Search Report received for Chinese Patent Application No. 202210728190.3, mailed on Aug. 29, 2025, 5 pages (2 pages of English Translation and 3 pages of Official Copy Only).
Notice of Allowance received for U.S. Appl. No. 18/988,115, mailed on Oct. 7, 2025, 5 pages.
International Search Report received for PCT Patent Application No. PCT/US2023/074960, mailed on Feb. 12, 2024, 6 pages.
International Search Report received for PCT Patent Application No. PCT/US2024/032153, mailed on Nov. 11, 2024, 6 pages.
Notice of Allowance received for U.S. Appl. No. 18/152,656, mailed on Jun. 25, 2025, 6 pages.
Notice of Allowance received for U.S. Appl. No. 18/424,644, mailed on Jun. 11, 2025, 6 pages.
Extended European Search Report received for European Patent Application No. 24221722.2, mailed on Apr. 17, 2025, 7 pages.
International Search Report received for PCT Patent Application No. PCT/US2023/074973, mailed on Mar. 7, 2024, 7 pages.
Notice of Allowance received for U.S. Appl. No. 18/153,943, mailed on Jun. 17, 2025, 7 pages.
Notice of Allowance received for U.S. Appl. No. 18/304,290, mailed on Aug. 20, 2025, 7 pages.
Notice of Allowance received for U.S. Appl. No. 18/988,115, mailed on Jun. 30, 2025, 7 pages.
Non-Final Office Action received for U.S. Appl. No. 18/882,622, mailed on May 22, 2025, 8 pages.
Notice of Allowance received for U.S. Appl. No. 18/473,182, mailed on Apr. 23, 2025, 8 pages.
Notice of Allowance received for U.S. Appl. No. 17/655,521, mailed on Apr. 16, 2025, 8 pages.
Notice of Allowance received for U.S. Appl. No. 18/473,179, mailed on Oct. 6, 2025, 8 pages.
Notice of Allowance received for U.S. Appl. No. 18/473,262, mailed on Oct. 7, 2025, 8 pages.
Notice of Allowance received for U.S. Appl. No. 18/882,622, mailed on Aug. 27, 2025, 8 pages.
Notice of Allowance received for U.S. Appl. No. 18/896,227, mailed on Jul. 11, 2025, 8 pages.
Notice of Allowance received for U.S. Appl. No. 18/919,095, mailed on Jul. 22, 2025, 8 pages.
Notice of Allowance received for U.S. Appl. No. 18/153,943, mailed on Oct. 7, 2025, 9 pages.
Notice of Allowance received for U.S. Appl. No. 18/157,040, mailed on Jun. 24, 2025, 9 pages.
Notice of Allowance received for U.S. Appl. No. 18/427,434, mailed on Apr. 17, 2025, 9 pages.
Notice of Allowance received for U.S. Appl. No. 18/471,850, mailed on Jun. 10, 2025, 9 pages.
Notice of Allowance received for U.S. Appl. No. 18/473,179, mailed on May 8, 2025, 9 pages.
Notice of Allowance received for U.S. Appl. No. 18/473,261, mailed on Sep. 23, 2025, 9 pages.
Notice of Allowance received for U.S. Appl. No. 18/473,262, mailed on Jun. 10, 2025, 9 pages.
Notice of Allowance received for U.S. Appl. No. 18/515,188, mailed on Mar. 20, 2025, 9 pages.

(56) References Cited

OTHER PUBLICATIONS

Adding Environments, Available online at: https://manual.keyshot.com/manual/environments/adding-environments/, [retrieved on Jun. 9, 2023], 2 pages.
Applicant-Initiated Interview Summary received for U.S. Appl. No. 18/119,219, mailed on May 21, 2024, 3 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Corrected Notice of Allowability received for U.S. Appl. No. 17/469,788, mailed on Feb. 12, 2025, 2 pages.
Corrected Notice of Allowability received for U.S. Appl. No. 17/932,999, mailed on Feb. 20, 2025, 2 pages.
Corrected Notice of Allowability received for U.S. Appl. No. 17/932,999, mailed on Jan. 23, 2025, 9 pages.
Corrected Notice of Allowability received for U.S. Appl. No. 18/146,234, mailed on Feb. 6, 2025, 2 pages.
Corrected Notice of Allowability received for U.S. Appl. No. 18/174,337, mailed on Jan. 15, 2025, 2 pages.
Corrected Notice of Allowance received for U.S. Appl. No. 17/407,675, mailed on Dec. 24, 2024, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
European Search Report received for European Patent Application No. 22703771.0, mailed on Feb. 26, 2025, 4 pages.
Ex Parte Quayle Action received for U.S. Appl. No. 17/655,347, mailed on Jul. 8, 2024, 6 pages.
Extended European Search Report received for European Patent Application No. 24158036.4, mailed on Jul. 18, 2024, 12 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24190323.6, mailed on Dec. 12, 2024, 9 pages.
Extended European Search Report received for European Patent Application No. 24217335.9, mailed on Feb. 24, 2025, 8 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/407,675, mailed on May 22, 2024, 18 pages.
Final Office Action received for U.S. Appl. No. 17/469,788, mailed on Nov. 16, 2023, 24 pages.
Final Office Action received for U.S. Appl. No. 17/580,495, mailed on Feb. 12, 2025, 29 pages.
Final Office Action received for U.S. Appl. No. 17/655,521, mailed on Apr. 10, 2024, 18 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 18/157,040, mailed on Dec. 2, 2024, 25 pages.
Final Office Action received for U.S. Appl. No. 18/327,844, mailed on Nov. 29, 2024, 25 pages.
Final Office Action received for U.S. Appl. No. 18/473,196, mailed on Dec. 6, 2024, 22 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
International Search Report received for PCT Patent Application No. PCT/US2022/071228, mailed on Aug. 25, 2022, 6 pages.
International Search Report received for PCT Patent Application No. PCT/US2022/076808, mailed on Mar. 28, 2023, 6 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/060592, mailed on Jun. 14, 2023, 7 pages.
International Search Report received for PCT Patent Application No. PCT/US2023/074955, mailed on Feb. 1, 2024, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2024/030661, mailed on Nov. 4, 2024, 5 pages.
International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.
International Search Report received for PCT Patent Application No. PCT/US2024/032451, mailed on Nov. 15, 2024, 6 pages.
International Search Report received for PCT Patent Application No. PCT/US2024/032455, mailed on Sep. 25, 2024, 4 pages.
International Search Report received for PCT Patent Application No. PCT/US2024/032456, mailed on Nov. 14, 2024, 6 pages.
International Search Report received for PCT Patent Application No. PCT/US2024/039190, mailed on Nov. 22, 2024, 5 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Light Manager, Available online at: https://manual.keyshot.com/manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 17/407,675, mailed on Sep. 11, 2023, 16 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.

(56) References Cited

OTHER PUBLICATIONS

Non-Final Office Action received for U.S. Appl. No. 17/655,521, mailed on Aug. 23, 2023, 13 pages.
Non-Final Office Action received for U.S. Appl. No. 17/655,521, mailed on Nov. 27, 2024, 17 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/905,483, mailed on Mar. 27, 2024, 16 pages.
Non-Final Office Action received for U.S. Appl. No. 17/933,020, mailed on Jan. 30, 2025, 26 pages.
Non-Final Office Action received for U.S. Appl. No. 17/934,104, mailed on Mar. 25, 2024, 26 pages.
Non-Final Office Action received for U.S. Appl. No. 18/119,219, mailed on Mar. 28, 2024, 15 pages.
Non-Final Office Action received for U.S. Appl. No. 18/149,640, mailed on Jan. 15, 2025, 17 pages.
Non-Final Office Action received for U.S. Appl. No. 18/153,943, mailed on Dec. 31, 2024, 33 pages.
Non-Final Office Action received for U.S. Appl. No. 18/298,994, mailed on Mar. 7, 2025, 26 pages.
Non-Final Office Action received for U.S. Appl. No. 18/304,290, mailed on Mar. 5, 2025, 111 pages.
Non-Final Office Action received for U.S. Appl. No. 18/317,893, mailed on Apr. 25, 2024, 18 pages.
Non-Final Office Action received for U.S. Appl. No. 18/327,844, mailed on May 17, 2024, 20 pages.
Non-Final Office Action received for U.S. Appl. No. 18/375,280, mailed on Nov. 27, 2024, 17 pages.
Non-Final Office Action received for U.S. Appl. No. 18/424,644, mailed on Jan. 29, 2025, 18 pages.
Non-Final Office Action received for U.S. Appl. No. 18/427,434, mailed on Nov. 21, 2024, 17 pages.
Non-Final Office Action received for U.S. Appl. No. 18/429,301, mailed on Jun. 12, 2024, 28 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 17/407,675, mailed on Dec. 11, 2024, 8 pages.
Notice of Allowance received for U.S. Appl. No. 17/469,788, mailed on Feb. 5, 2025, 5 pages.
Notice of Allowance received for U.S. Appl. No. 17/469,788, mailed on Oct. 15, 2024, 7 pages.
Notice of Allowance received for U.S. Appl. No. 17/655,347, mailed on Feb. 20, 2025, 7 pages.
Notice of Allowance received for U.S. Appl. No. 17/655,347, mailed on Oct. 9, 2024, 7 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2025, 12 pages.
Notice of Allowance received for U.S. Appl. No. 18/174,337, mailed on Jan. 2, 2025, 8 pages.
Notice of Allowance received for U.S. Appl. No. 18/317,893, mailed on Jan. 13, 2025, 11 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/336,770, mailed on Nov. 29, 2024, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/473,180, mailed on Aug. 22, 2024, 13 pages.
Notice of Allowance received for U.S. Appl. No. 18/473,180, mailed on Jan. 2, 2025, 12 pages.
Notice of Allowance received for U.S. Appl. No. 18/515,188, mailed on Nov. 27, 2024, 9 pages.
Notice of Allowance received for U.S. Appl. No. 18/668,032, mailed on Jan. 16, 2025, 9 pages.
Notice of Allowance received for U.S. Appl. No. 18/671,936, mailed on Jan. 15, 2025, 9 pages.
Notice of Allowance received for U.S. Appl. No. 18/671,936, mailed on Mar. 5, 2025, 7 pages.
Open Source Voxel Editor for Windows, Mac, Linux, iOS, and Android, Goxel [online]. Goxel by Guillaume Chereau, Available Online at: <URL: https://goxel.xyz/>, [retrieved on Apr. 25, 2024], 2024, 3 pages.
Pop 2 3D Scanner (Infrared Light I Precision 0.05mm), Revpoint [online]. Revopoint 3D, <URL: https://global.revopoint3d.com/products/face-3d-scanner-pop2?_ ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Restriction Requirement received for U.S. Appl. No. 17/905,483, mailed on Dec. 7, 2023, 7 pages.
Restriction Requirement received for U.S. Appl. No. 18/473,187, mailed on Dec. 30, 2024, 5 pages.
Search Report received for United Kingdom Patent Application No. GB2210885.6, mailed on Jan. 27, 2023, 1 page.
shareVOX, Phoria [online]. Phoria PTY LTD, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet:

(56) References Cited

OTHER PUBLICATIONS

<https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
Supplemental Notice of Allowance received for U.S. Appl. No. 18/515,188, mailed on Dec. 12, 2024, 2 pages.
VoxEdit Beta Tutorial—Introduction and How to Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
VR Design Best Practices, LeapMotion, Aug. 29, 2015, 31 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.
Berard Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.
Capturing Reality, "Data Sheet RealityCapture Tarasque 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality, "RealityCapture tutorial: Complete model in PPI", Youtube, https://www.youtube.com/watch?v=tw6wNNEbH_M, Oct. 14, 2021, 2 pages.
Cas and Chary XR, "Oculus Go & Your Phone as 2nd Controller!!—An Inexpensive Way to Play PC VR Games", posted on Mar. 8, 2019, https://www.youtube.com/watch?v=i_iRVa0kemw, 2019, 4 pages.
Choe et al., "Augmented-Reality-Based 3D Emotional Messenger for Dynamic User Communication with Smart Devices", Electronics, vol. 9, No. 1127, Jul. 10, 2020, 15 pages.
Dhakal et al., "SLAM-Share: Visual Simultaneous Localization and Mapping for Real-time Multi-user Augmented Reality", CoNEXT '22, Dec. 6-9, 2022, Roma, Italy, 14 pages.
Didehkhorshid et al., "Text Input in Virtual Reality Using a Tracked Drawing Tablet", HCII 2020, LNCS 12428, 2020, pp. 314-329.
Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Ghosh et al., "NotifiVIR: Exploring Interruptions and Notifications in Virtual Reality", IEEE transactions on visualization and computer graphics, vol. 24, No. 4, Apr. 2018, pp. 1447-1456.
Headmaster Introduction, "If You Can Move Your Head, You Can Move Your World", Retrieved from: <https://www.microsoft.com/buxtoncollection/a/pdf/HeadMaster%20Introduction.pdf)>, Retrieved on Dec. 26, 2024, 4 pages.
Huang et al., "Proxy-Based Security Audit System for Remote Desktop Access", Computer Communications and Networks, ICCCN 2009. Proceedings of 18th International Conference on, IEEE, Piscataway, NJ, USA, Aug. 3, 2009, 5 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
Kim et al., "Pseudo-haptic Button for Improving User Experience of Mid-air Interaction in VR", International Journal of Human-Computer Studies, vol. 168, No. 102907, Aug. 9, 2022, 11 pages.
Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.
Lin et al., "Ubii: Physical World Interaction Through Augmented Reality", Publisher: IEEE, vol. 16, No. 3, DOI:10.1109/TMC.2016.2567378, May 13, 2016, pp. 872-885.
Locher et al., "Mobile Phone and Cloud—a Dream Team for 3D Reconstruction", 2016 IEEE Winter Conference on Applications of Computer Vision (WACV), 2016, pp. 1-8.
Lor Cas, "Reality Capture: Exporting Mesh", Youtube, https://www.youtube.com/watch?v=PdvTRa2B_s0, Dec. 10, 2020, 2 pages.
Macmostvideo, "A Beginner's Guide to Selecting Items on Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.
Medeiros et al., "Promoting Reality Awareness in Virtual Reality through Proxemics", IEEE Virtual Reality and 3D User Interfaces (VR), Mar. 27-Apr. 1, 2021, 11 pages.
Metalnwood, "Using a Tablet for Touch Control, with VR Headset on. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Pfeuffer et al., "Gaze+touch vs. Touch: What's the Trade-off When Using Gaze to Extend Touch to Remote Displays?", Advances in Databases and Information Systems, Aug. 30, 2015, pp. 349-367.
Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Qi et al., "PointNet++: Deep Hierarchical Feature Learning on Point Sets in a Metric Space", Stanford University, Jun. 7, 2017, 14 pages.
Ran et al., "Multi-User Augmented Reality with Communication Efficient and Spatially Consistent Virtual Objects", CoNEXT '20, Dec. 1-4, 2020, Barcelona, Spain, 13 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.

(56) References Cited

OTHER PUBLICATIONS

Schubert Martin, “Design Sprints at Leap Motion: A Playground of 3D User Interfaces”, Ultraleap for Developers [online]. Nov. 8, 2017 [retrieved on Mar. 21, 2025]. Retrieved from the Internet: <URL: https://blog.leapmotion.com/design-playground-3d-user-interfaces/>, 17 pages.

Schuetz Markus, “Interactive Exploration of Point Clouds”, Technische Universitat Wien, reposiTUm, https://doi.org/10.34726/hss.2021.91668, Mar. 8, 2021, 119 pages.

Slambekova Dana, “Gaze and Gesture Based Object Interaction in Virtual World”, [retrieved on Dec. 17, 2015]. Retrieved from the Internet: <URL:https://www.cs.rit.edu/~dxs4659/Report.pdf>, May 31, 2012, 54 pages.

Speicher et al., “Pseudo-haptic Controls for Mid-air Finger-based Menu Interaction”, CHI’19 Extended Abstracts, May 4-9, 2019, Conference on Human Factors in Computing Systems, May 2, 2019, pp. 1-6.

Strand Robin, “Surface Skeletons in Grids With Non-cubic Voxels”, 2004 IEEE Xplore, Available Online at: <DOI: 10.1109/ICPR.2004.1334195>, Sep. 2004, 5 pages.

Sun et al., “MagicHand: Interact with IoT Devices in Augmented Reality Environment”, 2019 IEEE Conference on Virtual Reality and 3D User Interfaces, Osaka, Japan, Mar. 23-27, 2019, [retrieved on Dec. 4, 2020], 6 pages.

Tolle et al., “Design of Head Movement Controller System (HEMOCS) for Control Mobile Application through Head Pose Movement Detection”, Retrieved from :<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/ijim.v10i3.5552>, Retrieved on Dec. 26, 2024, 2016, 5 pages.

Wood Tyriel, “The HoloLens 2 Tour!—Discovering a World of Holograms”, YouTube [online]. YouTube, Mar. 23, 2021 [retrieved on Dec. 7, 2023-12-07], Retrieved from the Internet: <URL: https://www.youtube.com/watch?v=rMks7sMzPxl>, 2 pages.

Writtenhouse Sandy, “How to Use Live View on Google Maps”, Available online at <https://www.lifewire.com/use-live-view-google-maps-5323691>, [Retrieved from Internet on Jun. 27, 2024], Jul. 5, 2022, 6 pages.

Yue et al., “Optimal Region Selection for Stereoscopic Video Subtitle Insertion”, IEEE Transactions on Circuits and Systems for Video Technology, vol. 28, No. 11, Nov. 2018, 13 pages.

Zhuang et al., “Distributed Architecture for 3D Graphics Rendering in Collaborative System”, Computer and Modernization, Issue 4, 2017, 5 pages (1 page of English Abstract and 4 pages of Official Copy).

* cited by examiner

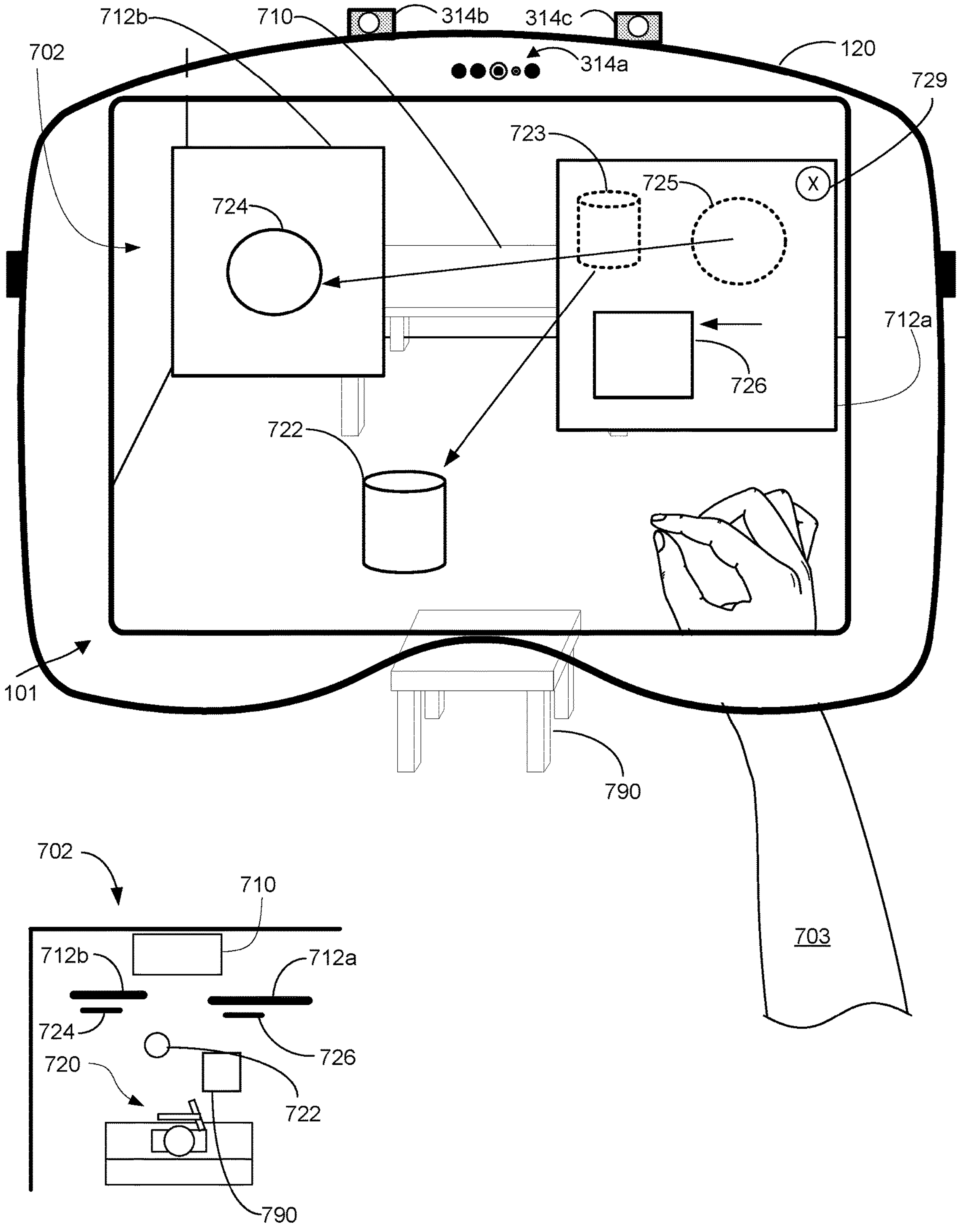
FIG. 7B1

Figure 8B:
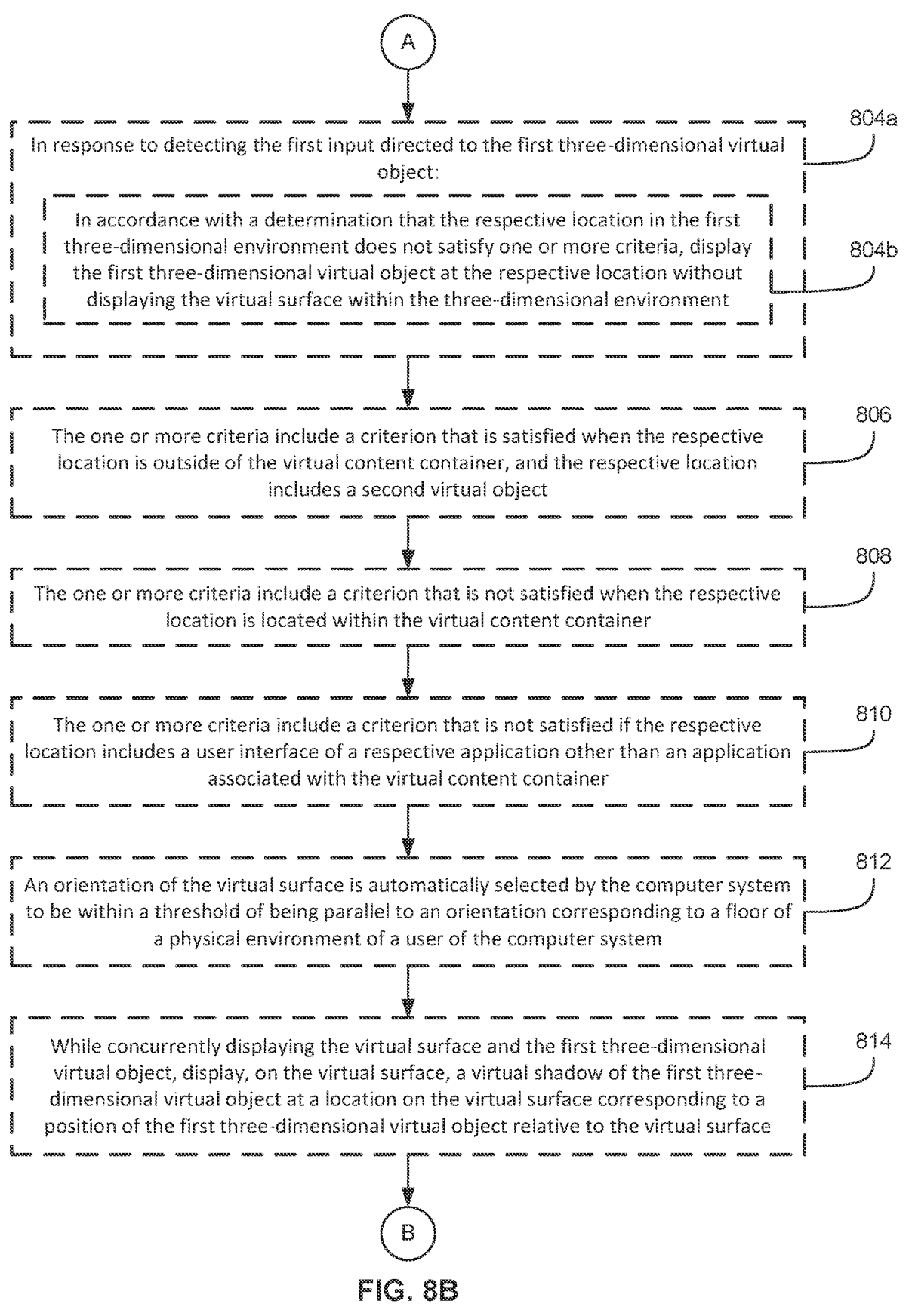

A

804a

In response to detecting the first input directed to the first three-dimensional virtual object:

804b

In accordance with a determination that the respective location in the first three-dimensional environment does not satisfy one or more criteria, display the first three-dimensional virtual object at the respective location without displaying the virtual surface within the three-dimensional environment

806

The one or more criteria include a criterion that is satisfied when the respective location is outside of the virtual content container, and the respective location includes a second virtual object

808

The one or more criteria include a criterion that is not satisfied when the respective location is located within the virtual content container

810

The one or more criteria include a criterion that is not satisfied if the respective location includes a user interface of a respective application other than an application associated with the virtual content container

812

An orientation of the virtual surface is automatically selected by the computer system to be within a threshold of being parallel to an orientation corresponding to a floor of a physical environment of a user of the computer system

814

While concurrently displaying the virtual surface and the first three-dimensional virtual object, display, on the virtual surface, a virtual shadow of the first three-dimensional virtual object at a location on the virtual surface corresponding to a position of the first three-dimensional virtual object relative to the virtual surface

Figure 8G:
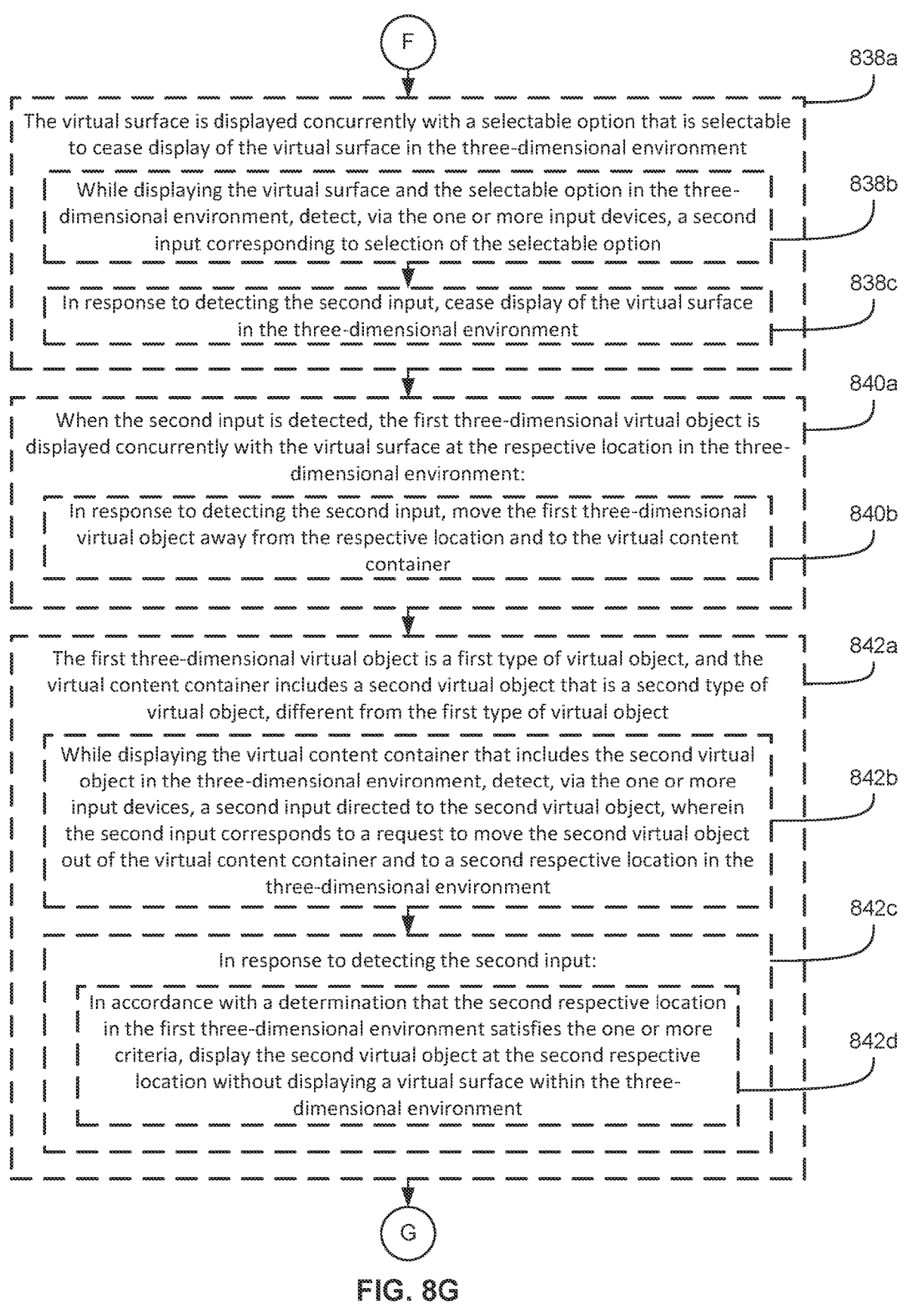

838a
The virtual surface is displayed concurrently with a selectable option that is selectable to cease display of the virtual surface in the three-dimensional environment 838b
While displaying the virtual surface and the selectable option in the three-dimensional environment, detect, via the one or more input devices, a second input corresponding to selection of the selectable option 838c
In response to detecting the second input, cease display of the virtual surface in the three-dimensional environment 840a
When the second input is detected, the first three-dimensional virtual object is displayed concurrently with the virtual surface at the respective location in the three-dimensional environment:

840b
In response to detecting the second input, move the first three-dimensional virtual object away from the respective location and to the virtual content container 842a
The first three-dimensional virtual object is a first type of virtual object, and the virtual content container includes a second virtual object that is a second type of virtual object, different from the first type of virtual object 842b
While displaying the virtual content container that includes the second virtual object in the three-dimensional environment, detect, via the one or more input devices, a second input directed to the second virtual object, wherein the second input corresponds to a request to move the second virtual object out of the virtual content container and to a second respective location in the three-dimensional environment 842c
In response to detecting the second input:

842d
In accordance with a determination that the second respective location in the first three-dimensional environment satisfies the one or more criteria, display the second virtual object at the second respective location without displaying a virtual surface within the three-dimensional environment

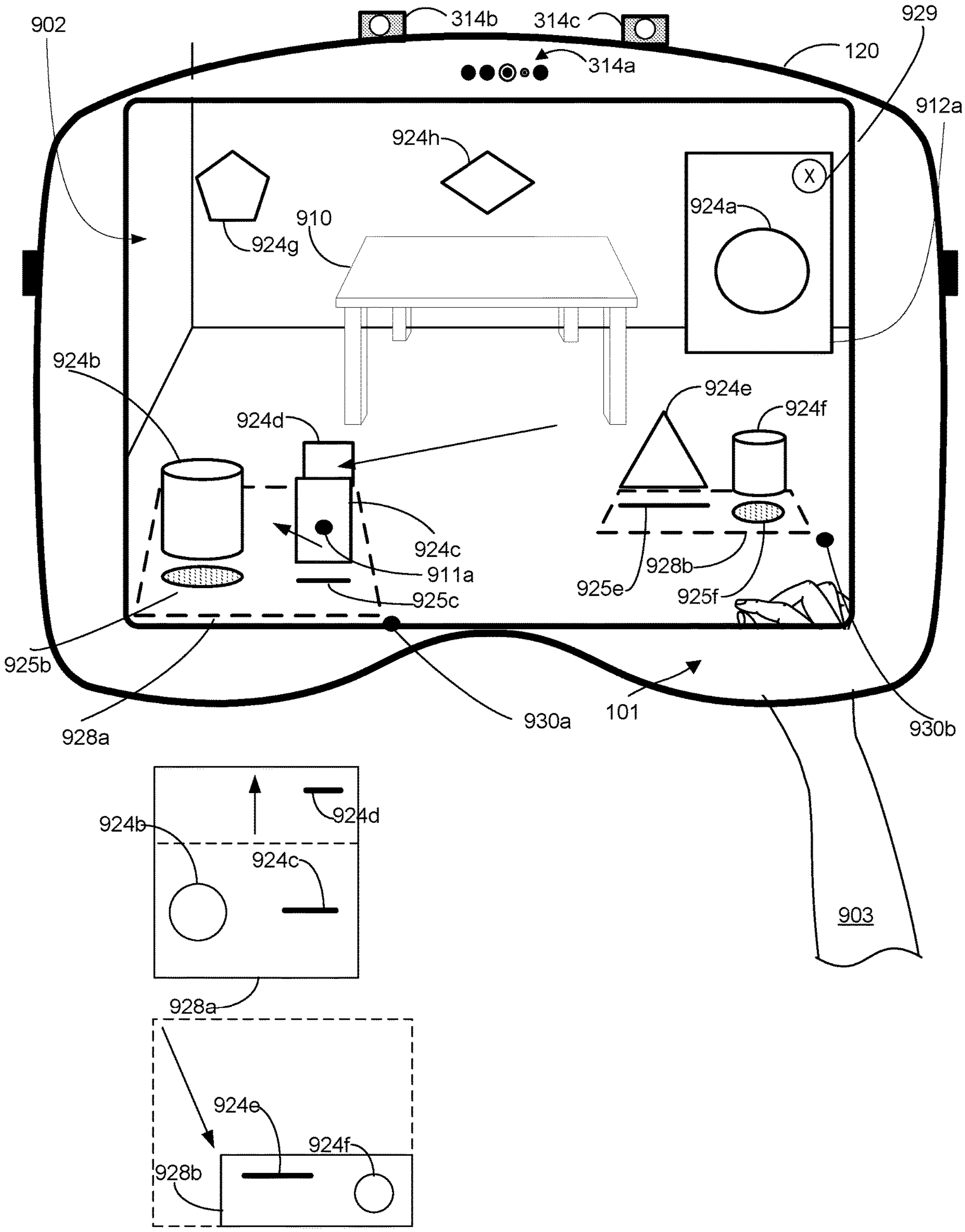
FIG. 9D1

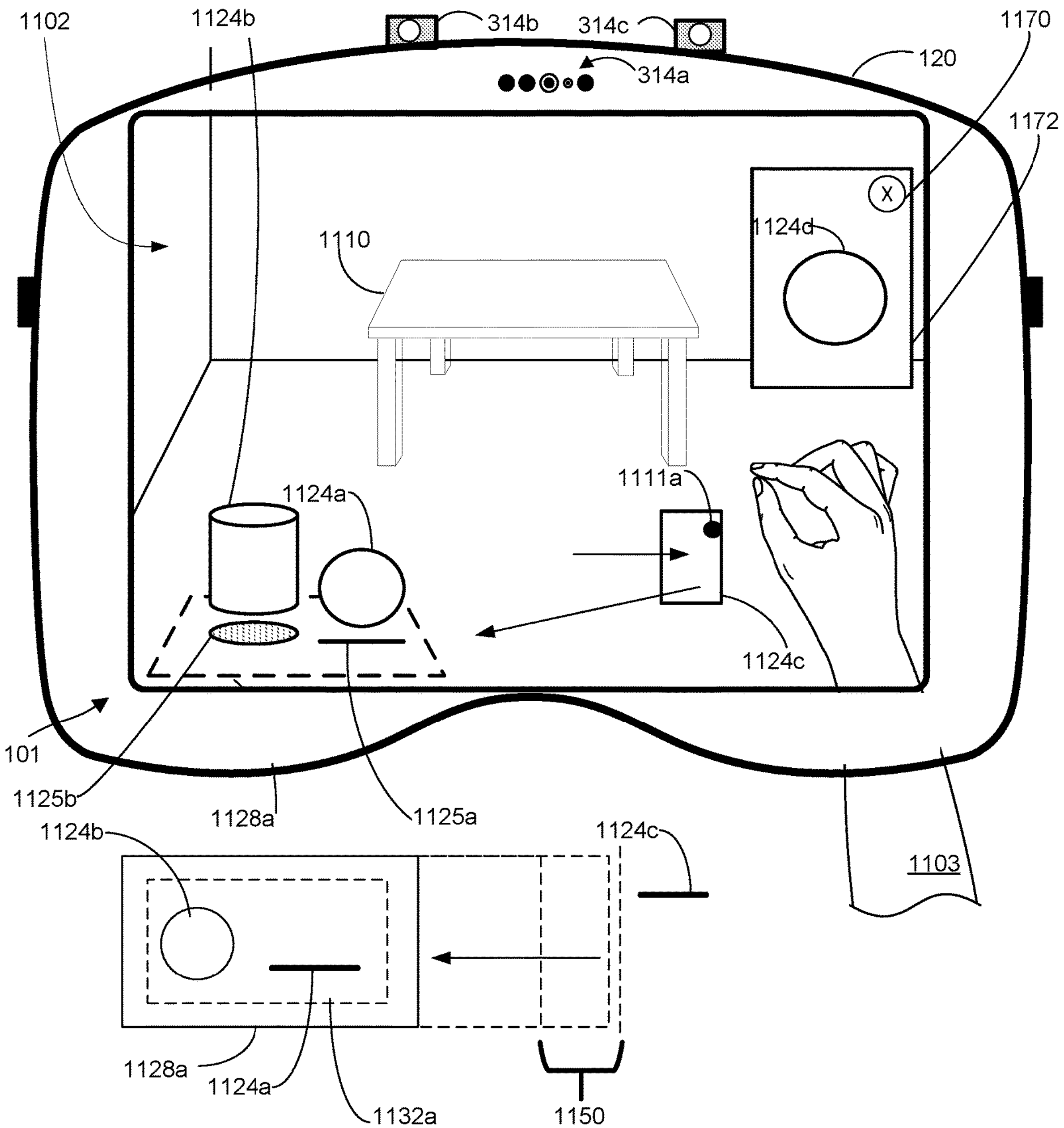
FIG. 11F1

1200

METHODS FOR DISPLAYING OBJECTS RELATIVE TO VIRTUAL SURFACES

CROSS-REFERENCE TO RELATED APPLICATIONS

This application claims the benefit of U.S. Provisional Application No. 63/377,004, filed Sep. 23, 2022, and U.S. Provisional Application No. 63/505,389, filed May 31, 2023, the contents of which are herein incorporated by reference in their entireties for all purposes.

TECHNICAL FIELD

This relates generally to computer systems that provide computer-generated experiences, including, but no limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a virtual surface for containing one or more virtual objects in a three-dimensional environment. In some embodiments, a computer system automatically resizes virtual surfaces that contain objects. In some embodiments, a computer system displays feedback related to removal and/or addition of objects to virtual surfaces.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8I is a flowchart illustrating an exemplary method of displaying a virtual surface for containing one or more virtual objects in a three-dimensional environment in accordance with some embodiments.

DESCRIPTION OF EMBODIMENTS

Figure 1A:
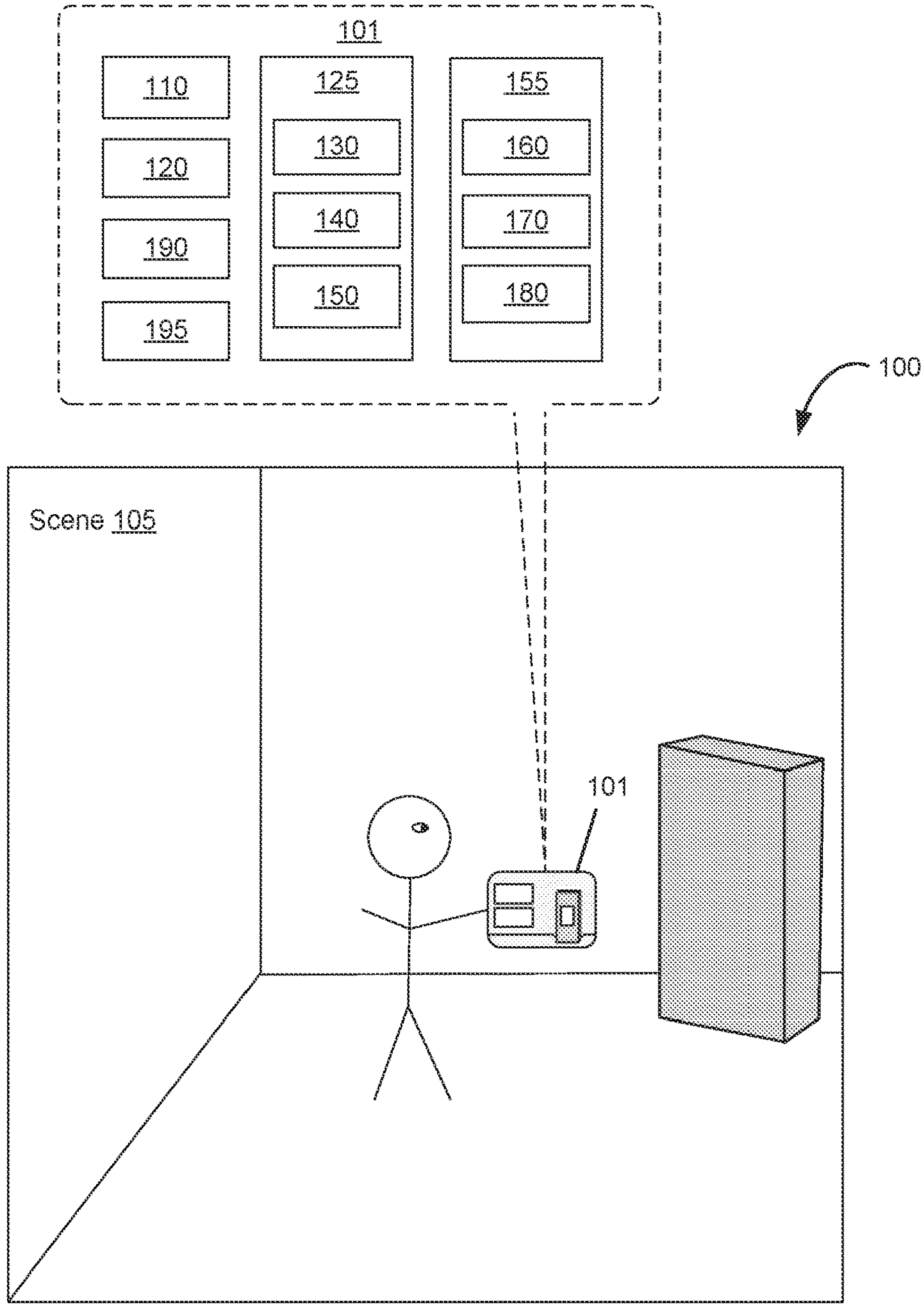
FIG. 1A is a block diagram illustrating an operating environment of a computer system for providing XR experiences in accordance with some embodiments.

The present disclosure relates to user interfaces for providing a computer generated (CGR) experience to a user, in accordance with some embodiments.

The systems, methods, and GUIs described herein provide improved ways for an electronic device to facilitate interaction with and manipulate objects in a three-dimensional environment.

In some embodiments, a computer system while displaying a virtual content container that includes one or more three-dimensional virtual objects in a three-dimensional environment, detects a first input directed to a first three-dimensional virtual object of the one or more three-dimensional virtual objects. In some embodiments, the first input corresponds to a request to move the first three-dimensional virtual object out of the virtual content container and to a respective location in the three-dimensional environment. In some embodiments, in response to detecting the first input directed to the first three-dimensional virtual object, in accordance with a determination that the respective location in the first three-dimensional environment satisfies one or more criteria, the computer system displays a virtual surface within the three-dimensional environment concurrently with the first three-dimensional virtual object. In some embodiments, the virtual surface was not displayed within the three-dimensional environment prior to detecting the first input directed to the first three-dimensional virtual object.

In some embodiments, a computer system while displaying a first virtual surface in a three-dimensional environment, wherein the first virtual surface includes a first virtual object positioned with a respective spatial relationship relative to the first virtual surface and a second virtual object positioned with the respective spatial relationship relative to the first virtual surface, detects a first input directed to the second virtual object. In some embodiments, the first input corresponds to a request to move the second virtual object away from a second location relative to the first virtual surface to a respective location in the three-dimensional environment. In some embodiments, in response to detecting the first input directed to the second virtual object, in accordance with a determination that the respective location satisfies one or more criteria, the computer system moves the second virtual object to a third location. In some embodiments, the computer system resizes the first virtual surface based on the third location of the second virtual object so that once the first virtual surface has been resized, the second virtual object has the respective spatial relationship relative to the first virtual surface.

In some embodiments, a computer system, while displaying a first virtual object and a second virtual object with a respective spatial relationship relative to a first virtual surface, wherein the first virtual object is positioned at a first location with the respective spatial relationship relative to the first virtual surface, and the second virtual object is positioned at a second location with the respective spatial relationship relative to the first virtual surface, detects a first input directed to the second virtual object. In some embodiments, the first input corresponds to a request to move the second virtual object away from the second location relative to the first surface to a respective location in the three-dimensional environment. In some embodiments, in response to detecting the first input directed to the second virtual object, the computer system moves the second virtual object to the respective location in the three-dimensional environment. In some embodiments, in accordance with a determination that the respective location is a first distance from an edge of the first virtual surface, the computer system displays one or more visual effects associated with the first virtual surface with a first visual prominence. In some embodiments, in accordance with a determination that the respective location is a second distance, less than the first distance, from the edge of the first virtual surface, the computer system displays the one or more visual effects associated with the first virtual surface with a second visual prominence greater than the first visual prominence. In some embodiments, in accordance with a determination that the respective location is not within the threshold distance of the edge of the first virtual surface, the computer system forgoes display of the one or more visual effects associated with the first virtual surface.

FIGS. 1A-6 provide a description of example computer systems for providing XR experiences to users (such as described below with respect to methods 800, 1000, and/or 1200). FIGS. 7A-7H illustrate example techniques for displaying a virtual surface for containing one or more virtual objects in a three-dimensional environment, in accordance with some embodiments. FIGS. 8A-8I is a flow diagram of methods of displaying a virtual surface for containing one or more virtual objects in a three-dimensional environment, in accordance with various embodiments. The user interfaces in FIGS. 7A-7H are used to illustrate the processes in FIGS. 8A-8I. FIGS. 9A-9G illustrate example techniques for automatically resizing virtual surfaces that contain objects, in accordance with some embodiments. FIGS. 10A-10G is a flow diagram of methods of automatically resizing virtual surfaces that contain objects, in accordance with various embodiments. The user interfaces in FIGS. 9A-9G are used to illustrate the processes in FIGS. 10A-10G. FIGS. 11A-11H illustrate example techniques for displaying feedback related to removal and/or addition of objects to virtual surfaces, in accordance with some embodiments. FIGS. 12A-12F is a flow diagram of methods of displaying feedback related to removal and/or addition of objects to virtual surfaces, in accordance with various embodiments. The user interfaces in FIGS. 11A-11H are used to illustrate the processes in FIGS. 12A-12F.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specfies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typcially move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
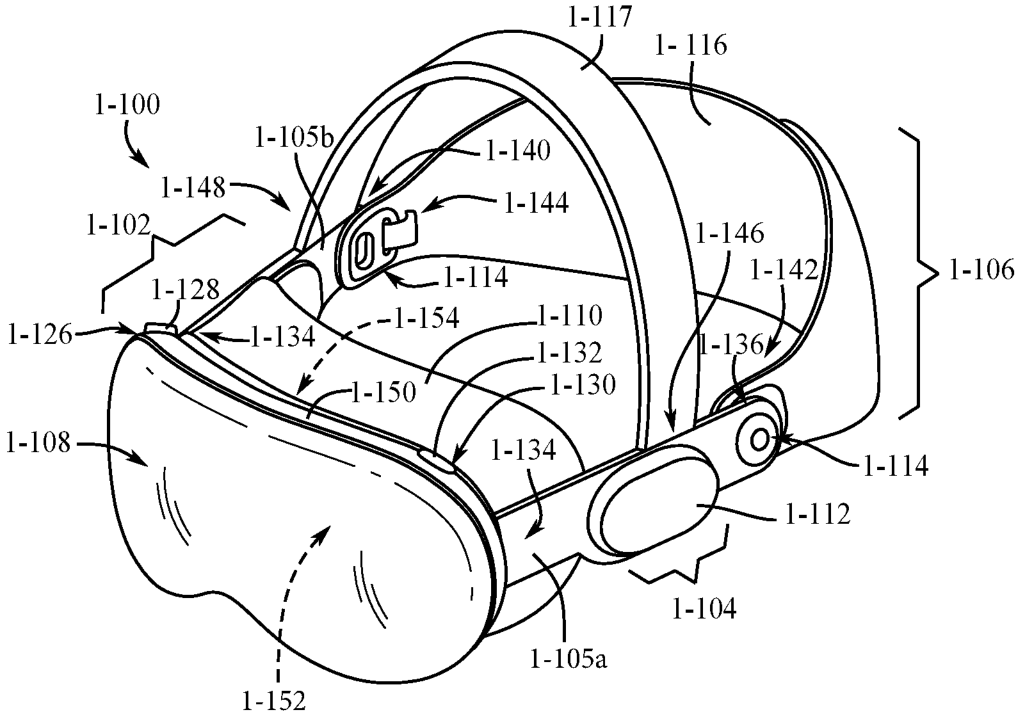
FIGS. 1B-1P are examples of a computer system for providing XR experiences in the operating environment of FIG. 1A.
Figure 1C:
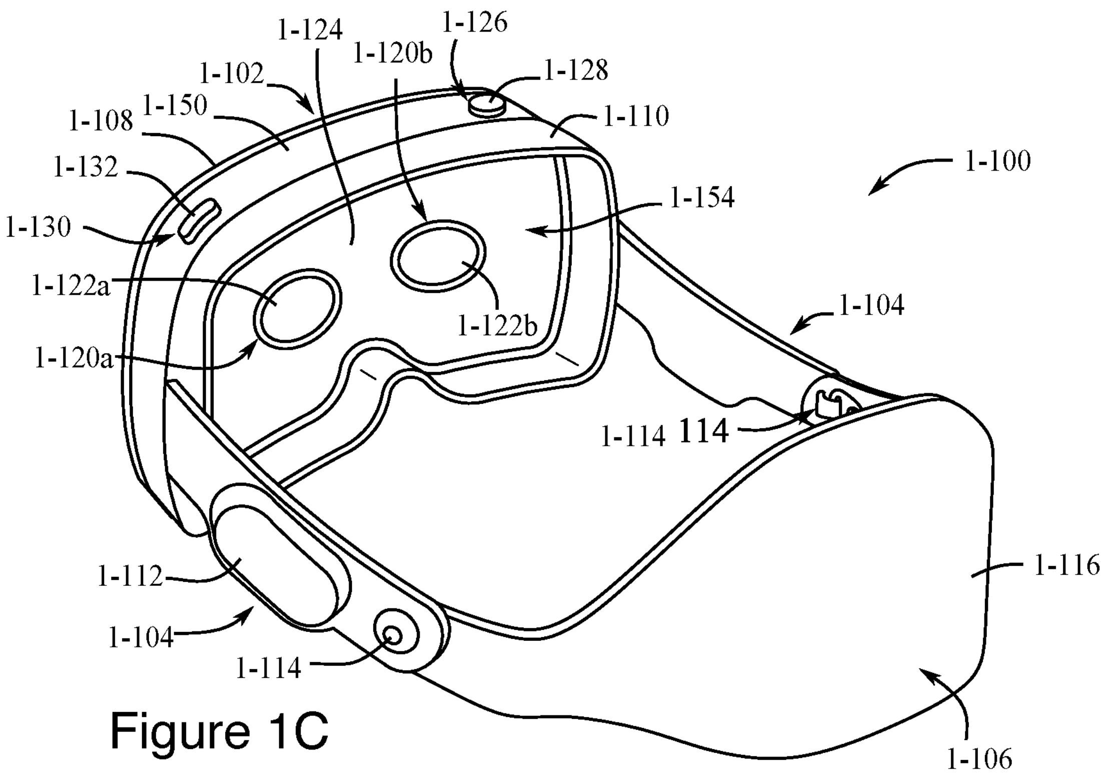
Figure 1D:
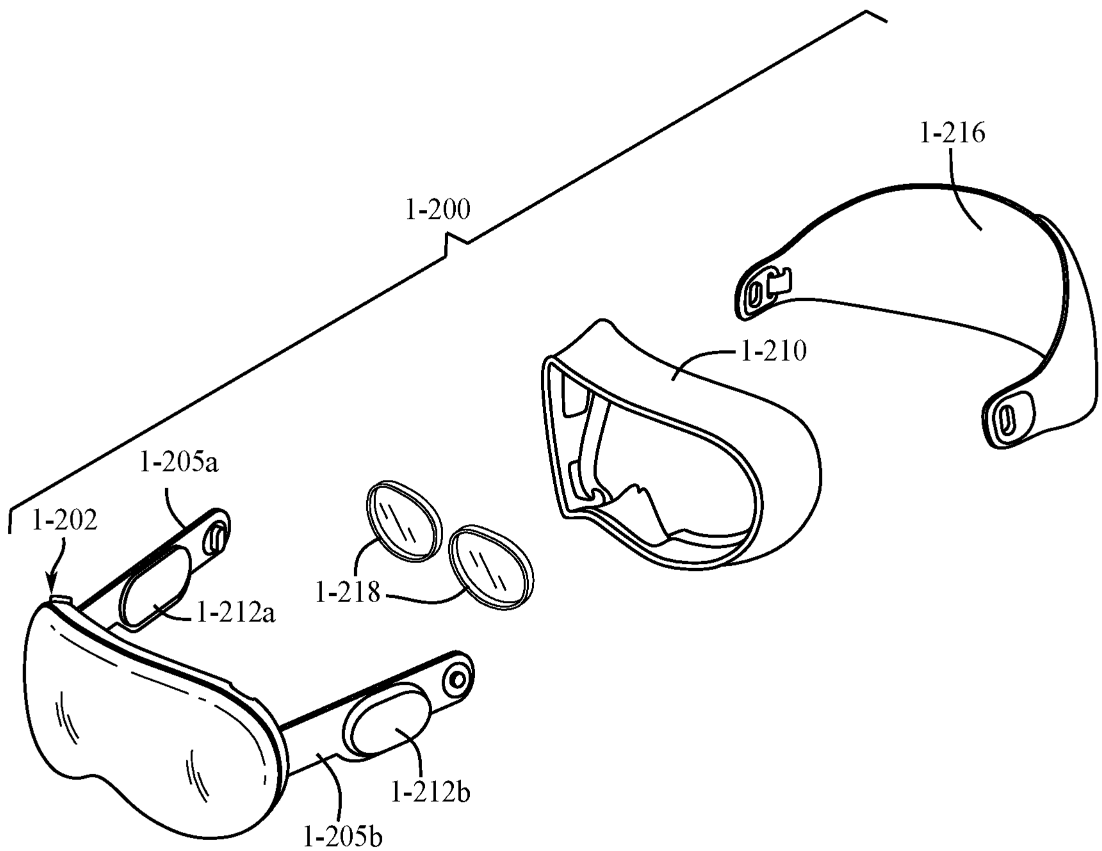
Figure 1E:
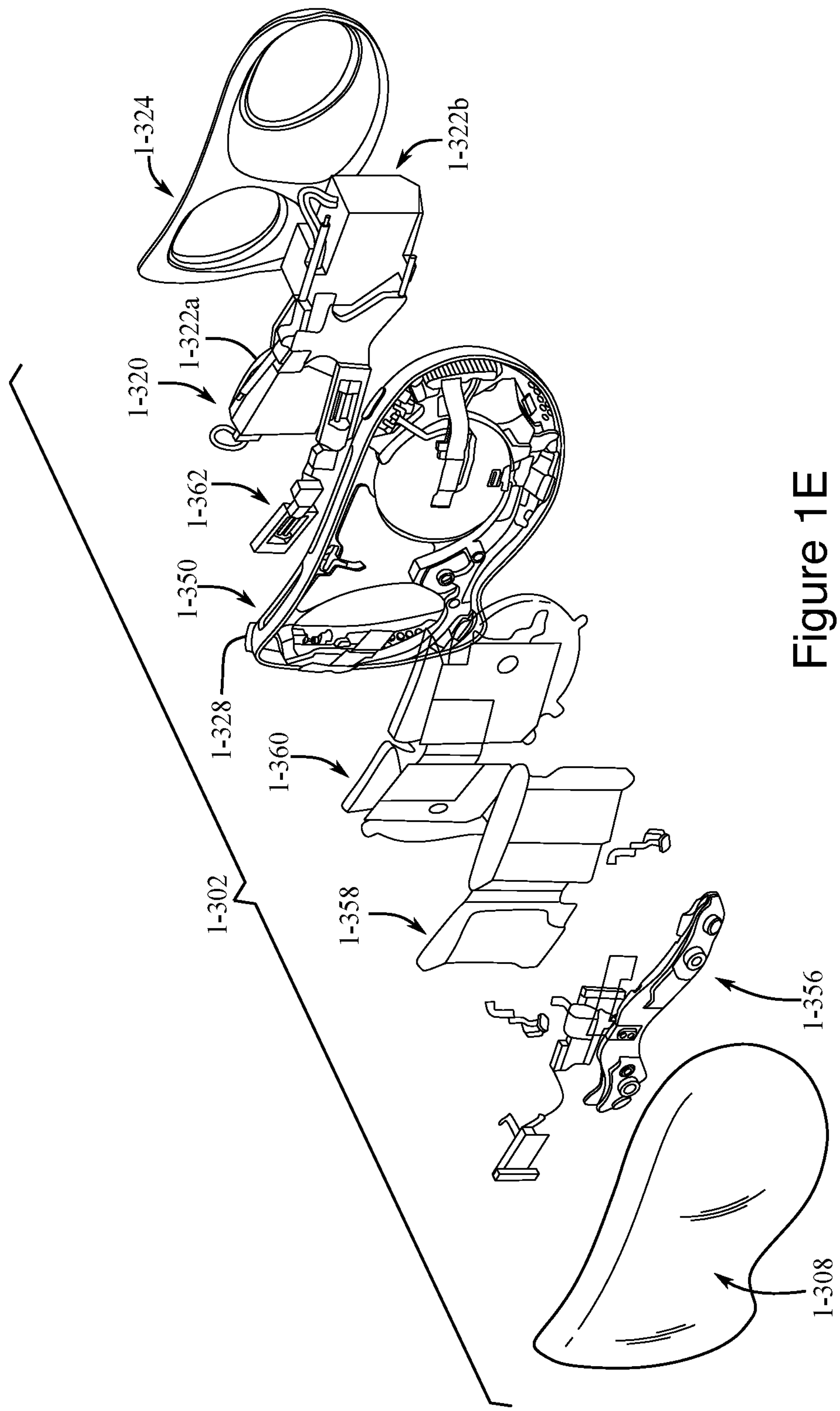
Figure 1F:
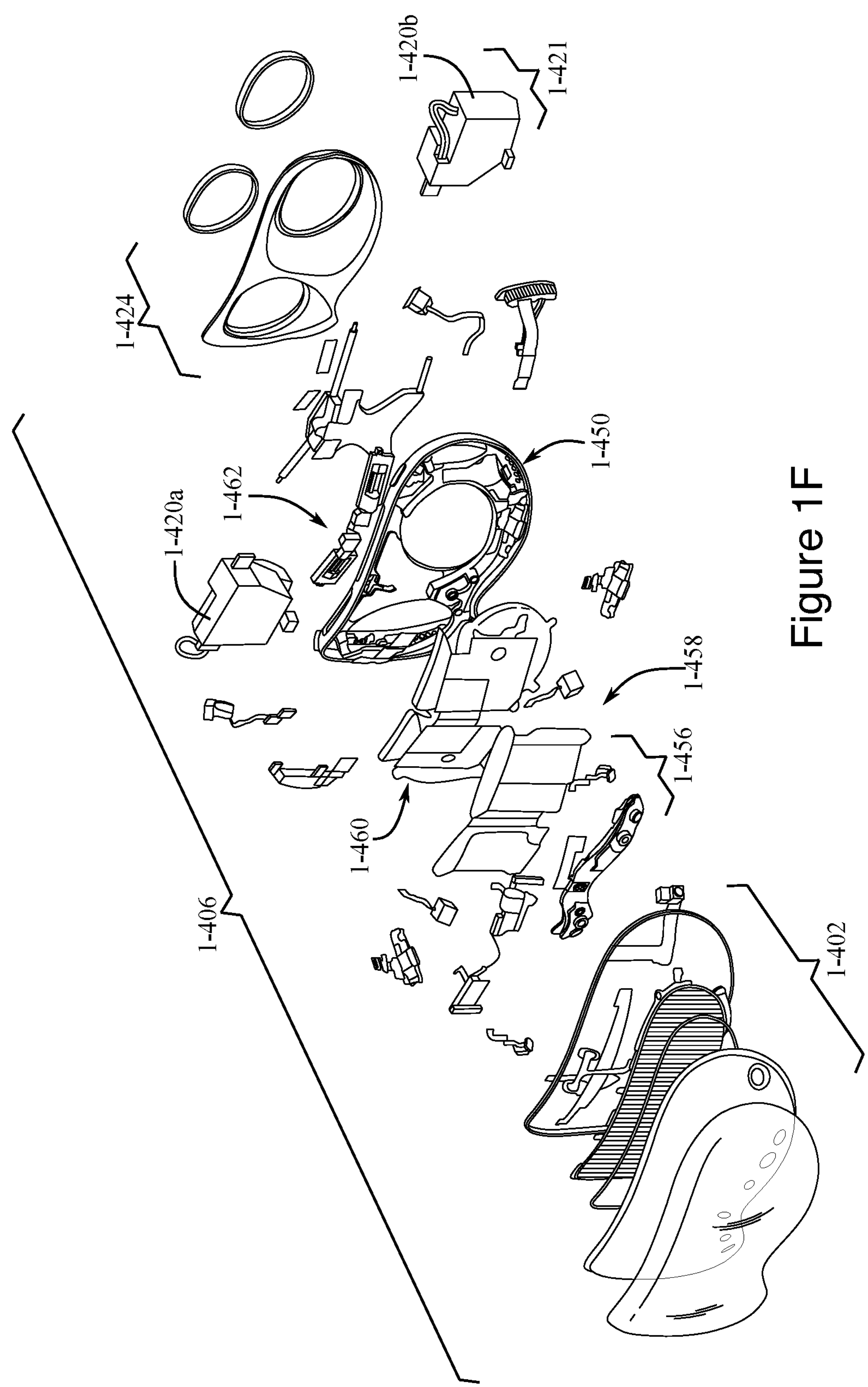
Figure 1G:
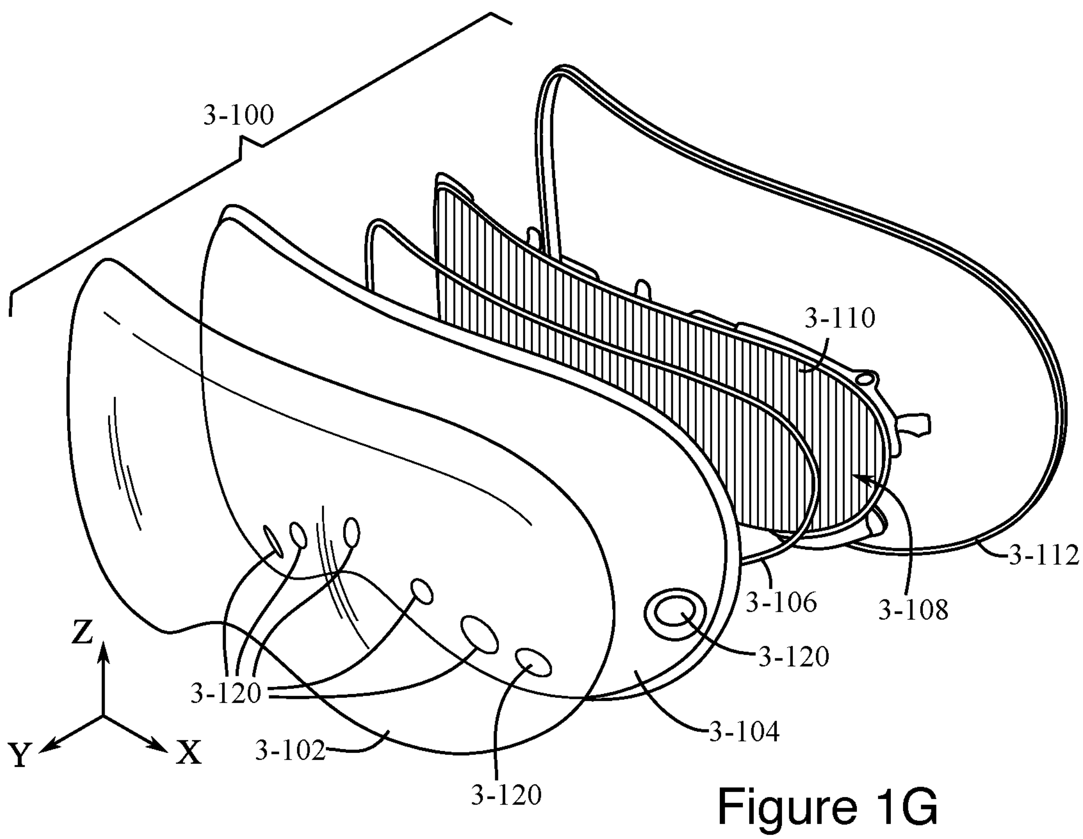
Figure 1H:
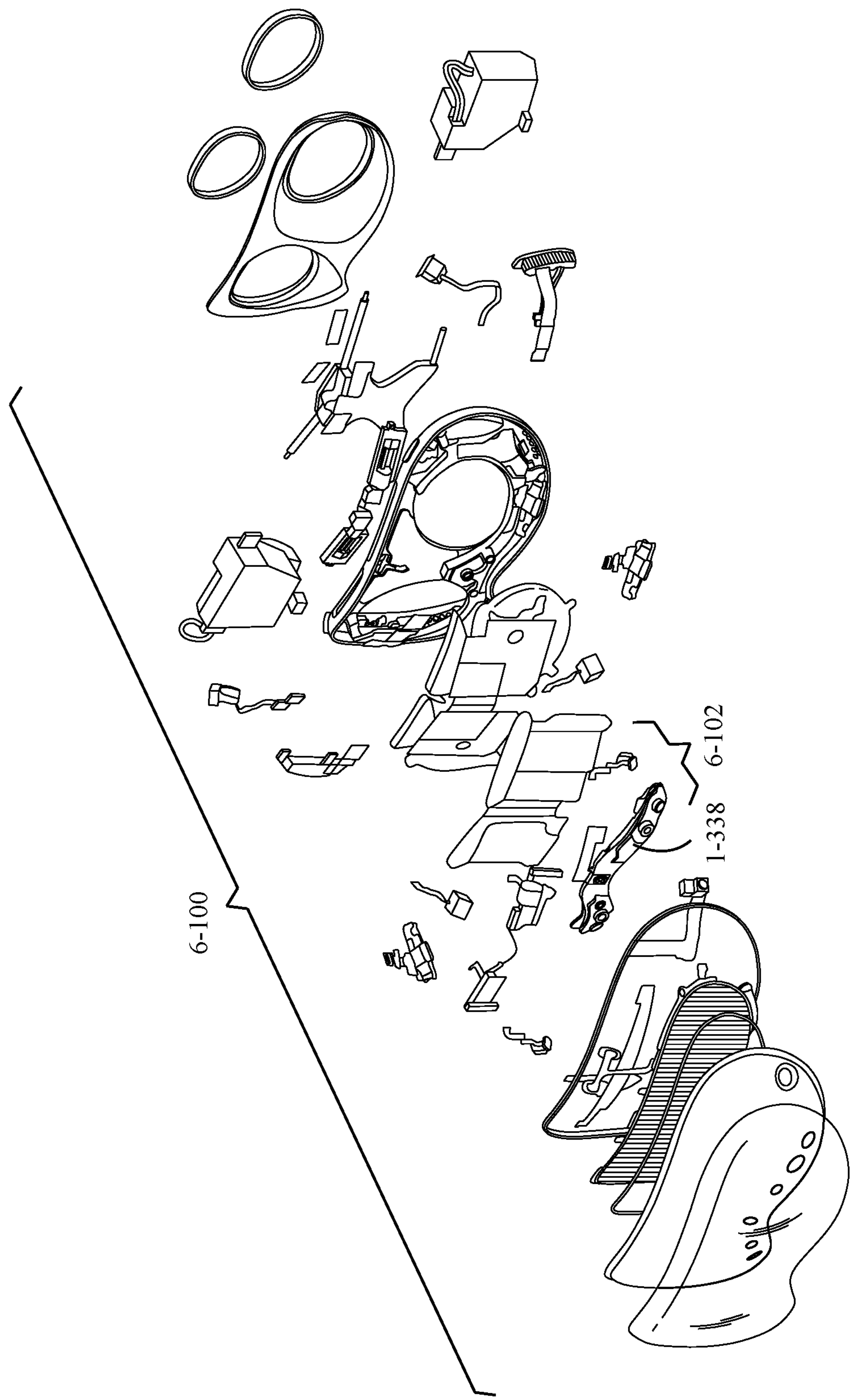
Figure 1I:
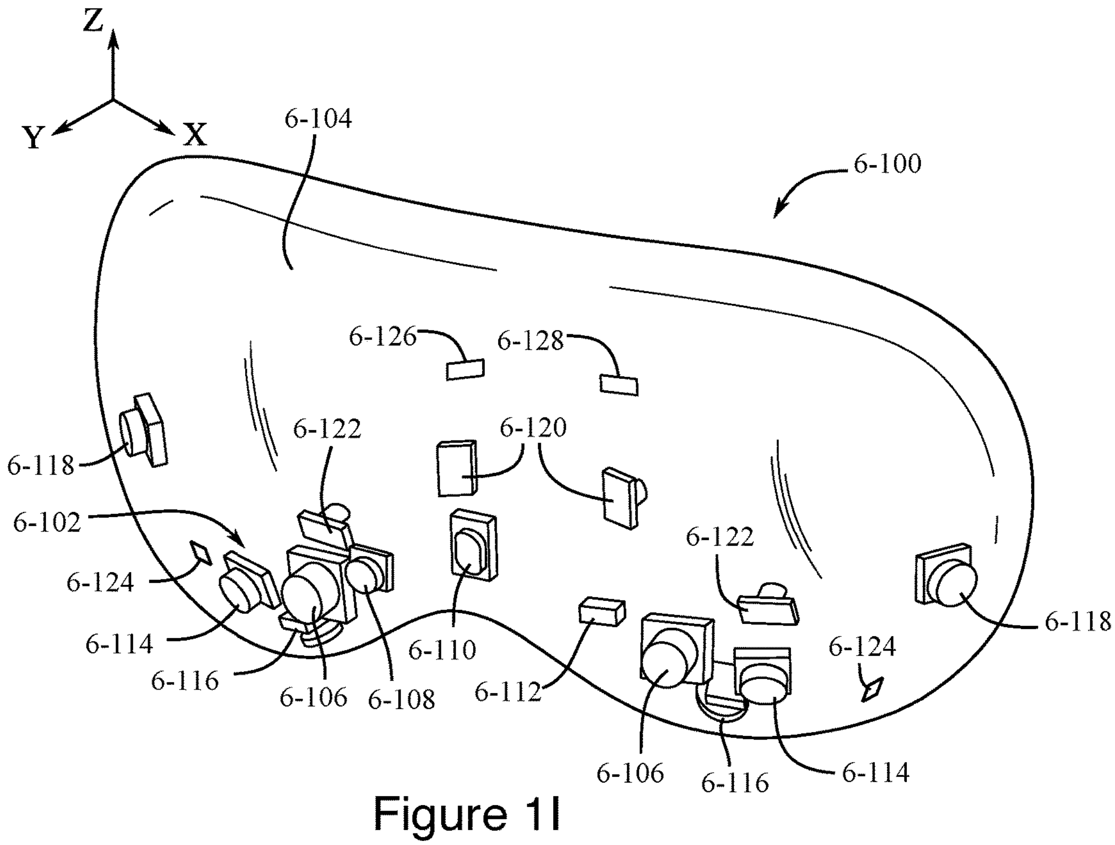
Figure 1J:
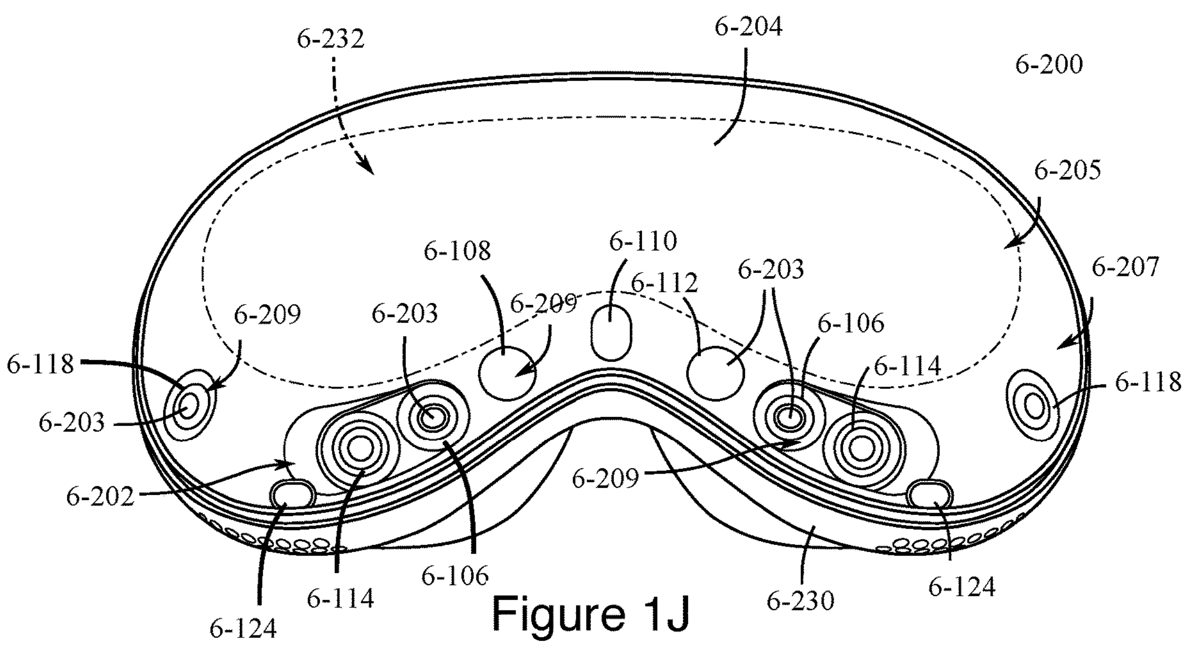
Figure 1K:
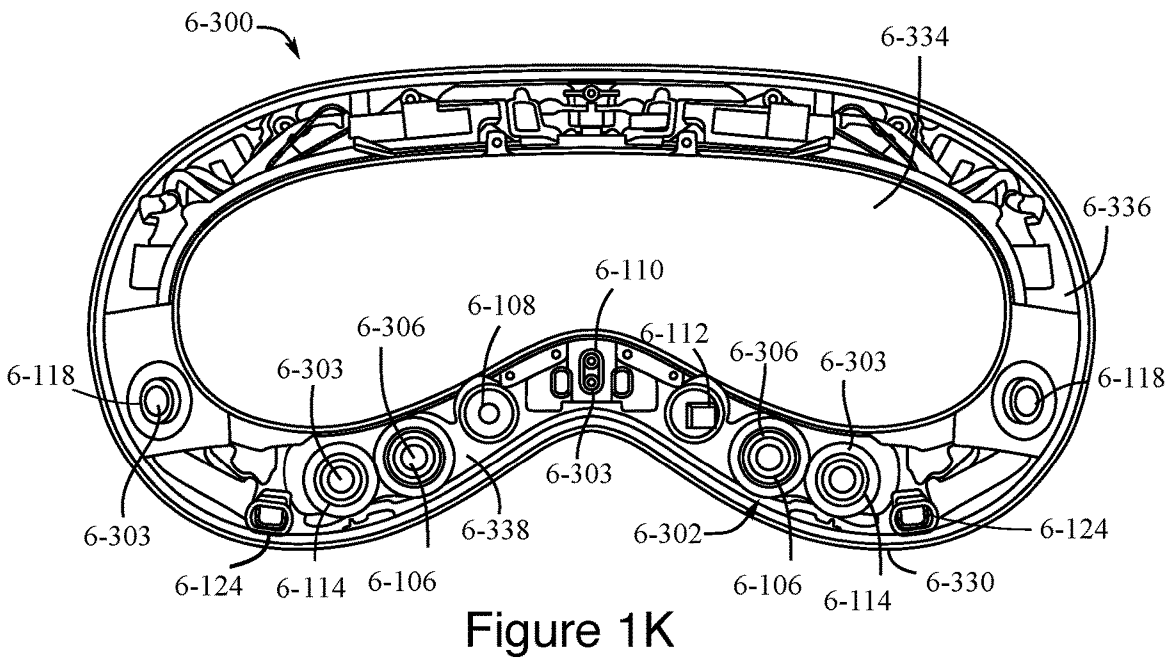
Figure 1L:
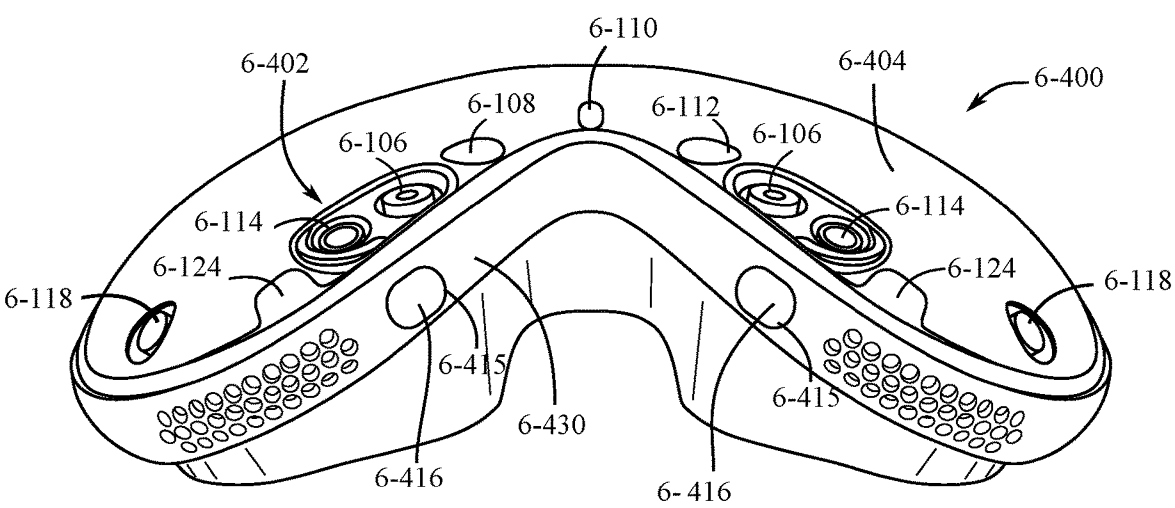
Figure 1M:
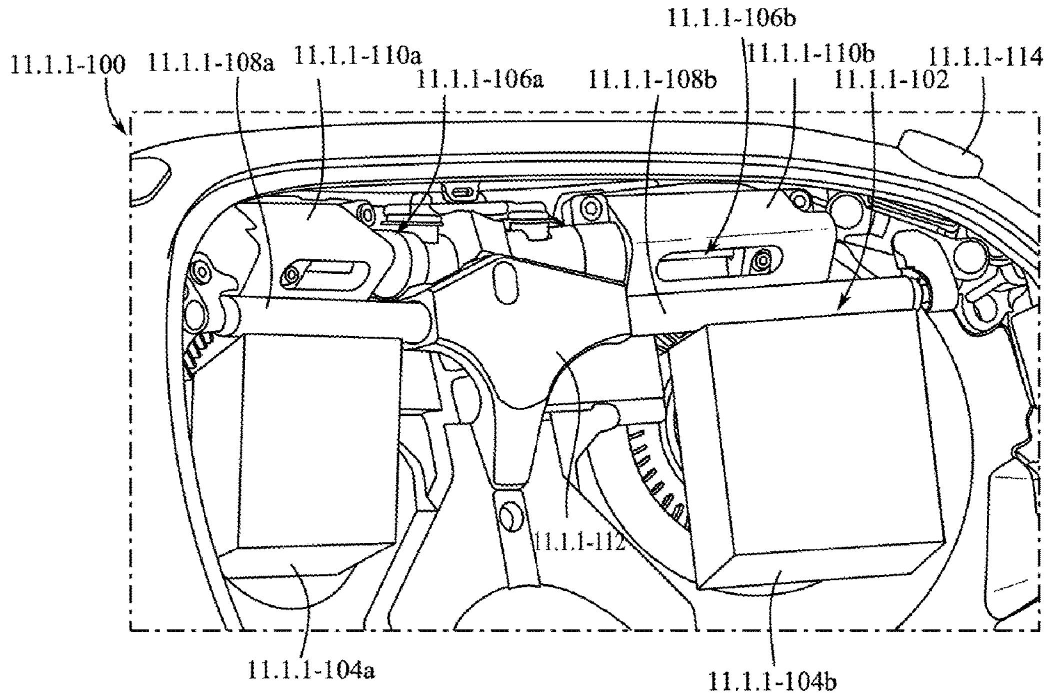
Figure 1N:
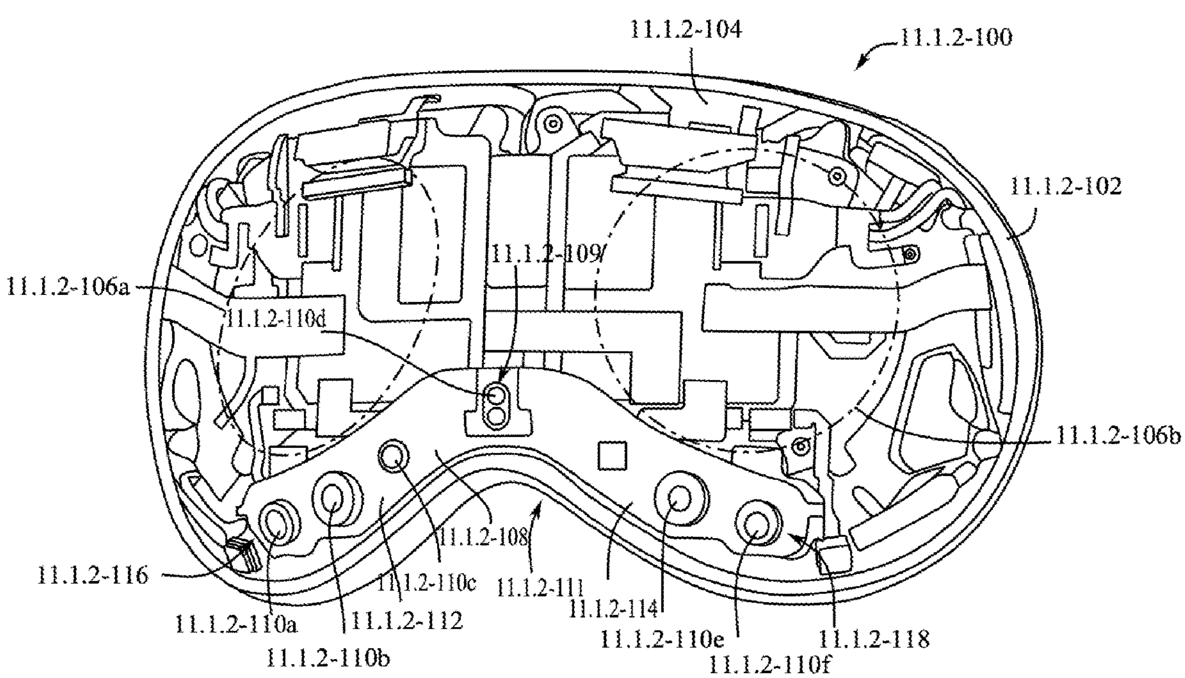
Figure 1O:
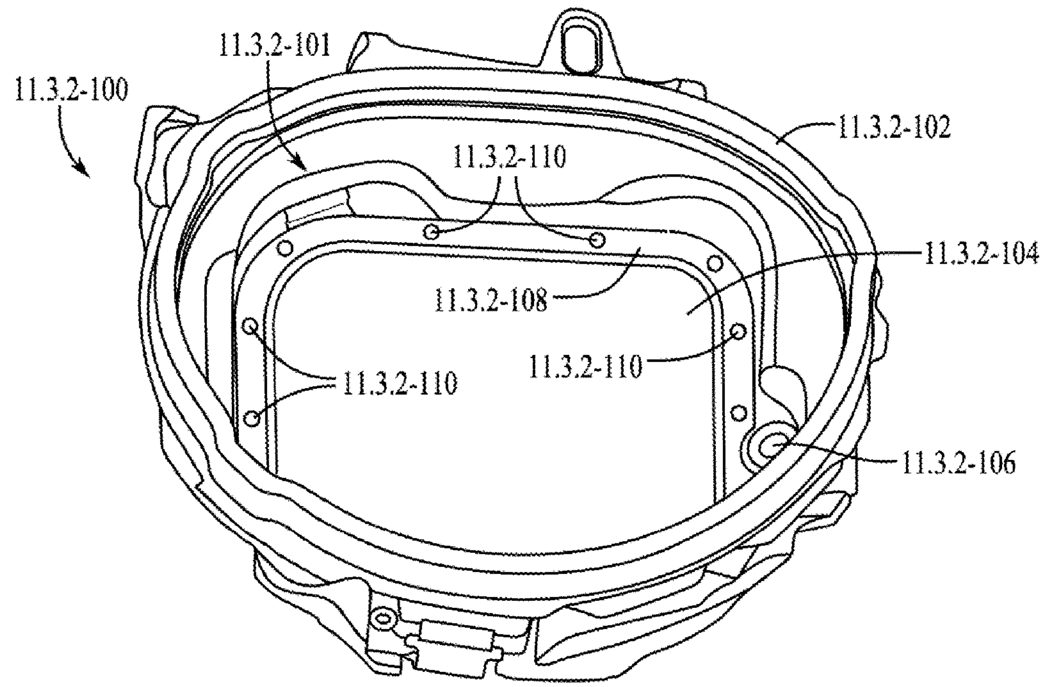
Figure 1P:
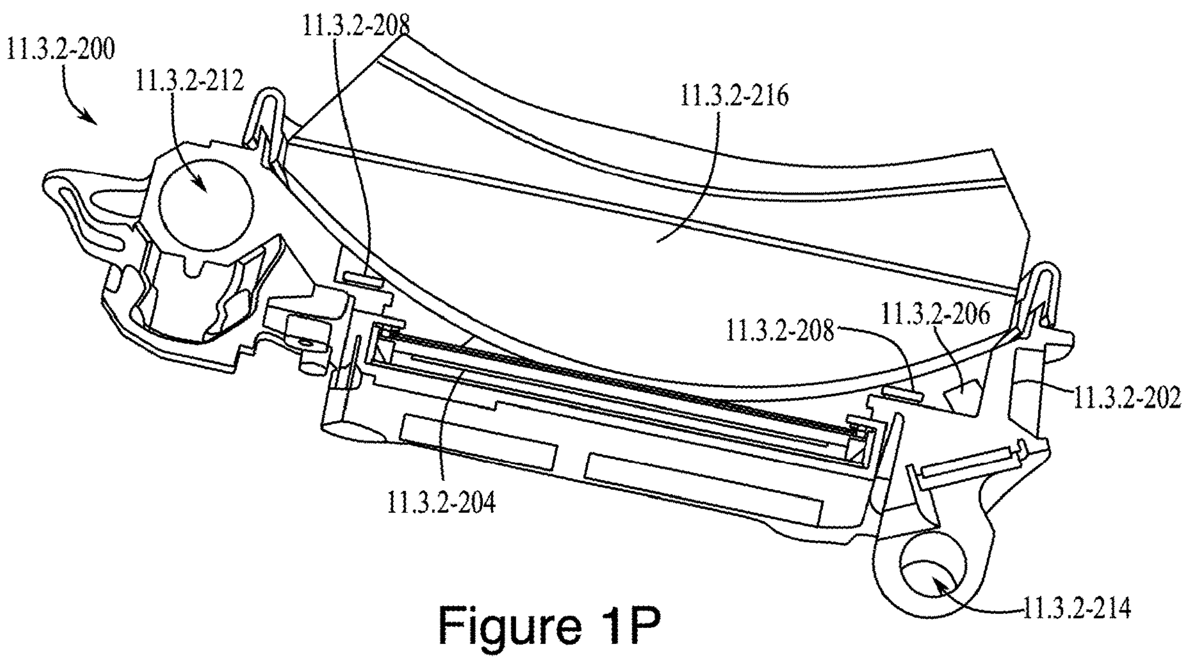

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens

1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
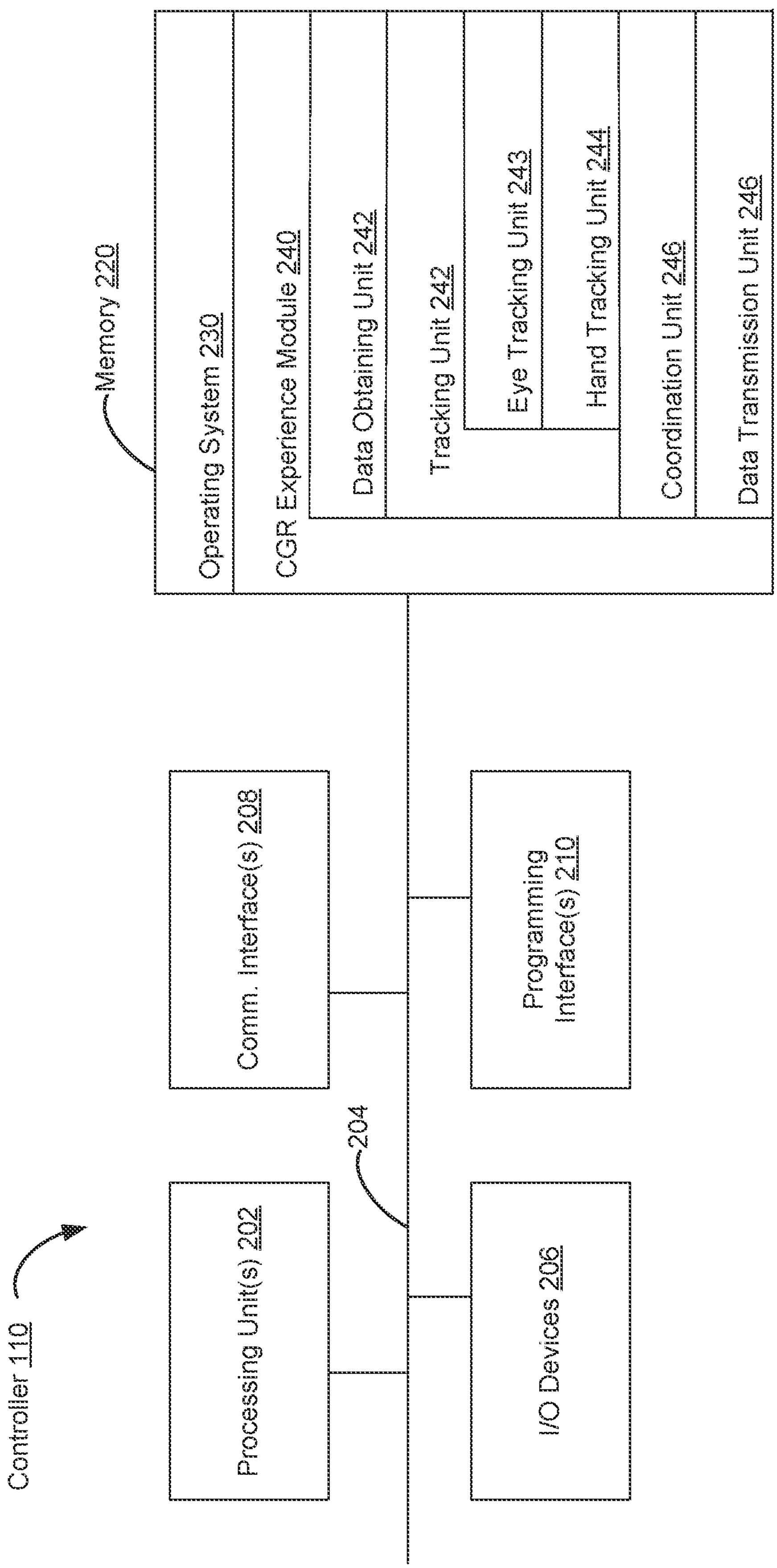
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
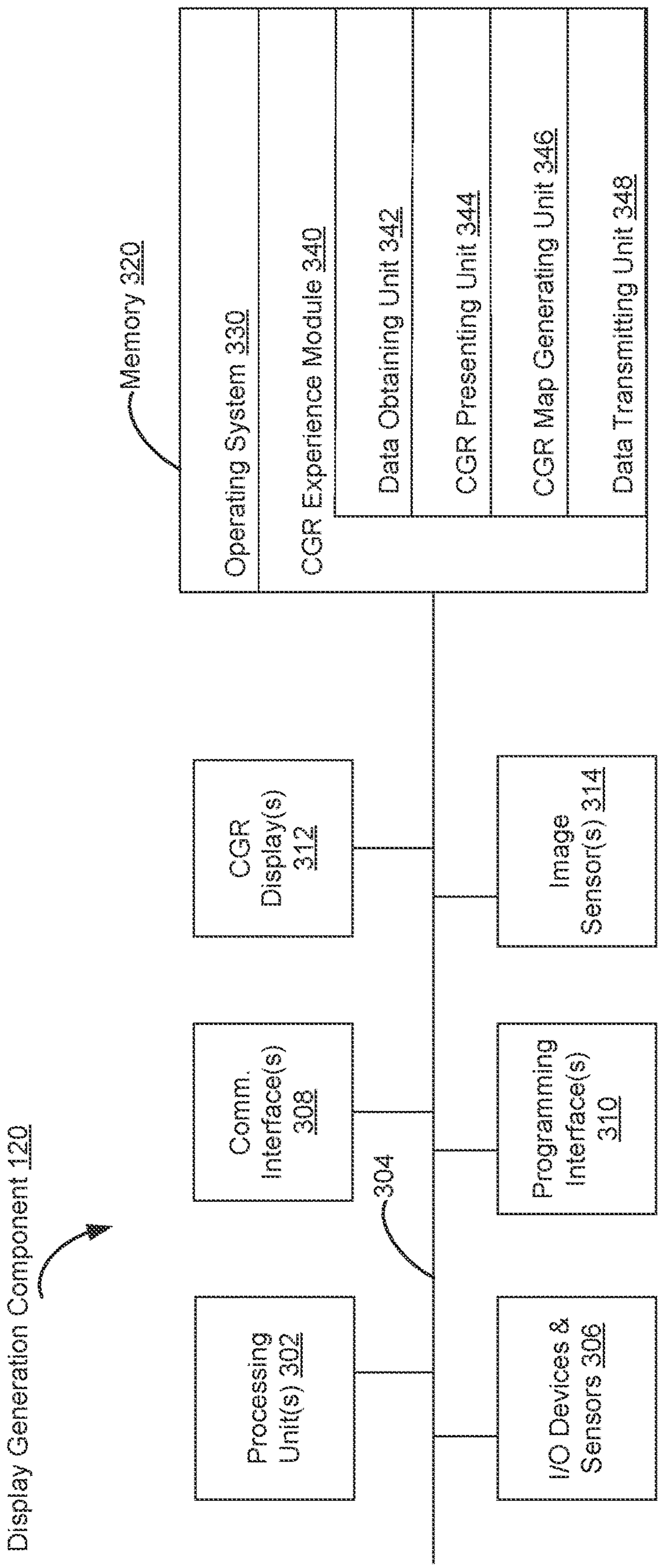
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG.

1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
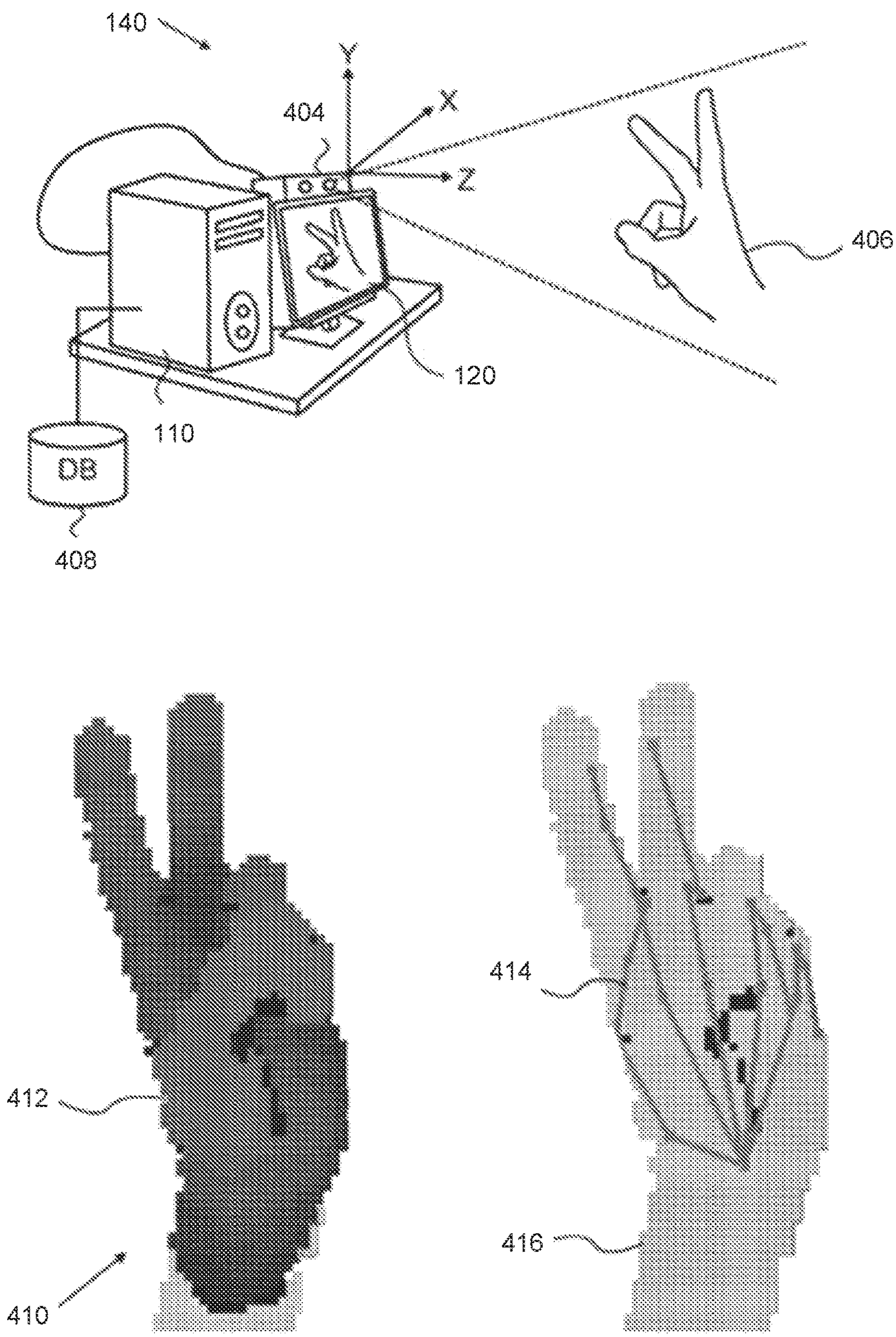
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
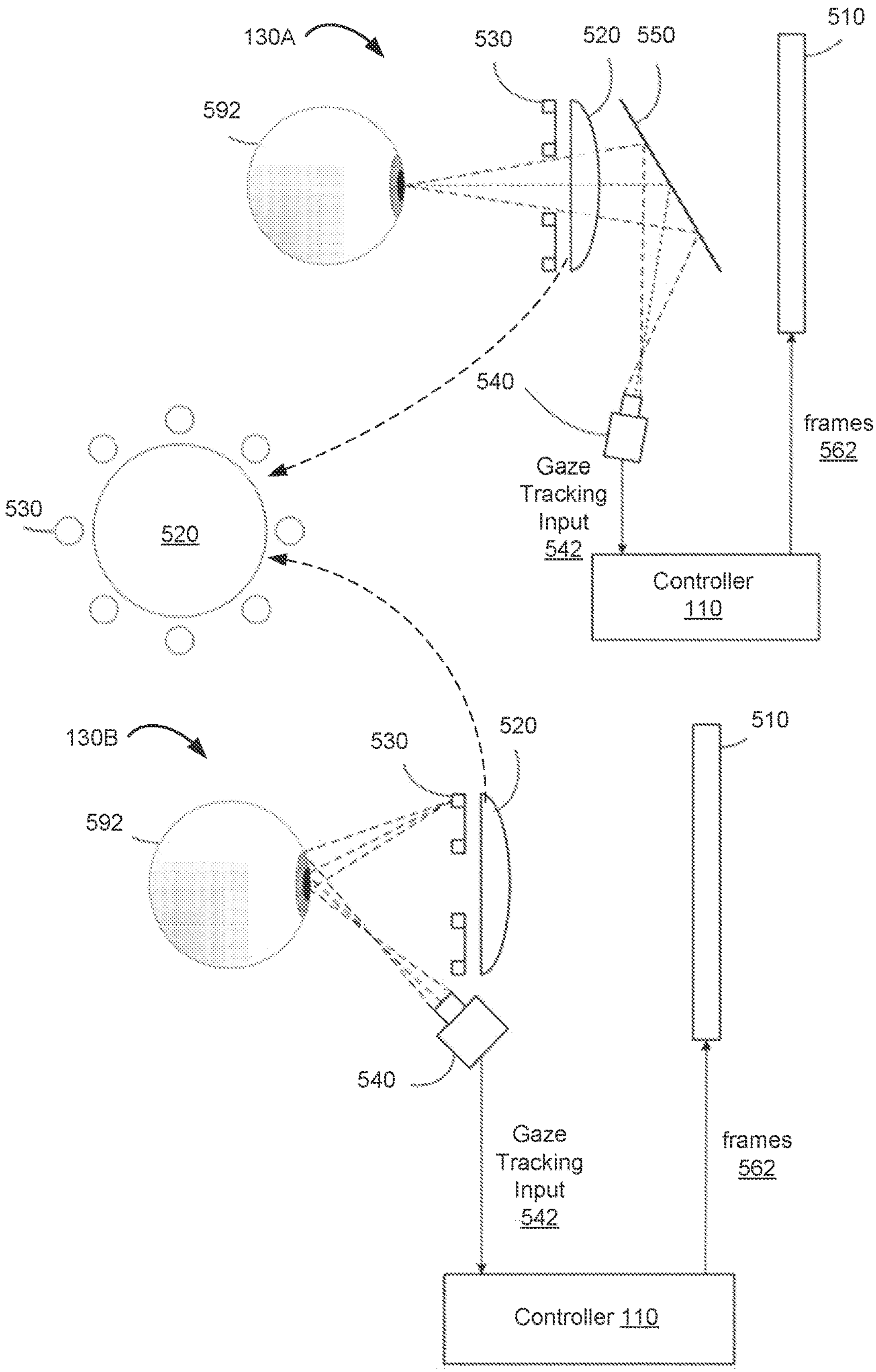
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
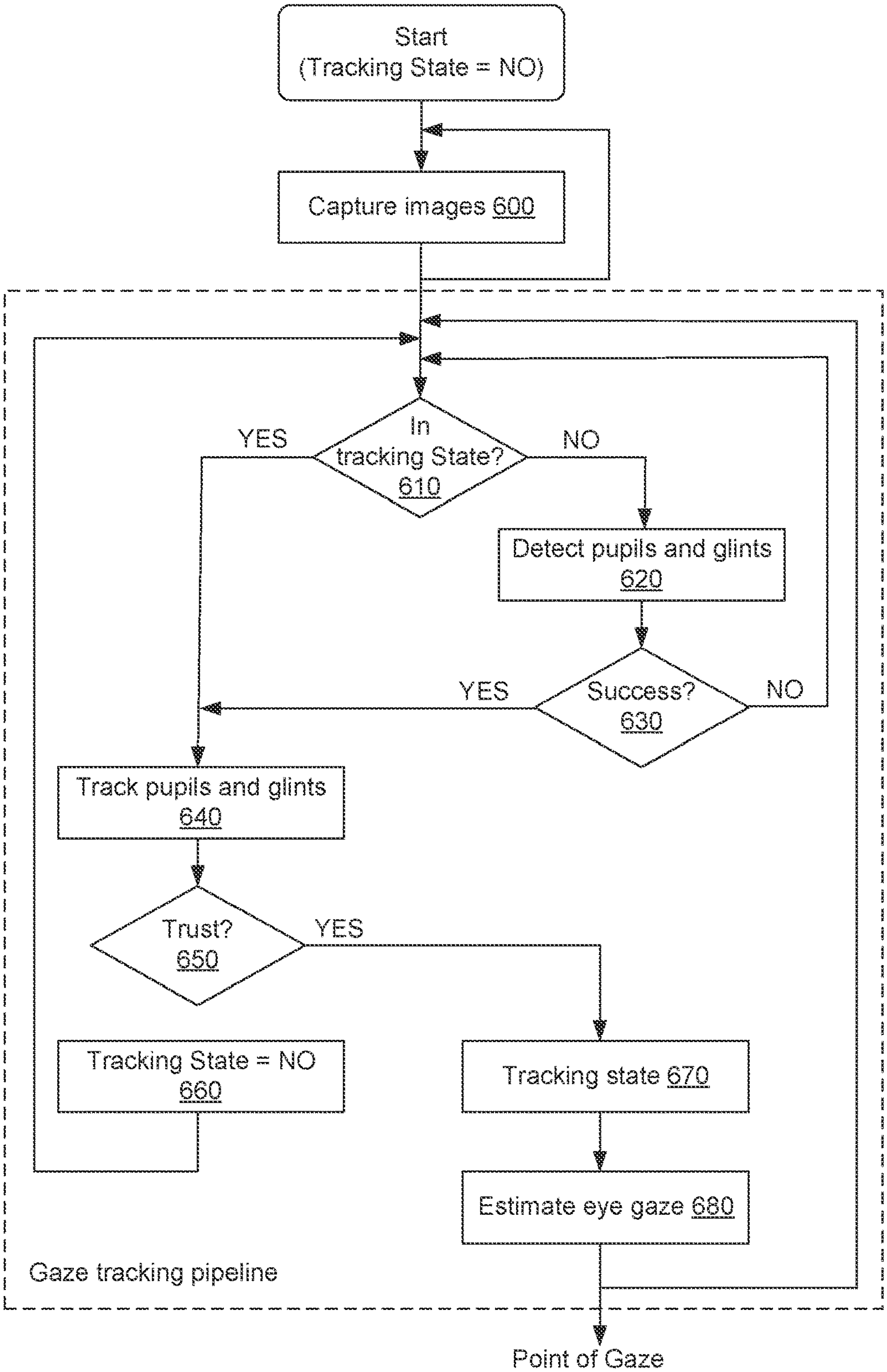
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted.

For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UP") and associated processes that may be implemented on a computer system, such as portable multifunction device or a head-mounted device, with a display generation component, one or more input devices, and (optionally) one or cameras.

FIGS. 7A-7H illustrate examples of a computer system displaying a virtual surface for containing one or more virtual objects in a three-dimensional environment in accordance with some embodiments.

Figure 7A:
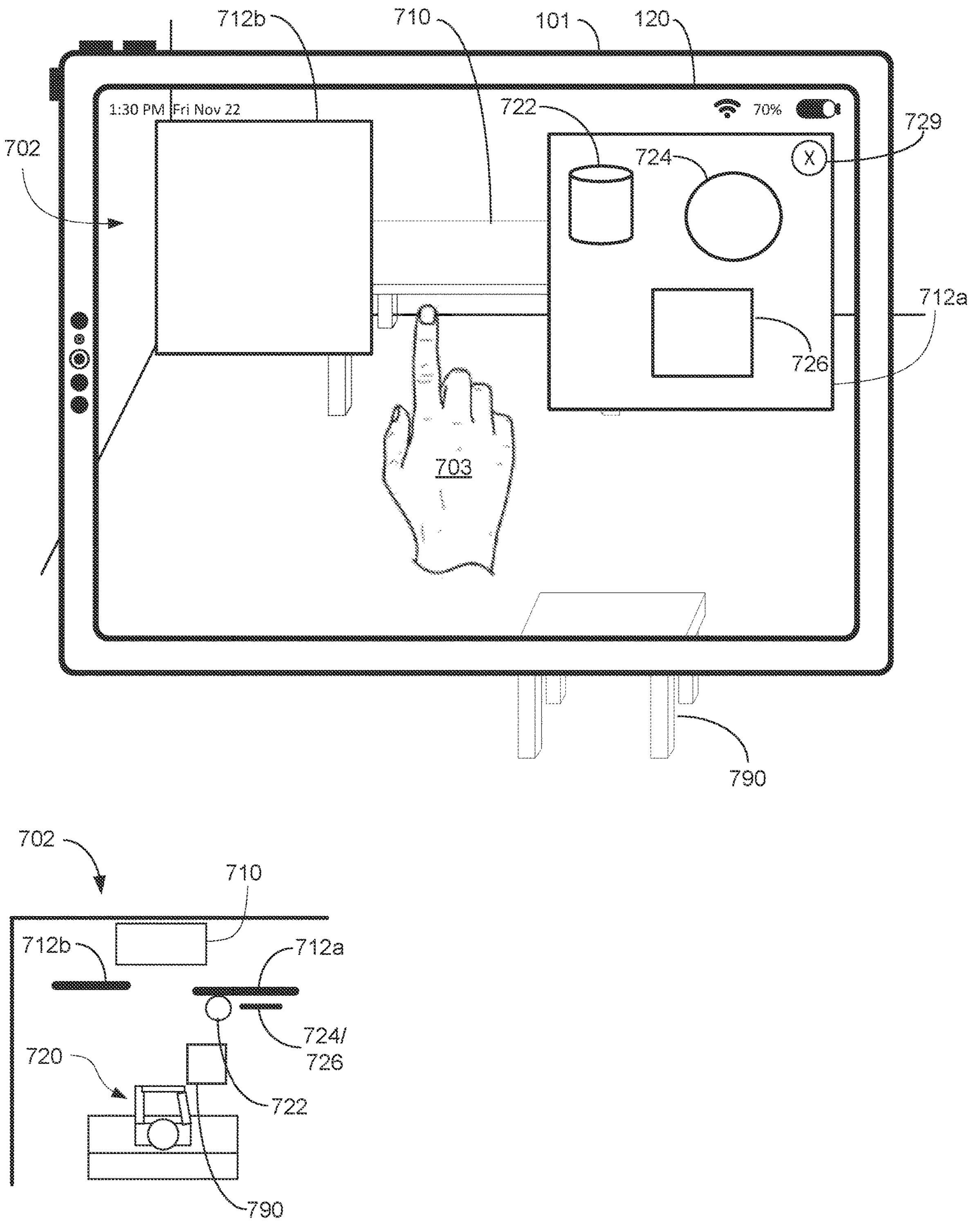
FIGS. 7A-7H illustrate examples of a computer system displaying a virtual surface for containing one or more virtual objects in a three-dimensional environment in accordance with some embodiments.

FIG. 7A illustrates a computer system 101 displaying, via a display generation component (e.g., display generation component 120 of FIG. 1), a three-dimensional environment 702 from a viewpoint of the user 720 illustrated in the overhead view (e.g., facing the back wall of the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702 or portions of the physical environment are visible via the display generation component 120 of computer system 101. For example, three-dimensional environment 702 includes portions of the left and back walls, and the floor in the physical environment of user 720. Three-dimensional environment 702 also includes tables 710 and 790, which are both physical tables in the physical environment of user 720.

In FIG. 7A, three-dimensional environment 702 also includes virtual content, such as virtual content 712*b* and 712*a*, which includes virtual objects 722, 724 and 724. Virtual objects 722, 724 and 726 are optionally one or more of a user interface of an application (e.g., messaging user interface, or content browsing user interface), a two-dimensional object (e.g., a shape, or a representation of a photograph) a three-dimensional object (e.g., virtual clock, virtual ball, or virtual car), or any other element displayed by computer system 101 that is not included in the physical environment of computer system 101 as described in more detail with reference to method 800. In some embodiments, virtual object 712*a* is a virtual content container that is able to hold different types of virtual content, such as objects 722, 724 and 724, as described in more detail with reference to method 800. Container 712*a* in FIG. 7A includes option 729 that is selectable to cause computer system 101 to cease displaying container 712*a* and/or objects 722, 724 and 726 included in container 712*a*. In some embodiments, virtual object 712*b* is a user interface of an application other than the virtual content container, such as a messaging application, an email application, or a word processing application.

Figure 7B:
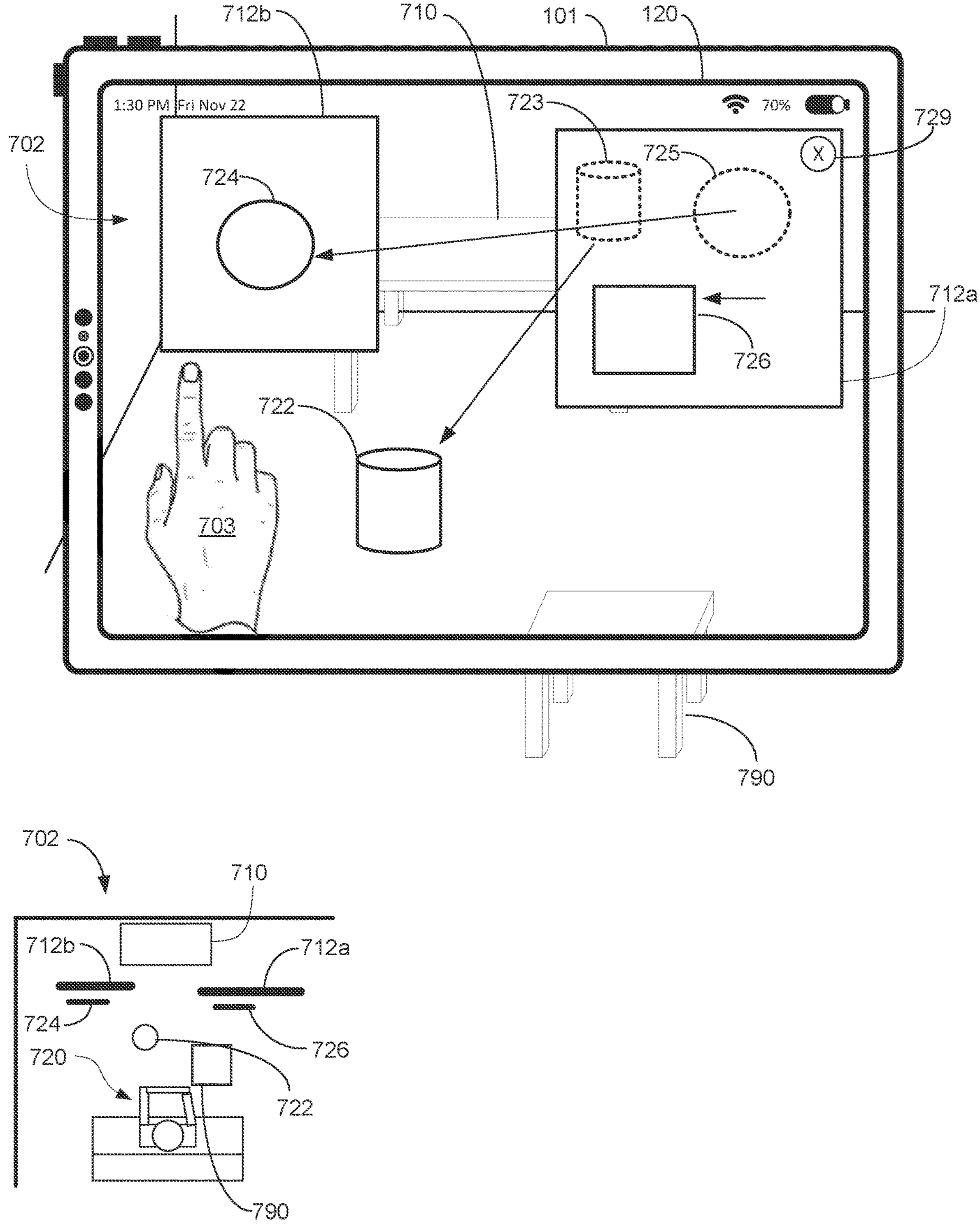

In some embodiments, virtual objects 722, 724 and/or 726 can be moved within or outside of container 712*a*. For example, from FIG. 7A to 7B, computer system 101 detects one or more movement inputs from hand 703, optionally corresponding to air pinch gestures as described in more detail with reference to method 800. FIG. 7B illustrates alternative results of alternative movement inputs (e.g., air pinch and drag gestures) directed to objects 722, 724 and 726. For example, object 24 has been moved out of container 712*a* and into object 712*b*. While movement of object 724 is ongoing towards object 712*b* and/or outside of container 712*a* (e.g., while input from hand 703 continues to be directed to and/or engaged with moving object 724), computer system 101 optionally displays an indication 725 of object 724 at the original location of object 724 in container 712*a*, as shown in FIG. 7B. Indication 725 optionally has a size, shape and/or form that corresponds to the size, shape and/or form of object 724, such as a ghost or faded version of object 724.

Similarly, object 722 has been moved out of container 712*a* and into empty space in three-dimensional environment 702 (e.g., space in three-dimensional environment 702 that is not occupied by another object). While movement of object 722 is ongoing towards the empty space in three-dimensional environment 702 and/or outside of container 712*a* (e.g., while input from hand 703 continues to be directed to and/or engaged with moving object 722), computer system 101 optionally displays an indication 723 of object 722 at the original location of object 722 in container 712*a*, as shown in FIG. 7B. Indication 723 optionally has a size, shape and/or form that corresponds to the size, shape and/or form of object 722, such as a ghost or faded version of object 722.

In contrast, object 726 has been moved within container 712*a* from FIG. 7A to 7B. In response, computer system 101 has moved object 726 to its new location within container 712*a* without displaying an indication of object 726 at its original location in container 712*a*.

FIG. 7B1 illustrates similar and/or the same concepts as those shown in FIG. 7B (with many of the same reference numbers). It is understood that unless indicated below, elements shown in FIG. 7B1 that have the same reference numbers as elements shown in FIGS. 7A-7H have one or more or all of the same characteristics. FIG. 7B1 includes computer system 101, which includes (or is the same as) display generation component 120. In some embodiments, computer system 101 and display generation component 120 have one or more of the characteristics of computer system 101 shown in FIGS. 7A-7H and display generation component 120 shown in FIGS. 1 and 3, respectively, and in some embodiments, computer system 101 and display generation component 120 shown in FIGS. 7A-7H have one or more of the characteristics of computer system 101 and display generation component 120 shown in FIG. 7B 1.

In FIG. 7B1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 7A-7H.

In FIG. 7B1, display generation component 120 is illustrated as displaying content that optionally corresponds to the content that is described as being displayed and/or visible via display generation component 120 with reference to FIGS. 7A-7H. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7B1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 7B1. Because display generation component 120 is optionally a head-mounted device, the field of view of display generation component 120 is optionally the same as or similar to the field of view of the user.

In FIG. 7B1, the user is depicted as performing an air pinch gesture (e.g., with hand 703) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7H.

In some embodiments, computer system 101 responds to user inputs as described with reference to FIGS. 7A-7H.

In the example of FIG. 7B1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7H and/or described with reference to the corresponding method(s) are optionally implemented on computer system 101 and display generation unit 120 in a manner similar or analogous to that shown in FIG. 7B1.

Figure 7C:
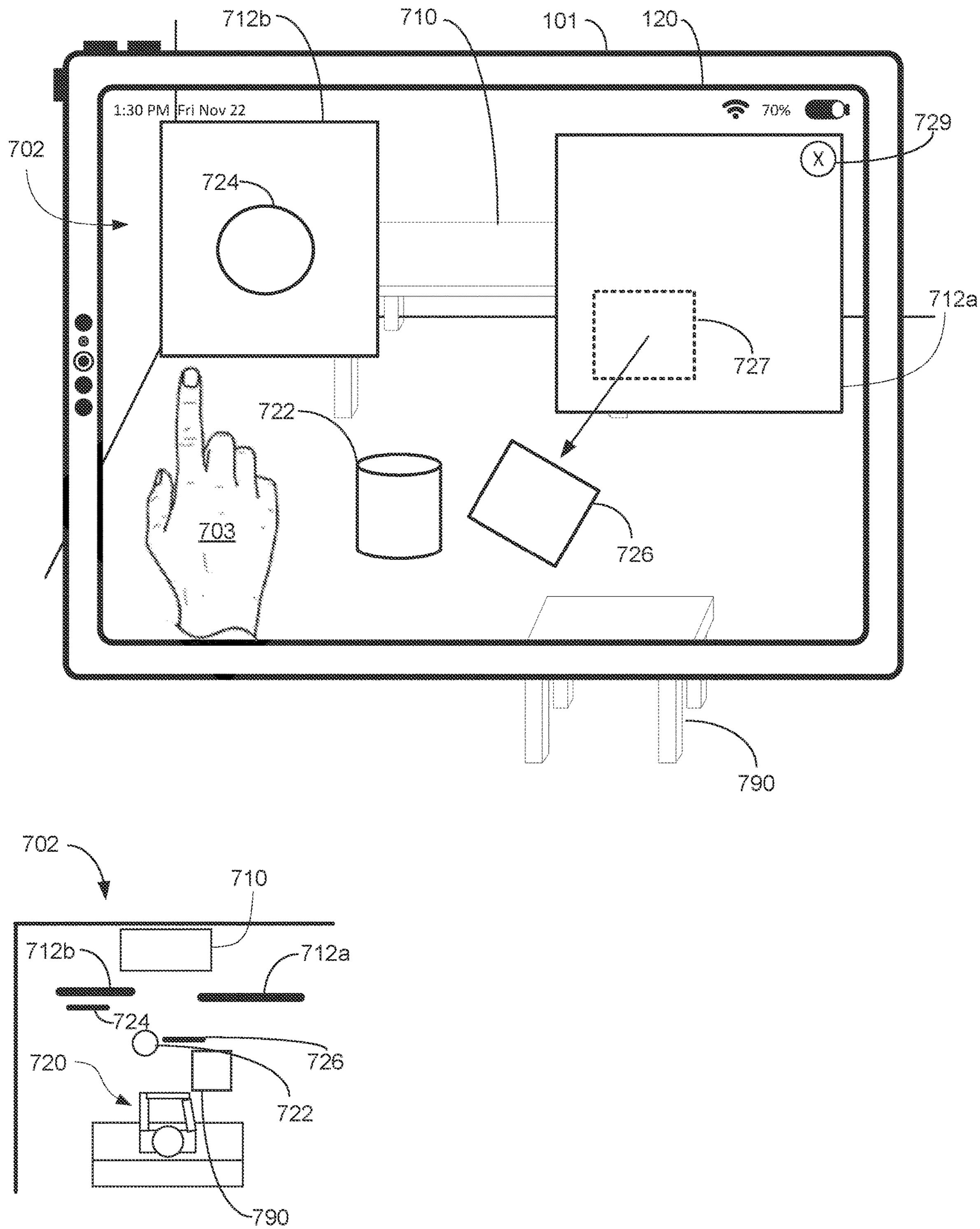

From FIG. 7B to 7C, computer system 101 detects input from hand 703 (e.g., air pinch and drag gesture) to move object 726 out of container 712*a* and towards object 722. As shown in FIG. 7C, in response computer system 101 moves object 726 towards objects 722, and during the movement of object 726 outside of container 712*a*, computer system 101 displays indication 727 of object 726 at the original location of object 726 in container 712*a*, as described previously. Indication 727 optionally has a size, shape and/or form that corresponds to the size, shape and/or form of object 726, such as a ghost or faded version of object 726. As shown in FIG. 7C, object 726 has an orientation that is not aligned with the orientation of object 722 (e.g., due to orientation changes applied to object 726 from hand 703 during movement of object 726, such as rotation). For example, the bottom surfaces of objects 722 and 726 are not aligned (e.g., not parallel to each other and/or to the floor in the physical environment) in FIG. 7C.

Figure 7D:
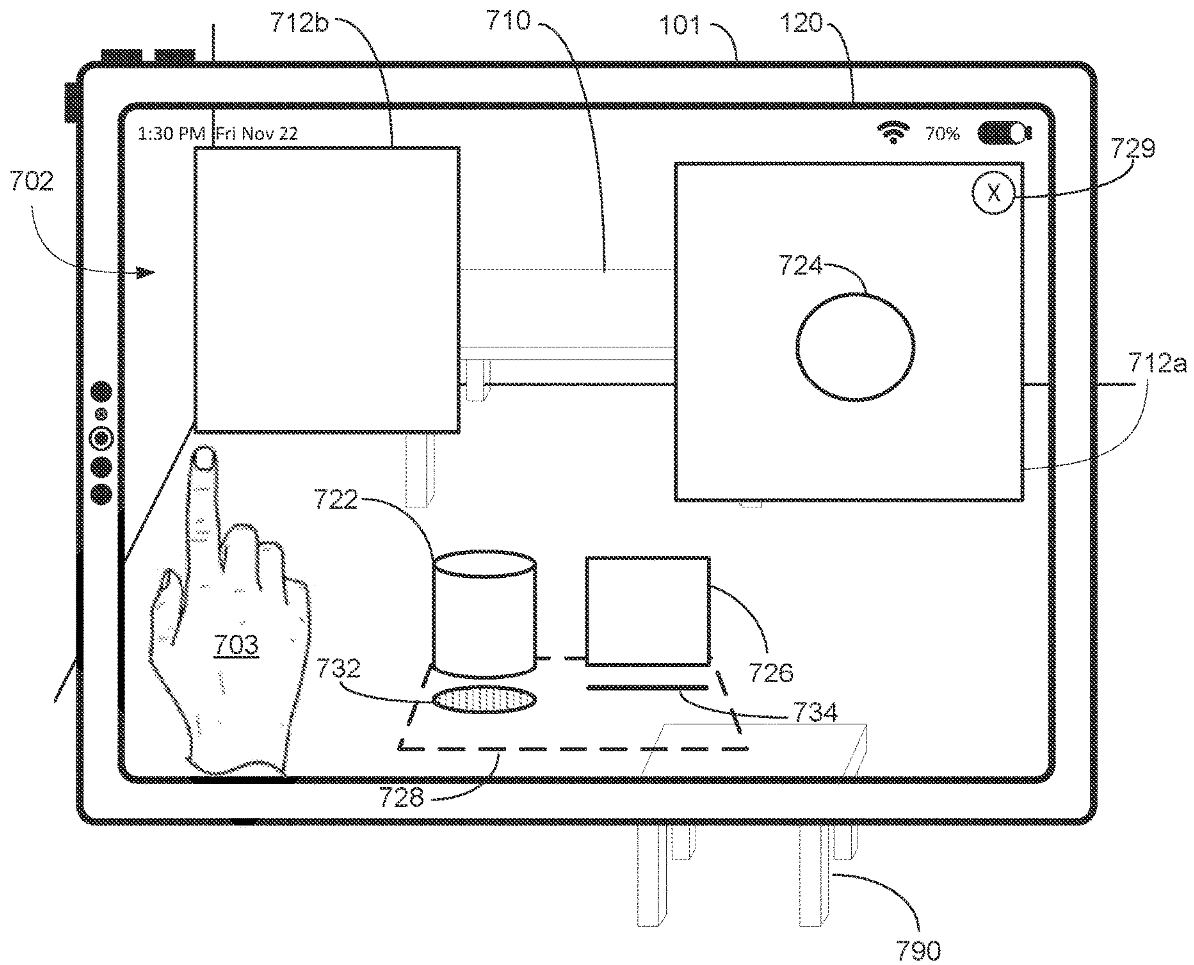
Figure 7D:
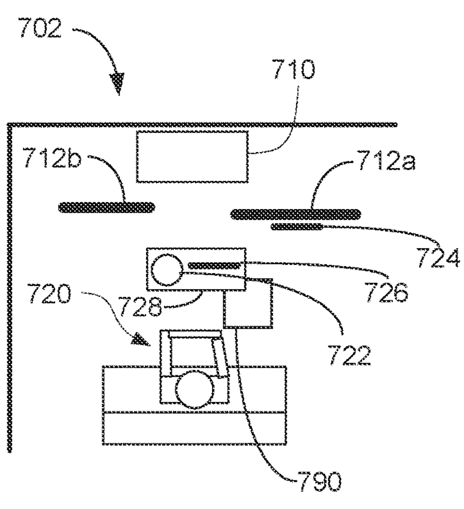

From FIG. 7C to 7D, computer system 101 detects an end of the movement input from hand 703 directed to object 726. Computer system 101 also detects movement of object 724 back to container 712*a* via input from hand 703 (e.g., air pinch and drag gesture). In response, as shown in FIG. 7D object 724 is back within container 712*a*, and because the location to which object 726 was moved by hand 703 satisfies one or more criteria for displaying a virtual surface in three-dimensional environment 702, in FIG. 7D computer system 101 displays virtual surface 728. In some embodiments, the one or more criteria include a criterion that is satisfied when object 726 is within a threshold distance (e.g., 0.1, 0.3, 0.5, 1, 3, 5, 10, 30, 50, 100 or 1000 cm) of another object (e.g., object 722) in three-dimensional environment 702, and optionally outside of container 712*a* and object 712*b*. Additional details about the one or more criteria are described with reference to method 800.

Virtual surface 728 has one or more characteristics described with reference to method 800. For example, virtual surface 728 optionally appears like a virtual table surface upon which objects 722 and 726 are displayed. In some embodiments, computer system 101 displays virtual shadows of objects on virtual surface 728, such as virtual shadow 732 for object 722, and virtual shadow 734 for object 726, to indicate that those objects are included in virtual surface 728. In some embodiments, virtual surface is at least partially translucent (e.g., indicated by its dashed-line border throughout the figures, including FIGS. 7A-7H, 9A-9G and 11A-11H). For example, in FIG. 7D, table 790 is at least partially visible through virtual surface 728. Virtual surface 728 provides a way to organize virtual objects within three-dimensional environment 702 that are not otherwise included in another container object. For example, virtual surface 728 is optionally movable within three-dimensional environment 702, which optionally causes the objects displayed on virtual surface 728 to be moved in three-dimensional environment 702 along with virtual surface 728.

In addition to displaying virtual surface 728 in FIG. 7D, computer system 101 has also aligned object 726 with object 722 and/or virtual surface 728 (e.g., automatically, without user input to change the orientation of object 726 in three-dimensional environment 702). For example, in some embodiments, virtual surface 728 is aligned to the first object that was displayed at the location at which the virtual surface 728 is displayed—for example, object 722 in FIG. 7D. As a result, the orientation of the top surface of virtual surface 728 is optionally aligned with object 722 (e.g., to be parallel to the bottom surface of object 722). Further, the orientation of the front edge of virtual surface 728 is optionally aligned with the front surface of object 722 (e.g., the front edge of virtual surface 728 and the front surface of object 722 face the same direction in three-dimensional environment 702). Orientations of objects that are added to virtual surface 728 are optionally automatically updated by computer system 101 to be aligned to virtual surface 728 and/or the first object upon which the orientation of virtual surface 728 is based. For example, in FIG. 7D, computer system 101 has automatically aligned object 726 such that its front surface faces the same direction as the front edge of virtual surface 728, and such that the bottom surface of object 726 is parallel to the top surface of virtual surface 728. The size of virtual surface 728 selected by computer system 101 is optionally sufficient to encompass objects 722 and 726, as described in more detail with reference to method 800.

Figure 7E:
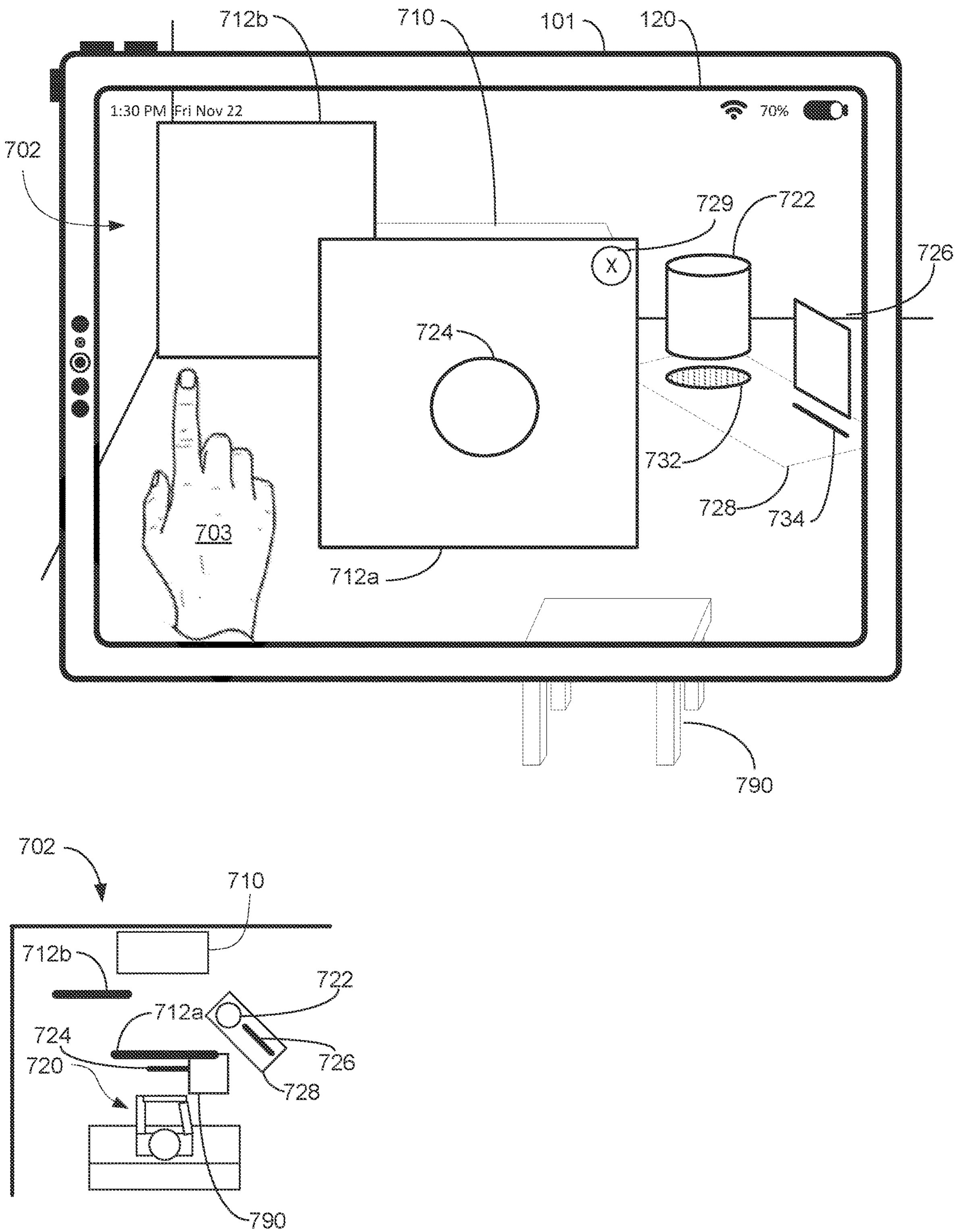

From FIG. 7D to 7E, computer system 101 detects alternative movement inputs from hand 703 (e.g., air pinch and drag gestures), for example moving container 712*a* leftward and towards the viewpoint of user 720, and moving virtual surface 728 rightward and away from the viewpoint of user 720. Characteristics of such movement inputs are described with reference to method 800. In response, as shown in FIG. 7E, computer system 101 displays container 712*a* including object 724 at a new location in three-dimensional environment 702 in accordance with the movement input. Further, computer system 101 in FIG. 7E displays virtual surface 728—and objects 722 and 726 included within it—at a new location in three-dimensional environment 702 in accordance with the movement input. In some embodiments, computer system 101 automatically orients the front edge of virtual surface 728 towards the viewpoint of user 720 as virtual surface 728 is moved within three-dimensional environment 702. Therefore, as shown in FIG. 7E, computer system 101 has changed the orientation of virtual surface 728 in three-dimensional environment 702 to continue to be directed towards the viewpoint of user 720. The orientations of objects 722 and 726 relative to virtual surface 728 have remained constant. Therefore, the orientations of objects 722 and 726 relative to three-dimensional environment 702 have changed in accordance with the change to the orientation of virtual surface 728 in three-dimensional environment 702.

Figure 7F:
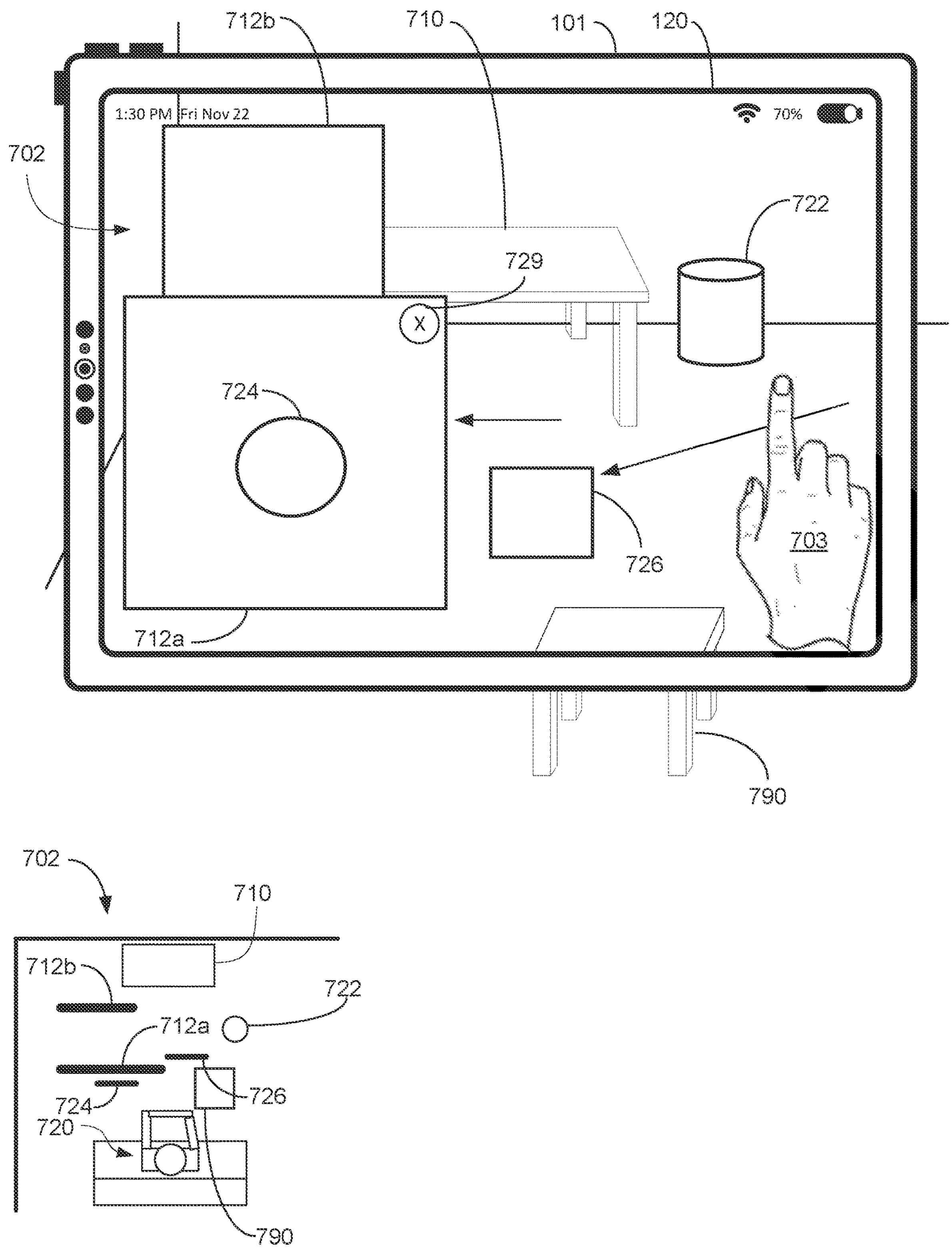

From FIG. 7E to 7F, computer system 101 detects alternative movement inputs from hand 703 (e.g., air pinch and drag gestures), for example moving container 712*a* leftward, and moving object 726 away from virtual surface 728. Characteristics of such movement inputs are described with reference to method 800. In response, as shown in FIG. 7F, computer system 101 displays container 712*a* including object 724 at a new location in three-dimensional environment 702 in accordance with the movement input. Further, computer system 101 in FIG. 7F has moved object 726 to a new location in three-dimensional environment 702, away from object 722 and/or virtual surface 728, in accordance with the movement input.

In some embodiments, computer system 101 automatically ceases display of virtual surface 728 if an object is removed from virtual surface 728 and the remaining objects do not satisfy criteria for maintaining display of virtual surface 728. For example, in some embodiments, if there is only one remaining object after another object has been removed from virtual surface 728, computer system 101 automatically ceases display of virtual surface 728. Additional details about the criteria are described with reference to method 800. Therefore, in FIG. 7F, computer system 101 has ceased display of virtual surface 728. Object 722 in FIG. 7F remains at its location in three-dimensional environment 702 after virtual surface 728 is no longer displayed.

Figure 7G:
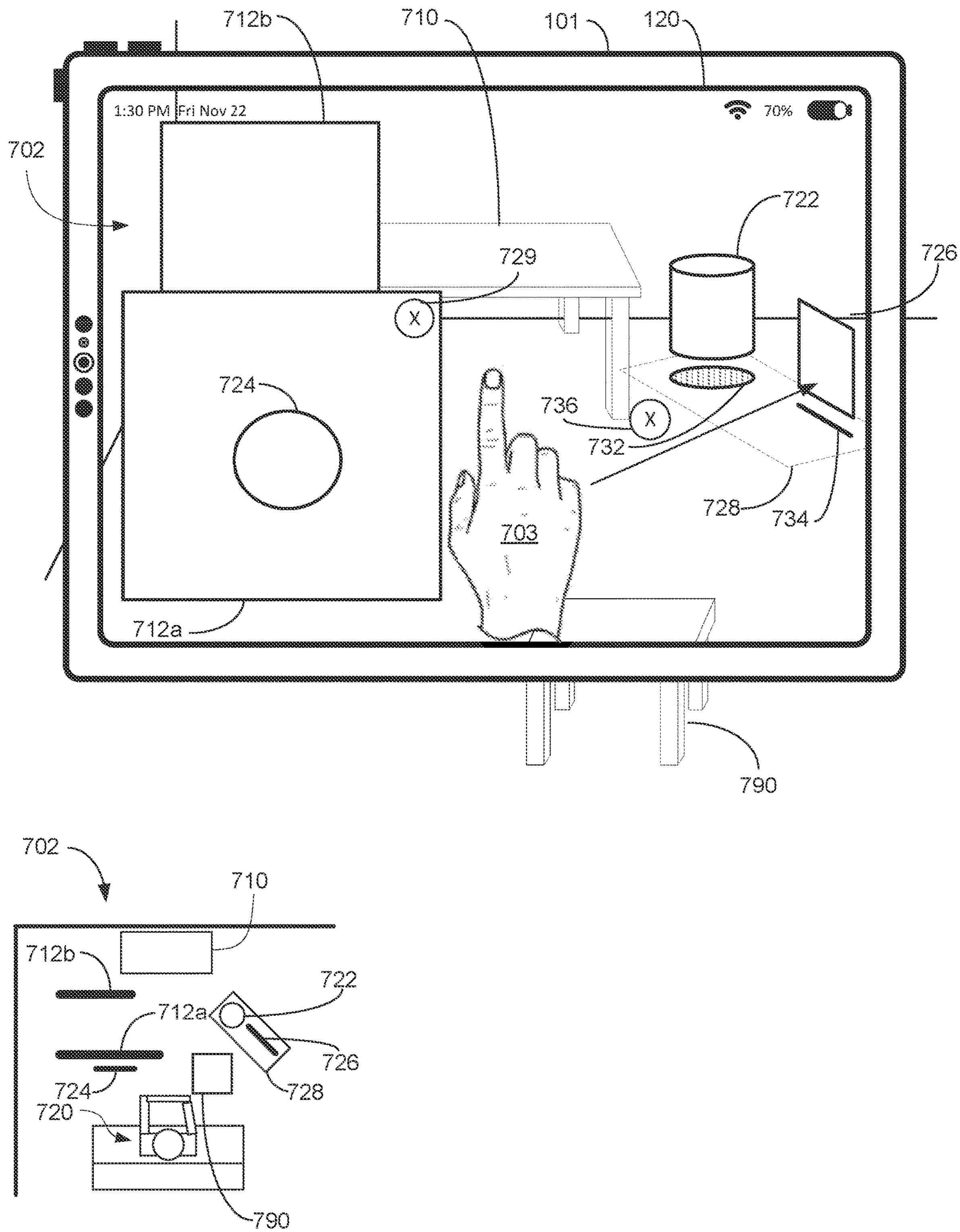

From FIG. 7F to 7G, computer system 101 detects movement input from hand 703 (e.g., air pinch and drag gesture) for moving object 726 back towards object 722. Characteristics of such movement inputs are described with reference to method 800. In response, and in accordance with a determination that the location to which object 726 is moved satisfies criteria for displaying virtual surface 728 (e.g., as described with reference to FIG. 7D and method 800), in FIG. 7G computer system 101 has redisplayed virtual surface 728 containing objects 722 and 726, including the various characteristics of virtual surface 728 described with reference to FIGS. 7D-7E.

In some embodiments, virtual surface 728 is displayed with a selectable option that is selectable to manually cease display of virtual surface 728. For example, in FIG. 7G, computer system 101 is displaying selectable option 736 in association with virtual surface 728 (e.g., adjacent to virtual surface 728). Selectable option 736 is optionally selectable to cease display of virtual surface 728 in three-dimensional environment 702. In FIG. 7G, computer system 101 detects a selection input of selectable option 736, such as via an air pinch gesture detected while attention of user 720 is directed to option 736. Characteristics of such selection inputs are described with reference to method 800.

Figure 7H:
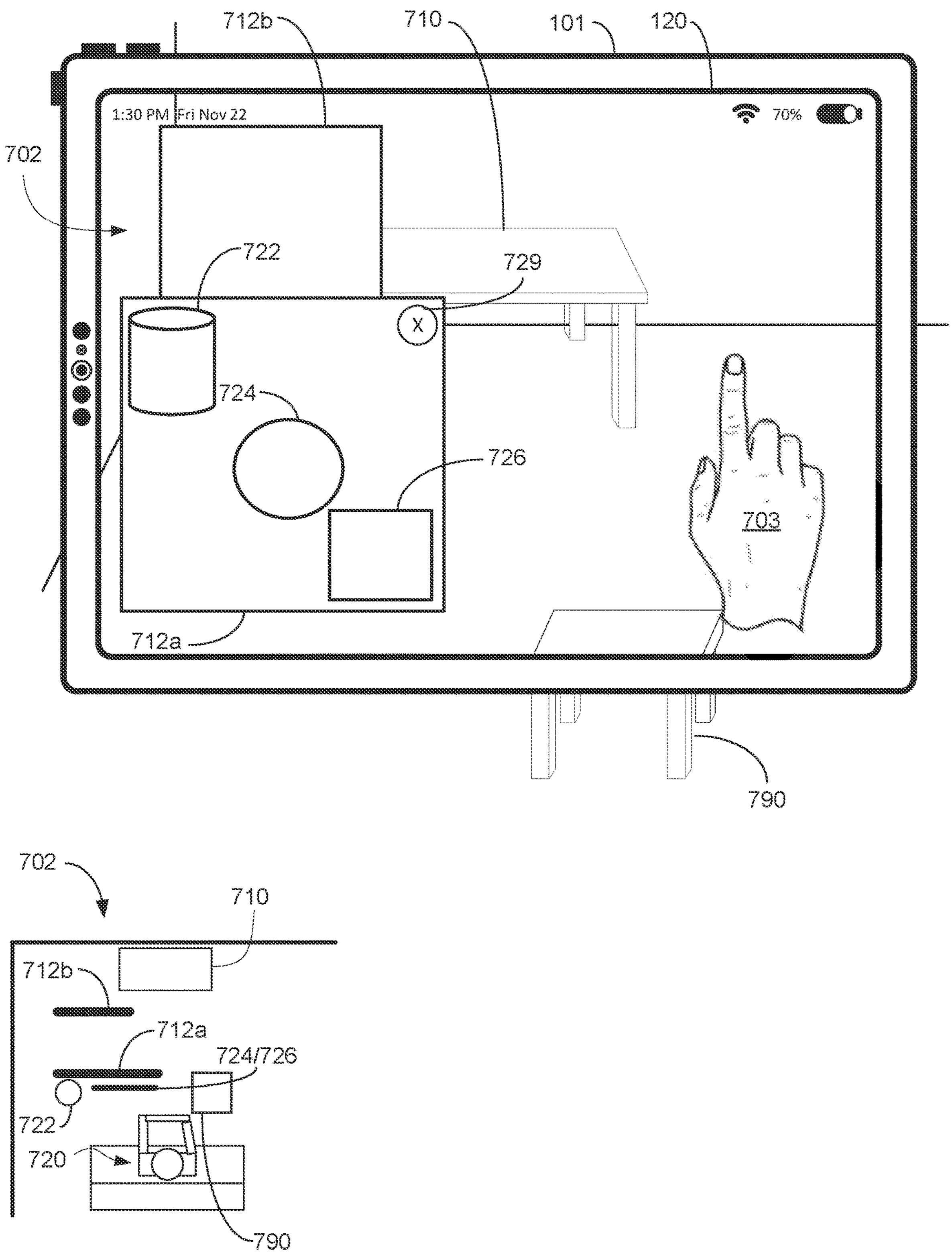
Figure 8A:
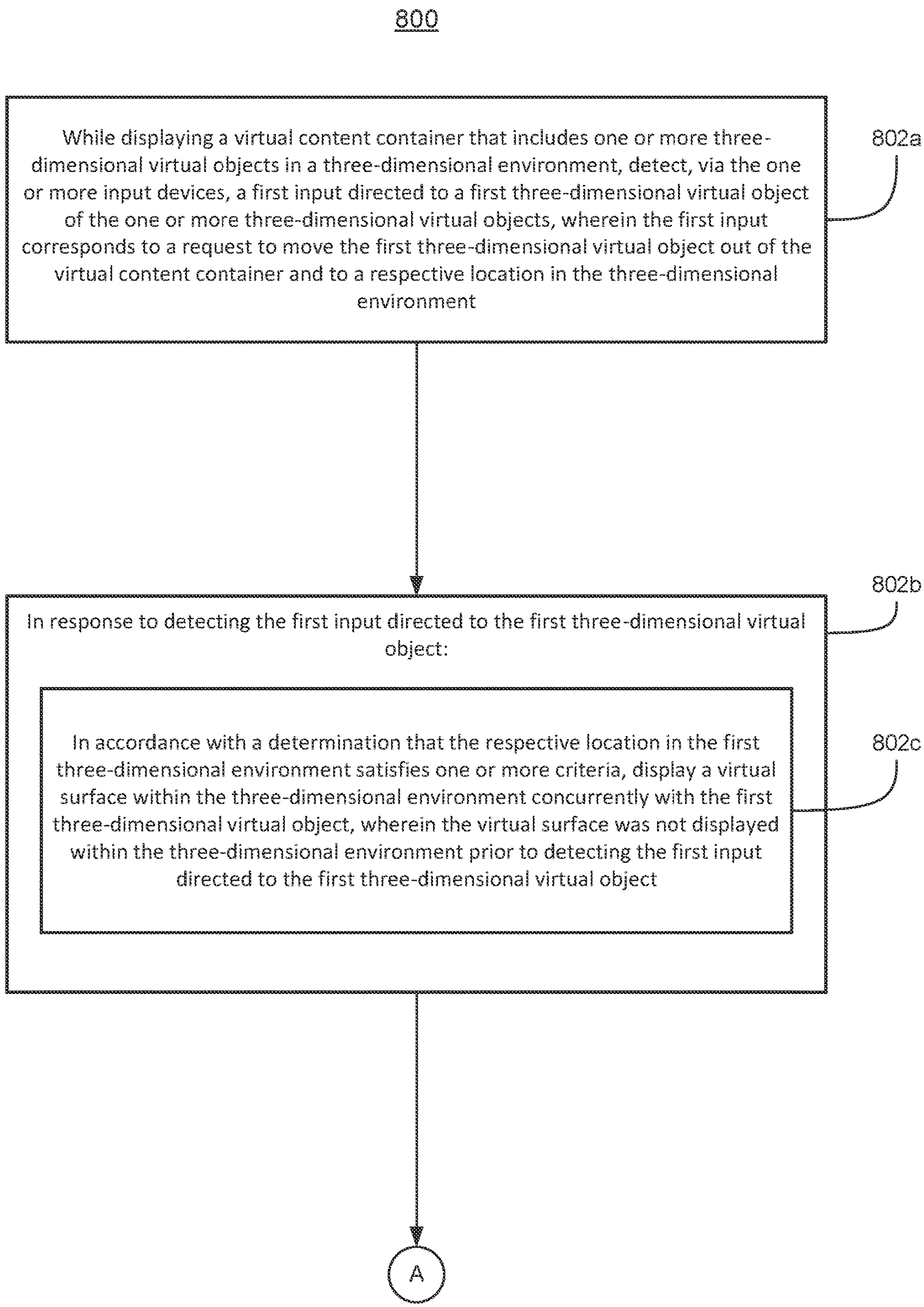
Figure 8C:
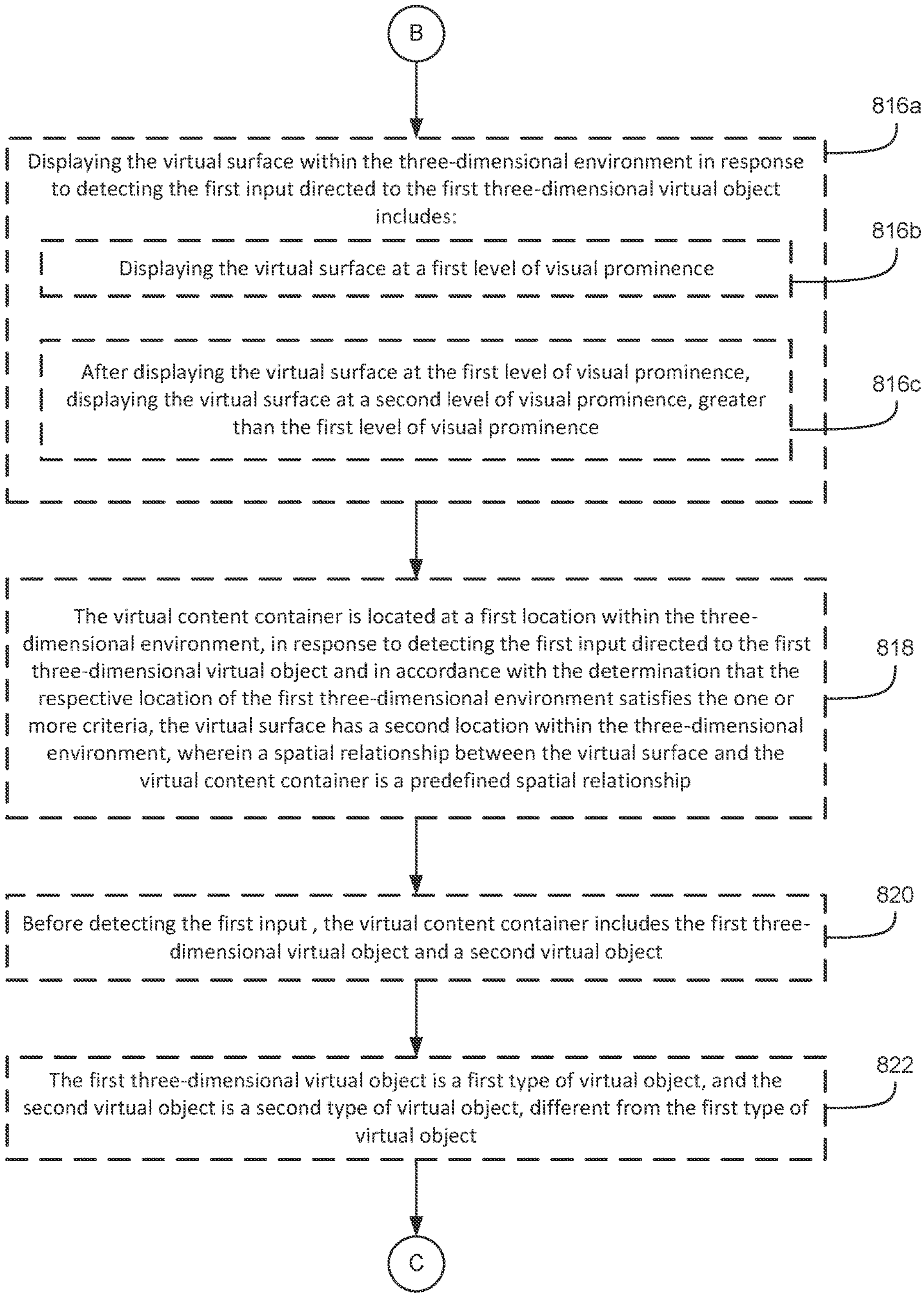
Figure 8D:
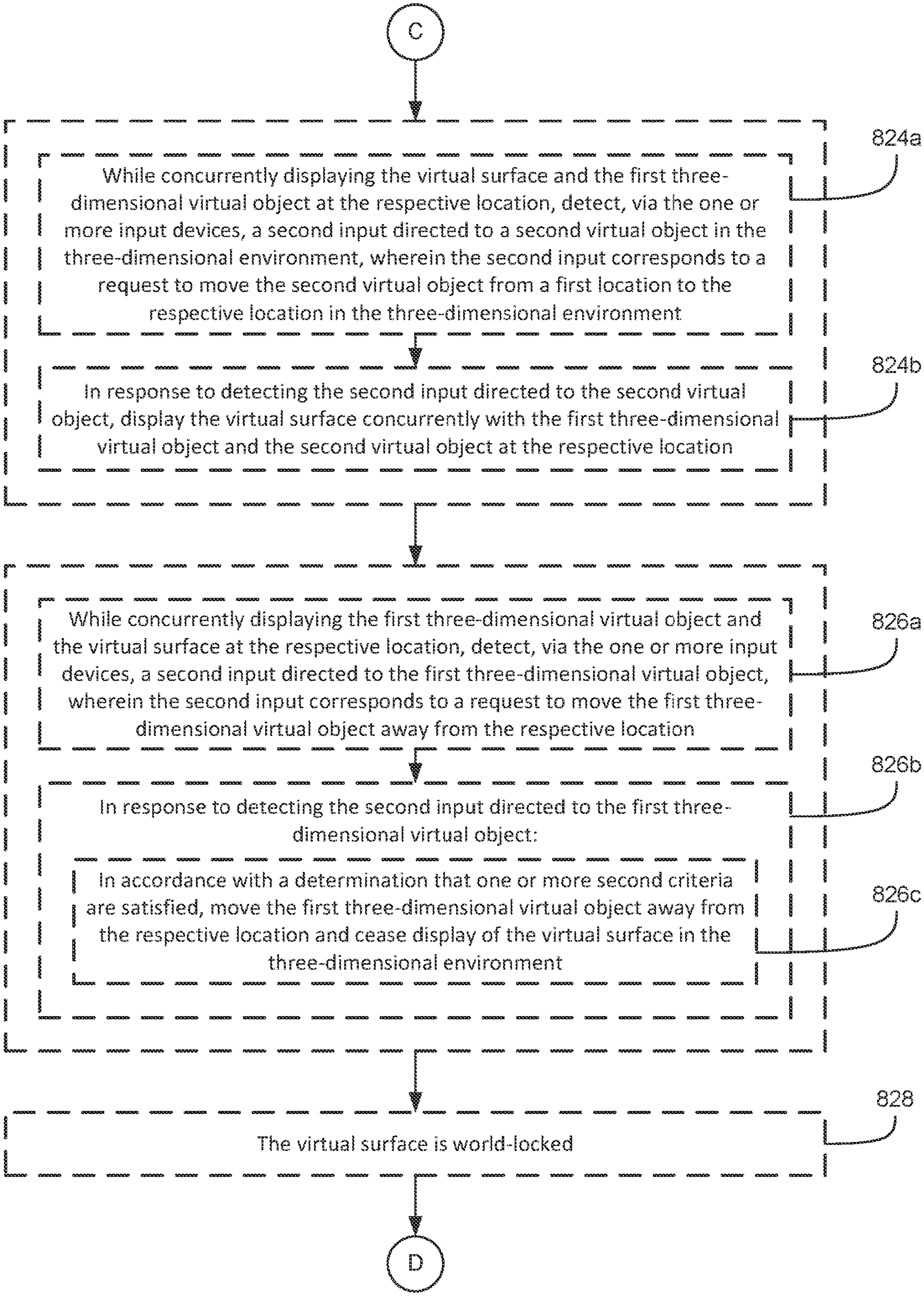
Figure 8E:
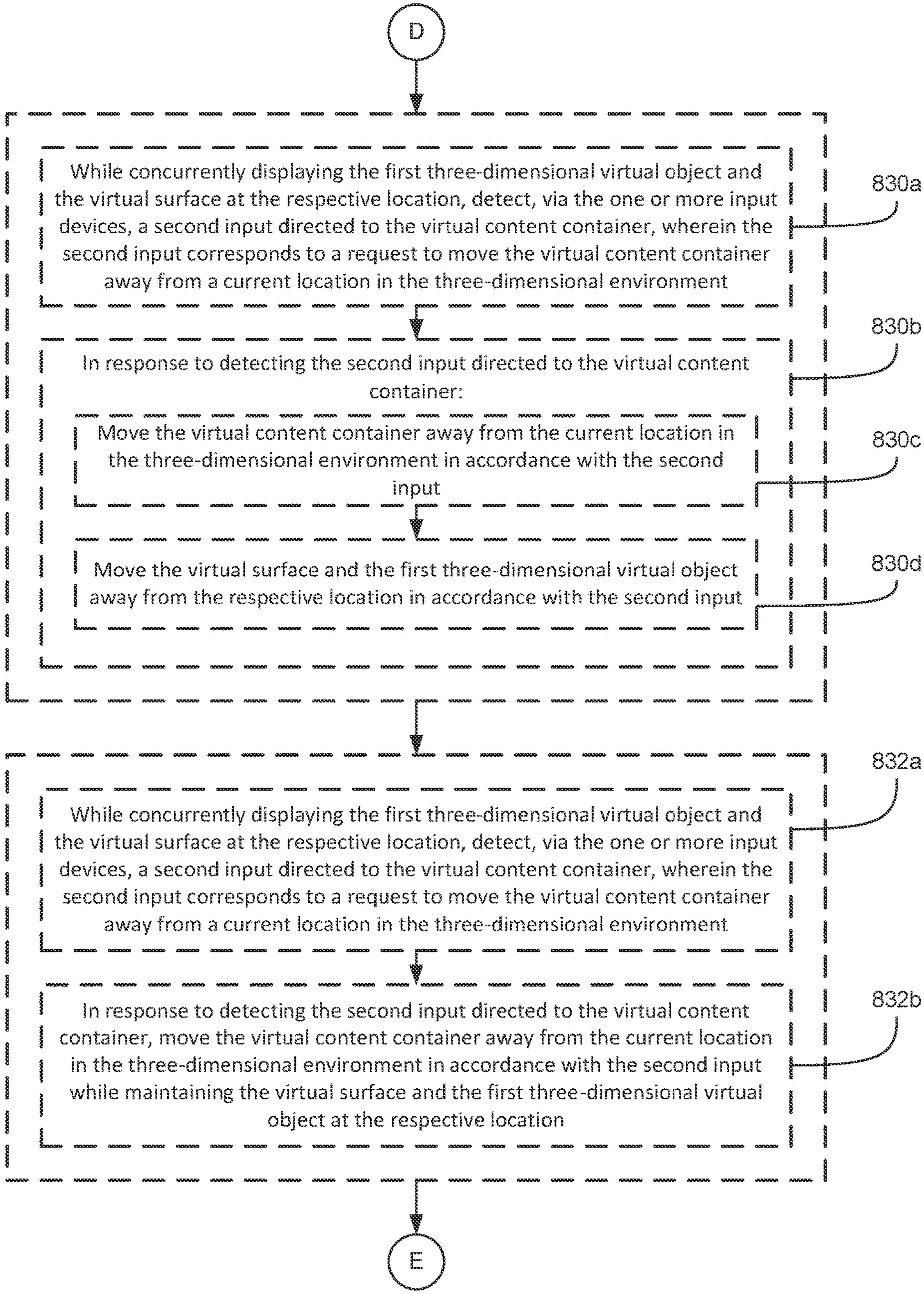
Figure 8F:
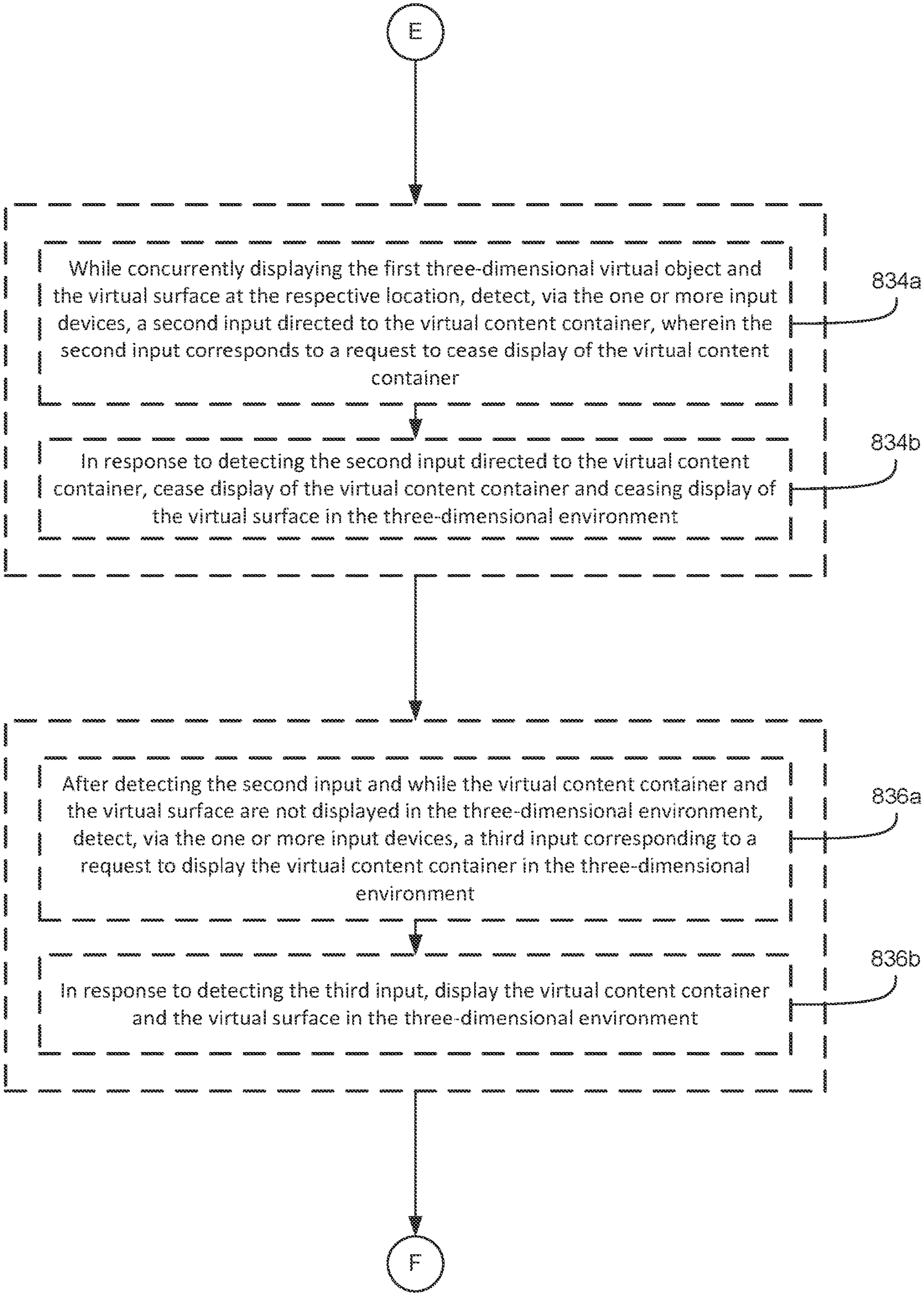
Figure 8H:
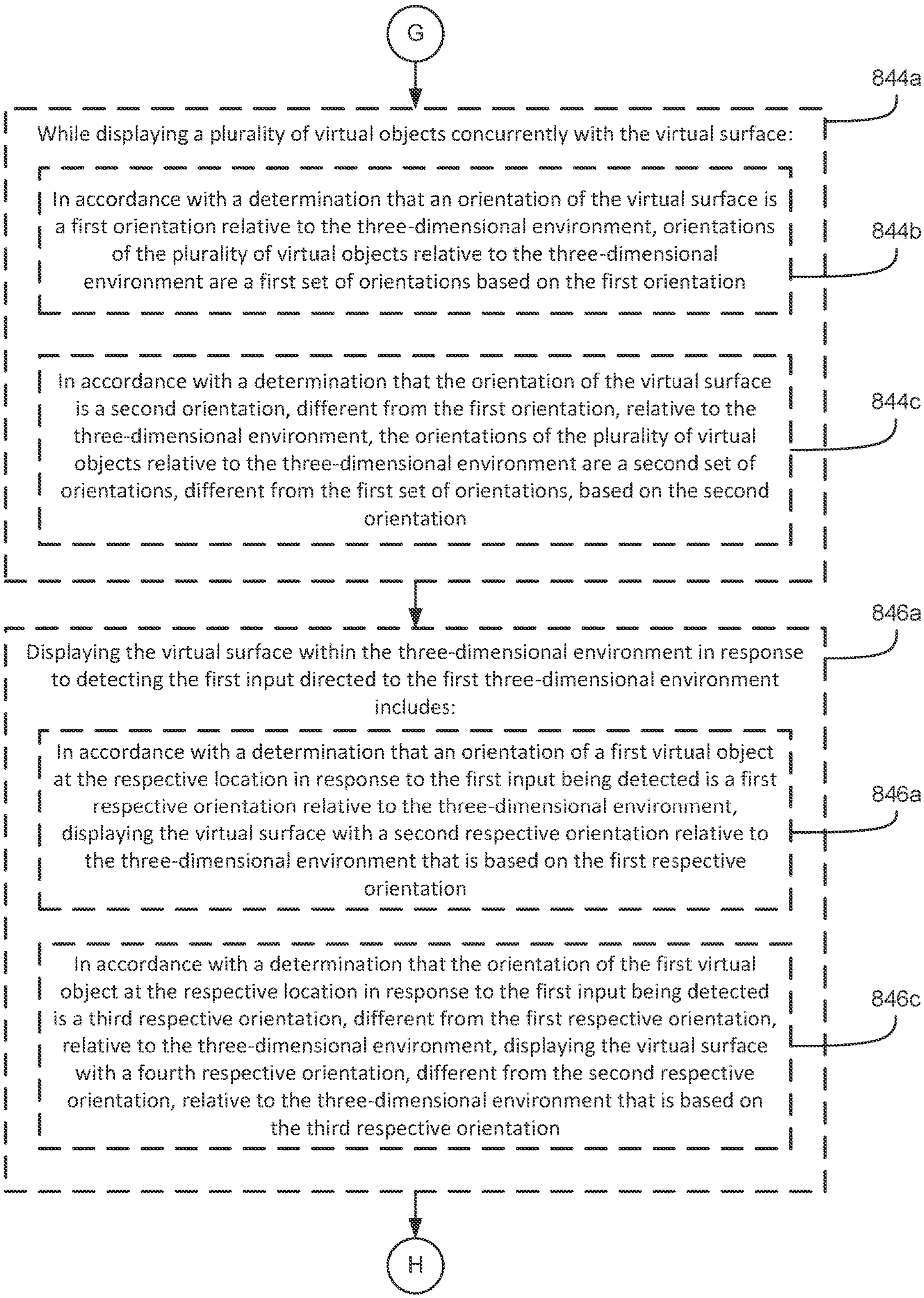
Figure 8I:
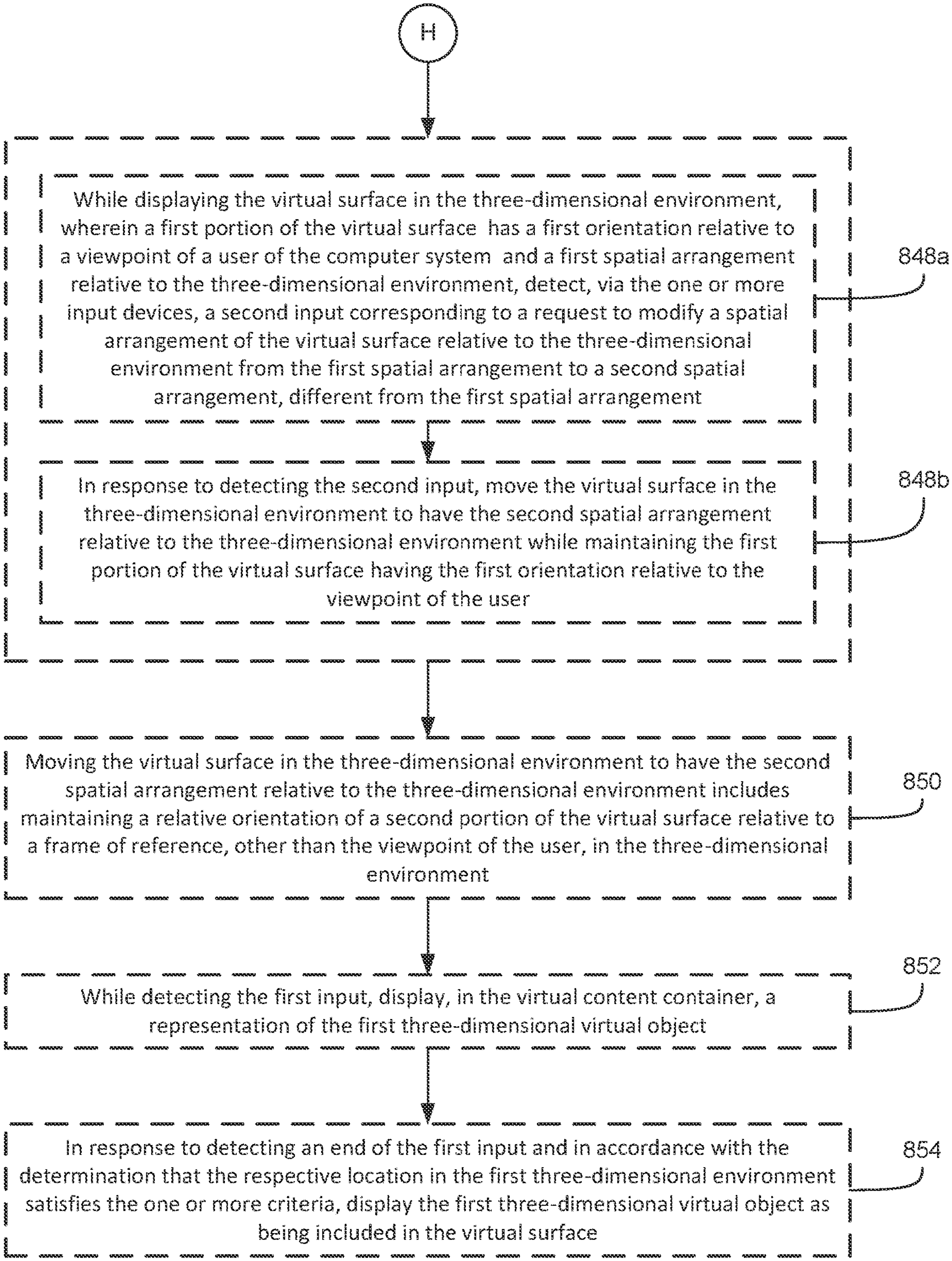

In response, in FIG. 7H, computer system 101 ceases display of virtual surface 728. However, instead of maintaining display of objects 722 and 726 at their locations in three-dimensional environment 702 when the display of virtual surface 728 was ceased, computer system 101 automatically moves objects 722 and 726 back to container 712*a*, as shown in FIG. 7H. In some embodiments, computer system 101 moves objects 722 and 726 back to their original locations in container 712*a* (e.g., their last locations in container 712*a* before being removed from container 712*a*). In some embodiments, computer system 101 moves objects 722 and 726 back to different locations in container 712*a*, optionally because their original locations are occupied by other objects.

FIGS. 8A-8I is a flowchart illustrating an exemplary method of displaying a virtual surface for containing one or more virtual objects in a three-dimensional environment in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system in communication with a display generation component and one or more input devices. For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users. In some embodiments, the one or more input devices include an electronic device or component capable of receiving a user input (e.g., capturing a user input, and/or detecting a user input) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor). In some embodiments, the computer system is in communication with a hand tracking device (e.g., one or more cameras, depth sensors, proximity sensors, touch sensors (e.g., a touch screen, trackpad)). In some embodiments, the hand tracking device is a wearable device, such as a smart glove. In some embodiments, the hand tracking device is a handheld input device, such as a remote control or stylus.

In some embodiments, while displaying a virtual content container that includes one or more three-dimensional virtual objects in a three-dimensional environment, such as container 712*a* in FIG. 7A, (e.g., for example, the first virtual content container is a container that holds three-dimensional virtual objects that are collected and/or owned by a user). In some embodiments, and discussed in greater detail hereinafter, the three-dimensional virtual objects are moveable by the user from the first virtual content container to locations within the three-dimensional environment outside of the virtual content container. In some embodiments, as the three-dimensional virtual objects are moved from the virtual content container to a location within the three-dimensional environment, faded representations of the three-dimensional virtual objects will be shown within the virtual content container. In some embodiments, the three-dimensional objects are three-dimensional models such as a dog, a train, or a car. In some embodiments, the three-dimensional environment is an extended reality (XR) environment, such as a virtual reality (VR) environment, a mixed reality (MR) environment, or an augmented reality (AR) environment, and the virtual content container is displayed within the three-dimensional environment) the computer system detects (802*a*), via the one or more input devices, a first input directed to a first three-dimensional virtual object (e.g., "the first virtual object") of the one or more three-dimensional virtual objects, such as the input directed to object 726 in FIGS. 7B, 7B1 and 7C, wherein the first input corresponds to a request to move the first three-dimensional virtual object out of the virtual content container and to a respective location in the three-dimensional environment. In some embodiments, and discussed in greater detail hereinafter, the first input includes a user interaction with one of the three-dimensional virtual objects such as an air gesture from a hand of a user of the computer system including pinching (e.g., a thumb and index finger of the hand of the user coming together and touching), dragging (e.g., while the hand of the user is in a pinch hand shape), and releasing (e.g., the hand of the user de-pinching to cause the thumb and index finger to move apart) the three-dimensional object from the virtual content container into the three-dimensional environment. In some embodiments, when the three-dimensional virtual object is held over the respective location in the three-dimensional environment, a shadow or faded representation of the three-dimensional virtual object is displayed in the virtual content container at the original location of the first three-dimensional virtual object. In some embodiments, when the three-dimensional virtual object is held over the respective location in the three-dimensional environment, a glow that surrounds the three-dimensional virtual object is displayed. In some embodiments, the first input includes a touch input from a finger on a touch-sensitive surface (e.g., at a location on the touch-sensitive surface corresponding to the first three-dimensional virtual object), followed by movement of the finger in contact with the touch-sensitive surface to a location on the touch-sensitive surface corresponding to the respective location in the three-dimensional environment.

In some embodiments, in response to detecting the first input directed to the first three-dimensional virtual object (802*b*), in accordance with a determination that the respective location in the first three-dimensional environment satisfies one or more criteria, such as the location of object 726 in FIG. 7C (e.g., the one or more criteria include a criterion that is satisfied when the respective location is a location within the three-dimensional environment that is within a threshold distance (e.g., 0.02 cm, 0.5 cm, 1 cm, 2 cm, 5 cm, 10 cm or 50 cm) of one or more other three-dimensional objects; additional or alternative details about the one or more criteria are discussed in greater detail hereinafter) the computer system displays (802*c*) a virtual surface within the three-dimensional environment (e.g., at the respective location) concurrently with the first three-dimensional virtual object (e.g., at the respective location), such as virtual surface 728 in FIG. 7D, wherein the virtual surface was not displayed within the three-dimensional environment prior to detecting the first input directed to the first three-dimensional virtual object. In some embodiments, the computer system creates a virtual surface capable of holding three-dimensional virtual objects that the user moves from the virtual content container. In some embodiments, the virtual surface was not displayed in the three-dimensional environment before detecting the first input. In some embodiments, the virtual surface is created and/or displayed at the respective location in the three-dimensional environment, outside of the virtual content container. The virtual surface optionally includes at least two objects in response to detecting the end of the first input, including the first three-dimensional virtual object. In some embodiments, the boundaries of the virtual surface are established based on the number of, location of, and/or boundaries of three-dimensional objects contained within and/or on the surface, discussed in greater detail hereinafter. In some embodiments, the virtual surface is created upon release of the three-dimensional objects that satisfy the one or more criteria. In some embodiments, the virtual surface is parallel to the floor and/or perpendicular to at least a portion of the virtual content container. In some embodiments, the virtual surface is displayed with one or more visual characteristics that make the virtual surface appear to be a glass surface. Displaying virtual objects from a virtual content container as grouped within a surface outside of the virtual content container provides organization to the three-dimensional environment, and avoids clutter within the three-dimensional environment.

In some embodiments, in response to detecting the first input directed to the first three-dimensional virtual object (804*a*), in accordance with a determination that the respective location in the first three-dimensional environment does not satisfy one or more criteria, the computer system displays (804*b*) the first three-dimensional virtual object at the respective location without displaying the virtual surface within the three-dimensional environment, such as displaying object 722 in FIGS. 7B and 7B1 without a virtual surface. In some embodiments, the computer system places the first three-dimensional virtual object at the respective location within the three-dimensional environment, but does not create or display the virtual surface. Forgoing creation of the virtual surface avoids unnecessary clutter in the three-dimensional environment and processing power to create and/or display the virtual surface when not appropriate.

In some embodiments, the one or more criteria include a criterion that is satisfied when the respective location is outside of the virtual content container, and the respective location includes a second virtual object (806), such as with respect to object 726 in FIG. 7C (e.g., the second virtual object has one or more of the characteristics of the first virtual object, and is optionally one-dimensional, two-dimensional or three-dimensional). In some embodiments, the three-dimensional environment already includes another virtual object that is located outside of the virtual content container when the first input is detected. In some embodiments, the second virtual object intersects with the respective location. In some embodiments, the second virtual object is within a threshold distance (e.g., 0.02 cm, 0.5 cm, 1 cm, 2 cm, 5 cm, 10 cm, 50 cm, 100 cm, 500 cm or 1000 cm) of the respective location. Displaying the virtual surface if the respective location includes a second virtual object helps organize the virtual objects included at the respective location, and allows for interaction with the group of virtual objects associated with the virtual surface, thereby reducing and improving interaction between the user and the computer system.

In some embodiments, the one or more criteria include a criterion that is not satisfied when the respective location is located within the virtual content container (808), such as with respect to object 726 in FIGS. 7B and 7B1. In some embodiments, the criterion is satisfied when the respective location is located outside of the virtual content container. In some embodiments, the user of the computer system repositions and/or realigns the first three-dimensional virtual object within the virtual content container, and in response, the computer system does not create or display the virtual surface. Forgoing displaying the virtual surface when the first virtual object is moved within the virtual content container avoids unnecessary creation and/or display of the virtual surface and avoids clutter in the three-dimensional environment, thereby reducing and improving interaction between the user and the computer system.

In some embodiments, the one or more criteria include a criterion that is not satisfied if the respective location includes a user interface of a respective application other than an application associated with the virtual content container (810), such as with respect to object 724 in FIGS. 7B and 7B1. In some embodiments, the criterion is satisfied when the respective location is located outside of any or all user interfaces of applications in the three-dimensional environment. In some embodiments, the three-dimensional environment includes one or more user interfaces of applications, other than the virtual content container (e.g., a user interface of a messaging application, a user interface of a content (e.g., photos or videos or audio) browsing and/or playback application, or a user interface of a content (e.g., text, graphics, video, and/or audio) creation application). Forgoing displaying the virtual surface when the first virtual object is moved to within the user interface of the respective application avoids unnecessary creation and/or display of the virtual surface and avoids clutter in the three-dimensional environment, thereby reducing and improving interaction between the user and the computer system.

In some embodiments, an orientation of the virtual surface is automatically selected by the computer system to be within a threshold of (e.g., 0, 1, 3, 5, 10, 15, 30, 45 or 60 degrees) being parallel to an orientation corresponding to a floor of a physical environment of a user of the computer system (812), such as the orientation of virtual surface 728 in FIG. 7D. In some embodiments, the virtual surface is maintained, by the computer system, as parallel to the floor of the physical environment. In some embodiments, the virtual surface is maintained by the computer system as being within the threshold of being parallel or perpendicular to another frame of reference in the physical environment (e.g., the horizon, gravity, a wall of a room, and/or the ceiling in the room). For instance, if the placement of the virtual surface in the three-dimensional environment is adjusted, such as will be described with reference to step(s) 848, the virtual surface is optionally adjusted to remain parallel to the floor of the physical environment. Maintaining an orientation of the virtual surface relative to a frame of reference ensures consistent presentation and/or interaction with the virtual surface and/or the virtual objects associated with the virtual surface, thereby reducing and improving interaction between the user and the computer system.

In some embodiments, while concurrently displaying the virtual surface and the first three-dimensional virtual object, the computer system displays (814), on the virtual surface, a virtual shadow of the first three-dimensional virtual object at a location on the virtual surface corresponding to a position of the first three-dimensional virtual object relative to the virtual surface, such as virtual shadows 732 and 734 in FIG. 7D. In some embodiments, the virtual shadow is displayed on the virtual surface as a darkened outline of the shape of the first virtual object. In some embodiments, the virtual shadow is virtually cast onto the virtual surface based on the positions and/or other characteristics (e.g., brightness, color, size and/or diffusivity) of one or more real or virtual light sources in the three-dimensional environment. In some embodiments, the size and/or shape of the virtual shadow corresponds to the size and/or shape of the first virtual object. In some embodiments, the position of the virtual shadow on the virtual surface changes as the position of the first virtual object relative to the virtual surface changes. Displaying a virtual shadow for the first virtual object on the virtual surface clearly indicates the relative placement of the first virtual object relative to the virtual surface and indicates that the first virtual object is associated with (e.g., displayed on and/or with) the virtual surface, thereby improving interaction between the user and the computer system.

In some embodiments, displaying the virtual surface within the three-dimensional environment in response to detecting the first input directed to the first three-dimensional virtual object includes (816*a*) displaying the virtual surface at a first level of visual prominence (816*b*), such as displaying virtual surface 728 in FIG. 7D at the first level of visual prominence (e.g., at a first size, at a first brightness, at a first level of opacity, at a first level of blurriness, and/or at a first level of color saturation), and after displaying the virtual surface at the first level of visual prominence, displaying the virtual surface at a second level of visual prominence, greater than the first level of visual prominence (816*c*), such as displaying virtual surface 728 in FIG. 7D at the second level of visual prominence (e.g., at a second size greater than the first size, at a second brightness greater than the first brightness, at a second level of opacity greater than the first level of opacity, at a second level of blurriness less than the first level of blurriness, and/or at a second level of color saturation greater than the first level of color saturation). In some embodiments, the virtual surface is gradually increased in visual prominence in response to detecting the first input. In some embodiments, the gradual increase is a function of the distance between the first virtual object and the respective location (e.g., the smaller the distance, the greater the visual prominence). In some embodiments, the gradual increase is additionally or alternatively a function of the time that has elapsed since the first virtual object has reached the respective location (e.g., the more time has elapsed, the greater the visual prominence). Gradually increasing the visual prominence of the virtual surface ensures time for the user to identify content that will become obscured by the virtual surface and also indicates that moving the virtual object to the respective location will cause the virtual surface to appear, thus allowing the user to provide alternative input to avoid display of the virtual surface, thereby improving interaction between the user and the computer system.

In some embodiments, the virtual content container is located at a first location within the three-dimensional environment, in response to detecting the first input directed to the first three-dimensional virtual object and in accordance with the determination that the respective location of the first three-dimensional environment satisfies the one or more criteria, the virtual surface has a second location within the three-dimensional environment, wherein a spatial relationship between the virtual surface and the virtual content container is a predefined spatial relationship (818), such as the spatial relationship between virtual surface 728 and the virtual content container 712*a* being the predefined spatial relationship in FIG. 7D. In some embodiments, the virtual surface is maintained at a predefined distance (e.g., 0.02 cm, 0.5 cm, 1 cm, 2 cm, 5 cm, 10 cm, 50 cm, 100 cm, 500 cm or 1000 cm) from the virtual content container. In some embodiments, the virtual surface is maintained at a predefined orientation relative to the virtual content container (e.g., perpendicular to a surface or edge of the virtual content container and/or parallel to a different edge of the virtual content container). In some embodiments, the location of the virtual surface in the three-dimensional environment is adjusted based changes to the location and/or orientation of the virtual content container, as will be described in more detail with reference to step(s) 830. Maintaining a relative spatial relationship between the virtual content container and the virtual surface ensures consistent placement of the virtual surface in the environment, and indicates the association between the virtual surface and the virtual content container, thereby improving interaction between the user and the computer system.

In some embodiments, before detecting the first input (e.g., when the start of the first input is detected), the virtual content container includes the first three-dimensional virtual object and a second virtual object (820), such as shown in FIG. 7A (e.g., the second virtual object optionally has one or more of the characteristics of the second virtual object described with reference to step(s) 806). In some embodiments, the virtual content container concurrently includes multiple virtual objects that are interactable, including being movable within the virtual content container and/or out of the virtual content container. Facilitating interaction with multiple virtual objects reduces the number of inputs needed to manage interaction with multiple virtual objects, thereby improving interaction between the user and the computer system.

In some embodiments, the first three-dimensional virtual object is a first type of virtual object, and the second virtual object is a second type of virtual object, different from the first type of virtual object (822), such as the different types of objects shown in container 712*a* in FIG. 7A. In some embodiments, the virtual content container concurrently includes various types of virtual objects. For instance, the virtual content container optionally includes one or more of three-dimensional models of real world objects (e.g., automobiles, bicycles, animals, buildings, or tents), one or more two-dimensional objects, one or more one-dimensional objects, one or more shapes, one or more representations of content items such as videos or photographs, one or more user interfaces of applications and/or one or more user-created content such as drawings. In some embodiments, the user of the computer system had previously placed such virtual objects into the virtual content container (e.g., with one or more inputs having analogous characteristics to the first input described with reference to step(s) 802). Facilitating concurrent interaction with multiple virtual objects of different types reduces the number of inputs needed to manage interaction with multiple virtual objects, thereby improving interaction between the user and the computer system.

Figure 9A:
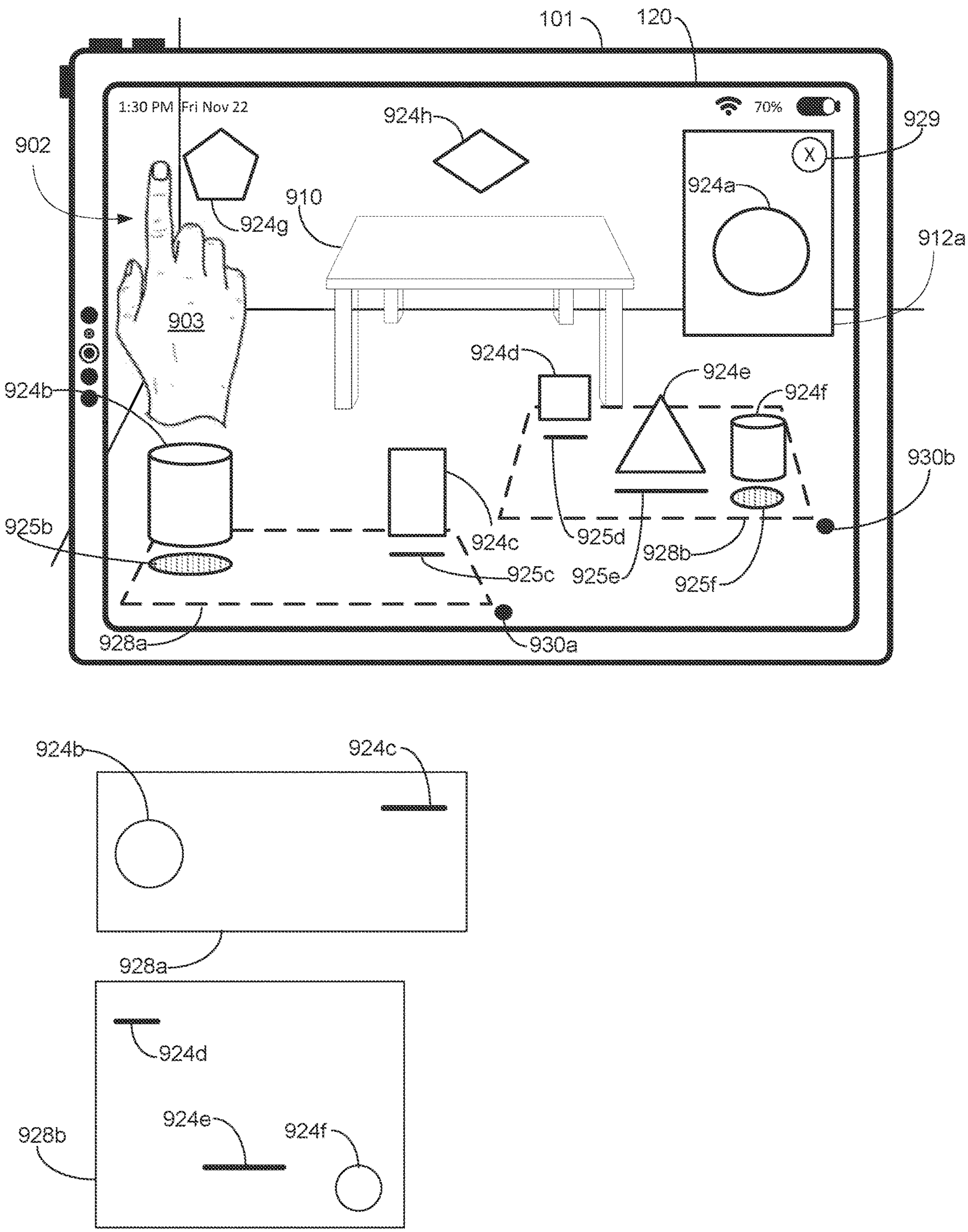
FIGS. 9A-9G illustrate examples of a computer system automatically resizing virtual surfaces that contain objects in accordance with some embodiments.
Figure 9B:
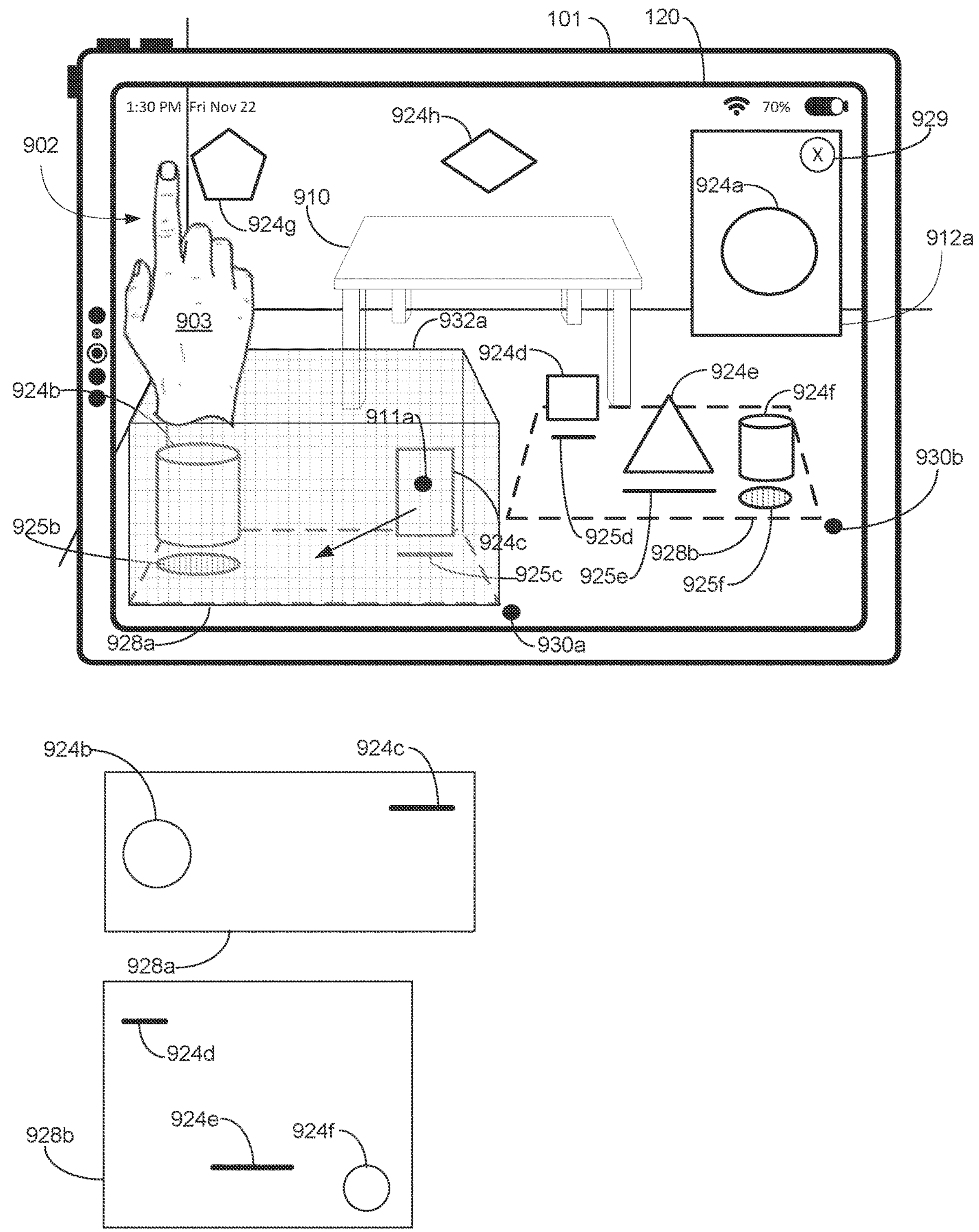
Figure 9C:
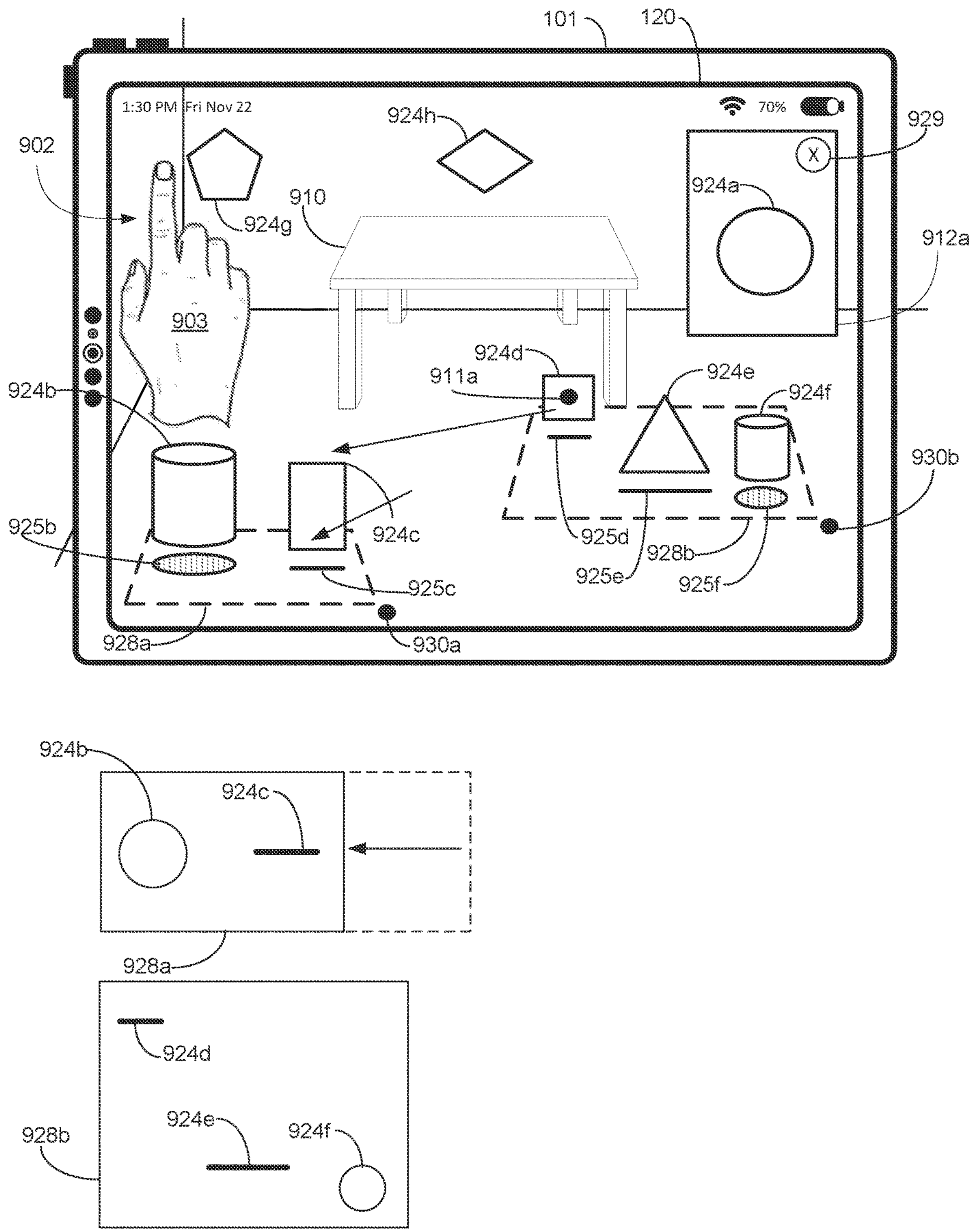

In some embodiments, while concurrently displaying the virtual surface and the first three-dimensional virtual object at the respective location, the computer system detects (824*a*), via the one or more input devices, a second input directed to a second virtual object in the three-dimensional environment, such as the input directed to object 924*d* in FIG. 9C (e.g., the second virtual object optionally has one or more of the characteristics of the second virtual object described with reference to step(s) 806), wherein the second input corresponds to a request to move the second virtual object from a first location to the respective location in the three-dimensional environment. In some embodiments, the second input has one or more of the characteristics of the first input for moving the first virtual object.

Figure 9D:
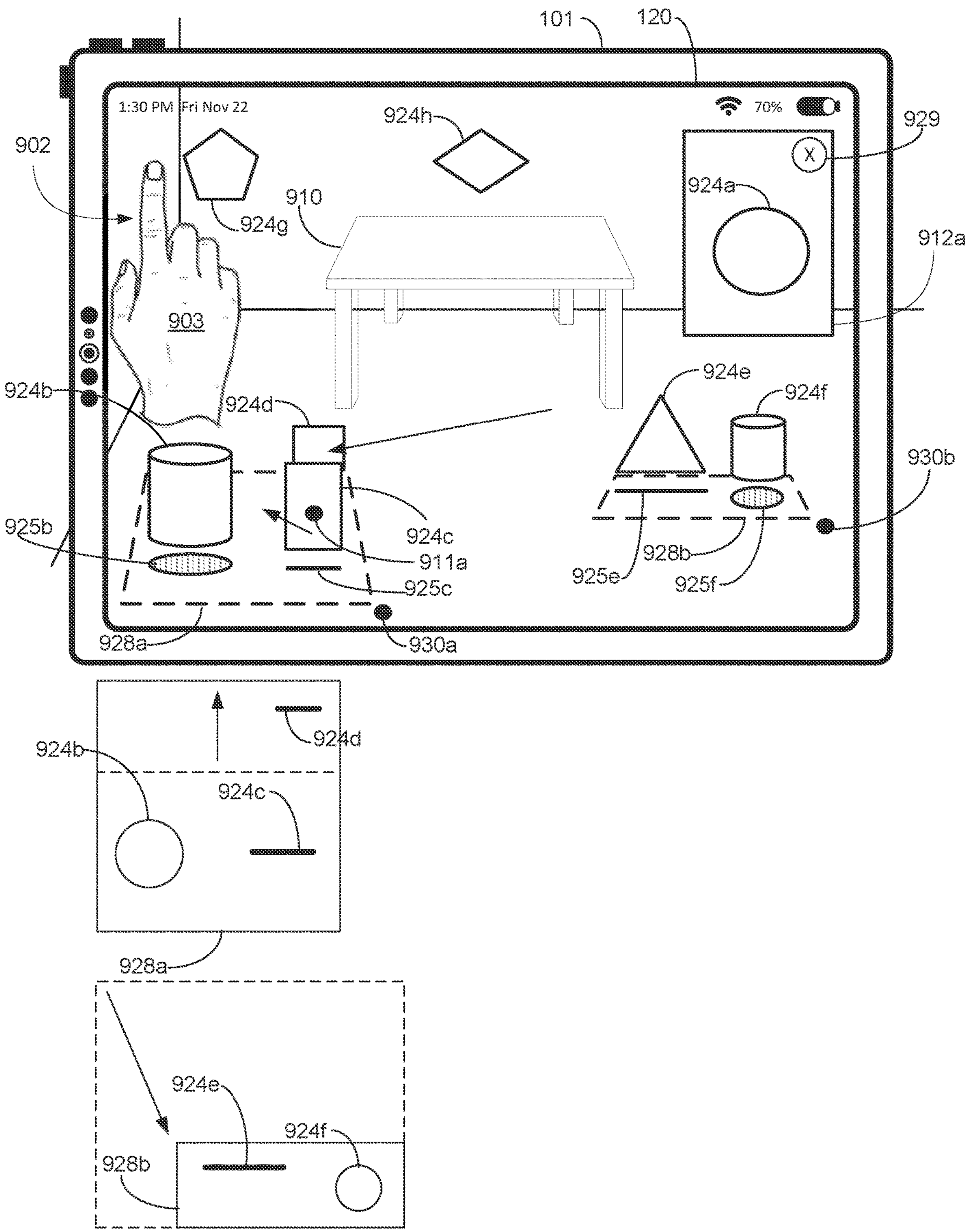

In some embodiments, in response to detecting the second input directed to the second virtual object, the computer system displays (824*b*) the virtual surface concurrently with the first three-dimensional virtual object and the second virtual object at the respective location, such as shown with virtual surface 928 in FIGS. 9D and 9D1. In some embodiments, once the virtual surface exists, the user of the computer system is able to add additional virtual objects to the virtual surface (e.g., to be contained by or included in the virtual surface). In some embodiments, the additional virtual objects are added from various locations on or within the three-dimensional environment (e.g., from within the virtual content container, or from outside of the virtual content container). Allowing additional virtual objects to be added to the virtual surface provides organization to the three-dimensional environment, and avoids clutter within the three-dimensional environment, thereby improving interaction between the user and the computer system.

In some embodiments, while concurrently displaying the first three-dimensional virtual object and the virtual surface at the respective location, the computer system detects (826*a*), via the one or more input devices, a second input directed to the first three-dimensional virtual object, wherein the second input corresponds to a request to move the first three-dimensional virtual object away from the respective location, such as the input directed to object 726 from FIG. 7E to FIG. 7F. In some embodiments, the second input has one or more of the characteristics of the first input for moving the first virtual object.

In some embodiments, in response to detecting the second input directed to the first three-dimensional virtual object (826*b*), in accordance with a determination that one or more second criteria are satisfied, the computer system moves (826*c*) the first three-dimensional virtual object away from the respective location and ceases display of the virtual surface in the three-dimensional environment, such as the movement of object 726 in FIG. 7F and the ceasing of the display of virtual surface 728 in FIG. 7F (e.g., without separate user input for ceasing display of the virtual surface). In some embodiments, the second input includes a touch input from a finger on a touch-sensitive surface (e.g., at a location on the touch-sensitive surface corresponding to the first three-dimensional virtual object), followed by movement of the finger in contact with the touch-sensitive surface to a location on the touch-sensitive surface corresponding to a location away from the virtual surface. In some embodiments, the first virtual object is moved by the second input back to the virtual content container. In some embodiments, the first virtual object is moved by the second input to a different virtual surface, a different user interface, or empty space in the three-dimensional environment. In some embodiments, the one or more second criteria include a criterion that is satisfied when moving the first virtual object away from the respective location will result in less than a threshold number of virtual objects remaining at the respective location (e.g., less than 1, 2, 3, 4, 5, 10 or 20 virtual objects remaining at the respective location and/or on or included in the virtual surface). In some embodiments, the threshold number of objects required to be at a particular location in the three-dimensional environment to create the virtual surface in the first instance (e.g., the thumber of objects needed to satisfy the one or more criteria) is the same or different from (e.g., greater than or less than) the threshold number of objects remaining at the location of the virtual surface to trigger the virtual surface to cease to be displayed. Automatically ceasing display of the virtual surface reduces the need for additional inputs for controlling when the virtual surface is displayed, and avoids clutter within the three-dimensional environment, thereby improving interaction between the user and the computer system.

In some embodiments, the virtual surface is world-locked (828), such as described with reference to virtual surface 728 in FIGS. 7D-7E. In some embodiments, the virtual surface is positioned with respect to the three-dimensional environment, optionally independent of a location of or virtual objects or elements in the three-dimensional environment, such as the virtual content container. Providing the virtual surface as world-locked ensures consistent and predictable interaction with the virtual surface, thereby improving interaction between the user and the computer system.

In some embodiments, while concurrently displaying the first three-dimensional virtual object and the virtual surface at the respective location, the computer system detects (830*a*), via the one or more input devices, a second input directed to the virtual content container, wherein the second input corresponds to a request to move the virtual content container away from a current location in the three-dimensional environment, such as the movement of container 712*a* from FIG. 7D to 7E (e.g., the location at which the virtual content container was displayed when the first virtual object was removed from the virtual content container, or a different location). In some embodiments, the second input has one or more of the characteristics of the first input for moving the first virtual object. In some embodiments, the second input is not directed to the virtual surface (e.g., the attention of the user is not directed to the virtual surface when the second input is detected).

In some embodiments, in response to detecting the second input directed to the virtual content container (830*b*), the computer system moves (830*c*) the virtual content container away from the current location in the three-dimensional environment in accordance with the second input, such as shown with container 712*a* in FIG. 7E (e.g., moving the virtual content container in a direction and/or with a magnitude corresponding to the direction and/or magnitude of a movement associated with the second input), and the computer system moves (830*d*) the virtual surface and the first three-dimensional virtual object away from the respective location in accordance with the second input, such as if virtual surface 728 had moved in FIG. 7E based on the movement of container 712*a* (e.g., moving the virtual surface in a direction and/or with a magnitude corresponding to the direction and/or magnitude of a movement associated with the second input). In some embodiments, the computer system adjusts the location of the virtual surface to be located within a threshold distance (e.g., 0.01, 0.1, 0.5, 1, 3, 5, 10, 50, 100, 500 or 1000 cm) and/or other spatial arrangement (e.g., orientation) of the virtual content container, such that when the virtual content container is moved and/or reoriented in the three-dimensional environment, the virtual surface is correspondingly moved and/or reoriented to maintain the spatial arrangement. In some embodiments, the spatial arrangement that is maintained between the virtual surface and the virtual content container is defined when the virtual surface is first created and/or displayed (e.g., defined by the spatial arrangement between the respective location and the virtual content container). Maintaining a spatial arrangement between the virtual content container and the virtual surface ensures consistent and predictable interaction with the virtual surface, and indicates the relationship between the virtual content container and the virtual surface, thereby improving interaction between the user and the computer system.

In some embodiments, while concurrently displaying the first three-dimensional virtual object and the virtual surface at the respective location, the computer system detects (832*a*), via the one or more input devices, a second input directed to the virtual content container, wherein the second input corresponds to a request to move the virtual content container away from a current location in the three-dimensional environment, such as shown with container 712*a* in FIG. 7E (e.g., the location at which the virtual content container was displayed when the first virtual object was removed from the virtual content container, or a different location). In some embodiments, the second input has one or more of the characteristics of the first input for moving the first virtual object. In some embodiments, the second input is not directed to the virtual surface (e.g., the attention of the user is not directed to the virtual surface when the second input is detected).

In some embodiments, in response to detecting the second input directed to the virtual content container, the computer system moves (832*b*) the virtual content container away from the current location in the three-dimensional environment in accordance with the second input while maintaining the virtual surface and the first three-dimensional virtual object at the respective location, such as if virtual surface 728 remained at its prior location in FIG. 7E in response to the movement of container 712*a* (e.g., the virtual surface is world-locked, and is not treated as having a fixed spatial arrangement relative to the virtual content container). Providing the virtual surface as world-locked ensures consistent and predictable interaction with the virtual surface, thereby improving interaction between the user and the computer system.

In some embodiments, while concurrently displaying the first three-dimensional virtual object and the virtual surface at the respective location, the computer system detects (834*a*), via the one or more input devices, a second input directed to the virtual content container, wherein the second input corresponds to a request to cease display of the virtual content container, such as selection of option 729 in container 712*a*. In some embodiments, the second input includes selection of a selectable option that is displayed with the virtual content container that is selectable to cease display of the virtual content container. In some embodiments, the second input includes attention of the user directed to the selectable option and an air pinching gesture performed by the hand of the user, similar to as described with reference to the first input. In some embodiments, the second input includes a tap or click detected on a touch-sensitive surface at a location corresponding to the selectable option. In some embodiments, the second input includes a voice input that includes a command to cease display of the virtual content container. In some embodiments, the second input is not directed to the virtual surface (e.g., the attention of the user is not directed to the virtual surface when the second input is detected).

In some embodiments, in response to detecting the second input directed to the virtual content container, the computer system ceases display (834*b*) of the virtual content container and ceasing display of the virtual surface in the three-dimensional environment. Automatically ceasing display of the virtual surface when its corresponding virtual content container is no longer displayed reduces the number of inputs needed to separately cease display of the virtual surface, and indicates the relationship between the virtual content container and the virtual surface, thereby improving interaction between the user and the computer system.

In some embodiments, after detecting the second input and while the virtual content container and the virtual surface are not displayed in the three-dimensional environment, the computer system detects (836*a*), via the one or more input devices, a third input corresponding to a request to display the virtual content container in the three-dimensional environment, such as an input to redisplay container 712*a* after ceasing display of it via selection of option 729. In some embodiments, the third input includes selection of a selectable option that is displayed in the three-dimensional environment that is selectable to cause display of the virtual content container. In some embodiments, the third input includes attention of the user directed to the selectable option and an air pinching gesture performed by the hand of the user, similar to as described with reference to the first input. In some embodiments, the third input includes a tap or click detected on a touch-sensitive surface at a location corresponding to the selectable option. In some embodiments, the third input includes a voice input that includes a command to display the virtual content container. In some embodiments, the third input is not an input that directly corresponds to a request to display the virtual surface.

In some embodiments, in response to detecting the third input, the computer system displays (836*b*) the virtual content container and the virtual surface in the three-dimensional environment. In some embodiments, the virtual surface and/or virtual content container are redisplayed at the same locations as they were displayed when the second input was detected. In some embodiments, the virtual surface and/or virtual content container include the same virtual objects displayed at the same relative positions and/or orientations relative to the virtual surface and/or virtual content container as when the second input was detected. Automatically redisplaying the virtual surface when its corresponding virtual content container is redisplayed reduces the number of inputs needed to separately cause display of the virtual surface, and indicates the relationship between the virtual content container and the virtual surface, thereby improving interaction between the user and the computer system.

In some embodiments, the virtual surface is displayed concurrently with a selectable option that is selectable to cease display of the virtual surface in the three-dimensional environment (838*a*), such as option 736 in FIG. 7G. In some embodiments, the selectable option is displayed outside and adjacent to the virtual surface (e.g., below and/or in front of the virtual surface). In some embodiments, the selectable option is displayed with and/or within an element that is displayed concurrently with the virtual surface, and that is interactable to move the virtual surface within the three-dimensional environment. In some embodiments, the element is not displayed in the three-dimensional environment unless the virtual surface is displayed in the three-dimensional environment.

In some embodiments, while displaying the virtual surface and the selectable option in the three-dimensional environment, the computer system detects (838*b*), via the one or more input devices, a second input corresponding to selection of the selectable option, such as input directed to option 736 in FIG. 7G (e.g., similar to as described with reference to step(s) 834). In some embodiments, in response to detecting the second input, the computer system ceases display (838*c*) of the virtual surface in the three-dimensional environment, such as shown in FIG. 7H. In some embodiments, the second input is detected when the virtual surface includes more than the threshold number of virtual objects that would otherwise trigger automatic cessation of display of the virtual surface, such as described with reference to step(s) 826. Providing an option to cease display of the virtual surface in response to user input provides the user with more control over the content of the three-dimensional environment, thereby improving interaction between the user and the computer system.

In some embodiments, when the second input is detected, the first three-dimensional virtual object (and optionally more virtual objects) is displayed concurrently with the virtual surface at the respective location in the three-dimensional environment (840*a*), such as shown in FIG. 7G. In some embodiments, in response to detecting the second input, the computer system moves (840*b*) the first three-dimensional virtual object (and optionally the other virtual objects that were also displayed with and/or in the virtual surface) away from the respective location and to the virtual content container, such as shown with objects 722 and 726 in FIG. 7H (e.g., without detecting an input to move the objects to the virtual content container). In some embodiments, the virtual objects of the virtual surface are returned to their corresponding locations within the virtual content container and/or other initial location when the virtual surface is closed (e.g., the locations the virtual objects had when they were added to the virtual surface). In some embodiments, the computer system displays an animation of the virtual objects moving back to the virtual content container. Moving the virtual objects back to the virtual content container ensures that further interaction with the virtual objects is possible, thereby improving interaction between the user and the computer system.

In some embodiments, the first three-dimensional virtual object is a first type of virtual object (e.g., a three-dimensional model of a real world object (such as a building, a tent or a car), a user interface of an application and/or a representation of a content item such as a photo, a video or a song), and the virtual content container includes a second virtual object that is a second type of virtual object, different from the first type of virtual object (842*a*), such as objects 722 and 726 being different types of objects in FIG. 7A. For example, the second type of virtual object is optionally a two-dimensional shape, a handwritten mark created by the user (e.g., a doodle or drawing) or textual content, whether or not user-created.

In some embodiments, while displaying the virtual content container that includes the second virtual object in the three-dimensional environment, the computer system detects (842*b*), via the one or more input devices, a second input directed to the second virtual object, wherein the second input corresponds to a request to move the second virtual object out of the virtual content container and to a second respective location in the three-dimensional environment, such as the input directed to object 726 in FIG. 7C. The second input optionally has one or more characteristics of the first input.

In some embodiments, in response to detecting the second input (842*c*), in accordance with a determination that the second respective location in the first three-dimensional environment satisfies the one or more criteria, the computer system displays (842*d*) the second virtual object at the second respective location without displaying a virtual surface within the three-dimensional environment, such as if in FIG. 7D, objects 722 and 726 were displayed at their locations without displaying virtual surface 728. Thus, in some embodiments, a virtual surface is not created for certain types of virtual objects that otherwise behave like the first type of virtual objects (e.g., are movable within and/or outside of the virtual content container), even if the conditions for creating a virtual surface are otherwise satisfied. In some embodiments, in response to detecting the second input and in accordance with a determination that the second respective location in the first three-dimensional environment does not satisfy the one or more criteria, the computer system similarly displays the second virtual object at the second respective location without displaying a virtual surface within the three-dimensional environment. Creating virtual surfaces only for certain types of virtual objects ensures that virtual surfaces are not erroneously created in the three-dimensional environment, reducing the need for inputs to correct for such erroneous creations, thereby improving interaction between the user and the computer system.

In some embodiments, while displaying a plurality of virtual objects concurrently with the virtual surface (844*a*) (e.g., the virtual surface includes the plurality of virtual objects, optionally including the first virtual object), in accordance with a determination that an orientation of the virtual surface is a first orientation relative to the three-dimensional environment (e.g., the orientation of the virtual surface about the vertical, horizontal and/or length directions and/or x, y and/or z-axes), orientations of the plurality of virtual objects relative to the three-dimensional environment are a first set of orientations based on the first orientation (844*b*), such as the orientations of the objects on virtual surface 728 in FIG. 7D, and in accordance with a determination that the orientation of the virtual surface is a second orientation, different from the first orientation, relative to the three-dimensional environment, the orientations of the plurality of virtual objects relative to the three-dimensional environment are a second set of orientations, different from the first set of orientations, based on the second orientation (844*c*), such as the orientations of the objects on virtual surface 728 in FIG. 7E. In some embodiments, the plurality of virtual objects are aligned and/or positioned relative to one or more points or orientations of the virtual surface. For example, the front surfaces of the plurality of virtual objects are optionally oriented towards the front surface of the virtual surface. Additionally or alternatively, the bottom surfaces of the plurality of virtual objects are optionally aligned with (e.g., parallel to) the top surface of the virtual surface. Thus, in some embodiments, as the orientation and/or position of the virtual surface in the three-dimensional environment is changed (e.g., in response to user input), the orientations and/or relative positions of the plurality of virtual objects relative to the virtual surface are optionally maintained, which optionally results in the orientations and/or relative positions of the plurality of the virtual objects relative to the three-dimensional environment to change in accordance with the change in the orientation and/or position of the virtual surface in the three-dimensional environment. Displaying virtual objects as positioned and/or oriented relative to the virtual surface provides organization to the three-dimensional environment, and avoids clutter within the three-dimensional environment.

In some embodiments, displaying the virtual surface within the three-dimensional environment in response to detecting the first input directed to the first three-dimensional environment includes (846*a*), in accordance with a determination that an orientation of a first virtual object at the respective location in response to the first input being detected (e.g., the first three-dimensional virtual object because another virtual object was not at the respective location when the first input was detected, or another virtual object that was at the respective location when the first input was detected, if any) is a first respective orientation relative to the three-dimensional environment, such as the orientation of object 722 in FIG. 7C, displaying the virtual surface with a second respective orientation relative to the three-dimensional environment that is based on the first respective orientation (846*a*), such as the orientation of virtual surface 728 in FIG. 7D (e.g., the relationship between the orientations of the objects included in the virtual surface and the virtual surface is optionally as described with reference to step(s) 844), and in accordance with a determination that the orientation of the first virtual object at the respective location in response to the first input being detected is a third respective orientation, different from the first respective orientation, relative to the three-dimensional environment, such as if the orientation of object 722 in FIG. 7C were different, displaying the virtual surface with a fourth respective orientation, different from the second respective orientation, relative to the three-dimensional environment that is based on the third respective orientation (846*c*), such as if the orientation of virtual surface 728 in FIG. 7D were different based on the different orientation of object 722. In some embodiments, the orientation of the first object included in the virtual surface sets the orientation of the virtual surface in the three-dimensional environment when the virtual surface is created. For example, if, when the first input is detected, a second virtual object was already located at the respective location, the orientation of the virtual surface relative to the three-dimensional environment is optionally set based on the orientation of that second virtual object relative to the three-dimensional environment—and the orientation of the first virtual object when added to the virtual surface optionally conforms to the orientation of the virtual surface. If, when the first input is detected, a second virtual object was not already located at the respective location, the orientation of the virtual surface relative to the three-dimensional environment is optionally set based on the orientation of the first virtual object relative to the three-dimensional environment when the one or more criteria are satisfied. Setting the orientation of the virtual surface based on the first object included in the virtual surface provides organization to the three-dimensional environment and predictable display of the virtual surface, and avoids clutter within the three-dimensional environment.

In some embodiments, while displaying the virtual surface in the three-dimensional environment, wherein a first portion of the virtual surface (e.g., front edge, top surface, or left edge) has a first orientation relative to a viewpoint of a user of the computer system (e.g., parallel, perpendicular, or another orientation) and a first spatial arrangement relative to the three-dimensional environment (e.g., a first orientation and/or position relative to the three-dimensional environment), the computer system detects (848*a*), via the one or more input devices, a second input corresponding to a request to modify a spatial arrangement of the virtual surface relative to the three-dimensional environment from the first spatial arrangement to a second spatial arrangement, different from the first spatial arrangement, such as movement of virtual surface 728 from FIG. 7D to FIG. 7E. For example, the second input corresponds to an input to change the orientation and/or position of the virtual surface within the three-dimensional environment. The second input optionally has one or more characteristics of the first input, but is directed to the virtual surface. In some embodiments, the second input does not include an input to change the orientation of the virtual surface in the three-dimensional environment.

In some embodiments, in response to detecting the second input, the computer system moves (848*b*) the virtual surface in the three-dimensional environment to have the second spatial arrangement relative to the three-dimensional environment while maintaining the first portion of the virtual surface having the first orientation relative to the viewpoint of the user, such as shown with the orientation of virtual surface 728 in FIG. 7E. In some embodiments, the front portion of the virtual surface is maintained to face the viewpoint of the user of the compute system as the user of the computer system moves the virtual surface in the three-dimensional environment (e.g., vertically and/or horizontally). In some embodiments, if the viewpoint of the user moves in the three-dimensional environment (e.g., instead of the virtual surface moving in the three-dimensional environment), the first orientation of the first portion of the virtual surface relative to the viewpoint of the user is not maintained. Maintaining the orientation of the virtual surface relative to the viewpoint of the user ensures that the virtual surface and/or objects within the virtual surface remain interactable by the user, and reduces the need for inputs to position the virtual surface such that the virtual surface and/or its objects remain interactable.

In some embodiments, moving the virtual surface in the three-dimensional environment to have the second spatial arrangement relative to the three-dimensional environment includes maintaining a relative orientation of a second portion of the virtual surface relative (e.g., the bottom surface, a right edge, or a left edge) to a frame of reference, other than the viewpoint of the user, in the three-dimensional environment (850), such as virtual surface 728 remaining parallel to the floor (e.g., the floor, gravity, the horizon or other optionally fixed frame of reference in the physical environment and/or three-dimensional environment). In some embodiments, moving the virtual surface in the three-dimensional environment causes the horizontal orientation of the virtual surface to change to maintain its orientation relative to the viewpoint of the user, but the vertical orientation of the virtual surface relative to the frame of reference remains unchanged (e.g., the virtual surface always remains parallel to the floor, regardless of whether the virtual surface is moved vertically or horizontally in the three-dimensional environment). Maintaining the orientation of the virtual surface relative to the frame of reference ensures that the virtual surface and/or objects within the virtual surface remain interactable by the user and the virtual surface and/or its objects are predictably presented in the three-dimensional environment, and reduces the need for inputs to position the virtual surface such that the virtual surface and/or its objects remain interactable.

In some embodiments, while detecting the first input, the computer system displays (852), in the virtual content container, a representation of the first three-dimensional virtual object, such as indication 727 in FIG. 7C. In some embodiments, the first three-dimensional virtual object is represented within the virtual content container as an outline and/or dimmed (or otherwise visually deemphasized) representation of the shape and/or volume of the first three-dimensional virtual object. In some embodiments, the representation has a size and/or shape based on the size and/or shape of the first virtual object. In some embodiments, the representation is displayed at the location in the virtual content container than the first virtual object had when the first input was detected. In some embodiments, the representation is not displayed in the virtual content container before the first input is detected, and is displayed in response to the first virtual object being moved away from its original location in the virtual content container and/or is displayed in response to the first virtual object being moved outside of the virtual content container. Displaying a representation of the first virtual object in the virtual content container indicates the relationship between the virtual content container and the first virtual object, and clearly indicates that the first virtual object originated in the virtual content container, thereby improving interaction between the user and the computer system.

In some embodiments, in response to detecting an end of the first input (e.g., detecting a finger lifting off from a touch-sensitive surface after moving on the touch-sensitive surface, or detecting the hand of the user releasing a pinch hand shape (e.g., the tip of the index finger and thumb of the hand of the user moving apart and no longer touching)) and in accordance with the determination that the respective location in the first three-dimensional environment satisfies the one or more criteria, the computer system displays (854) the first three-dimensional virtual object as being included in the virtual surface, such as shown with object 726 and virtual surface 728 in FIG. 7D (e.g., adding the virtual object to the virtual surface). When included in the virtual surface, the first virtual object and/or the virtual surface are displayed with one or more of the characteristics described with reference to step(s) 802-852. In some embodiments, in response to detecting the end of the first input and in accordance with a determination that the respective location in the first three-dimensional environment does not satisfy the one or more criteria, the computer system displays the first three-dimensional virtual object at the respective location without displaying it as being included in the virtual surface. Including the first virtual object in the virtual surface in response to detecting the end of the first input avoids accidental or unintentional adding of virtual objects to the virtual surface, and reduces the need for inputs to correct such errors, thereby improving interaction between the user and the computer system.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9G illustrate examples of a computer system automatically resizing virtual surfaces that contain objects in accordance with some embodiments.

FIG. 9A illustrates a computer system 101 displaying, via a display generation component (e.g., display generation component 120 of FIG. 1), a three-dimensional environment 902 from a viewpoint of a user (e.g., similar to as described with reference to FIGS. 7A-7H). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 9A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 902 or portions of the physical environment are visible via the display generation component 120 of computer system 101. For example, three-dimensional environment 902 includes portions of the left and back walls, and the floor in the physical environment of the user. Three-dimensional environment 902 also includes table 910, which is a physical table in the physical environment of the user.

In FIG. 9A, three-dimensional environment 902 also includes virtual content, such as virtual content 912*a*, which includes virtual object 924*a*, and virtual objects 924*b*-*g*. Virtual objects 924*a*-924*g* are optionally one or more of a user interface of an application (e.g., messaging user interface, or content browsing user interface), a two-dimensional object (e.g., a shape, or a representation of a photograph) a three-dimensional object (e.g., virtual clock, virtual ball, or virtual car), or any other element displayed by computer system 101 that is not included in the physical environment of computer system 101 as described in more detail with reference to method 1000. In some embodiments, virtual object 912*a* is a virtual content container that is able to hold different types of virtual content, such as object 924*a*, as described in more detail with reference to method 1000. Container 912*a* in FIG. 9A includes option 929 that is selectable to cause computer system 101 to cease displaying container 912*a* and/or object 924*a* in container 912*a*. In FIG. 9A, objects 924*g* and 924*h* are located in empty space in three-dimensional environment 902 (e.g., a portion of three-dimensional environment 902 that does not include any objects).

In contrast, objects 924*b*-924*f* are displayed on virtual surfaces 928*a* and 928*b*. Virtual surfaces 928*a* and 928*b* optionally have one or more of the characteristics of virtual surfaces described with reference to method 1000 and/or virtual surface 728 described with reference to FIGS. 7A-7H. In FIG. 9A, objects 924*b* and 924*c* are displayed on virtual surface 928*a* (including corresponding simulated shadows 925*b* and 925*c*), and objects 924*d*, 924*e* and 924*f* are displayed on virtual surface 928*b* (including corresponding simulated shadows 925*d*, 925*e* and 9250. FIGS. 9A-9G also include overhead views of virtual surfaces 928*a* and 928*b* shown below computer system 101. In FIG. 9A, virtual surface 928*a* is displayed with element 930*a* (e.g., outside of and adjacent to a corner of virtual surface 928*a*) that is manipulable via input from the user (e.g., air pinch and drag gesture) to manually resize virtual surface 928*a*, and virtual surface 928*b* is displayed with element 930*b* (e.g., outside of and adjacent to a corner of virtual surface 928*b*) that is manipulable via input from the user (e.g., air pinch and drag gesture) to manually resize virtual surface 928*b*, as described in more detail with reference to method 1000. In FIG. 9A, virtual surfaces 928*a* and 928*b* are sized such that they are sufficiently large to encompass their respective objects, as described in more detail with reference to method 1000.

In some embodiments, upon detecting the start of an input for moving an object that is displayed on a virtual surface (e.g., air pinch and drag gesture), computer system 101 displays an indication of the boundaries of the virtual surface in three-dimensional environment 902. For example, in FIG. 9B, computer system 101 detects the initiation of a movement input directed to object 924*c* on virtual surface 928*a* (e.g., detects an air pinch gesture from hand 903 while attention of the user is directed to object 924*c*, before detecting movement of hand 903, or detects the initiation of a different movement input described with reference to method 1000). In response, as shown in FIG. 9B, computer system 101 displays visual indication 932*a*, which is optionally an indication of the boundaries of the volume associated with virtual surface 928*a*. The volume associated with virtual surface 928*a* is optionally the volume within which objects displayed on virtual surface 928*a* can be positioned. Additional details about visual indication 932*a* and the volume associated with virtual surface are provided with reference to method 1000.

From FIG. 9B to FIG. 9C, computer system 101 detects movement of object 924*c* towards object 924*b* (e.g., via a movement input from hand 903 (e.g., air pinch and drag gesture), as described with reference to method 1000). In response, as shown in FIG. 9C, computer system 101 moves object 924*c* towards object 924*b*. Further, because the movement of virtual object 924*c* towards object 924*b* has reduced the required size of virtual surface 928*a* to be able to encompass its corresponding objects (e.g., objects 924*b* and 924*c*), computer system 101 automatically reduces the size of virtual surface 928*a* to a size needed to encompass objects 924*b* and 924*c* at the new location of object 924*c*. Computer system 101 optionally reduces the size of virtual surface 928*a* along one or more dimensions based on the updated location of object 924*c*. Additional details relating to automatically reducing the size of a virtual surface are provided with reference to method 1000.

Computer system 101 optionally also automatically increases the size of a virtual surface when new objects are added to the virtual surface if such resizing is warranted based on the placement of the newly added object relative to the virtual surface. For example, from FIG. 9C to FIG. 9D, computer system 101 detects movement of object 924*d* towards virtual surface 928*a* (e.g., via a movement input from hand 903 (e.g., air pinch and drag gesture), as described with reference to method 1000). In response, as shown in FIG. 9D, computer system 101 moves object 924*d* towards virtual surface 928*a* and object 924*d* is added to virtual surface 928*a* (e.g., as described with reference to method 1000). In response to the movement of object 924*d*, object 924*d* is removed from virtual surface 928*b* (e.g., as described with reference to method 1000). As a result, computer system 101 automatically reduces the size of virtual surface 928*a* in two dimensions, as shown in FIG. 9D, because the area and/or volume occupied by the remaining objects 924*e* and 924*f* is smaller in those two dimensions than the area and/or volume that had been occupied by objects 924*d*, 924*e* and 924*f* before object 924*d* was removed from virtual surface 928*b*.

Further in response to the movement of object 924*d*, as shown in FIG. 9D, object 924*d* is added to virtual surface 928*a*, and computer system 101 automatically increases the size of virtual surface 928*a* along one dimension, because the area and/or volume occupied by objects 924*b*, 924*c* and 924*d* at the user-defined position of object 924*d* is larger in that one dimension than the area and/or volume that had been occupied by objects 924*b* and 924*c* before object 924*d* was added to virtual surface 928*a*. Additional details relating to automatically increasing the size of a virtual surface are provided with reference to method 1000.

FIG. 9D1 illustrates similar and/or the same concepts as those shown in FIG. 9D (with many of the same reference numbers). It is understood that unless indicated below, elements shown in FIG. 9D1 that have the same reference numbers as elements shown in FIGS. 9A-9G have one or more or all of the same characteristics. FIG. 9D1 includes computer system 101, which includes (or is the same as) display generation component 120. In some embodiments, computer system 101 and display generation component 120 have one or more of the characteristics of computer system 101 shown in FIGS. 9A-9G and display generation component 120 shown in FIGS. 1 and 3, respectively, and in some embodiments, computer system 101 and display generation component 120 shown in FIGS. 9A-9G have one or more of the characteristics of computer system 101 and display generation component 120 shown in FIG. 9D1.

In FIG. 9D1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 9A-9G.

In FIG. 9D1, display generation component 120 is illustrated as displaying content that optionally corresponds to the content that is described as being displayed and/or visible via display generation component 120 with reference to FIGS. 9A-9G. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 9D1.

Display generation component 120 has a field of view (e.g., a field of view captured by external image sensors

314*b* and 314*c* and/or visible to the user via display generation component 120, indicated by dashed lines in the overhead view) that corresponds to the content shown in FIG. 9D1. Because display generation component 120 is optionally a head-mounted device, the field of view of display generation component 120 is optionally the same as or similar to the field of view of the user.

In FIG. 9D1, the user is depicted as performing an air pinch gesture (e.g., with hand 903) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 9A-9G.

In some embodiments, computer system 101 responds to user inputs as described with reference to FIGS. 9A-9G.

In the example of FIG. 9D1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 9A-9G and/or described with reference to the corresponding method(s) are optionally implemented on computer system 101 and display generation unit 120 in a manner similar or analogous to that shown in FIG. 9D1.

Figure 9E:
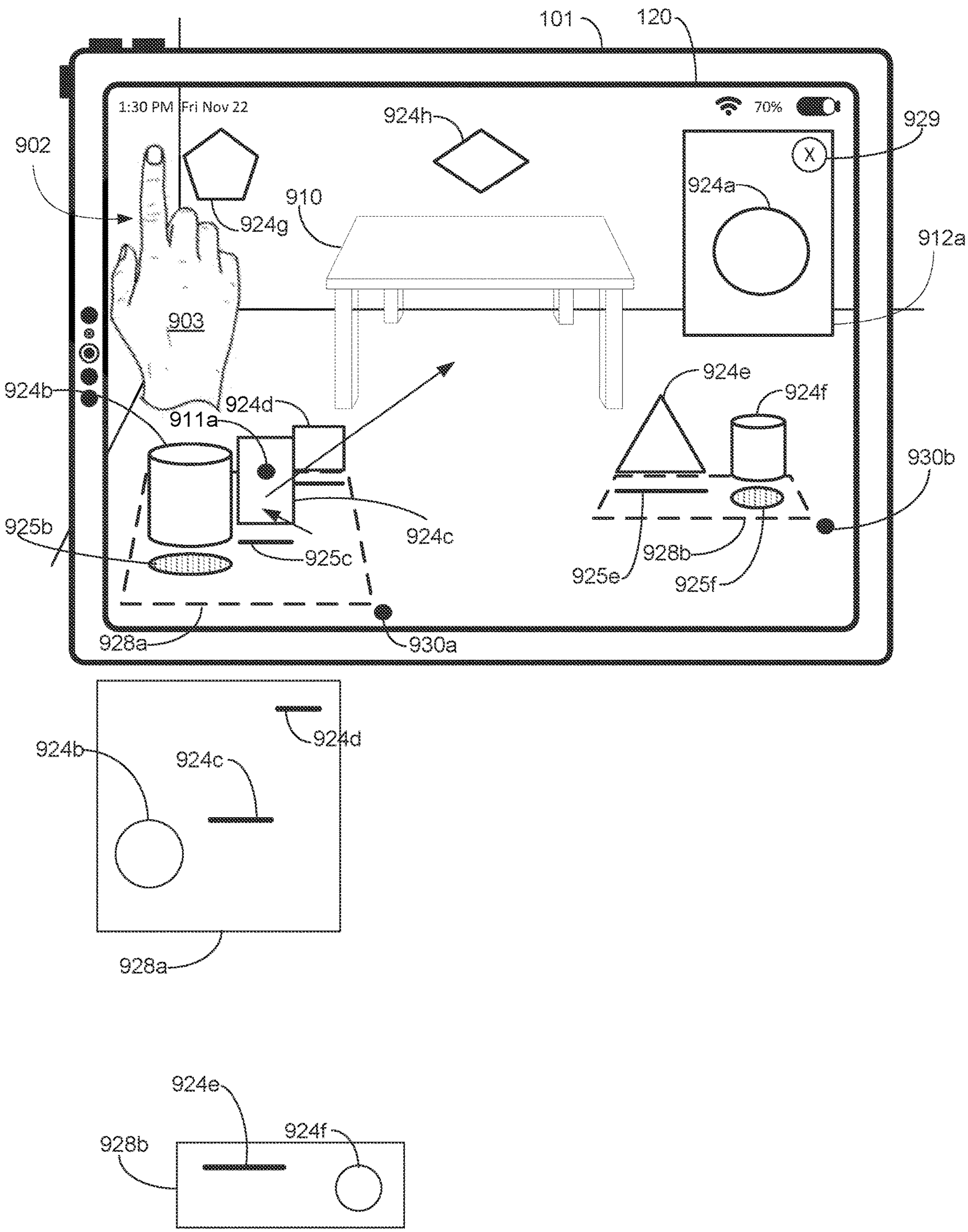

From FIG. 9D to FIG. 9E, computer system 101 detects movement of object 924*c* within virtual surface 928*a*, further towards a location between objects 924*b* and 924*d* (e.g., via a movement input from hand 903 (e.g., air pinch and drag gesture), as described with reference to method 1000). In response, as shown in FIG. 9E, computer system 101 moves object 924*c* towards that location between objects 924*c* and 924*d*. Further, the movement of virtual object 924*c* in FIG. 9E has not reduced or increased the required size of virtual surface 928*a*, because in the arrangement of objects in FIGS. 9D and 9E, objects 924*b* and 924*d* define the area and/or volume that is occupied by objects 924*b*, 924*c*, and 924*d*, and those objects have not moved from FIG. 9D to FIG. 9E. Therefore, computer system 101 does not change the size of virtual surface 928*a* in FIG. 9E.

Figure 9F:
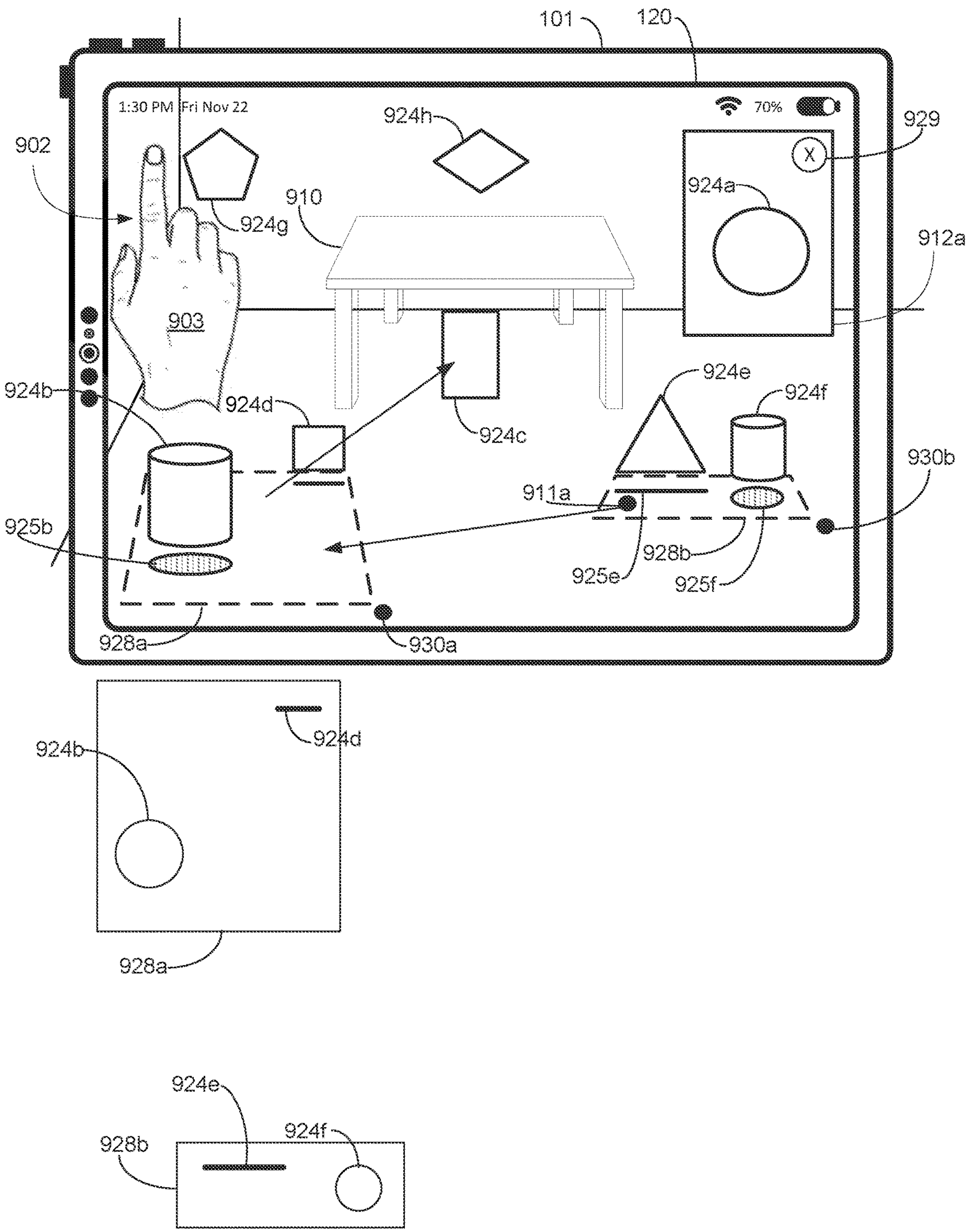

Computer system 101 responds similarly from FIG. 9E to FIG. 9F. In particular, from FIG. 9E to FIG. 9F, computer system 101 detects movement of object 924*c* to a location outside of virtual surface 928*a*—thus removing object 924*c* from virtual surface 928*a*—to an empty location in three-dimensional environment 902 (e.g., via a movement input from hand 903 (e.g., air pinch and drag gesture), as described with reference to method 1000). In response, as shown in FIG. 9F, computer system 101 moves object 924*c* out and away from virtual surface 928*a* to the empty location in three-dimensional environment 902. Further, the movement of virtual object 924*c* in FIG. 9F has not reduced or increased the required size of virtual surface 928*a*, because in the arrangement of objects in FIGS. 9E and 9F, objects 924*b* and 924*d* continue to define the area and/or volume that is occupied by the objects of virtual surface 928*a*, and those objects have not moved from FIG. 9E to FIG. 9F. Therefore, computer system 101 does not change the size of virtual surface 928*a* in FIG. 9F.

Figure 9G:
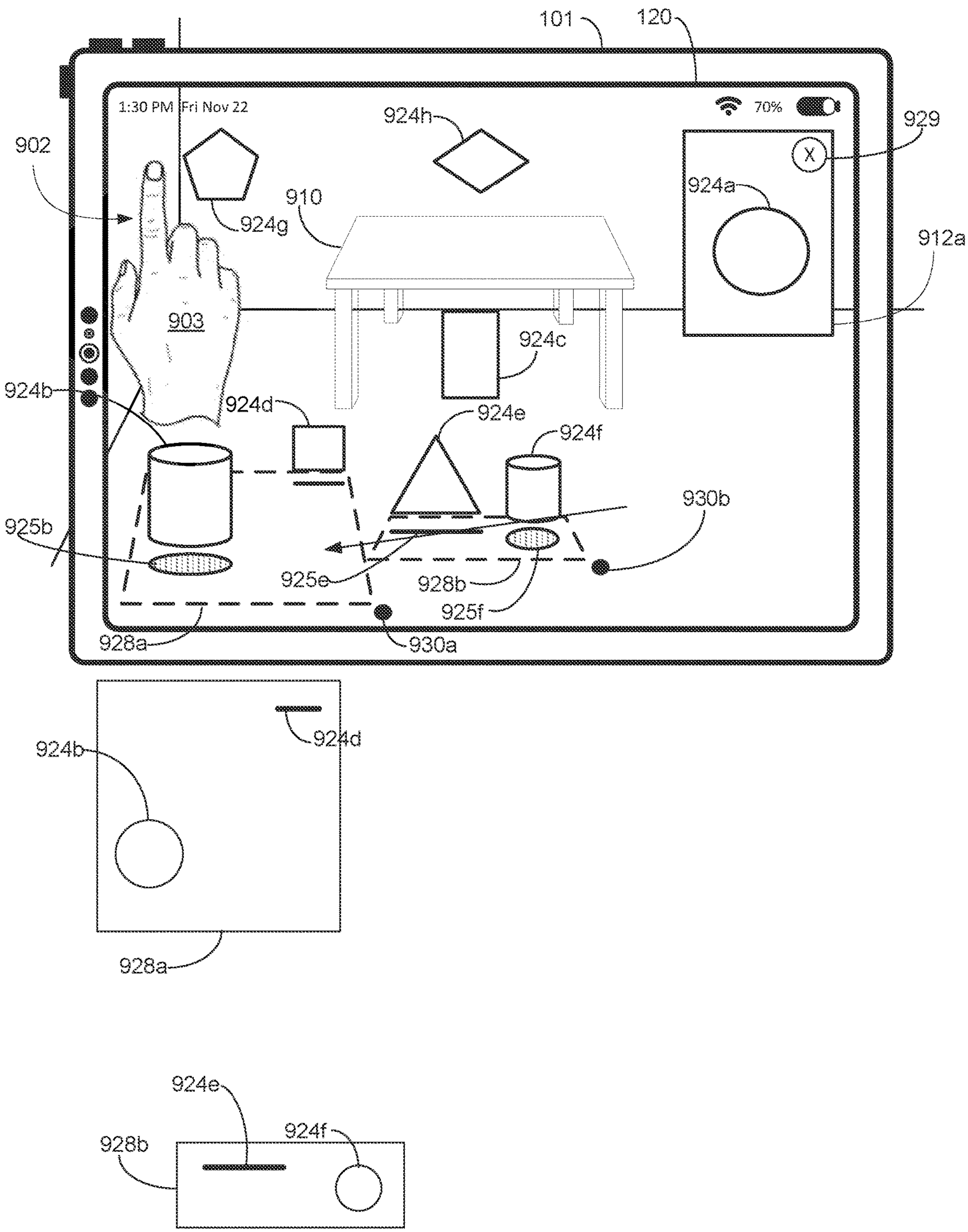
Figure 10A:
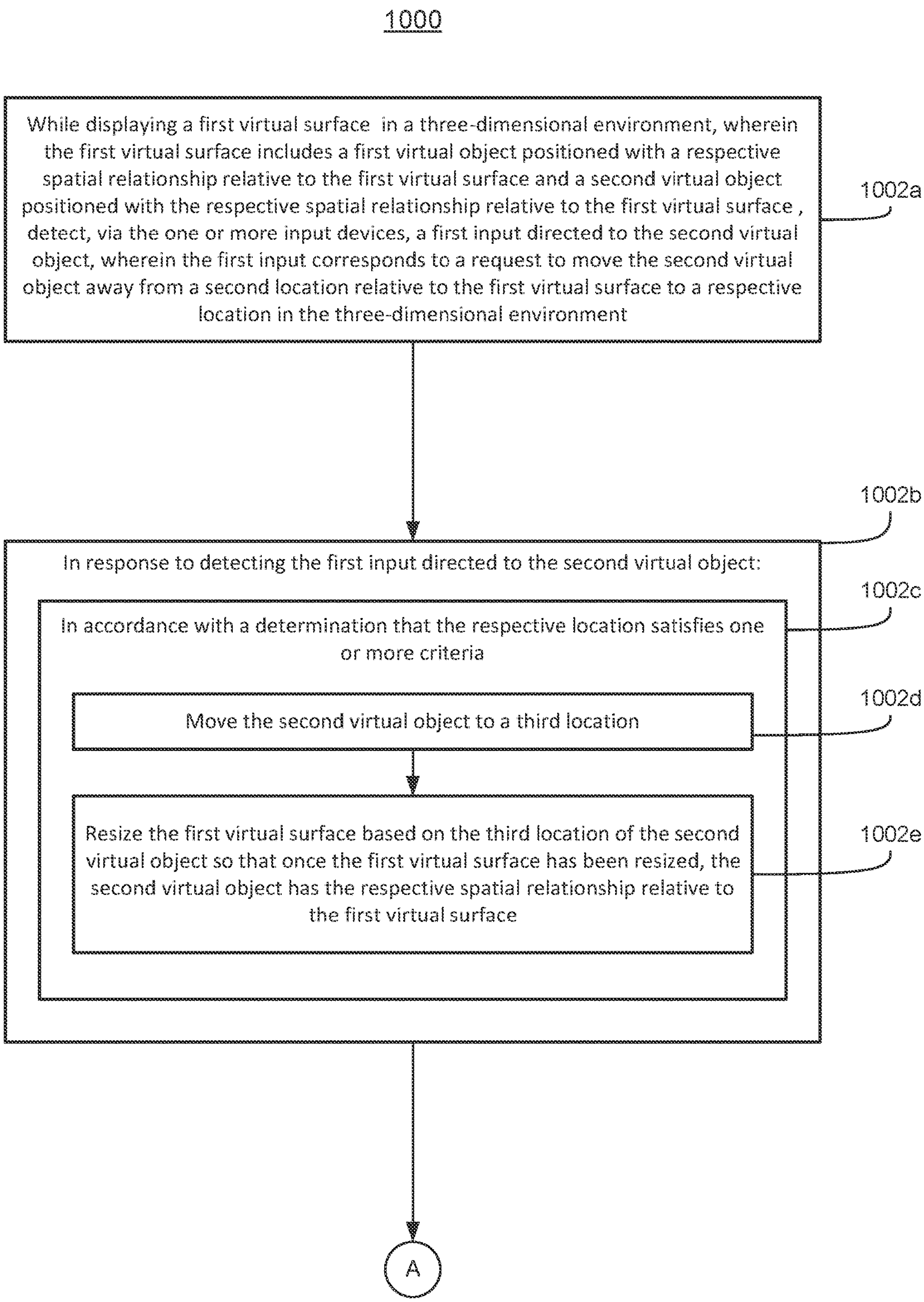
FIGS. 10A-10G is a flowchart illustrating a method of automatically resizing virtual surfaces that contain objects in accordance with some embodiments.
Figure 10B:
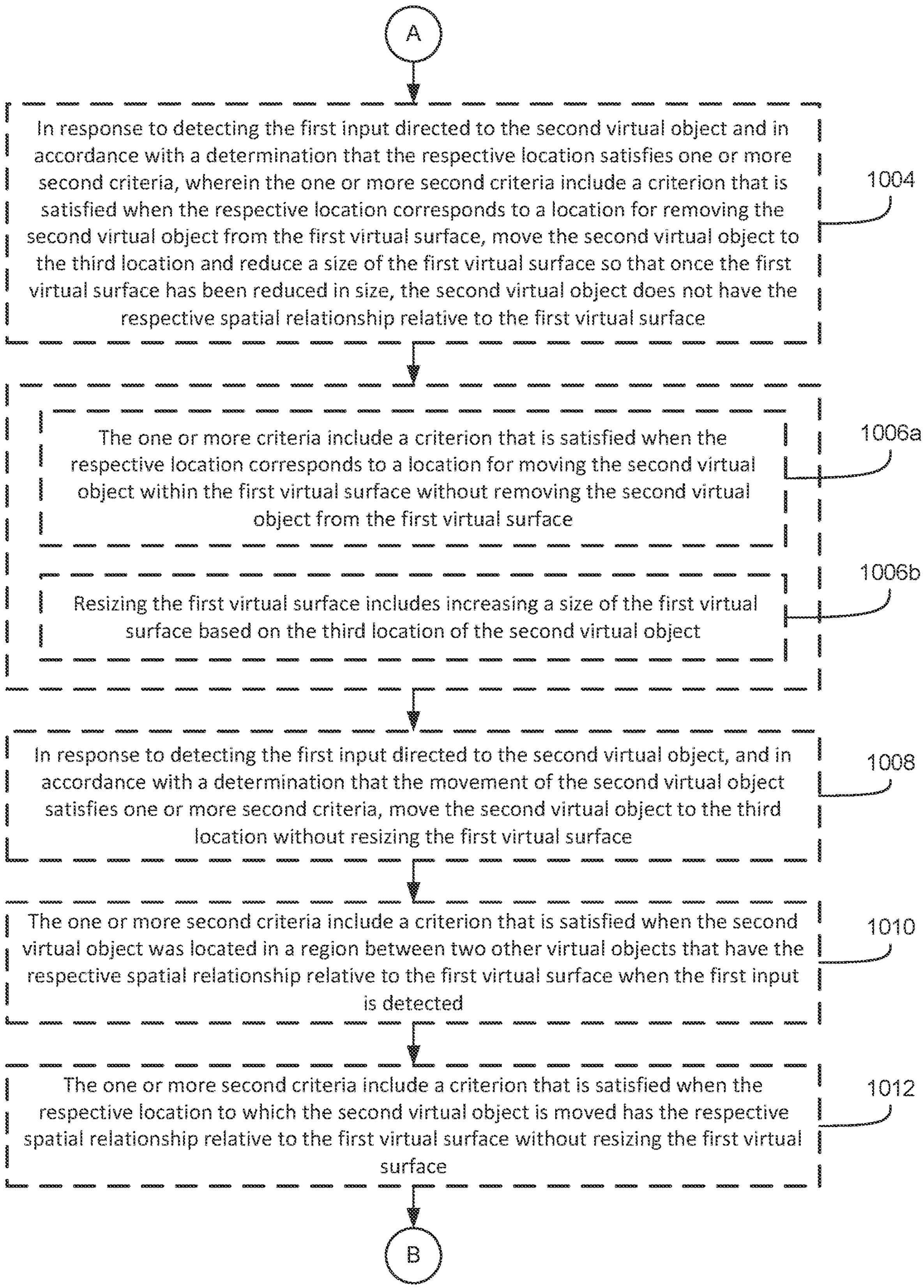
Figure 10C:
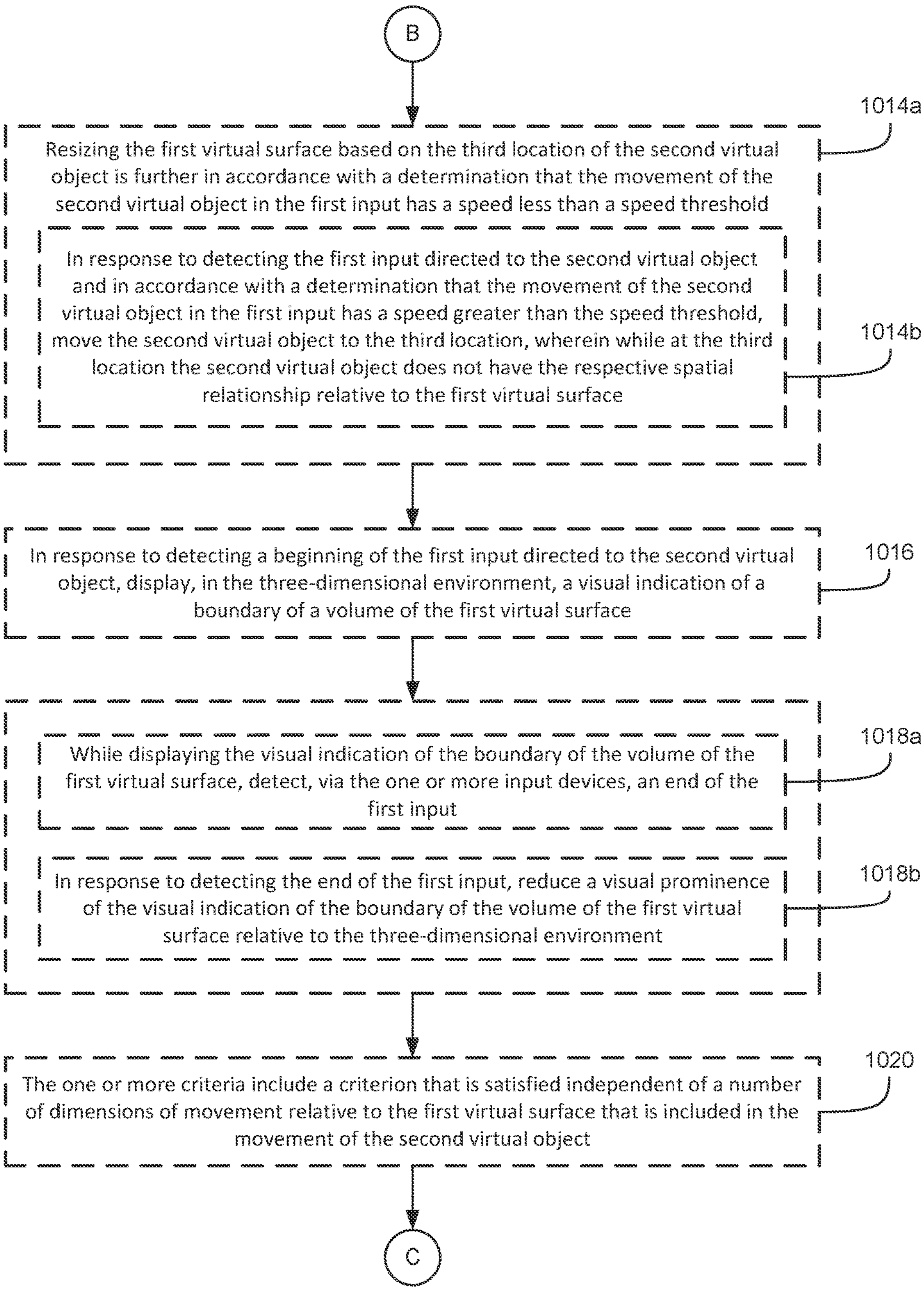
Figure 10D:
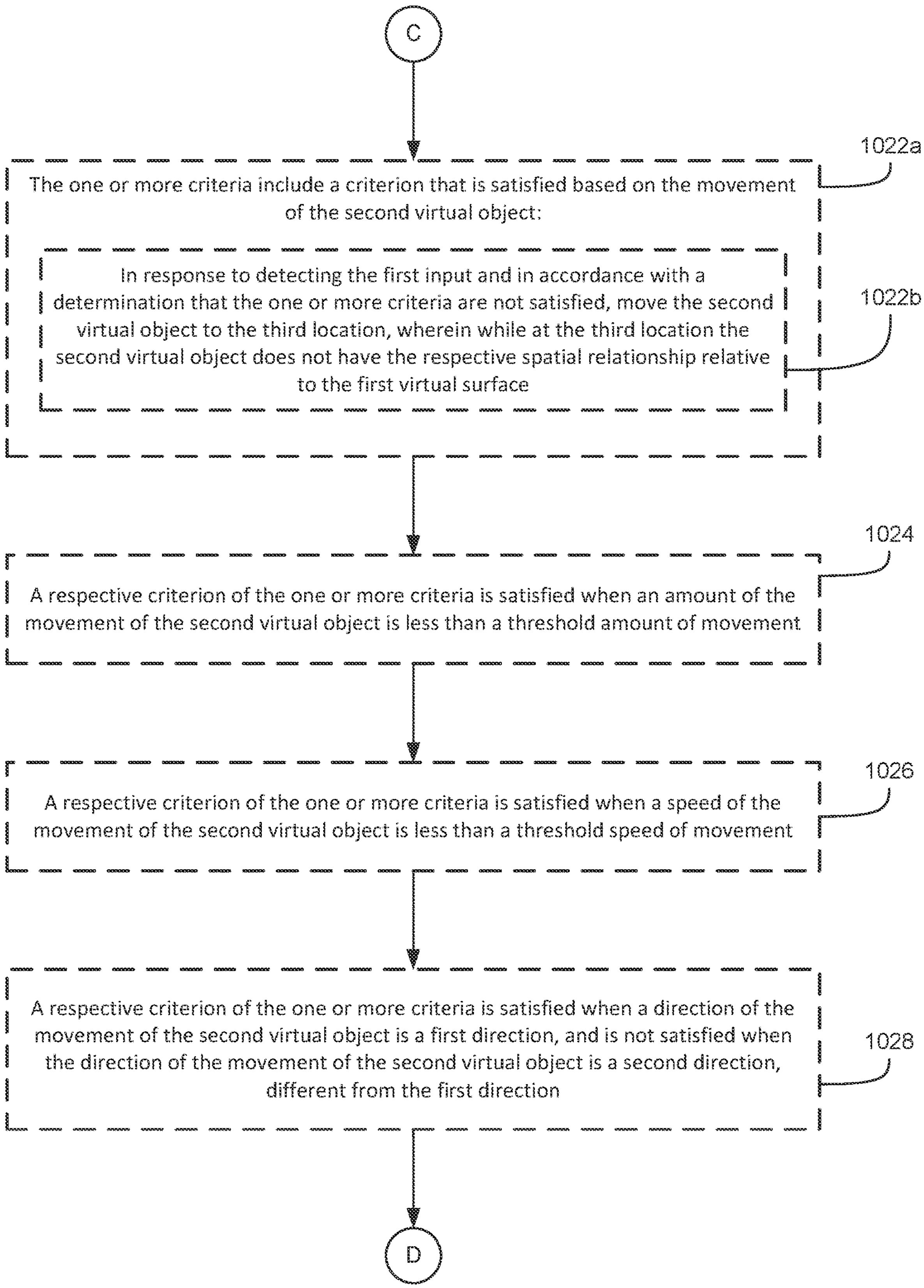
Figure 10E:
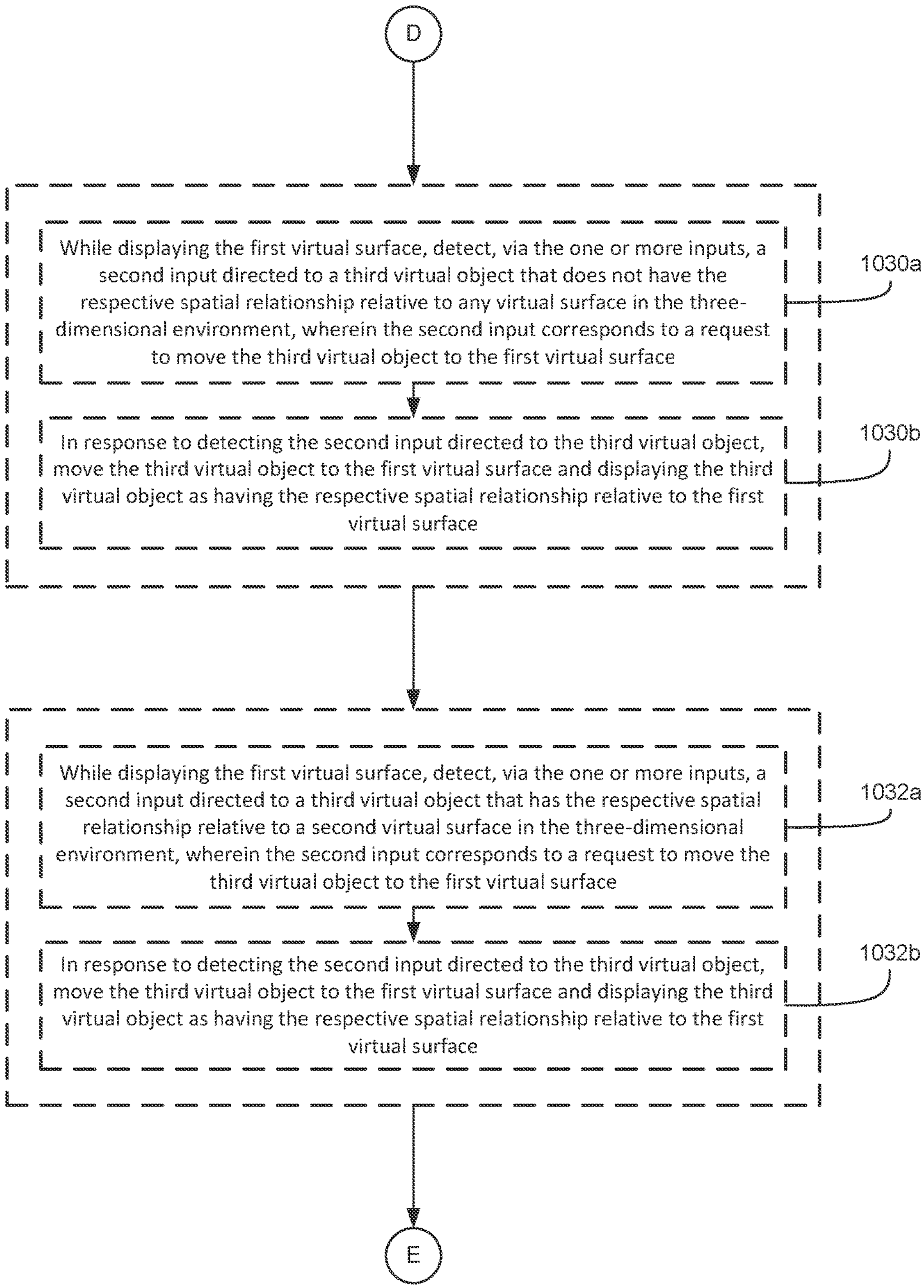
Figure 10F:
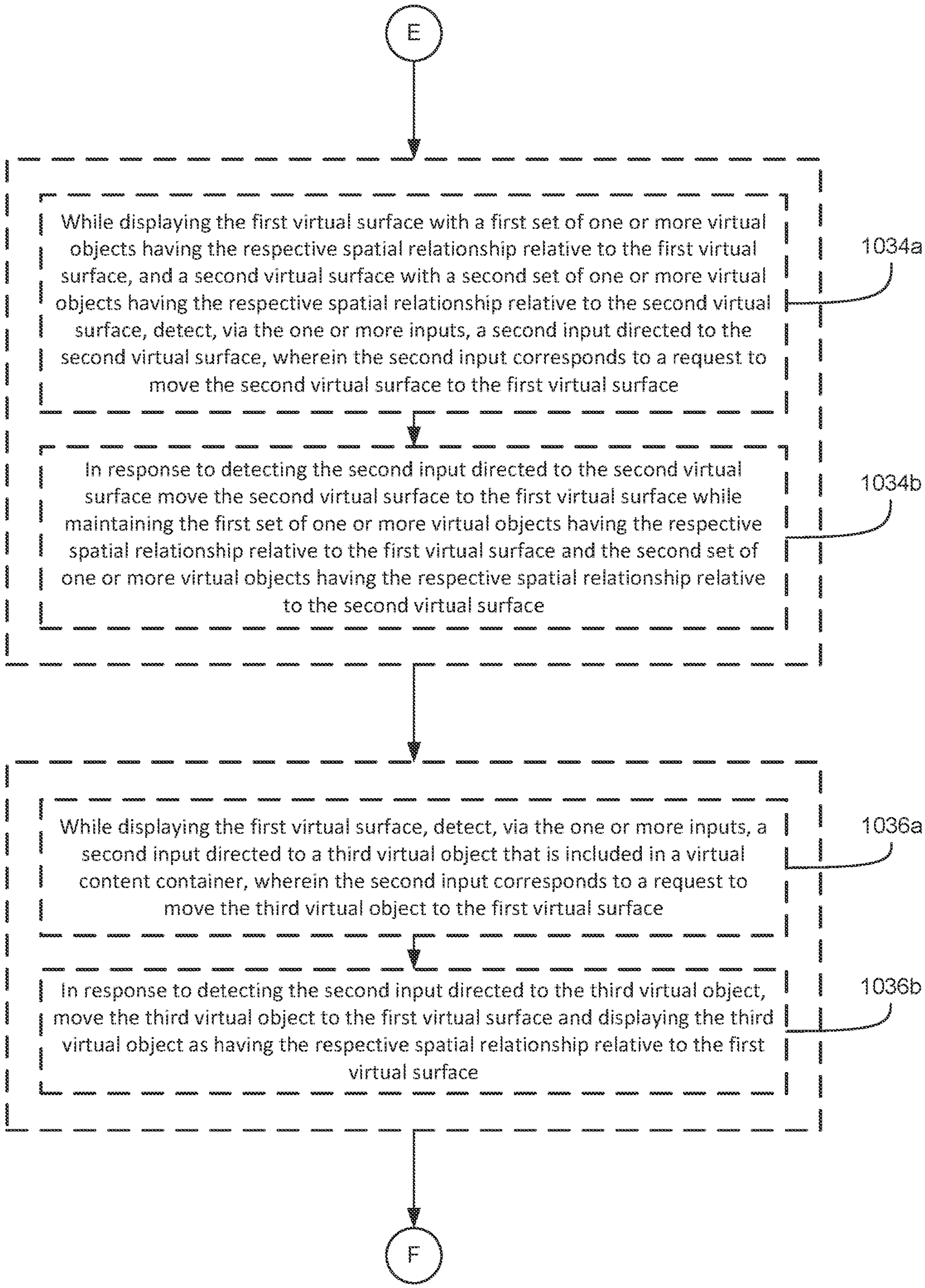
Figure 10G:
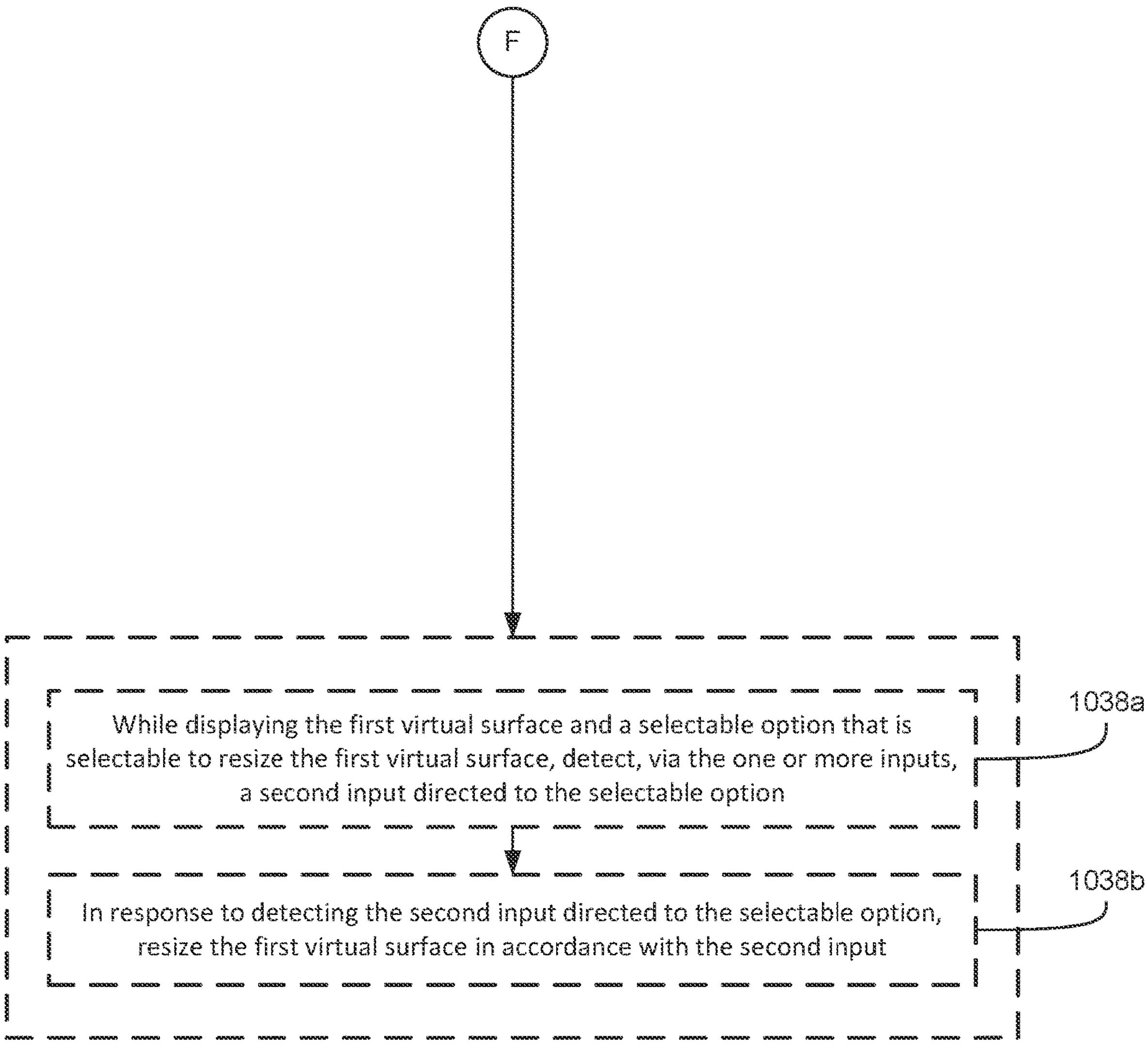

In some embodiments, while objects are able to be moved from one virtual surface to another, as described previously, two virtual surfaces cannot be combined with one another. For example, from FIG. 9F to FIG. 9G, computer system 101 detects movement of virtual surface 928*a*—and corresponding objects 924*e* and 924*f*—towards and to virtual surface 928*a* (e.g., via a movement input from hand 903 (e.g., air pinch and drag gesture) while attention 911*a* of the user is directed to virtual surface 928*b*, as described with reference to method 1000). In response, as shown in FIG. 9G, computer system 101 moves virtual surface 928*b* to a location that is sufficiently close to virtual surface 928*a*, and at which an object other than virtual surface 928*b* would be added to virtual surface 928*a* (e.g., as described with reference to method 1000). However, in response and as shown in FIG. 9G, virtual surface 928*a* and 928*b* remain separate, including maintaining their own distributions of objects 924*b,d* and 924*e,f*, respectively.

FIGS. 10A-10G is a flowchart illustrating a method of automatically resizing virtual surfaces that contain objects in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a computer system in communication with a display generation component and one or more input devices. In some embodiments, the computer system has one or more of the characteristics of the computer system of method 800. In some embodiments, the display generation component has one or more of the characteristics of the display generation component of method 800. In some embodiments, the one or more input devices have one or more of the characteristics of the one or more input devices of method 800.

In some embodiments, while displaying a first virtual surface (e.g., "first surface") in a three-dimensional environment, such as virtual surface 928*a* in FIG. 9A (In some embodiments, and as discussed with reference to method 800, the first surface is a virtual surface capable of holding two-dimensional or three-dimensional objects within a three-dimensional environment. In some embodiments, the first surface has one or more of the characteristics of the surfaces in methods 800, 1000 and/or 1200. In some embodiments, the three-dimensional environment has one or more of the characteristics of the three-dimensional environments of methods 800 and/or 1200) wherein the first virtual surface includes a first virtual object (e.g., a three-dimensional virtual object) positioned with a respective spatial relationship relative to the first virtual surface (e.g., the first virtual object is visually represented as resting on the first virtual surface, optionally at a first location relative to the virtual surface) and a second virtual object (e.g., a three-dimensional virtual object) positioned with the respective spatial relationship relative to the first virtual surface, such as object 924*b* and 924*c* on virtual surface 928*a* in FIG. 9A (e.g., the second virtual object is visually represented as resting on the first virtual surface, optionally at a second location relative to the virtual surface), (In some embodiments, the first virtual object and the second virtual object are part of a collection of virtual objects collected and/or owned by a user. In some embodiments, the user positioned the first virtual object and the second virtual object at the first location and second location, respectively, as described below.) the computer system detects (1002*a*), via the one or more input devices, a first input directed to the second virtual object, wherein the first input corresponds to a request to move the second virtual object away from a second location relative to the first virtual surface to a respective location in the three-dimensional environment, such as the input directed to object 924*c* from FIG. 9B to 9C. In some embodiments, the first location relative to the first surface is a location that is near the edge and/or corner of the first surface. In some embodiments, the first location relative to the first surface is a location that is in the center of the first surface. In some embodiments, the second location relative to the first surface is a location that is near the edge and/or corner of the first surface. In some embodiments, the second location relative to the first surface is a location that is in the center of the first surface. In some embodiments, the first input includes a user interaction with one of the virtual objects (e.g., second virtual object), such as the user input described with reference to method 800 (e.g., an air pinch gesture, followed by movement of the hand of the user while maintaining a pinch hand shape). In some embodiments, the first input includes a magnitude and/or direction of movement that corresponds to moving the second virtual object from the second location relative to the first surface to the respective location in the three-dimensional environment. The first input optionally includes movement of the hand of the user corresponding to moving the second virtual object in an up, down, left, and/or right direction from the first virtual object and/or the second location relative to the first surface. In some embodiments, this movement moves the second virtual object closer to the first virtual object. In some embodiments, this movement moves the second virtual object further from the first virtual object. In some embodiments, the first input includes a touch and drag on a touch screen, or a click and drag with a mouse. In some embodiments, the second virtual object is moved in the three-dimensional environment with a magnitude and/or in a direction corresponding to the magnitude and/or direction of the movement in the first input.

In some embodiments, in response to detecting the first input directed to the second virtual object (1002*b*), in accordance with a determination that the respective location satisfies one or more criteria (1002*c*), such as the location to which object 924*c* is moved in FIG. 9C (e.g., the one or more criteria include a criterion that is satisfied when the respective location is within a threshold distance (e.g., 0.02 cm, 0.5 cm, 1 cm, 2 cm, 5 cm, 10 cm, or 50 cm) of the first virtual object (optionally whether the respective location is outside or inside of the edge of the first virtual surface) and/or within the threshold distance of an edge of the first virtual surface (optionally whether the respective location is outside or inside of the edge of the first virtual surface) and/or is within a volume and/or area corresponding to the first surface. In some embodiments, the volume corresponding to the first surface is a rectangular prism in which one side coincides with the surface of the first surface, and the opposite side extends away from the first surface. In some embodiments, the area of the first surface corresponds to the surface area of the first surface.), the computer system moves (1002*d*) the second virtual object to a third location, such as the location of object 924*c* in FIG. 9C. In some embodiments, the third location is determined by the first input. In some embodiments, the third location relative to the first surface is a location that is near the edge and/or corner of the first surface. In some embodiments, the third location relative to the first surface is the center of the first surface. In some embodiments, and discussed in greater detail hereinafter, the third location is determined by the computer system based on the respective location specified by the first input and/or the location of the respective location within the first virtual surface and/or the three-dimensional environment. In some embodiments, at the third location relative to the first surface, the second virtual object remains contained in the first surface. In some embodiments, the first input does not include an input moving, resizing, altering, or otherwise interacting with the first surface.

In some embodiments, the computer system (automatically) resizes (1002*e*) the first virtual surface based on the third location of the second virtual object so that once the first virtual surface has been resized, the second virtual object has the respective spatial relationship relative to the first virtual surface, such as automatically resizing virtual surface 928*a* in FIG. 9C (e.g., the second virtual object is visually represented as resting on the first virtual surface once it is resized). In some embodiments, if the first virtual surface were not resized, the second virtual object would not have the respective spatial relationship to the first virtual surface when moved to the third location (e.g., the second virtual object would not be visually represented as resting on the first virtual surface if it were not resized). In some embodiments, the first surface is increased or decreased in size based on the movement of the second virtual object. For instance, the first surface is optionally increased by a scaling factor (e.g., 1.1, 1.3, 1.5, 2, 3, 5, or 10) as additional virtual objects are added to the first surface by the user. The first surface is optionally decreased by a scaling factor (e.g., 0.9, 0.7, 0.5, 0.3, 0.1, 0.05, 0.01) as virtual objects are removed from the first surface by the user. The first surface is optionally manually resized by the user by air pinching (e.g., a thumb and index finger of the hand of the user coming together and touching) and dragging (e.g., while the hand of the user is in a pinch hand shape) directed to one or more corners of the first surface, followed by releasing of the air pinch hand shape (e.g., the hand of the user depinching to cause the thumb and index finger to move apart). In some embodiments, the virtual objects that are included in the first surface are reoriented and/or repositioned relative to the surface when the first surface is resized. For example, in some embodiments, the first virtual object starts at the center of the first surface and the second virtual object is moved, in response to the first input, to a position that causes the first surface to expand. In such a case, the first surface is optionally expanded to include the new location of the second virtual object and the first virtual object is repositioned to remain in the center of the expanded first surface. In some embodiments, when the first surface is resized, the locations of the virtual objects are adjusted such that they are in locations that are similar to their prior locations before the resizing (e.g., if a particular virtual object was in the lower-left portion of the first surface prior to resizing, the computer system optionally positions the particular virtual object in the lower-left portion of the first surface after resizing). In some embodiments, the first surface is resized based on the updated location of the second virtual object (e.g., the amount and/or manner in which the first surface is resized is different for different updated locations of the second virtual object), as discussed in greater detail hereinafter. Resizing the first virtual surface based on the locations of the virtual objects within the surface allows for automatic resizing of the first virtual surface to an appropriate size without the need for additional user input.

In some embodiments, in response to detecting the first input directed to the second virtual object and in accordance with a determination that the respective location satisfies one or more second criteria, wherein the one or more second criteria include a criterion that is satisfied when the respective location corresponds to a location for removing the second virtual object from the first virtual surface (e.g., such as described with reference to step(s) 1022-1028), the computer system moves (1004) the second virtual object to the third location and (automatically, without user input for doing so) reduces a size of the first virtual surface so that once the first virtual surface has been reduced in size, the second virtual object does not have the respective spatial relationship relative to the first virtual surface, such as removing object 924*d* from virtual surface 928*b* and resizing virtual surface 928*b* in FIGS. 9C-9D and 9D1 (e.g., the second virtual object is not visually represented as resting on the first virtual surface once it is resized). In some embodiments, the first virtual surface is resized based on the locations of the remaining virtual object(s) on the first virtual surface after the second virtual object is removed. For example, the first virtual surface is reduced in size so that its boundary and/or volume includes the remaining virtual object(s) but does not include area or volume outside of (or does not include more than a threshold amount of area or volume, such as not more than 1, 3, 5, 10, 20, 30, 50 or 75% of the area or volume occupied by the remaining virtual object(s), outside of) the area or volume occupied by the remaining virtual object(s). Reducing the size of the first virtual surface when the second virtual object is removed from the first virtual surface reduces clutter in the three-dimensional environment and makes available additional space in the three-dimensional environment without the need for input to do so, thereby improving interaction between the user and the computer system.

In some embodiments, the one or more criteria include a criterion that is satisfied when the respective location corresponds to a location for moving the second virtual object within the first virtual surface without removing the second virtual object from the first virtual surface (1006*a*), such as if object 924*c* were moved within virtual surface 928*a* in FIG. 9B corresponding to a location that requires virtual surface 928*a* to increase in size (e.g., the movement of the second virtual object does not satisfy the requirements described with reference to one or more of step(s) 1022-1028), and (automatically, without user input for doing so) resizing the first virtual surface includes increasing a size of the first virtual surface based on the third location of the second virtual object (1006*b*), such as if virtual surface 928*a* were increased in size in FIG. 9C. In some embodiments, the first virtual surface is resized based on the locations of the virtual object(s) on the first virtual surface, including the second virtual object after it is moved. For example, the first virtual surface is optionally increased in size so that its boundary and/or volume includes the virtual object(s) but does not include area or volume outside of (or does not include more than a threshold amount of area or volume, such as not more than 1, 3, 5, 10, 20, 30, 50 or 75% of the area or volume occupied by the virtual object(s), outside of) the area or volume occupied by the virtual object(s). Increasing the size of the first virtual surface when the second virtual object is moved within the first virtual surface reduces the need for inputs to increase the size of the first virtual surface and facilitates organization in the three-dimensional environment, thereby improving interaction between the user and the computer system.

In some embodiments, in response to detecting the first input directed to the second virtual object, and in accordance with a determination that the movement of the second virtual object satisfies one or more second criteria, the computer system moves (1008) the second virtual object to the third location without resizing the first virtual surface, such as the movement of object 924*c* from FIGS. 9D and 9D1 to 9E. In some embodiments, the one or more second criteria include a criterion that is satisfied when the movement of the second virtual object does not satisfy the requirements described with reference to one or more of step(s) 1022-1028 for removing the second virtual object from the first virtual surface. In some embodiments, the one or more second criteria include a criterion that is satisfied when the updated location of the second virtual object in response to the first input does not require a change in the area or volume of the first virtual surface, optionally because the boundary and/or volume of the first virtual surface includes the location of the second virtual object both when the first input is detected and in response to the first input which optionally updates the location of the second virtual object. For example, the unchanged boundary and/or volume of the first virtual surface includes the virtual object(s) included within the first virtual surface but does not include area or volume outside of (or does not include more than a threshold amount of area or volume, such as not more than 1, 3, 5, 10, 20, 30, 50 or 75% of the area or volume occupied by the virtual object(s), outside of) the area or volume occupied by the virtual object(s), both when the first input is detected and in response to (and/or after) detecting the first input. Avoiding modifying the size of the first virtual surface when the second virtual object is moved within the first virtual surface reduces consumption of unnecessary processing power while maintaining consistent display of the three-dimensional environment, thereby improving interaction between the user and the computer system.

In some embodiments, the one or more second criteria include a criterion that is satisfied when the second virtual object was located in a region between two other virtual objects that have the respective spatial relationship relative to the first virtual surface when the first input is detected (1010), such as the removal of object 924*c* from virtual surface 928*a* from FIG. 9E to 9F. For example, the criterion is satisfied when the second virtual object was located in a center or central region of the virtual surface, because the outer boundaries of the virtual surface are defined by other virtual objects that are included in or placed on the virtual surface, such as described with reference to step(s) 1008. Therefore, because the boundaries and/or size of the virtual surface are controlled by virtual objects other than the second virtual object, removing the second virtual object from the table optionally does not cause a change in the boundaries and/or size of the virtual surface. Avoiding modifying the size of the first virtual surface when the second virtual object is removed from an inner region of the virtual surface reduces consumption of unnecessary processing power while maintaining consistent display of the three-dimensional environment, thereby improving interaction between the user and the computer system.

In some embodiments, the one or more second criteria include a criterion that is satisfied when the respective location to which the second virtual object is moved has the respective spatial relationship relative to the first virtual surface without resizing the first virtual surface (1012), such as the movement of object 924*c* from FIGS. 9D and 9D1 to 9E. For example, if the respective location is within the existing boundaries of the virtual surface, the virtual surface is optionally not resized. For example, when the second virtual object is moved to the respective location, the respective object has the respective spatial relationship relative to the first virtual surface without the need to change the outer boundaries and/or size of the first virtual surface, and the outer boundaries of the virtual surface are optionally defined by other virtual objects that are included in or placed on the virtual surface, such as described with reference to step(s) 1008. Avoiding modifying the size of the first virtual surface when the second virtual object is moved to a location that does not expand the boundaries of the virtual surface reduces consumption of unnecessary processing power while maintaining consistent display of the three-dimensional environment, thereby improving interaction between the user and the computer system.

In some embodiments, (automatically) resizing the first virtual surface based on the third location of the second virtual object is further in accordance with a determination that the movement of the second virtual object in the first input has a speed less than a speed threshold (1014*a*), such as the speed of movement of removing object 924*c* from virtual surface 928*a* (e.g., less than 0.01, 0.05, 0.1, 0.3, 0.5, 1, 3, 5, 10 or 50 m/s). In some embodiments, the speed of the movement of the second virtual object corresponds to a speed of a movement of the first input (e.g., the speed of movement of the hand of the user providing the first input, the speed of movement of a mouse providing the first input, or the speed or movement of a contact detected on a touch-sensitive surface providing the first input).

In some embodiments, in response to detecting the first input directed to the second virtual object and in accordance with a determination that the movement of the second virtual object in the first input has a speed greater than the speed threshold, the computer system moves (1014*b*) the second virtual object to the third location, wherein while at the third location the second virtual object does not have the respective spatial relationship relative to the first virtual surface, such as the removal of object 924*c* from virtual surface 928*a* from FIG. 9E to 9F (e.g., because the first virtual surface is not resized to include the second virtual object at the third location, but rather the second virtual object is removed from the first virtual surface). Therefore, in some embodiments, moving the second virtual object more slowly results in the first virtual surface expanding to accommodate the new location of the second virtual object, but moving the second virtual object more quickly results in the first virtual surface not expanding to accommodate the new location of the second virtual object, and the second virtual object becomes removed from the first virtual surface. Expanding or not expanding the virtual surface based on the speed of movement of the object allows for multiple different object operations to be performed without the need for separate inputs for doing so, thereby improving interaction between the user and the computer system.

In some embodiments, in response to detecting a beginning of the first input directed to the second virtual object (e.g., in response to detecting the tip of the thumb and index finger coming together and touching in an air pinch gesture performed by a hand of the user, or in response to detecting a contact being detecting on a touch-sensitive surface in the case of the first input being provided via the touch-sensitive surface), the computer system displays (1016), in the three-dimensional environment, a visual indication of a boundary of a volume of the first virtual surface, such as indication 932*a* in FIG. 9B. In some embodiments, the visual indication of the boundary of the volume of the first virtual surface is displayed prior to detecting a (or any) movement component of the first input. In some embodiments, the visual indication of the boundary of the volume of the first virtual surface is displayed in response to beginning to detect a (or any) movement component of the first input. The volume of the first virtual surface optionally has one or more characteristics of the volume described with reference to step(s) 1002. In some embodiments, the volume of the first virtual surface includes the virtual object(s) included within the first virtual surface but does not include area or volume outside of (or does not include more than a threshold amount of area or volume, such as not more than 1, 3, 5, 10, 20, 30, 50 or 75% of the area or volume occupied by the virtual object(s), outside of) the area or volume occupied by the virtual object(s). In some embodiments, the visual indication includes one or more of a glowing, a highlighting, or an otherwise visual emphasis of an outer surface of the volume and/or the interior of the volume. Displaying the visual indication of the boundary of the first virtual surface provides feedback to the user about locations to which virtual objects can be moved within or outside of the virtual surface, thereby reducing errors in the movement of objects and improving interaction between the user and the computer system.

In some embodiments, while displaying the visual indication of the boundary of the volume of the first virtual surface, the computer system detects (1018*a*), via the one or more input devices, an end of the first input, such as in FIG. 9C (e.g., in response to detecting the tip of the thumb and index finger moving apart and no longer touching in an air pinch gesture performed by a hand of the user, or in response to detecting a contact no longer being detecting on a touch-sensitive surface in the case of the first input being provided via the touch-sensitive surface). In some embodiments, in response to detecting the end of the first input, the computer system reduces (1018*b*) a visual prominence of the visual indication of the boundary of the volume of the first virtual surface relative to the three-dimensional environment, such as shown in FIG. 9C (optionally including ceasing display of the visual indication of the boundary). For example, reducing a brightness, opacity, and/or color saturation and/or increasing a blurriness of the visual indication. In some embodiments, the visual prominence of the visual indication of the boundary of the volume of the first virtual surface is reduced in response to detecting an end of movement in the first input independent of or before detecting the end of the first input. Reducing the visual prominence of the visual indication of the boundary of the first virtual surface provides feedback to the user that the first input has ended and reduces unnecessary clutter in the three-dimensional environment, thereby reducing errors in the movement of objects and improving interaction between the user and the computer system.

In some embodiments, the one or more criteria include a criterion that is satisfied independent of a number of dimensions of movement relative to the first virtual surface that is included in the movement of the second virtual object (1020), such as if object 924*c* were repositioned in any number of dimensions from FIG. 9B to 9C. In some embodiments, the second virtual object is repositioned in a vertical and/or horizontal manner (e.g., with respect to the viewpoint of the user) within the first virtual surface. In some embodiments, the second virtual object is repositioned in depth (e.g., with respect to the viewpoint of the user) within the first virtual surface. Thus, in some embodiments, virtual objects within the first virtual surface are able to be moved in one, two or three dimensions while remaining within the first virtual surface (e.g., remaining within the boundaries and/or volume of the first virtual surface, such as described with reference to step(s) 1008). Allowing for virtual object movement in an unfixed (e.g., user-defined) number of dimensions within the first virtual surface increases flexibility in usage of the first virtual surface to provide organization in the three-dimensional environment, thereby improving interaction between the user and the computer system.

In some embodiments, the one or more criteria include a criterion that is satisfied based on the movement of the second virtual object (1022*a*), such as the movement of object 924*c* from FIG. 9E to 9F. In some embodiments, one or more characteristics of the movement of the second virtual object, such as the amount of movement, the speed of the movement, the acceleration of the movement and/or the direction of the movement determine whether the one or more characteristics are satisfied, and thus whether the first virtual surface is automatically resized such that the second virtual object has the respective spatial relationship relative to the first virtual surface when the second virtual object is at the third location. In some embodiments, the one or more characteristics of the movement of the second virtual object correspond to one or more characteristics of a movement of the first input (e.g., one or more characteristics of the movement of the hand of the user providing the first input, one or more characteristics the movement of a mouse providing the first input, or one or more characteristics the movement of a contact detected on a touch-sensitive surface providing the first input).

In some embodiments, in response to detecting the first input and in accordance with a determination that the one or more criteria are not satisfied, the computer system moves (1022*b*) the second virtual object to the third location, wherein while at the third location the second virtual object does not have the respective spatial relationship relative to the first virtual surface, such as the movement of object 924*c* from FIG. 9E to 9F (e.g., because the first virtual surface is not resized to include the second virtual object at the third location, but rather the second virtual object is removed from the first virtual surface). Expanding or not expanding the virtual surface based on one or more characteristics of the movement of the object allows for multiple different object operations to be performed without the need for separate inputs for doing so, thereby improving interaction between the user and the computer system.

In some embodiments, a respective criterion of the one or more criteria (e.g., the criterion) is satisfied when an amount of the movement of the second virtual object is less than a threshold amount of movement (1024), such as the amount of movement of object 924*c* from FIG. 9E to 9F (e.g., the amount of movement of the second virtual object away from the second location and/or from the second location to the third location). In some embodiments, the threshold amount of movement is an absolute value (e.g., 0.1, 0.3, 0.5, 1, 3, 5, 10, 30, 50, 100, 500 or 1000 cm). In some embodiments, the threshold amount of movement is a relative value (e.g., 0.3, 0.5, 1, 3, 5, 10, 20, 40, 60, 80 or 100% of one or more dimensions of the first virtual surface). In some embodiments, the criterion is not satisfied when an amount of the movement of the second virtual object is greater than the threshold amount of movement. Expanding or not expanding the virtual surface based on an amount of the movement of the object allows for multiple different object operations to be performed without the need for separate inputs for doing so, thereby improving interaction between the user and the computer system.

In some embodiments, a respective criterion of the one or more criteria (e.g., the criterion) is satisfied when a speed of the movement of the second virtual object is less than a threshold speed of movement (1026), such as the speed of movement of object 924*c* from FIG. 9E to 9F (e.g., 0.01, 0.05, 0.1, 0.3, 0.5, 1, 3, 5, 10 or 50 m/s). In some embodiments, the criterion is not satisfied when the speed of the movement of the second virtual object is greater than the threshold speed of movement. Expanding or not expanding the virtual surface based on a speed of the movement of the object allows for multiple different object operations to be performed without the need for separate inputs for doing so, thereby improving interaction between the user and the computer system.

In some embodiments, a respective criterion of the one or more criteria (e.g., the criterion) is satisfied when a direction of the movement of the second virtual object is a first direction (e.g., laterally with respect to the viewpoint of the user and/or away from the viewpoint of the user), and is not satisfied when the direction of the movement of the second virtual object is a second direction, different from the first direction (1028), such as the direction of movement of object 924*c* from FIG. 9E to 9F (e.g., towards the viewpoint of the user and/or away from the first virtual surface). Expanding or not expanding the virtual surface based on a direction of the movement of the object allows for multiple different object operations to be performed without the need for separate inputs for doing so, thereby improving interaction between the user and the computer system.

In some embodiments, while displaying the first virtual surface, the computer system detects (1030*a*), via the one or more inputs, a second input directed to a third virtual object (e.g., the third virtual object optionally has one or more of the characteristics of the first virtual object and/or the second virtual object) that does not have the respective spatial relationship relative to any virtual surface in the three-dimensional environment (e.g., the third virtual object is not placed on or included in any virtual surface in the three-dimensional environment; for example, the third virtual object is located in empty space in the three-dimensional environment), wherein the second input corresponds to a request to move the third virtual object to the first virtual surface, such as an input to add object 924*g* in FIG. 9E to virtual surface 928*a*. In some embodiments, the second input has one or more of the characteristics of the first input.

In some embodiments, in response to detecting the second input directed to the third virtual object, the computer system moves (1030*b*) the third virtual object to the first virtual surface and displays the third virtual object as having the respective spatial relationship relative to the first virtual surface, such as if object 924*g* were displayed on virtual surface 928*a* (e.g., the third virtual object is placed on or is included in the first virtual surface). In some embodiments, the first virtual surface does or does not resize to accept the third virtual object according to the descriptions provided with reference to one or more of step(s) 1004-1006. For example, if the location to which the third virtual object is moved is within the existing boundaries or volume of the first virtual surface, the first virtual surface is optionally not resized to accommodate the third virtual object. However, if the location to which the third virtual object is moved is not within the existing boundaries or volume of the first virtual surface, but is within a threshold distance of the first virtual surface and/or the boundaries or volume of the first virtual surface (e.g., 0.1, 0.3, 0.5, 1, 3, 5, 10, 30, 50, 100, 500 or 1000 cm), the first virtual surface is optionally automatically resized (e.g., increased in size) by the computer system. The first virtual surface is optionally resized to a size such that its boundary and/or volume includes the virtual object(s) included within it—including the third virtual object—but does not include area or volume outside of (or does not include more than a threshold amount of area or volume, such as not more than 1, 3, 5, 10, 20, 30, 50 or 75% of the area or volume occupied by the virtual object(s), outside of) the area or volume occupied by the virtual object(s). In some embodiments, if the location to which the third virtual object is moved is not within the existing boundaries or volume of the first virtual surface, and is further than the threshold distance of the first virtual surface and/or the boundaries or volume of the first virtual surface, the first virtual surface is optionally not resized and the third virtual object is optionally not added to the first virtual surface (e.g., not displayed as having the respective spatial relationship relative to the first virtual surface). Allowing for objects from space in the three-dimensional environment to be added to the first virtual surface facilities organization of the three-dimensional environment, thereby improving interaction between the user and the computer system.

In some embodiments, while displaying the first virtual surface, the computer system detects (1032*a*), via the one or more inputs, a second input directed to a third virtual object (e.g., the third virtual object optionally has one or more of the characteristics of the first virtual object and/or the second virtual object) that has the respective spatial relationship relative to a second virtual surface in the three-dimensional environment (e.g., the third virtual object is placed on or included in the second virtual surface, which optionally has one or more of the characteristics of the first virtual surface), wherein the second input corresponds to a request to move the third virtual object to the first virtual surface, such as the movement input directed to object 924*d* from FIGS. 9C to 9D and 9D1. In some embodiments, the second input has one or more of the characteristics of the first input.

In some embodiments, in response to detecting the second input directed to the third virtual object, the computer system moves (1032*b*) the third virtual object to the first virtual surface and displays the third virtual object as having the respective spatial relationship relative to the first virtual surface, such as shown with object 924*d* relative to virtual surface 928*a* in FIGS. 9D and 9D1 (e.g., similar to as described with reference to step(s) 1030). In some embodiments, in response to the second input, the third virtual object is removed from the second virtual surface in one or more of the ways described with reference to step(s) 1004, 1010, 1014 and 1022-1028. In some embodiments, the first virtual surface does or does not resize to accommodate the third virtual object in one or more of the ways described with reference to step(s) 1030. Allowing for objects from other virtual surfaces in the three-dimensional environment to be added to the first virtual surface facilities organization of the three-dimensional environment, thereby improving interaction between the user and the computer system.

In some embodiments, while displaying the first virtual surface with a first set of one or more virtual objects having the respective spatial relationship relative to the first virtual surface (optionally including or not including the first and/or second virtual objects; in some embodiments, the first set of one or more virtual objects have one or more of the characteristics of the first and/or second virtual objects), and a second virtual surface with a second set of one or more virtual objects having the respective spatial relationship relative to the second virtual surface (optionally including or not including the first and/or second virtual objects; in some embodiments, the second set of one or more virtual objects have one or more of the characteristics of the first and/or second virtual objects), the computer system detects (1034*a*), via the one or more inputs, a second input directed to the second virtual surface, wherein the second input corresponds to a request to move the second virtual surface to the first virtual surface, such as the input from FIG. 9F to 9G to move virtual surface 928*b* to virtual surface 928*a*. In some embodiments, the second input has one or more of the characteristics of the first input, but is directed to the second virtual surface rather than to a particular object included in or on the second virtual surface.

In some embodiments, in response to detecting the second input directed to the second virtual surface, the computer system moves (1034*b*) the second virtual surface to the first virtual surface while maintaining the first set of one or more virtual objects having the respective spatial relationship relative to the first virtual surface and the second set of one or more virtual objects having the respective spatial relationship relative to the second virtual surface, such as shown with virtual surfaces 928*a* and 928*b* in FIG. 9G. For example, the objects included in the two virtual surfaces optionally remain as included in the two virtual surfaces, and do not get moved to the other virtual surface and/or do not combine into a single virtual surface, even if the one or more criteria described with reference to the first input would otherwise be satisfied if applied to the first virtual surface and/or the second virtual surface. In response to the second input, the sizes and/or boundaries of the two virtual surfaces optionally remain unchanged. Forgoing combining the content of two virtual surfaces avoids unintentional movement of objects between virtual surface, thereby reducing inputs needed to correct such errors and improving interaction between the user and the computer system.

In some embodiments, while displaying the first virtual surface, the computer system detects (1036*a*), via the one or more inputs, a second input directed to a third virtual object (e.g., the third virtual object optionally has one or more of the characteristics of the first virtual object and/or the second virtual object) that is included in a virtual content container (e.g., having one or more of the characteristics of the virtual content container described with reference to method 800), such as an input directed to object 924*a*, wherein the second input corresponds to a request to move the third virtual object to the first virtual surface. In some embodiments, the second input has one or more of the characteristics of the first input.

In some embodiments, in response to detecting the second input directed to the third virtual object, the computer system moves (1036*b*) the third virtual object to the first virtual surface and displaying the third virtual object as having the respective spatial relationship relative to the first virtual surface, such as if object 924*a* were displayed on virtual surface 928*a* (e.g., similar to as described with reference to step(s) 1030). In some embodiments, in response to the second input, the third virtual object is removed from the virtual content container in one or more of the ways described with reference to method 800. In some embodiments, the first virtual surface does or does not resize to accommodate the third virtual object in one or more of the ways described with reference to step(s) 1030. Allowing for objects from other containers or areas in the three-dimensional environment to be added to the first virtual surface facilities organization of the three-dimensional environment, thereby improving interaction between the user and the computer system.

In some embodiments, while displaying the first virtual surface and a selectable option that is selectable to resize the first virtual surface, the computer system detects (1038*a*), via the one or more inputs, a second input directed to the selectable option, such as input directed to option 930*a* for virtual surface 928*a*. In some embodiments, the selectable option is displayed adjacent to or relative to a corner or a side of the first virtual surface. In some embodiments, the second input has one or more of the characteristics of the first input, but is directed to the selectable option rather than to a particular object included in or on the second virtual surface. In some embodiments, the second input includes movement corresponding to movement of the selectable option. In some embodiments, the selectable option is not displayed, and the second input is instead directed to one or more corners or sides of the first virtual surface. In some embodiments, the second input is a voice input or other input not directed to the first virtual surface.

In some embodiments, in response to detecting the second input directed to the selectable option, the computer system resizes (1038*b*) the first virtual surface in accordance with the second input (e.g., manually resizing the first virtual surface based on the second input), such as manually resizing virtual surface 928*a* based on input directed to option 930*a*. For example, the computer system optionally increases or decreases a size of the first virtual surface in accordance with the movement of the selectable option. For example, if the selectable option is displayed adjacent to or relative to a corner of the first virtual surface, the movement of the selectable option optionally causes its corresponding corner of the first virtual surface to move in the same direction and/or with the same magnitude as the movement of the selectable option, and the remaining dimension(s) of the first virtual surface are optionally adjusted accordingly so as to maintain the first virtual surface as a single and/or contiguous surface. As another example, if the selectable option is displayed adjacent to or relative to a side of the first virtual surface, the movement of the selectable option optionally causes its corresponding side of the first virtual surface to move in the same direction and/or with the same magnitude as the movement of the selectable option, and the remaining dimension(s) of the first virtual surface are optionally adjusted accordingly so as to maintain the first virtual surface as a single and/or contiguous surface. In some embodiments, the first virtual surface cannot be manually resized to a size smaller that will cause one of the virtual objects included in the first virtual surface to no longer be within the boundaries and/or volume of the first virtual surface. In some embodiments, if the first virtual surface is resized such that one or more of the virtual objects that are included in the first virtual surface are no longer within the boundaries and/or volume of the first virtual surface, those virtual objects are removed from the first virtual surface (e.g., no longer have the respective spatial relationship relative to the first virtual surface). In some embodiments, while the first virtual surface has a size that was manually defined by the user of the computer system (e.g., in response to the second input), subsequent input adding or removing virtual objects or otherwise triggering one or more of the automatic resizing operations described with reference to step(s) 1002-1036 will result in the computer system automatically resizing the first virtual surface in accordance with one or more of the details of step(s) 1002-1036, even if the first virtual surface would otherwise not need to be resized to accommodate all of the virtual objects included within it. Allowing for manual resizing of virtual surfaces facilities organization of the three-dimensional environment, thereby improving interaction between the user and the computer system.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11H illustrate examples of a computer system displaying feedback related to removal and/or addition of objects to virtual surfaces in accordance with some embodiments.

Figure 11A:
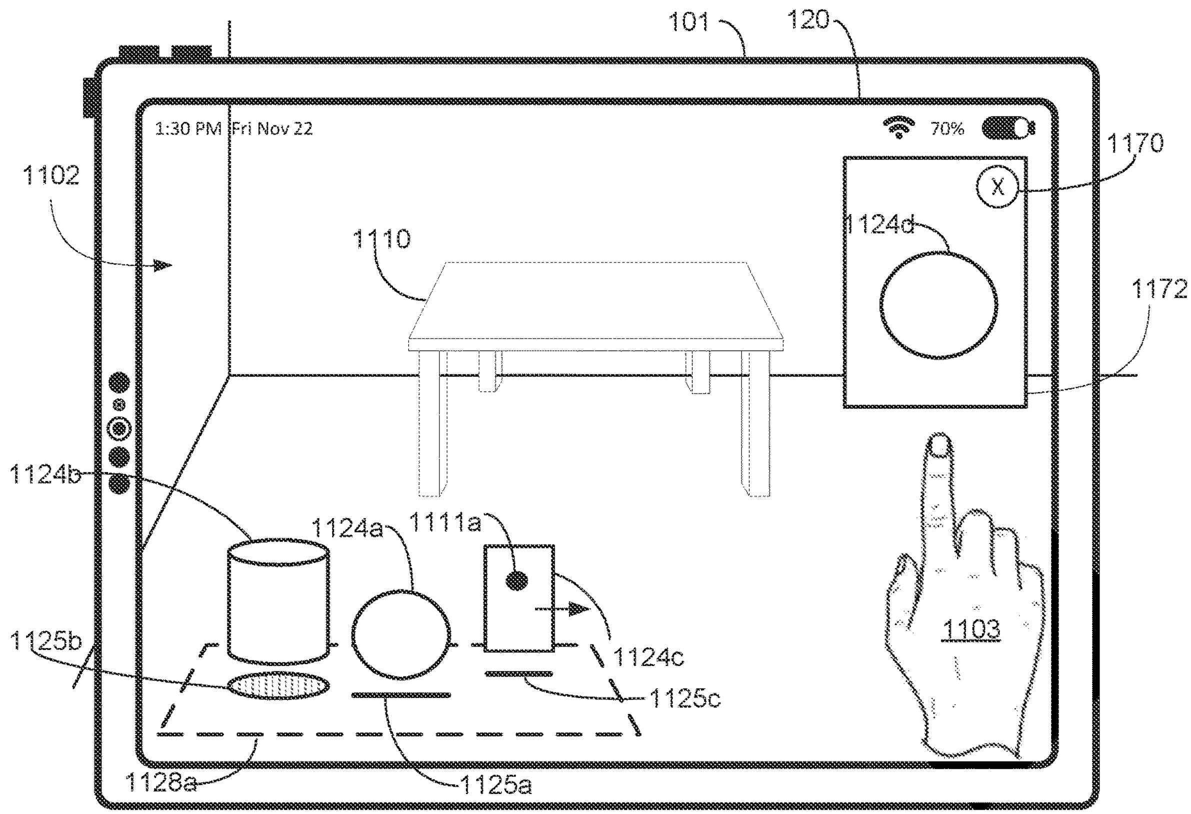
FIGS. 11A-11H illustrate examples of a computer system displaying feedback related to removal and/or addition of objects to virtual surfaces in accordance with some embodiments.
Figure 11A:
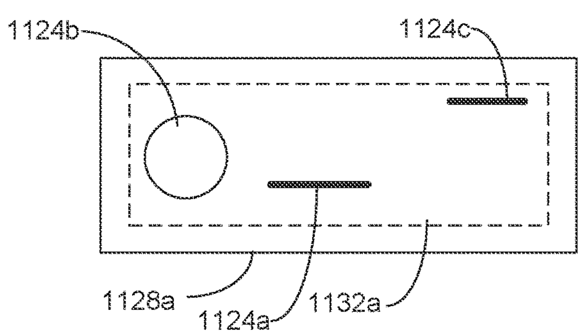

FIG. 11A illustrates a computer system 101 displaying, via a display generation component (e.g., display generation component 120 of FIG. 1), a three-dimensional environment 1102 from a viewpoint of a user (e.g., similar to as described with reference to FIGS. 7A-7H). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 11A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1102 or portions of the physical environment are visible via the display generation component 120 of computer system 101. For example, three-dimensional environment 1102 includes portions of the left and back walls, and the floor in the physical environment of the user. Three-dimensional environment 1102 also includes table 1110, which is a physical table in the physical environment of the user.

In FIG. 11A, three-dimensional environment 1102 also includes virtual content, such as virtual content 1172, which includes virtual object 1124*d*, and virtual objects 1124*a-c*. Virtual objects 1124*a-d* are optionally one or more of a user interface of an application (e.g., messaging user interface, or content browsing user interface), a two-dimensional object (e.g., a shape, or a representation of a photograph) a three-dimensional object (e.g., virtual clock, virtual ball, or virtual car), or any other element displayed by computer system 101 that is not included in the physical environment of computer system 101 as described in more detail with reference to method 1200. In some embodiments, virtual object 1172 is a virtual content container that is able to hold different types of virtual content, such as object 1124*d*, as described in more detail with reference to method 1200. Container 1172 in FIG. 11A includes option 1170 that is selectable to cause computer system 101 to cease displaying container 1172 and/or object 1124*d* in container 1172. In FIG. 11A, objects

1124*a*-*c* are displayed on virtual surface 1128*a* (including corresponding simulated shadows 1125*a*-*c*). Virtual surface 1128*a* optionally has one or more of the characteristics of virtual surfaces described with reference to method 1200 and/or virtual surface 728 described with reference to FIGS. 7A-7H and/or virtual surfaces 928*a* and 928*b* described with reference to FIGS. 9A-9G. FIGS. 11A-11H also include an overhead view of virtual surface 1128*a* shown below computer system 101. In the overhead view, region 1132*a* indicates the region closest to the outer boundaries of virtual surface 1128*a* such that if objects within virtual surface 1128*a* are moved to within region 1132*a*, computer system 101 displays various visual indications as will be described later. In FIG. 11A, virtual surfaces 1128*a* is sized such that it is sufficiently large to encompass objects 1124*a*-*c*, as described in more detail with reference to method 1200.

From FIG. 11A to FIG. 11B, computer system 101 detects movement of object 1124*c* towards the right boundary of virtual surface 1128*a*, and into region 1132*a* (e.g., via a movement input from hand 1103 (e.g., air pinch and drag gesture) while attention 1111*a* is directed to object 1124*c*, as described with reference to method 1200). It is understood that in some embodiments, the movements of object 1124*c* shown and described with reference to FIGS. 11A-11G are part of a single continuous movement input (e.g., during which an air pinch hand shape of hand 1103 is maintained, or during which contact of a finger on a touch-sensitive surface is maintained), and in some embodiments, the movements of object 1124*c* shown and described with reference to FIGS. 11A-11G correspond to two or more movement inputs directed to object 1124*c* (e.g., separated by release of the pinch hand shape in which the index finger and thumb of hand 1103 move apart and are no longer touching, or separated by breaking of the contact of the finger on the touch-sensitive surface).

Figure 11B:
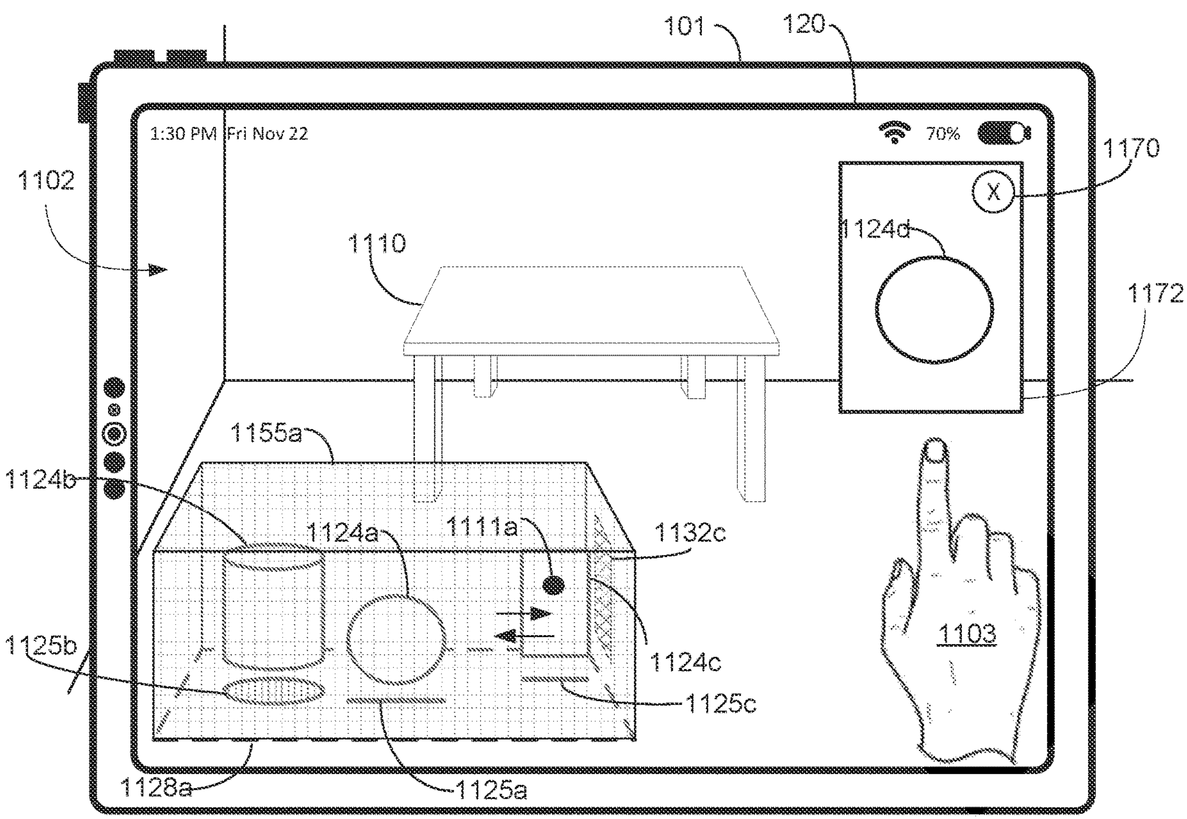
Figure 11B:
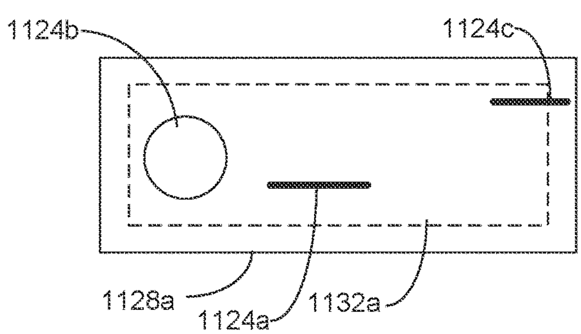

In response to the input from hand 1103 from FIG. 11A to FIG. 11B, as shown in FIG. 11B, computer system 101 displays an indication of the boundaries of the virtual surface in three-dimensional environment 1102. For example, in FIG. 11B, computer system 101 displays visual indication 1155*a*, which is optionally an indication of the boundaries of the volume associated with virtual surface 1128*a*. The volume associated with virtual surface 1128*a* is optionally the volume within which objects displayed on virtual surface 1128*a* can be positioned. Additional details about visual indication 1155*a* and the volume associated with virtual surface 1128*a* are provided with reference to method 1200. Additionally or alternatively to visual indication 1155*a*, computer system 101 also displays visual indication 1132*c*, which is optionally displayed in a region of a boundary of the volume associated with virtual surface 1128*a* closest to object 1124*c*. For example, visual indication 1132*c* is optionally a glowing or other virtual lighting effect that emanates from a portion of the boundary of the volume associated with virtual surface 1128*a* that is closest to object 1124*c*. Through visual indications 1132*c* and 1155*a*, computer system 101 is able to provide feedback to a user about how movement of the object relates to the boundaries of virtual surface 1128*a*, and therefore how such movement relates to removing or adding the object from or to virtual surface 1128*a*, as will be described later. Additional details about visual indication 1132*c* are provided with reference to method 1200

Figure 11C:
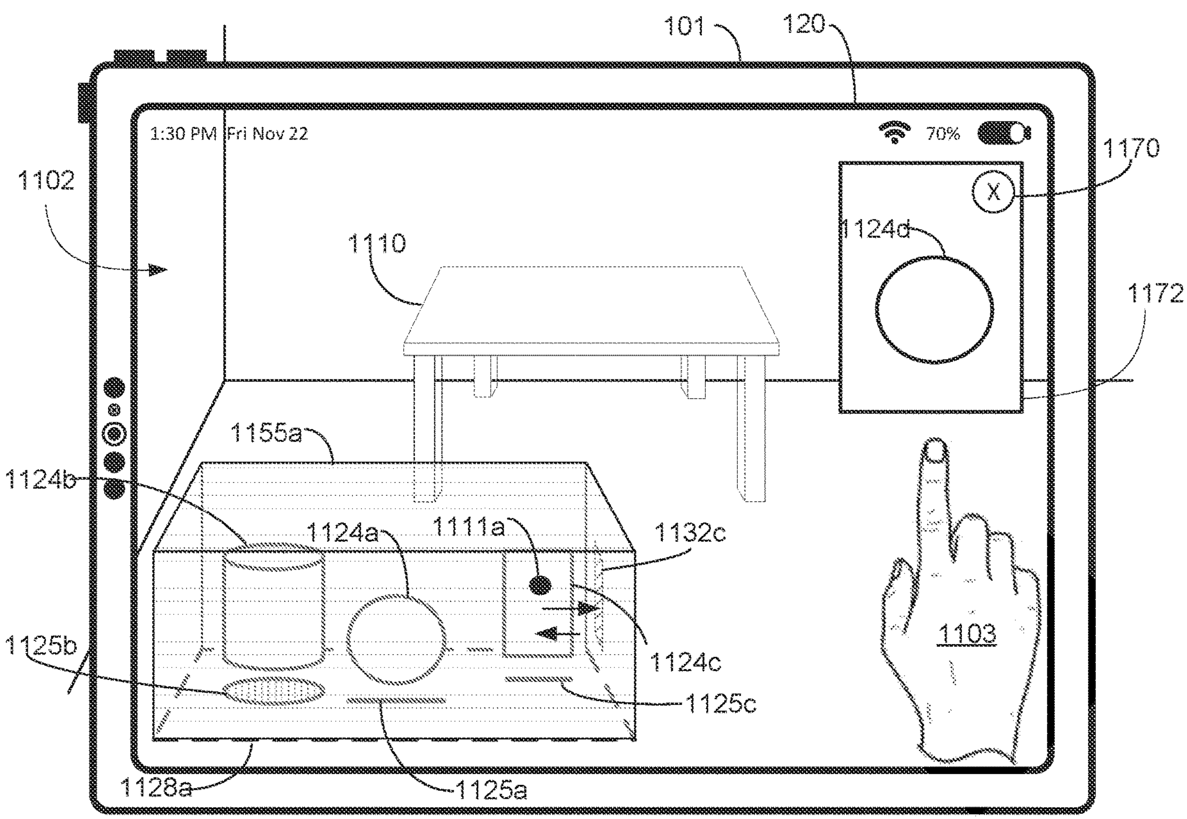
Figure 11C:
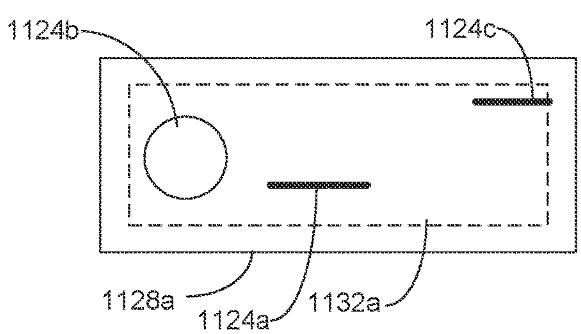

From FIG. 11B to FIG. 11C, computer system 101 detects movement of object 1124*c* away from the boundary of virtual surface 1128*a* (e.g., via a movement input from hand 1103 (e.g., air pinch and drag gesture) while attention 1111*a* is directed to object 1124*c*, as described with reference to method 1200). In response, as shown in FIG. 11C, computer system 101 moves object 1124*c* away from the boundary of virtual surface 1128*a* while remaining in region 1132*a*. Further, in FIG. 11C, because the movement of object 1124*c* has moved object 1124*c* further from the boundary of virtual surface 1128*a*, computer system 101 reduces the visual prominence of visual indication 1155*a* (e.g., by reducing the brightness, opacity, and/or color saturation, and/or by increasing the blurriness of visual indication 1155*a*, optionally without changing a size of visual indication 1155*a*) and/or visual indication 1132*c* (e.g., by reducing the brightness, size, opacity, and/or color saturation, and/or by increasing the blurriness of visual indication 1132*c*) in accordance with such movement.

Figure 11D:
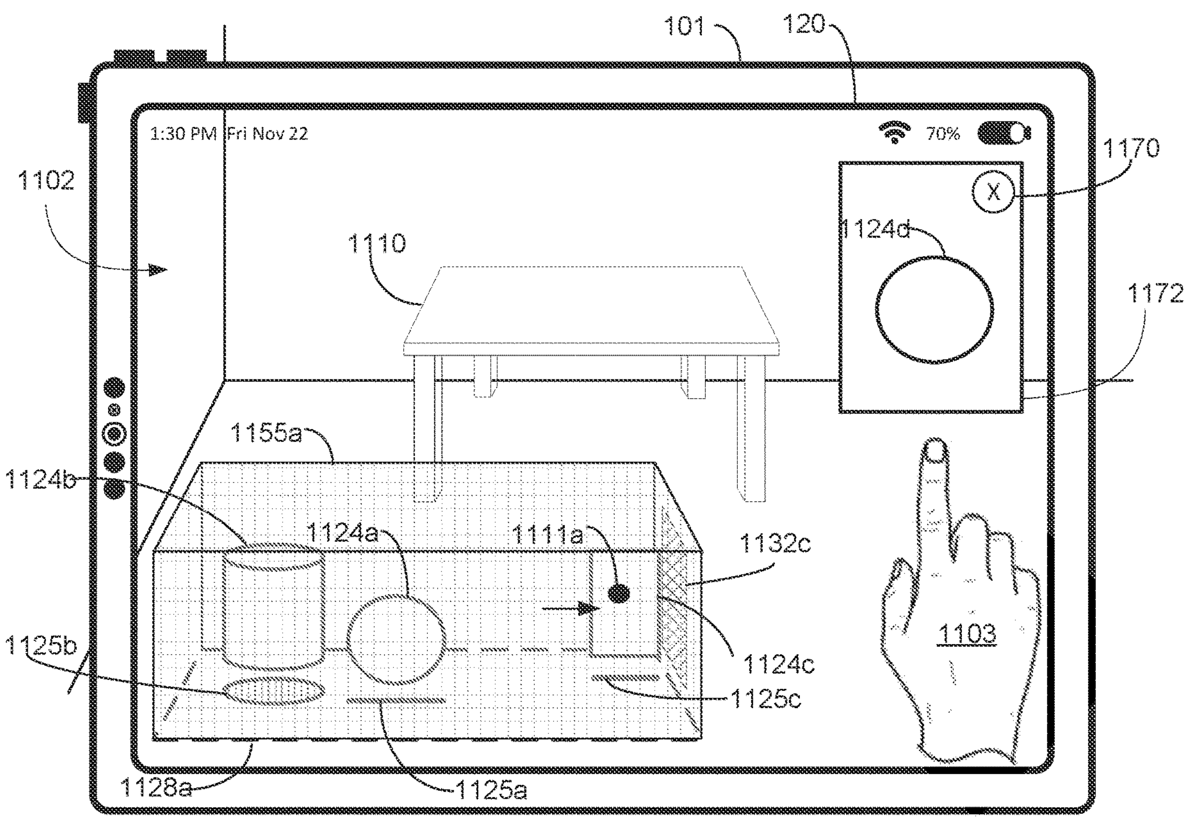
Figure 11D:
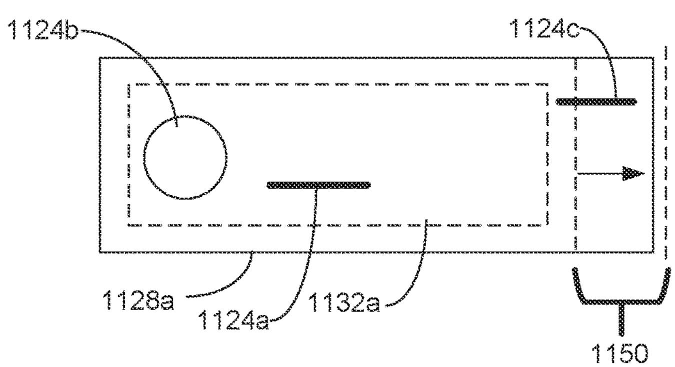

From FIG. 11C to FIG. 11D, computer system 101 detects movement of object 1124*c* back towards and past the original boundary of virtual surface 1128*a* (e.g., via a movement input from hand 1103 (e.g., air pinch and drag gesture) while attention 1111*a* is directed to object 1124*c*, as described with reference to method 1200). In response, as shown in FIG. 11D, computer system 101 moves object 1124*c* towards and past the original boundary of virtual surface 1128*a*. However, object 1124*c* remains within a threshold distance 1150 (e.g., 0.1, 0.5, 1, 3, 5, 10, 50, 100, 1000 or 10000 cm) of the original boundary of virtual surface 1128*a*. As a result, computer system 101 expands virtual surface 1128*a* in one or more dimensions such that object 1124*c* remains displayed on virtual surface 1128*a*, as shown in FIG. 11D. Additional details related to expanding virtual surface 1128*a* are described with reference to method 1200. Further, in FIG. 11D, because object 1124*c* is moved further towards and past the original boundary of virtual surface 1128*a*, computer system 101 increases the visual prominence of visual indication 1155*a* (e.g., by increasing the brightness, opacity, and/or color saturation, and/or by decreasing the blurriness of visual indication 1155*a*) and/or visual indication 1132*c* (e.g., by increasing the brightness, size, opacity, and/or color saturation, and/or by decreasing the blurriness of visual indication 1132*c*) in accordance with such movement. Such changes in visual prominence indicate that the movement of the object 1124*c* is progressing towards removal of object 1124*c* from virtual surface 1128*a*. The visual prominence of visual indications 1155*a* and/or 1132*c* in FIG. 11D are optionally greater than the visual prominence of visual indications 1155*a* and/or 1132*c* in FIGS. 11B and 11C, because object 1124*c* is further towards threshold 1150 in FIG. 11D than it is in FIGS. 11B and 11C.

Figure 11E:
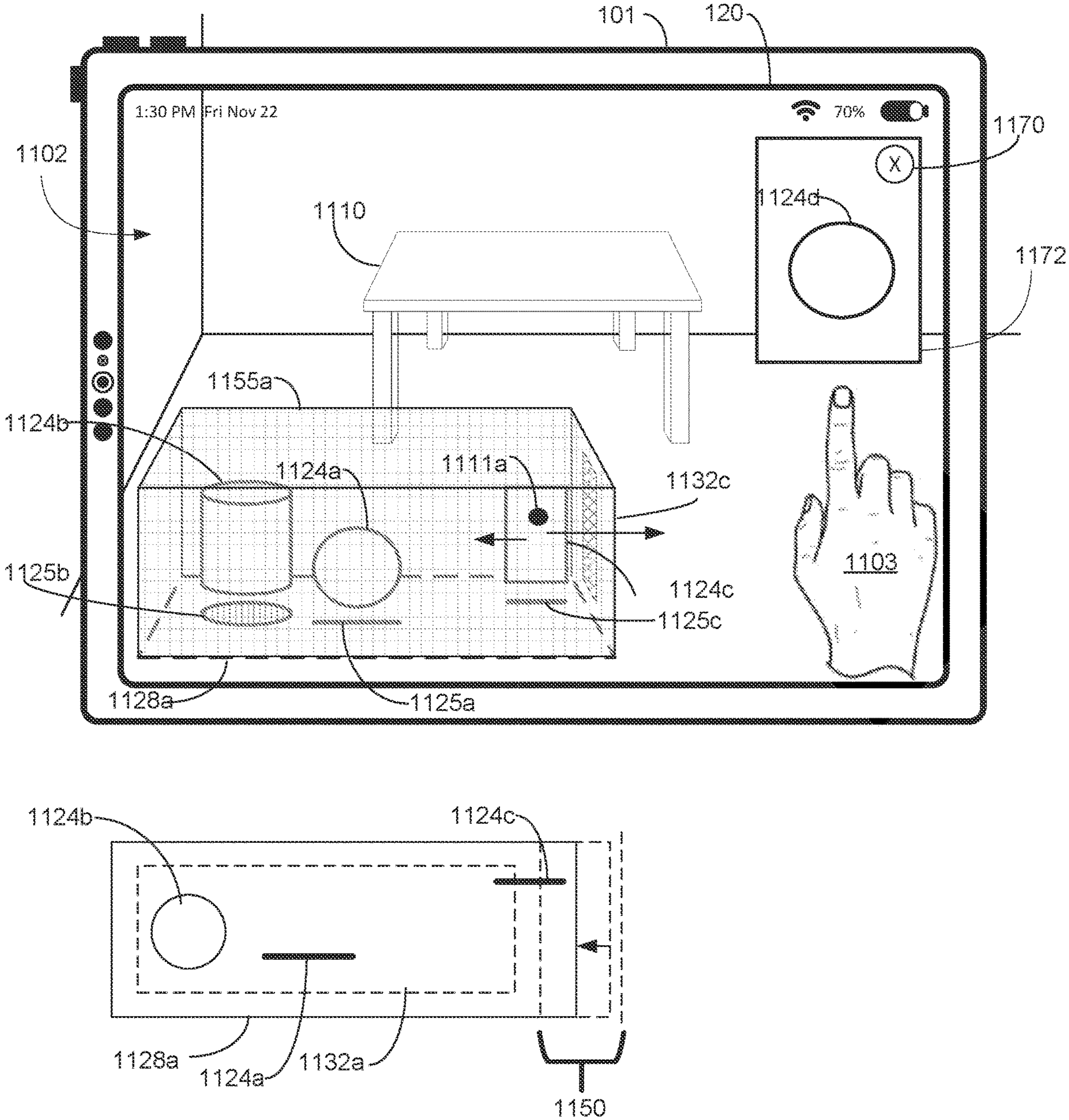

From FIG. 11D to FIG. 11E, computer system 101 detects movement of object 1124*c* away from threshold 1150 (e.g., via a movement input from hand 1103 (e.g., air pinch and drag gesture) while attention 1111*a* is directed to object 1124*c*, as described with reference to method 1200). In response, as shown in FIG. 11E, computer system 101 moves object 1124*c* away from threshold 1150 of virtual surface 1128*a* while remaining in region 1132*a* and/or outside of the original boundary of virtual surface 1128*a*. Further, in FIG. 11E, because the movement of object 1124*c* has moved object 1124*c* further from threshold 1150 of virtual surface 1128*a*, computer system 101 reduces the visual prominence of visual indication 1155*a* (e.g., by reducing the brightness, opacity, and/or color saturation, and/or by increasing the blurriness of visual indication 1155*a*) and/or visual indication 1132*c* (e.g., by reducing the brightness, size, opacity, and/or color saturation, and/or by increasing the blurriness of visual indication 1132*c*) in accordance with such movement. Computer system 101 also contracts virtual surface 1128*a* in one or more dimensions such that object 1124*c* remains displayed on virtual surface 1128*a* and such that the size of virtual surface 1128*a* is not larger than the area or volume occupied by objects 1124*a-c* at their locations in FIG. 11E. Additional details related to contracting virtual surface 1128*a* are described with reference to method 1200.

Figure 11F:
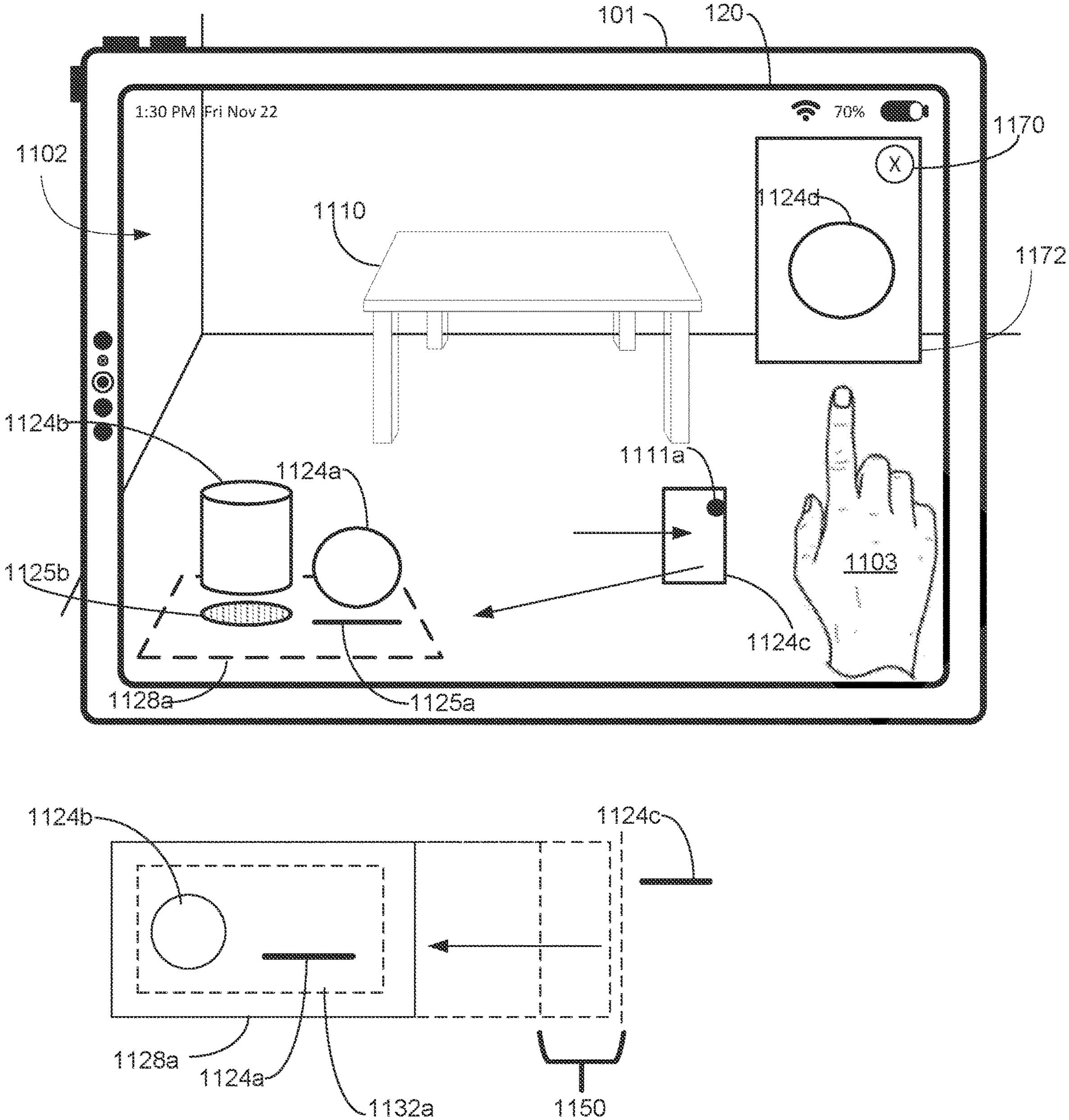

From FIG. 11E to FIG. 11F computer system 101 detects movement of object 1124*c* back towards and past threshold 1150 (e.g., via a movement input from hand 1103 (e.g., air pinch and drag gesture) while attention 1111*a* is directed to object 1124*c*, as described with reference to method 1200). In response, as shown in FIG. 11F, computer system 101 moves object 1124*c* towards and past the threshold 1150 of virtual surface 1128*a*, and removes object 1124*c* from virtual surface 1128*a* and moves object 1124*c* to empty space in the three-dimensional environment 1102 in accordance with the movement. As a result of the removal of object 1124*c* from virtual surface 1128*a*, computer system 101 also contracts virtual surface 1128*a* in one or more dimensions such that the size of virtual surface 1128*a* is not larger than the area or volume occupied by objects 1124*a-b*, which remain on virtual surface 1128*a*, at their locations in FIG. 11F. Additionally, because object 1124*c* moved beyond threshold 1150 of the original boundary of virtual surface 1128*a*, and is no longer within the threshold distance of the boundary (current or original) of virtual surface 1128*a*, computer system 101 ceases display of visual indications 1155*a* and 1132*c*, as shown in FIG. 11F.

FIG. 11F1 illustrates similar and/or the same concepts as those shown in FIG. 11D (with many of the same reference numbers). It is understood that unless indicated below, elements shown in FIG. 11F1 that have the same reference numbers as elements shown in FIGS. 11A-11H have one or more or all of the same characteristics. FIG. 11F1 includes computer system 101, which includes (or is the same as) display generation component 120. In some embodiments, computer system 101 and display generation component 120 have one or more of the characteristics of computer system 101 shown in FIGS. 11A-11H and display generation component 120 shown in FIGS. 1 and 3, respectively, and in some embodiments, computer system 101 and display generation component 120 shown in FIGS. 11A-11H have one or more of the characteristics of computer system 101 and display generation component 120 shown in FIG. 11F1.

In FIG. 11F1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 11A-11H.

In FIG. 11F1, display generation component 120 is illustrated as displaying content that optionally corresponds to the content that is described as being displayed and/or visible via display generation component 120 with reference to FIGS. 11A-11H. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 11F1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 11F1. Because display generation component 120 is optionally a head-mounted device, the field of view of display generation component 120 is optionally the same as or similar to the field of view of the user.

In FIG. 11F1, the user is depicted as performing an air pinch gesture (e.g., with hand 1103) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 11A-11H.

In some embodiments, computer system 101 responds to user inputs as described with reference to FIGS. 11A-11H.

In the example of FIG. 11F1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 11A-11H and/or described with reference to the corresponding method(s) are optionally implemented on computer system 101 and display generation unit 120 in a manner similar or analogous to that shown in FIG. 11F1.

Figure 11G:
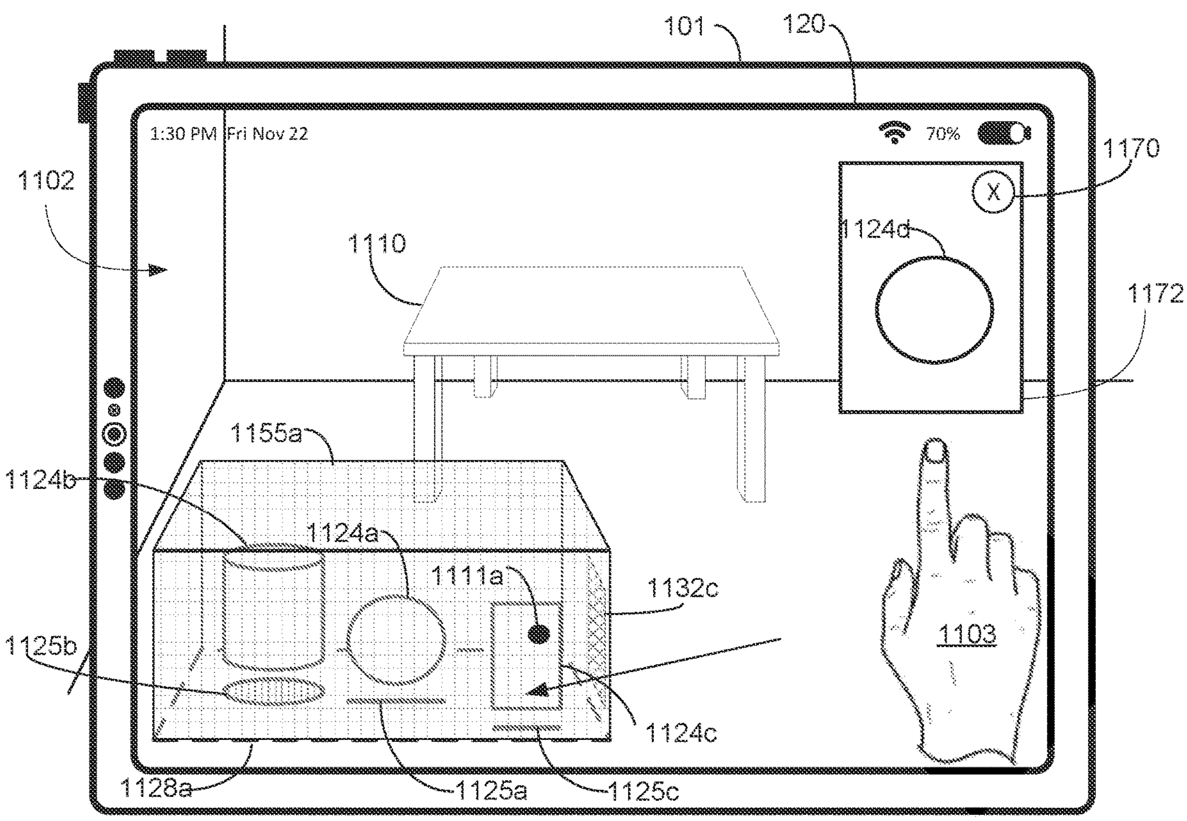
Figure 11G:
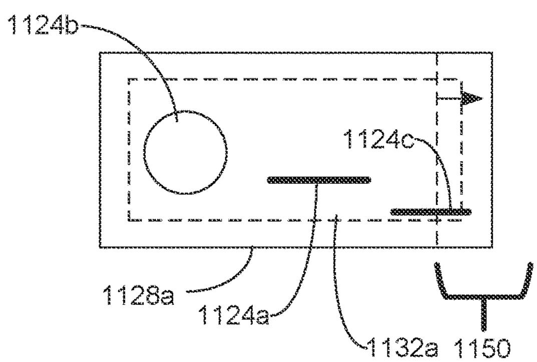

From FIG. 11F to FIG. 11G computer system 101 detects movement of object 1124*c* back towards virtual surface 1128*a* and to within threshold 1150 of the boundary of virtual surface 1128*a*, but outside of the boundary of virtual surface 1128*a* (e.g., via a movement input from hand 1103 (e.g., air pinch and drag gesture) while attention 1111*a* is directed to object 1124*c*, as described with reference to method 1200). In response, as shown in FIG. 11G, computer system 101 moves object 1124*c* towards virtual surface 1128*a*, and expands virtual surface 1128*a* in one or more dimensions such that object 1124*c* is displayed on virtual surface 1128*a*, but object 1124*c* is at least partially within region 1132*a*, as shown in FIG. 11G. Additional details related to expanding virtual surface 1128*a* are described with reference to method 1200. Further, computer system 101 redisplays visual indications 1155*a* and 1132*c* with visual characteristics based on the distance of object 1124*c* from the boundary of virtual surface 1128*a* and/or threshold 1150, as previously described.

From FIG. 11F to FIG. 11G, computer system 101 detects an end of the movement input(s) directed to object 1124*c* (e.g., a release of the air pinch hand shape in which the index finger and thumb of hand 1103 move apart and are no longer touching, or a breaking of the contact of the finger on a touch-sensitive surface). In response, computer system 101 expands virtual surface 1128*a* such that object 1124*c* remains displayed on virtual surface 1128*a* without being within region 1132*a*, and such that the size of virtual surface 1128*a* is not larger than the area or volume occupied by objects 1124*a-c* at their locations in FIG. 11H, and displays object 1124*c* on virtual surface 1128*a*. Computer system 101 also ceases display of visual indications 1155*a* and 1132*c* in FIG. 11H.

FIGS. 12A-12F is a flowchart illustrating a method 1200 of displaying feedback related to removal and/or addition of objects to virtual surfaces in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at a computer system in communication with a display generation component and one or more input devices. In some embodiments, the computer system has one or more of the characteristics of the computer system of methods 800 and/or 1000. In some embodiments, the display generation component has one or more of the characteristics of the display generation component of methods 800 and/or 1000. In some embodiments, the one or more input devices have one or more of the characteristics of the one or more input devices of methods 800 and/or 1000.

In some embodiments, while displaying, via the display generation component, a first virtual object and a second virtual object with a respective spatial relationship relative to a first virtual surface, such as object 1124*c* and virtual surface 1128*a* in FIG. 11A (e.g., the first virtual object is visually represented as resting on the first virtual surface and/or the second virtual object is visually represented as resting on the first virtual surface, such as described with reference to methods 800 and/or 1000), (In some embodiments, the first (optionally three-dimensional) virtual object and the second (optionally three-dimensional) virtual object are part of a collection of objects collected and/or owned by a user. In some embodiments, the first virtual surface is a virtual surface capable of holding objects placed by the user, such as described with reference to methods 800 and/or 1000. In some embodiments, the first and/or second virtual objects have one or more of the characteristics of the objects described with reference to methods 800 and/or 1000. In some embodiments, the first and second virtual objects are displayed within a three-dimensional environment having one or more of the characteristics of the three-dimensional environments of methods 800 and/or 1000. In some embodiments, the first virtual object or the second virtual object, but not both, have the respective spatial relationship relative to the first virtual surface (e.g., the first virtual surface includes the first virtual object but not the second, or includes the second but not the first) wherein the first virtual object is positioned at a first location with the respective spatial relationship relative to the first virtual surface, and the second virtual object is positioned at a second location with the respective spatial relationship relative to the first virtual surface, such as objects 1124*a, b, c* relative to virtual surface 1128*a* in FIG. 11A (In some embodiments, the first virtual object is positioned at the first location by a user in response to movement that moves the first virtual object to the first location. Likewise, in some embodiments, the second virtual object is positioned at the second location by the user in response to input that moves the second virtual object to the second location. As described below and/or with reference to methods 800 and/or 1000, such movement of the virtual objects is optionally accomplished by air pinching a hand of the user, dragging the hand of the user in the pinch hand shape, and releasing the pinch by the hand of the user (e.g., the virtual object(s) are moved with a magnitude and/or in a direction based on a magnitude and/or direction of the movement of the hand of the user). In some embodiments, the first location relative to the first virtual surface is a location that is near the edge and/or corner of the first virtual surface. In some embodiments, the first location relative to the first virtual surface is a location that is in the center of the first virtual surface. In some embodiments, the second location relative to the first virtual surface is a location that is near the edge and/or corner of the first virtual surface. In some embodiments, the second location relative to the first virtual surface is a location that is in the center of the first virtual surface.) the computer system detects (1202*a*), via the one or more input devices, a first input directed to the second virtual object, wherein the first input corresponds to a request to move the second virtual object away from the second location relative to the first surface to a respective location in the three-dimensional environment, such as the input directed to object 1124*c* from FIG. 11A to 11B. In some embodiments, the first input includes a user input directed to the second virtual object, such as an air pinch gesture performed by a hand of the user, followed by movement of the hand of the user while in the pinch hand shape. In some embodiments, the direction and/or magnitude of the movement of the second virtual object away from the second location relative to the first virtual surface corresponds to the direction and/or magnitude of the movement included in the first input. In some embodiments, the first input includes a touch input on a touch screen, such as a tap and hold input from a finger of a user followed by a dragging of the finger. In some embodiments, the first input includes a mouse click and hold, followed by movement of the mouse while the click is held. In some embodiments, the first input has one or more of the characteristics of inputs for moving virtual objects described with reference to methods 800 and/or 1000.

In some embodiments, in response to detecting the first input directed to the second virtual object (1202*b*), the computer system moves (1202*c*) the second virtual object to the respective location in the three-dimensional environment, such as the movement of object 1124*c* from FIG. 11A to 11B, and in accordance with a determination that the respective location is a first distance from an edge of the first virtual surface, the computer system displays (1202*d*) one or more visual effects associated with the first virtual surface with a first visual prominence, such as effects 1155*a* and/or 1132*c* in FIG. 11C. In some embodiments, the displaying of the one or more visual effects with the first visual prominence is in accordance with a determination that the respective location is within a region of the first virtual surface (e.g., the first input has not moved the second virtual object outside of an area and/or volume of the first virtual surface. In some embodiments, the volume corresponding to the first virtual surface is a rectangular prism in which one side coincides with the surface of the first virtual surface, and the opposite side extends away from the first virtual surface. In some embodiments, the area of the first virtual surface corresponds to the surface area of the first virtual surface.) and is within a threshold distance (e.g., 0.1, 0.2 cm, 2 cm, 5 cm, 10 cm, or 40 cm) of an edge of the first virtual surface. In some embodiments, the respective location is within a threshold distance of the edge of the first virtual surface if the second three-dimensional object is positioned within the threshold distance of a vertical projection of the edge of the first virtual surface and/or a diagonal distance between the second three-dimensional and the edge of the first virtual surface is less than the threshold distance. In some embodiments, the one or more visual effects decrease in visual prominence as the distance of the second virtual object from the edge of the first virtual surface increases. In some embodiments, the visual effect is a glow that surrounds the virtual object. In some embodiments, the one or more visual effects have a first level of size, opacity, brightness and/or color saturation relative to the first virtual surface.

In some embodiments, in accordance with a determination that the respective location is a second distance, less than the first distance, from the edge of the first virtual surface, the computer system displays (1202*e*) the one or more visual effects associated with the first virtual surface with a second visual prominence greater than the first visual prominence, such as the prominence of effects 1155*a* and/or 1132*c* in FIG. 11B. In some embodiments, the one or more visual effects increase in visual prominence as the distance of the second virtual object from the edge of the first virtual surface decreases. For example, the second virtual object will glow brighter at the second distance than at the first distance from the edge. In some embodiments, the one or more visual effects have a second level of size, opacity, brightness and/or color saturation, greater than the first level.

In some embodiments, in accordance with a determination that the respective location is not within the threshold distance of the edge of the first virtual surface, the computer system forgoes display (12020 of the one or more visual effects associated with the first virtual surface, such as shown in FIG. 11A. For example, if the respective location is within the region of the first virtual surface, without being within the threshold distance of the edge of the first virtual surface (or any edge of the first virtual surface), the one or more visual effects are optionally not displayed. Displaying a visual effect that increases in magnitude as the virtual object approaches the edge of the virtual surface provides feedback that the virtual object is approaching the edge of the first virtual surface during placement such that the user can alter the placement location if desired, thus avoiding errors in interaction between the user and the computer system.

In some embodiments, while displaying the one or more visual effects associated with the first virtual surface with the first visual prominence and the second virtual object at the respective location, the computer system detects (1204*a*), via the one or more inputs devices, a second input directed to the second virtual object, wherein the second input corresponds to a request to move the second virtual object away from the edge of the first virtual surface, such as the input directed to object 1124*c* from FIG. 11B to 11C. In some embodiments, the second input has one or more of the characteristics of the first input described with reference to step(s) 1202.

In some embodiments, in response to detecting the second input directed to the second virtual object (1204*b*), the computer system moves (1204*c*) the second virtual object to a second respective location at which the second virtual object has the respective spatial relationship relative to the first virtual surface, such as the movement of object 1124*c* in FIG. 11C (e.g., the second respective position is still on the first virtual surface, for example more towards the center of the first virtual surface than the respective location). In some embodiments, the computer system reduces (1204*d*) a visual prominence of (e.g., reducing a brightness, color saturation, opacity and/or size of) the one or more visual effects associated with the first virtual surface, such as the reduced prominence of effects 1155*a* and/or 1132*c* in FIG. 11C. In some embodiments, the visual prominence of the one or more visual effects is decreased more the further away the second virtual object is moved from the edge of the first virtual surface. In some embodiments, if the second virtual object is positioned more than a threshold distance (e.g., 0.01, 0.05, 0.1, 0.3, 0.5, 1, 3, 5, 10, 50, 100 or 500 cm) from the edge of the first virtual surface, the one or more visual effects are ceased to be displayed. At least partially reversing the visual effects as the virtual object moves away from the edge of the virtual surface provides feedback that the virtual object is moving away from the edge of the first virtual surface during placement such that the user can alter the placement location if desired, thus avoiding errors in interaction between the user and the computer system.

Figure 11H:
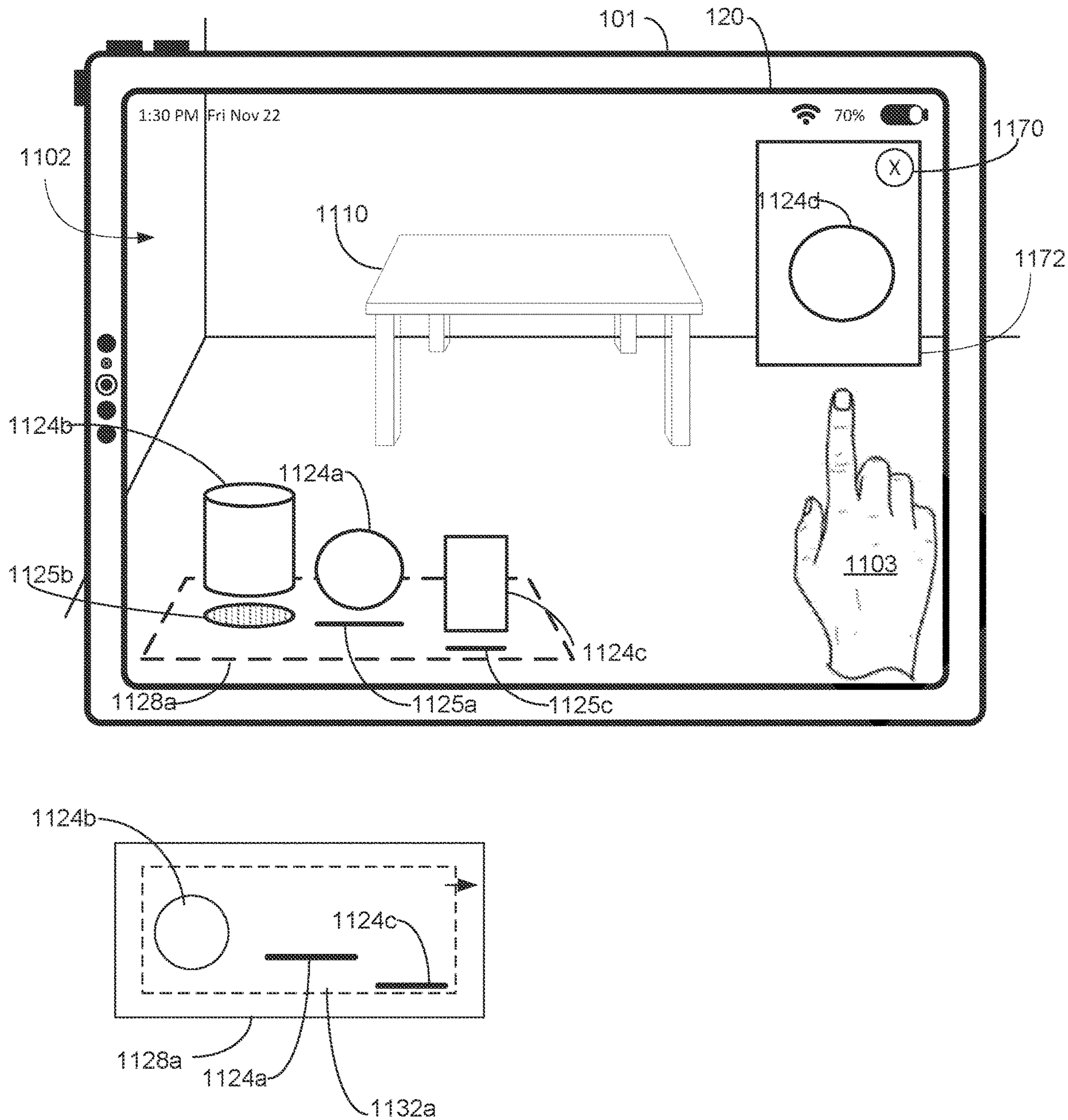
Figure 12A:
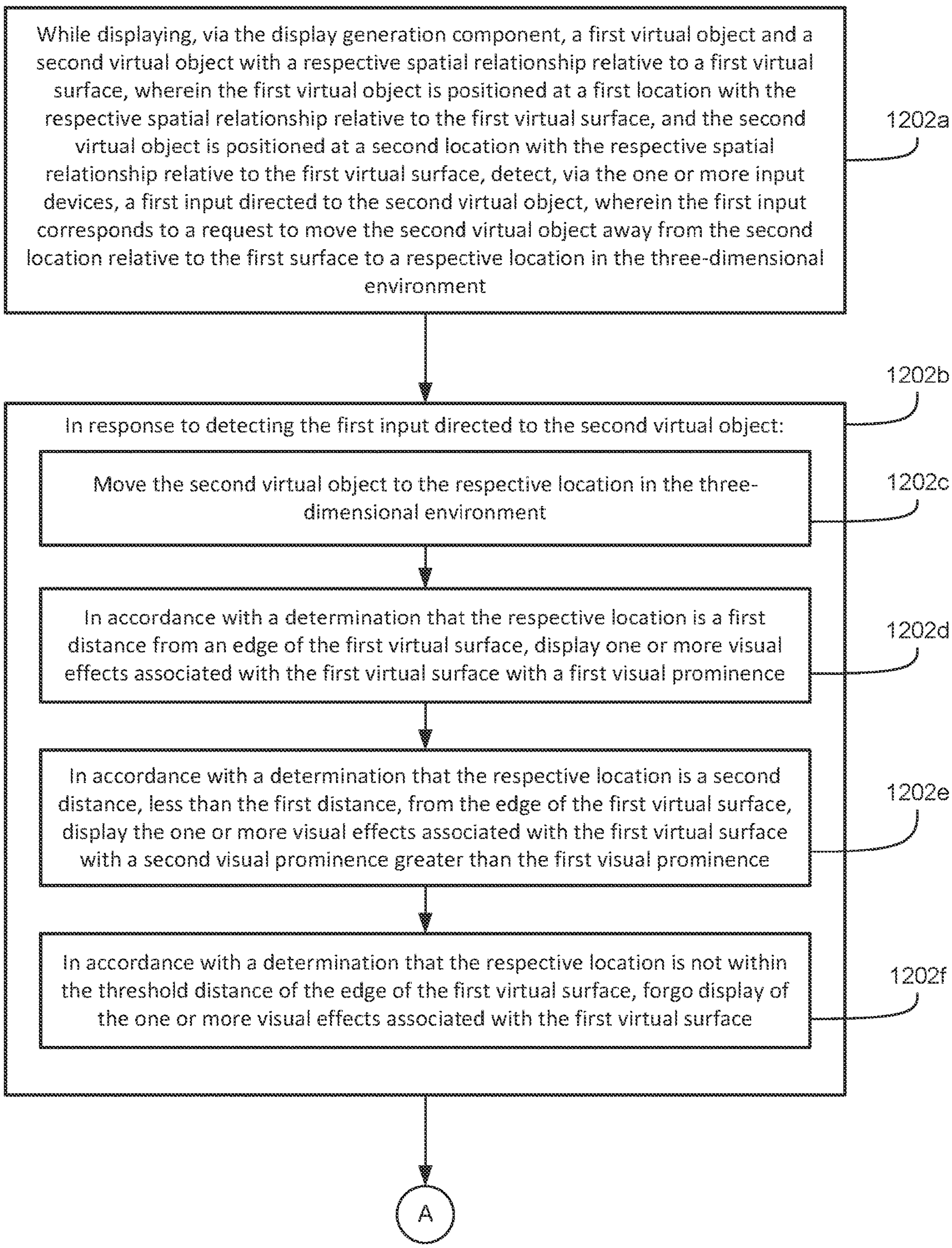
FIGS. 12A-12F is a flowchart illustrating a method of displaying feedback related to removal and/or addition of objects to virtual surfaces in accordance with some embodiments.
Figure 12B:
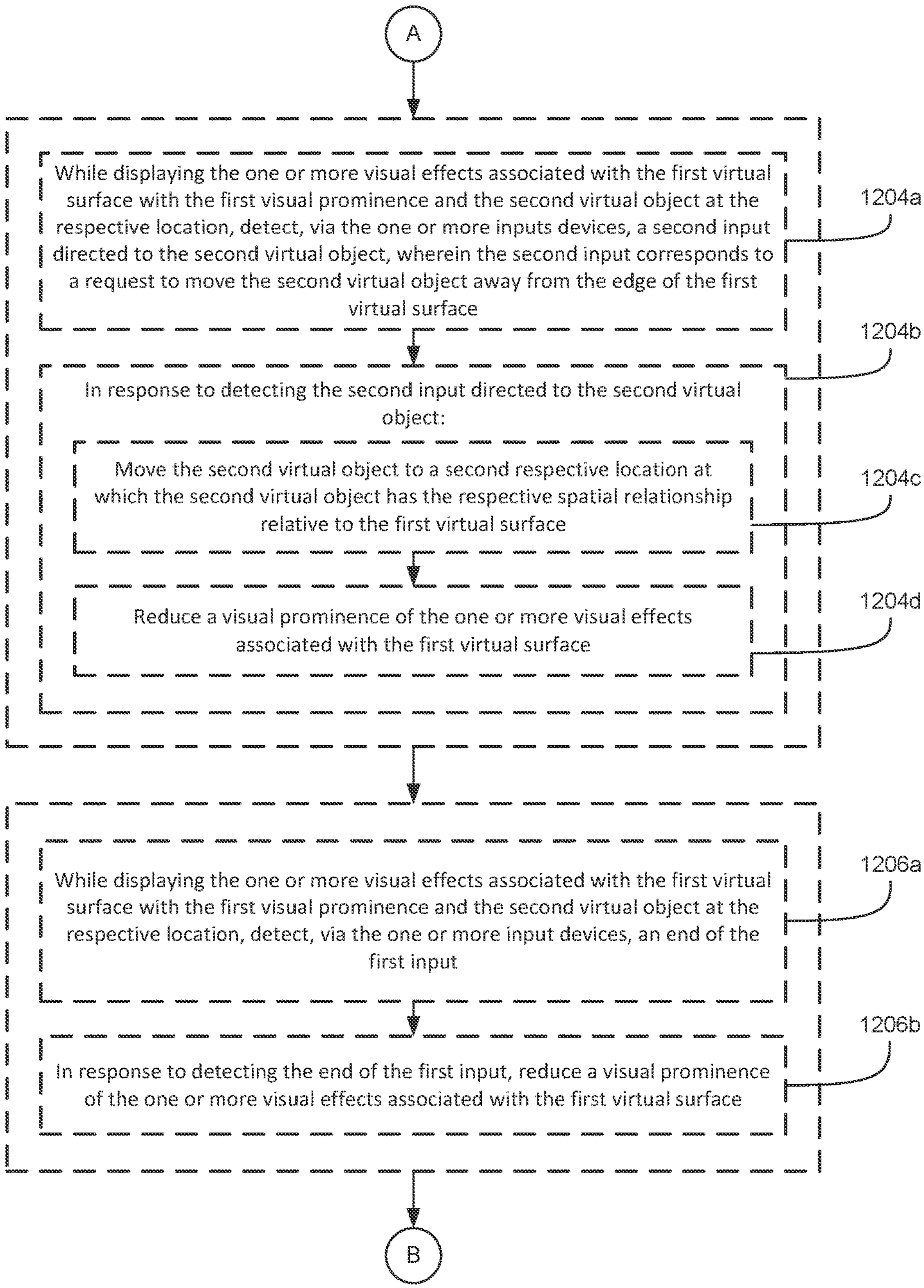
Figure 12C:
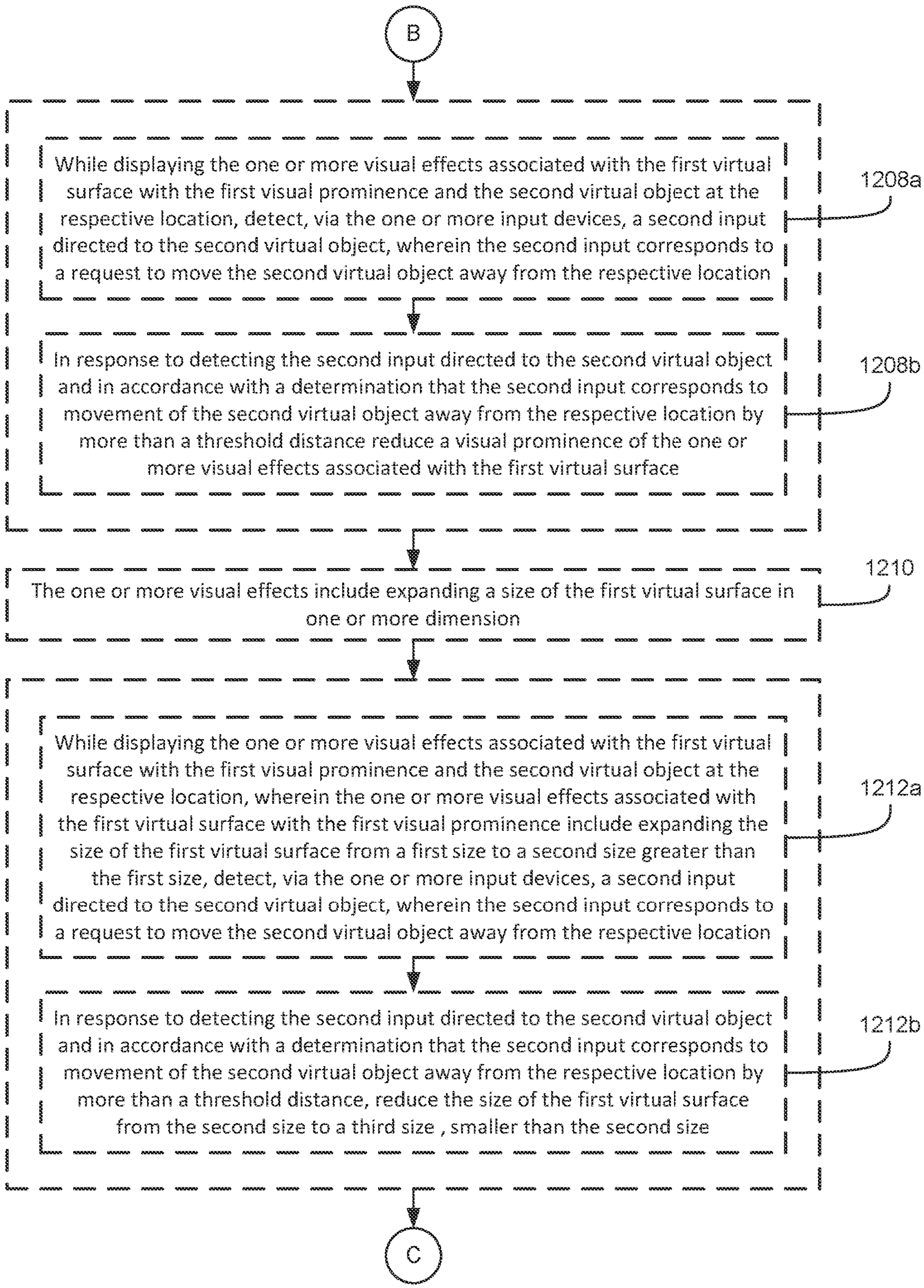
Figure 12D:
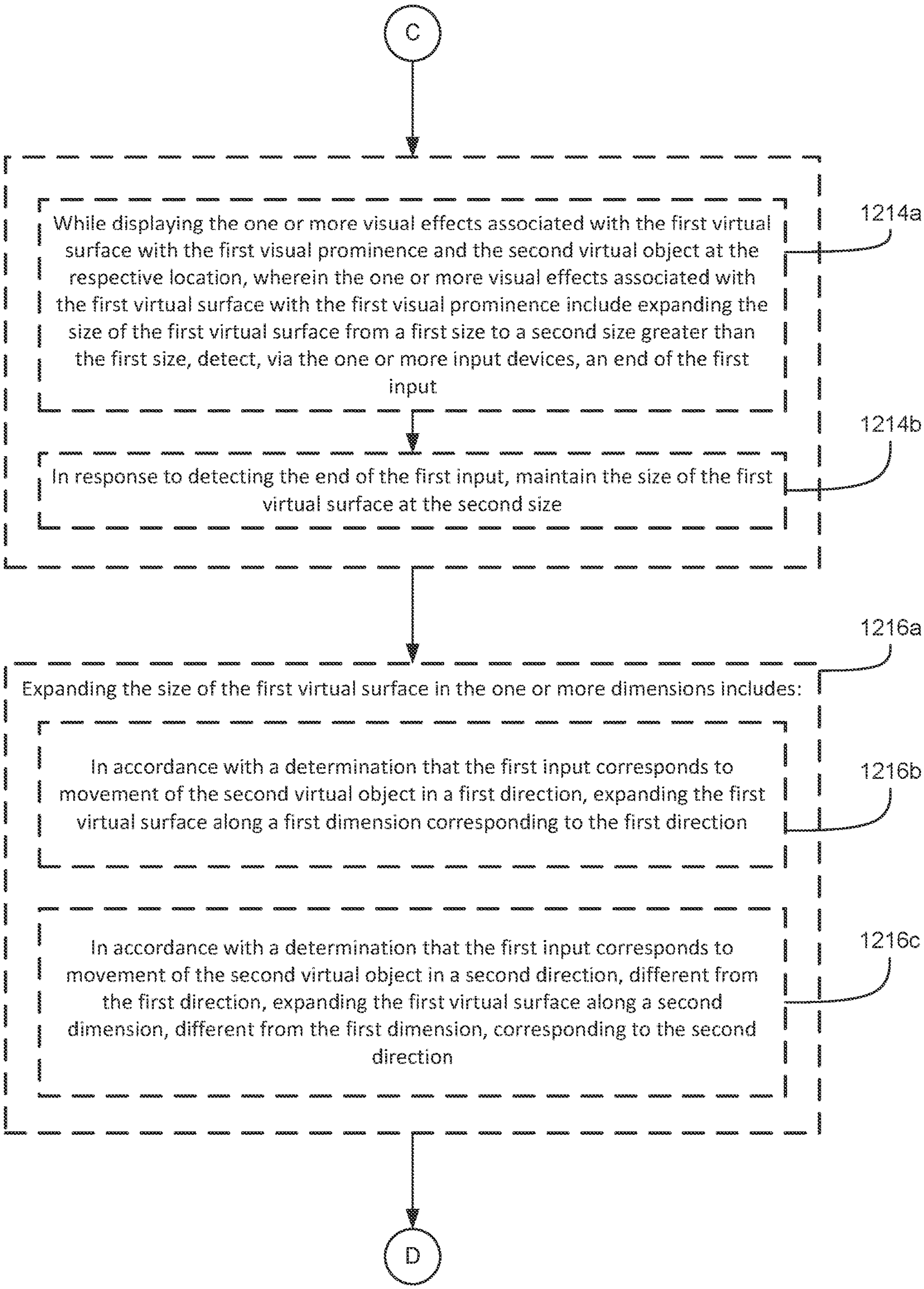
Figure 12E:
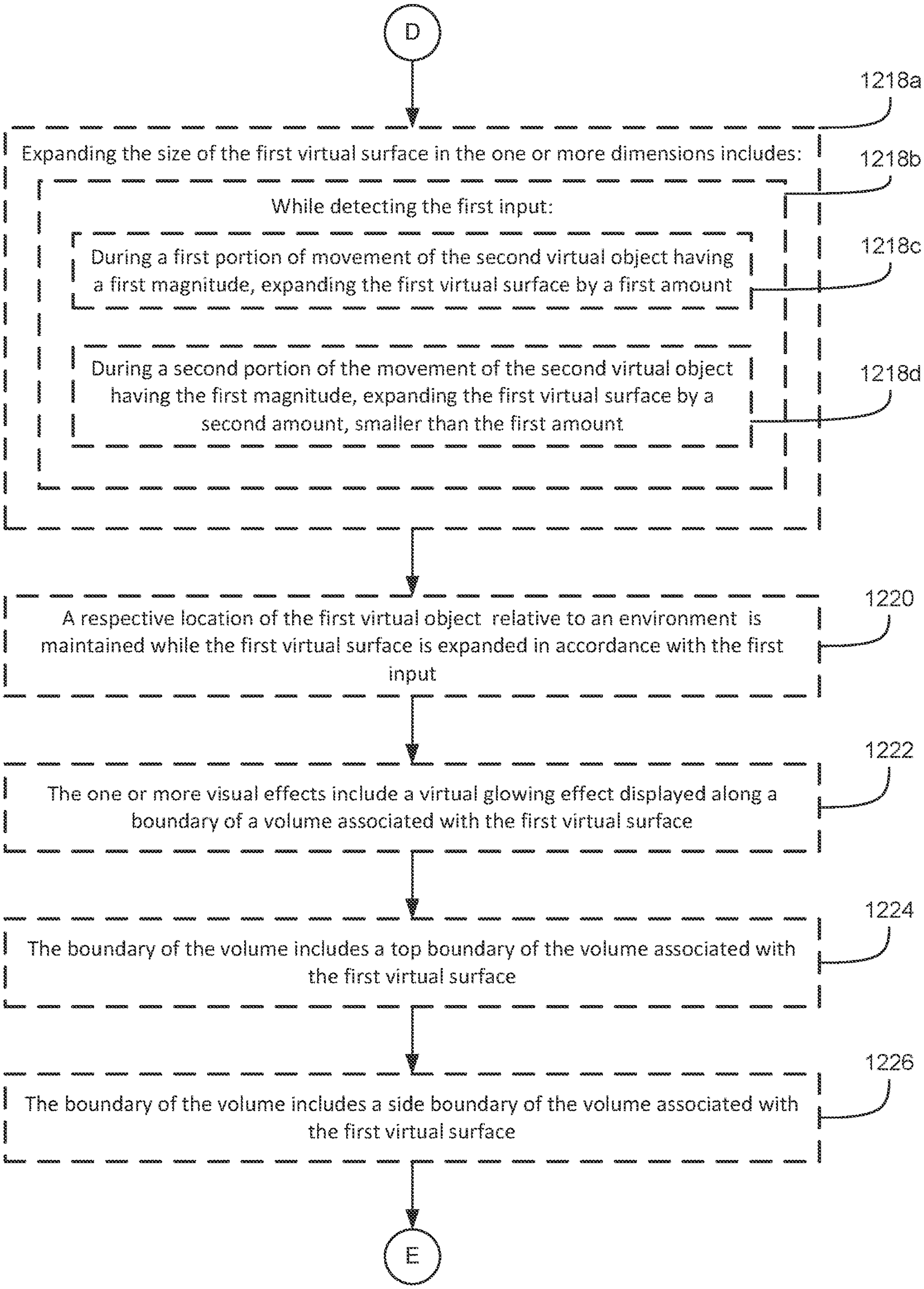
Figure 12F:
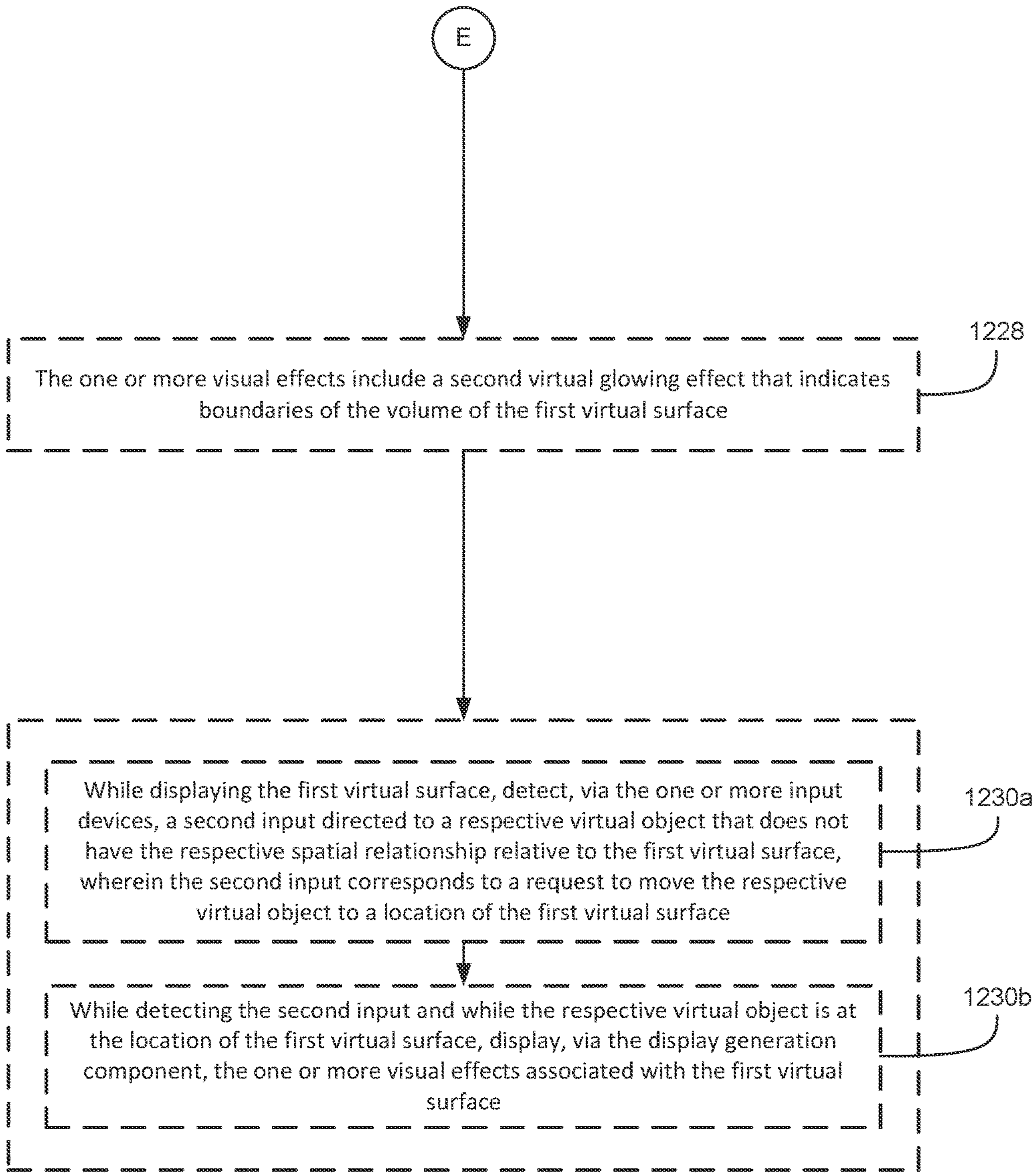

In some embodiments, while displaying the one or more visual effects associated with the first virtual surface with the first visual prominence and the second virtual object at the respective location, the computer system detects (1206*a*), via the one or more input devices, an end of the first input, such as the end of the input directed to object 1124*c* from FIG. 11G to 11H. For example, in the case that the first input includes an air pinch gesture directed to the first virtual object, the end of the first input optionally corresponds to the tips of the index finger and thumbs moving away from each other and no longer touching. In the case that the first input includes detecting a contact on a touch-sensitive surface, the end of the first input optionally corresponds to the contact no longer being detected on the touch-sensitive surface.

In some embodiments, in response to detecting the end of the first input, the computer system reduces (1206*b*) a visual prominence of the one or more visual effects associated with the first virtual surface (e.g., as described with reference to step(s) 1204), such as the reduction of prominence of effects 1155*a* and/or 1132*c* in FIG. 11H. In some embodiments, the one or more visual effects are no longer displayed in response to detecting the end of the first input. At least partially reversing the visual effects when the first input ends reduces clutter in the user interface when object movement is no longer occurring, thus avoiding errors in interaction between the user and the computer system.

In some embodiments, while displaying the one or more visual effects associated with the first virtual surface with the first visual prominence and the second virtual object at the respective location, the computer system detects (1208*a*), via the one or more input devices, a second input directed to the second virtual object, wherein the second input corresponds to a request to move the second virtual object away from the respective location, such as the input directed to object 1124*c* from FIGS. 11E to 11F and 11F1. In some embodiments, the second input has one or more of the characteristics of the first input described with reference to step(s) 1202. In some embodiments, the second input is a continuation of the first input after the first input moved the second virtual object to the respective location.

In some embodiments, in response to detecting the second input directed to the second virtual object and in accordance with a determination that the second input corresponds to movement of the second virtual object away from the respective location (and/or the original location of the second virtual object when the beginning of the first input was detected) by more than a threshold distance (e.g., 0.05, 0.1, 0.3, 0.5, 1, 3, 5, 10, 50, 100, 500 and/or 1000 cm) the computer system reduces (1208*b*) a visual prominence of the one or more visual effects associated with the first virtual surface (e.g., as described with reference to step(s) 1204), such as shown with respect to visual indications 1155*a* and/or 1132*c* ceasing being displayed from FIGS. 11E to 11F and 11F1. In some embodiments, moving the second virtual object away from the respective location by more than the threshold distance corresponds to an input for removing the second virtual object from the first virtual surface, such as described with reference to method 1000. In some embodiments, the one or more visual effects are no longer displayed in response to detecting the second input. At least partially reversing the visual effects when the second input corresponds to moving the second virtual object greater than a threshold distance reduces clutter in the user interface when object movement no longer implicates the boundaries of the first virtual surface, thus avoiding errors in interaction between the user and the computer system.

In some embodiments, the one or more visual effects include expanding a size of the first virtual surface in one or more dimensions (1210), such as from FIG. 11C to 11D. In some embodiments, the size of the first virtual surface is expanded to accommodate the second virtual object at the respective location (e.g., such that the second virtual object has the respective spatial relationship relative to the expanded first virtual surface). In some embodiments, if the first virtual surface were not expanded in response to detecting the first input, the second virtual object at the respective location would optionally not have the respective spatial relationship relative to the first virtual surface. Expanding a size of the first virtual surface in response to the first input allows for more flexible placement of virtual objects relative to the first virtual surface while reducing unintentional removal of objects from the first virtual surface, thus avoiding errors in interaction between the user and the computer system.

In some embodiments, while displaying the one or more visual effects associated with the first virtual surface with the first visual prominence and the second virtual object at the respective location, wherein the one or more visual effects associated with the first virtual surface with the first visual prominence include expanding the size of the first virtual surface from a first size to a second size greater than the first size (e.g., such as described with reference to step(s) 1210), the computer system detects (1212*a*), via the one or more input devices, a second input directed to the second virtual object, wherein the second input corresponds to a request to move the second virtual object away from the respective location, such as the input directed to object 1124*c* from FIGS. 11E to 11F and 11F1. In some embodiments, the second input has one or more of the characteristics of the first input described with reference to step(s) 1202. In some embodiments, the second input is a continuation of the first input after the first input moved the second virtual object to the respective location.

In some embodiments, in response to detecting the second input directed to the second virtual object and in accordance with a determination that the second input corresponds to movement of the second virtual object away from the respective location by more than a threshold distance (e.g., such as described with reference to step(s) 1208), the computer system reduces (1212*b*) the size of the first virtual surface from the second size to a third size (optionally the same as the first size), smaller than the second size, such as the reduction of the size of virtual surface 1128*a* from FIGS. 11E to 11F and 11F1. In some embodiments, the third size corresponds to a size at which the virtual object that remain included in the first virtual surface (e.g., after the removal of the second virtual object) have the respective spatial relationship relative to the first virtual surface, such as described with reference to method 1000. In some embodiments, the third size is smaller than the first size (e.g., because the first virtual surface no longer needs to be the first size and the second virtual object has been removed from the first virtual surface. At least partially reducing the size of the first virtual surface when the second input corresponds to moving the second virtual object greater than a threshold distance reduces clutter in the user interface when object movement no longer implicates the boundaries of the first virtual surface, thus avoiding errors in interaction between the user and the computer system.

In some embodiments, while displaying the one or more visual effects associated with the first virtual surface with the first visual prominence and the second virtual object at the respective location, wherein the one or more visual effects associated with the first virtual surface with the first visual prominence include expanding the size of the first virtual surface from a first size to a second size greater than the first size (e.g., such as described with reference to step(s) 1210-1212), the computer system detects (1214*a*), via the one or more input devices, an end of the first input (e.g., as described with reference to step(s) 1206), such as if the end of the input directed to object 1124*c* ended in FIG. 11B. In some embodiments, in response to detecting the end of the first input, the computer system maintains (1214*b*) the size of the first virtual surface at the second size, such as if the size of virtual surface 1128*a* remained the same in FIG. 11B in response to detecting an end of the input directed to object 1124*c*. For example, because the second virtual object is dropped at the respective location, the first virtual surface remains the second size so that the second virtual object continues to have the respective spatial relationship relative to the first virtual surface. Maintaining the expanded size of the first virtual surface when the second virtual object is dropped at its current location ensures that the second virtual object maintains its respective spatial relationship with the first virtual surface, thus avoiding errors in interaction between the user and the computer system.

In some embodiments, expanding the size of the first virtual surface in the one or more dimensions includes (1216*a*), in accordance with a determination that the first input corresponds to movement of the second virtual object in a first direction (e.g., movement towards a right-side boundary of the first virtual surface, or towards a left-side boundary of the first virtual surface), expanding the first virtual surface along a first dimension corresponding to the first direction (1216*b*), such as expanding virtual surface 1128*a* rightward from FIG. 11C to 11D based on the rightward movement of object 1124*c* (e.g., expanding the right-side boundary of the first virtual surface, or expanding the left-side boundary of the first virtual surface), and in accordance with a determination that the first input corresponds to movement of the second virtual object in a second direction, different from the first direction (e.g., movement towards a front-side boundary of the first virtual surface, or towards a back-side boundary of the first virtual surface), expanding the first virtual surface along a second dimension, different from the first dimension, corresponding to the second direction (1216*c*), such as if movement of object 1124*c* from FIG. 11C to 11D were in a different direction and virtual surface 1128*a* were expanded in that direction (e.g., expanding the front-side boundary of the first virtual surface, or expanding the back-side boundary of the first virtual surface). In some embodiments, the greater the magnitude of movement of the second virtual object in a particular direction, the greater the expansion of the first virtual surface in that direction. Expanding the first virtual surface in a direction corresponding to the direction of the movement of the second virtual object avoids cluttering other parts of the user interface that are not in the direction of the movement of the second object, and also reduces the likelihood of unintentional removal of the second virtual object from the first virtual surface, thus avoiding errors in interaction between the user and the computer system.

In some embodiments, expanding the size of the first virtual surface in the one or more dimensions includes (1218*a*), while detecting the first input (1218*b*) (e.g., before detecting an end of the first input, as described with reference to step(s) 1206), during a first portion of movement of the second virtual object having a first magnitude, expanding the first virtual surface by a first amount (1218*c*) (e.g., in the direction of the movement of the second virtual object), such as the expansion of virtual surface 1128*a* from FIG. 11C to 11D, and during a second portion of the movement of the second virtual object having the first magnitude (e.g., after the first portion of the movement of the second virtual object, and in the same direction as the first portion of the movement of the second virtual object), expanding the first virtual surface by a second amount, smaller than the first amount (1218*d*) (e.g., in the direction of the movement of the second virtual object), such as further expansion of virtual surface 1128*a* after FIG. 11D in response to further rightward movement of object 1124*c*. Thus, in some embodiments, the amount of expansion of the first virtual surface for a given amount of movement of the second virtual object gets smaller as the total amount of movement towards and/or through an edge or boundary of the first virtual surface increases. Expanding the first virtual by different amounts for different portions of the movement of the second virtual object provides feedback about the amount of movement of the second virtual object, and also reduces the likelihood of unintentional removal of the second virtual object from the first virtual surface, thus avoiding errors in interaction between the user and the computer system.

In some embodiments, a respective location of the first virtual object (e.g., the one or more virtual objects that have the respective spatial relationship with the first virtual surface, other than the second virtual object) relative to an environment (e.g., the-dimensional environment in which the first virtual surface is displayed) is maintained while the first virtual surface is expanded in accordance with the first input (1220), such as the placements of objects 1124*b* and 1124*a* relative to environment 1102 not changing from FIG. 11C to 11D. In some embodiments, the other virtual object (s) that are located on the first virtual surface remain at fixed locations and/or orientations relative to the environment when the first virtual surface is resized. This maintenance of fixed locations and/or orientations relative to the environment optionally is true irrespective of the direction in which the first virtual surface is resized. In some embodiments, the relative location of the first virtual object and/or other virtual objects relative to the first virtual surface changes as the first virtual surface is resized, and optionally changes differently depending on how much and/or in what direction(s) the first virtual surface is resized. Maintaining the positions of virtual objects other than the second virtual object relative to the environment ensures consistent display of the environment, thus avoiding errors in interaction between the user and the computer system.

In some embodiments, the one or more visual effects include a virtual glowing effect displayed along a boundary of a volume associated with the first virtual surface (1222), such as effect 1132*c* in FIG. 11D. In some embodiments, the boundary and/or the volume have one or more of the characteristics described with reference to methods 800 and/or 1000. In some embodiments, the virtual glowing effect makes a portion or all of the boundary of the volume appear glowing (e.g., visually distinguished) from other parts of the boundary of the volume and/or environment in which the first virtual surface is displayed. In some embodiments, the virtual glowing effect is displayed as if it were emanating from the second virtual object and landing on or otherwise intersecting with the boundary of the volume. Therefore, in some embodiments, the virtual glowing effect is displayed in a portion of the boundary of the volume that is closer (optionally closest) to the second virtual object, but is not displayed in portions of the boundary of the volume that are further from the second virtual object. Displaying a virtual glowing effect along a boundary of the volume provides feedback about the bounds of the volume of the first virtual surface, facilitating proper object placement within the first virtual surface and avoiding unintentional removal of objects from the first virtual surface, thus avoiding errors in interaction between the user and the computer system.

In some embodiments, the boundary of the volume includes a top boundary of the volume associated with the first virtual surface (1224) (e.g., the boundary or boundaries of the volume that are further or furthest from the virtual or physical floor of the environment in which the first virtual surface is displayed). Displaying a virtual glowing effect along a top boundary of the volume provides feedback about the upper bounds of the volume of the first virtual surface, facilitating proper object placement within the first virtual surface and avoiding unintentional removal of objects from the first virtual surface, thus avoiding errors in interaction between the user and the computer system.

In some embodiments, the boundary of the volume includes a side boundary of the volume associated with the first virtual surface (1226), such as the right boundary of virtual surface 1128*a* in FIG. 11D (e.g., the boundary or boundaries of the volume that are perpendicular to or within a threshold angle (e.g., 1, 3, 5, 10, 20, 30, 45 or 60 degrees) of being perpendicular to the virtual or physical floor of the environment in which the first virtual surface is displayed). Displaying a virtual glowing effect along a size boundary of the volume provides feedback about the lateral bounds of the volume of the first virtual surface, facilitating proper object placement within the first virtual surface and avoiding unintentional removal of objects from the first virtual surface, thus avoiding errors in interaction between the user and the computer system.

In some embodiments, the one or more visual effects include a second virtual glowing effect that indicates boundaries of the volume of the first virtual surface (1228), such as indication 1155*a* indicating the boundaries of virtual surface 1128*a*. In some embodiments, the first virtual surface is also displayed with a background glowing effect. In some embodiments, the background glowing effect is or includes an interior volume of the first virtual surface being displayed with a virtual glowing effect. In some embodiments, the background glowing effect is or includes the surface of most or all of the boundary of the volume being displayed with the virtual flowing effect. In some embodiments, the virtual flowing effect and the second virtual glowing effect are displayed concurrently. Displaying a virtual glowing effect that indicates the boundaries of the volume of the first virtual surface provides feedback about the bounds of the volume of the first virtual surface, facilitating proper object placement within the first virtual surface and avoiding unintentional removal of objects from the first virtual surface, thus avoiding errors in interaction between the user and the computer system.

In some embodiments, while displaying the first virtual surface, the computer system detects (1230*a*), via the one or more input devices, a second input directed to a respective virtual object that does not have the respective spatial relationship relative to the first virtual surface (e.g., another virtual object that is in the three-dimensional environment in which the first virtual surface is displayed), wherein the second input corresponds to a request to move the respective virtual object to a location of the first virtual surface (e.g., to add the respective virtual object to the first virtual surface, such as described with reference to methods 800 and/or 1000), such as the input to move virtual object 1124*c* to virtual surface 1128*a* from FIGS. 11F and 11F1 to 11G. In some embodiments, the second input has one or more of the characteristics of the first input. In some embodiments, the respective virtual object has one or more of the characteristics of the first and/or second virtual objects.

In some embodiments, while detecting the second input and while the respective virtual object is at the location of the first virtual surface, the computer system displays (1230*b*), via the display generation component, the one or more visual effects associated with the first virtual surface, such as shown with effects 1155*a* and/or 1132*c* in FIG. 11G. In some embodiments, the computer system displays the one or more visual effects when the respective virtual object reaches a certain threshold distance (e.g., 0.05, 0.1, 0.2 cm, 2 cm, 5 cm, 10 cm, or 40 cm) of an edge of the first virtual surface and/or a boundary of a volume of the first virtual surface. In some embodiments, in response to detecting an end of the second input (e.g., corresponding to dropping the respective virtual object at the location of the first virtual surface), the respective virtual object has the respective spatial relationship relative to the first virtual surface. Displaying visual effects associated with the first virtual surface when a virtual object is being brought to the first virtual surface provides feedback about the bounds of the volume of the first virtual surface, facilitating proper object placement within the first virtual surface and avoiding unintentional placement of objects on the first virtual surface, thus avoiding errors in interaction between the user and the computer system.

It should be understood that the particular order in which the operations in method 1200 have been described is merely exemplary and is not intended to indicate that the described order is the only order in which the operations could be performed. One of ordinary skill in the art would recognize various ways to reorder the operations described herein. In some embodiments, aspects/operations of methods 800, 1000, and/or 1200 may be interchanged, substituted, and/or added between these methods. For example, the three-dimensional environments of methods 800, 1000, and/or 1200, the virtual surfaces in methods 800, 1000, and/or 1200, the virtual objects of methods 800, 1000 and/or 1200, the inputs directed to virtual object of methods 800, 1000 and/or 1200, and/or virtual content containers of methods 800, 1000, and/or 1200 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at a computer system in communication with a display generation component and one or more input devices:

displaying a virtual content container that includes one or more three-dimensional virtual objects in a three-dimensional environment;

while displaying the virtual content container, detecting, via the one or more input devices, a first input directed to a first three-dimensional virtual object of the one or more three-dimensional virtual objects, wherein the first input corresponds to a request to move the first three-dimensional virtual object out of the virtual content container and to a respective location in the three-dimensional environment; and in response to detecting the first input directed to the first three-dimensional virtual object:

in accordance with a determination that the respective location in the three-dimensional environment satisfies one or more criteria, including a criterion that is satisfied when the first three-dimensional virtual object at the respective location is within a threshold distance of a second three-dimensional virtual object in the three-dimensional environment, displaying a virtual surface within the three-dimensional environment concurrently with the first three-dimensional virtual object, wherein:

the virtual surface indicates a portion of the three-dimensional environment occupied by the first three-dimensional virtual object and the second three-dimensional virtual object; and the virtual surface was not displayed within the three-dimensional environment prior to detecting the first input directed to the first three-dimensional virtual object; and in accordance with a determination that the respective location in the three-dimensional environment does not satisfy the one or more criteria because the first three-dimensional virtual object at the respective location is further than the threshold distance of the second three-dimensional virtual object in the three-dimensional environment, displaying the first three-dimensional virtual object at the respective location without displaying the virtual surface that indicates a portion of the three-dimensional environment occupied by the first three-dimensional virtual object and the second three-dimensional virtual object within the three-dimensional environment.

2. The method of claim 1, wherein the one or more criteria include a criterion that is satisfied when the respective location is outside of the virtual content container.

3. The method of claim 1, wherein the one or more criteria include a criterion that is not satisfied when the respective location is located within the virtual content container.

4. The method of claim 1, wherein the one or more criteria include a criterion that is not satisfied if the respective location includes a user interface of a respective application other than an application associated with the virtual content container.

5. The method of claim 1, wherein an orientation of the virtual surface is automatically selected by the computer system to be within a threshold of being parallel to an orientation corresponding to a floor of a physical environment of a user of the computer system.

6. The method of claim 1, further comprising:

while concurrently displaying the virtual surface and the first three-dimensional virtual object, displaying, on the virtual surface, a virtual shadow of the first three-dimensional virtual object at a location on the virtual surface corresponding to a position of the first three-dimensional virtual object relative to the virtual surface.

7. The method of claim 1, wherein displaying the virtual surface within the three-dimensional environment in response to detecting the first input directed to the first three-dimensional virtual object includes:

displaying the virtual surface at a first level of visual prominence; and after displaying the virtual surface at the first level of visual prominence, displaying the virtual surface at a second level of visual prominence, greater than the first level of visual prominence.

8. The method of claim 1, wherein the virtual content container is located at a first location within the three-dimensional environment, in response to detecting the first input directed to the first three-dimensional virtual object and in accordance with the determination that the respective location of the three-dimensional environment satisfies the one or more criteria, the virtual surface has a second location within the three-dimensional environment, wherein a spatial relationship between the virtual surface and the virtual content container is a predefined spatial relationship.

9. The method of claim 1, wherein before detecting the first input, the virtual content container includes the first three-dimensional virtual object and a third virtual object.

10. The method of claim 9, wherein the first three-dimensional virtual object is a first type of virtual object, and the third virtual object is a second type of virtual object, different from the first type of virtual object.

11. The method of claim 1, the method further comprising:

while concurrently displaying the virtual surface and the first three-dimensional virtual object at the respective location, detecting, via the one or more input devices, a second input directed to a third virtual object in the three-dimensional environment, wherein the second input corresponds to a request to move the third virtual object from a first location to the respective location in the three-dimensional environment; and in response to detecting the second input directed to the third virtual object, displaying the virtual surface concurrently with the first three-dimensional virtual object and the third virtual object at the respective location.

12. The method of claim 1, the method further comprising:

while concurrently displaying the first three-dimensional virtual object and the virtual surface at the respective location, detecting, via the one or more input devices, a second input directed to the first three-dimensional virtual object, wherein the second input corresponds to a request to move the first three-dimensional virtual object away from the respective location; and in response to detecting the second input directed to the first three-dimensional virtual object:

in accordance with a determination that one or more second criteria are satisfied, moving the first three-dimensional virtual object away from the respective location and ceasing display of the virtual surface in the three-dimensional environment.

13. The method of claim 1, wherein the virtual surface is world-locked.

14. The method of claim 1, the method further comprising:

while concurrently displaying the first three-dimensional virtual object and the virtual surface at the respective location, detecting, via the one or more input devices, a second input directed to the virtual content container, wherein the second input corresponds to a request to move the virtual content container away from a current location in the three-dimensional environment; and in response to detecting the second input directed to the virtual content container:

moving the virtual content container away from the current location in the three-dimensional environment in accordance with the second input; and moving the virtual surface and the first three-dimensional virtual object away from the respective location in accordance with the second input.

15. The method of claim 1, the method further comprising:

while concurrently displaying the first three-dimensional virtual object and the virtual surface at the respective location, detecting, via the one or more input devices, a second input directed to the virtual content container, wherein the second input corresponds to a request to move the virtual content container away from a current location in the three-dimensional environment; and in response to detecting the second input directed to the virtual content container, moving the virtual content container away from the current location in the three-dimensional environment in accordance with the second input while maintaining the virtual surface and the first three-dimensional virtual object at the respective location.

16. The method of claim 1, the method further comprising:

while concurrently displaying the first three-dimensional virtual object and the virtual surface at the respective location, detecting, via the one or more input devices, a second input directed to the virtual content container, wherein the second input corresponds to a request to cease display of the virtual content container; and in response to detecting the second input directed to the virtual content container, ceasing display of the virtual content container and ceasing display of the virtual surface in the three-dimensional environment.

17. The method of claim 16, the method further comprising:

after detecting the second input and while the virtual content container and the virtual surface are not displayed in the three-dimensional environment, detecting, via the one or more input devices, a third input corresponding to a request to display the virtual content container in the three-dimensional environment; and in response to detecting the third input, displaying the virtual content container and the virtual surface in the three-dimensional environment.

18. The method of claim 1, wherein the virtual surface is displayed concurrently with a selectable option that is selectable to cease display of the virtual surface in the three-dimensional environment, the method further comprising:

while displaying the virtual surface and the selectable option in the three-dimensional environment, detecting, via the one or more input devices, a second input corresponding to selection of the selectable option; and in response to detecting the second input, ceasing display of the virtual surface in the three-dimensional environment.

19. The method of claim 18, wherein when the second input is detected, the first three-dimensional virtual object is displayed concurrently with the virtual surface at the respective location in the three-dimensional environment, the method further comprising:

in response to detecting the second input, moving the first three-dimensional virtual object away from the respective location and to the virtual content container.

20. The method of claim 1, wherein the first three-dimensional virtual object is a first type of virtual object, and the virtual content container includes a third virtual object that is a second type of virtual object, different from the first type of virtual object, the method further comprising:

while displaying the virtual content container that includes the third virtual object in the three-dimensional environment, detecting, via the one or more input devices, a second input directed to the third virtual object, wherein the second input corresponds to a request to move the third virtual object out of the virtual content container and to a second respective location in the three-dimensional environment; and in response to detecting the second input:

in accordance with a determination that the second respective location in the three-dimensional environment satisfies one or more criteria, displaying the third virtual object at the second respective location without displaying a virtual surface within the three-dimensional environment.

21. The method of claim 1, the method further comprising:

displaying a plurality of virtual objects concurrently with the virtual surface; while displaying the plurality of virtual objects concurrently with the virtual surface:

in accordance with a determination that an orientation of the virtual surface is a first orientation relative to the three-dimensional environment, orientations of the plurality of virtual objects relative to the three-dimensional environment are a first set of orientations based on the first orientation; and in accordance with a determination that the orientation of the virtual surface is a second orientation, different from the first orientation, relative to the three-dimensional environment, the orientations of the plurality of virtual objects relative to the three-dimensional environment are a second set of orientations, different from the first set of orientations, based on the second orientation.

22. The method of claim 21, wherein:

displaying the virtual surface within the three-dimensional environment in response to detecting the first input directed to the first three-dimensional virtual object includes:

in accordance with a determination that an orientation of the first three-dimensional virtual object at the respective location in response to the first input being detected is a first respective orientation relative to the three-dimensional environment, displaying the virtual surface with a second respective orientation relative to the three-dimensional environment that is based on the first respective orientation; and in accordance with a determination that the orientation of the first three-dimensional virtual object at the respective location in response to the first input being detected is a third respective orientation, different from the first respective orientation, relative to the three-dimensional environment, displaying the virtual surface with a fourth respective orientation, different from the second respective orientation, relative to the three-dimensional environment that is based on the third respective orientation.

23. The method of claim 1, further comprising:

while displaying the virtual surface in the three-dimensional environment, wherein a first portion of the virtual surface has a first orientation relative to a viewpoint of a user of the computer system and a first spatial arrangement relative to the three-dimensional environment, detecting, via the one or more input devices, a second input corresponding to a request to modify a spatial arrangement of the virtual surface relative to the three-dimensional environment from the first spatial arrangement to a second spatial arrangement, different from the first spatial arrangement; and in response to detecting the second input, moving the virtual surface in the three-dimensional environment to have the second spatial arrangement relative to the three-dimensional environment while maintaining the first portion of the virtual surface having the first orientation relative to the viewpoint of the user.

24. The method of claim 23, wherein moving the virtual surface in the three-dimensional environment to have the second spatial arrangement relative to the three-dimensional environment includes maintaining a relative orientation of a second portion of the virtual surface relative to a frame of reference, other than the viewpoint of the user, in the three-dimensional environment.

25. The method of claim 1, further comprising while detecting the first input, displaying, in the virtual content container, a representation of the first three-dimensional virtual object.

26. The method of claim 1, further comprising:

in response to detecting an end of the first input and in accordance with the determination that the respective location in the three-dimensional environment satisfies the one or more criteria, displaying the first three-dimensional virtual object as being included in the virtual surface.

27. A computer system that is in communication with a display generation component and one or more input devices, the computer system comprising:

one or more processors;

memory; and one or more programs, wherein the one or more programs are stored in the memory and configured to be executed by the one or more processors, the one or more programs including instructions for:

displaying a virtual content container that includes one or more three-dimensional virtual objects in a three-dimensional environment;

while displaying the virtual content container, detecting, via the one or more input devices, a first input directed to a first three-dimensional virtual object of the one or more three-dimensional virtual objects, wherein the first input corresponds to a request to move the first three-dimensional virtual object out of the virtual content container and to a respective location in the three-dimensional environment; and in response to detecting the first input directed to the first three-dimensional virtual object:

in accordance with a determination that the respective location in the three-dimensional environment satisfies one or more criteria, including a criterion that is satisfied when the first three-dimensional virtual object at the respective location is within a threshold distance of a second three-dimensional virtual object in the three-dimensional environment, displaying a virtual surface within the three-dimensional environment concurrently with the first three-dimensional virtual object, wherein:

the virtual surface indicates a portion of the three-dimensional environment occupied by the first three-dimensional virtual object and the second three-dimensional virtual object; and the virtual surface was not displayed within the three-dimensional environment prior to detecting the first input directed to the first three-dimensional virtual object; and in accordance with a determination that the respective location in the three-dimensional environment does not satisfy the one or more criteria because the first three-dimensional virtual object at the respective location is further than the threshold distance of the second three-dimensional virtual object in the three-dimensional environment, displaying the first three-dimensional virtual object at the respective location without displaying the virtual surface that indicates a portion of the three-dimensional environment occupied by the first three-dimensional virtual object and the second three-dimensional virtual object within the three-dimensional environment.

28. A non-transitory computer readable storage medium storing one or more programs, the one or more programs comprising instructions, which when executed by one or more processors of a computer system that is in communication with a display generation component and one or more input devices, cause the computer system to perform a method comprising:

displaying a virtual content container that includes one or more three-dimensional virtual objects in a three-dimensional environment;

while displaying the virtual content container, detecting, via the one or more input devices, a first input directed to a first three-dimensional virtual object of the one or more three-dimensional virtual objects, wherein the first input corresponds to a request to move the first three-dimensional virtual object out of the virtual content container and to a respective location in the three-dimensional environment; and in response to detecting the first input directed to the first three-dimensional virtual object:

in accordance with a determination that the respective location in the three-dimensional environment satisfies one or more criteria, including a criterion that is satisfied when the first three-dimensional virtual object at the respective location is within a threshold distance of a second three-dimensional virtual object in the three-dimensional environment, displaying a virtual surface within the three-dimensional environment concurrently with the first three-dimensional virtual object, wherein:

the virtual surface indicates a portion of the three-dimensional environment occupied by the first three-dimensional virtual object and the second three-dimensional virtual object; and the virtual surface was not displayed within the three-dimensional environment prior to detecting the first input directed to the first three-dimensional virtual object; and in accordance with a determination that the respective location in the three-dimensional environment does not satisfy the one or more criteria because the first three-dimensional virtual object at the respective location is further than the threshold distance of the second three-dimensional virtual object in the three-dimensional environment, displaying the first three-dimensional virtual object at the respective location without displaying the virtual surface that indicates a portion of the three-dimensional environment occupied by the first three-dimensional virtual object and the second three-dimensional virtual object within the three-dimensional environment.

29. The computer system of claim 27, wherein the virtual content container is located at a first location within the three-dimensional environment, in response to detecting the first input directed to the first three-dimensional virtual object and in accordance with the determination that the respective location of the three-dimensional environment satisfies the one or more criteria, the virtual surface has a second location within the three-dimensional environment, wherein a spatial relationship between the virtual surface and the virtual content container is a predefined spatial relationship.

30. The computer system of claim 27, the one or more programs further including instructions for:

while concurrently displaying the first three-dimensional virtual object and the virtual surface at the respective location, detecting, via the one or more input devices, a second input directed to the first three-dimensional virtual object, wherein the second input corresponds to a request to move the first three-dimensional virtual object away from the respective location; and in response to detecting the second input directed to the first three-dimensional virtual object:

in accordance with a determination that one or more second criteria are satisfied, moving the first three-dimensional virtual object away from the respective location and ceasing display of the virtual surface in the three-dimensional environment.

31. The computer system of claim 27, the one or more programs further including instructions for:

while concurrently displaying the first three-dimensional virtual object and the virtual surface at the respective location, detecting, via the one or more input devices, a second input directed to the virtual content container, wherein the second input corresponds to a request to move the virtual content container away from a current location in the three-dimensional environment; and in response to detecting the second input directed to the virtual content container:

moving the virtual content container away from the current location in the three-dimensional environment in accordance with the second input; and moving the virtual surface and the first three-dimensional virtual object away from the respective location in accordance with the second input.

32. The computer system of claim 27, the one or more programs further including instructions for:

while concurrently displaying the first three-dimensional virtual object and the virtual surface at the respective location, detecting, via the one or more input devices, a second input directed to the virtual content container, wherein the second input corresponds to a request to move the virtual content container away from a current location in the three-dimensional environment; and in response to detecting the second input directed to the virtual content container, moving the virtual content container away from the current location in the three-dimensional environment in accordance with the second input while maintaining the virtual surface and the first three-dimensional virtual object at the respective location.

33. The computer system of claim 27, wherein the first three-dimensional virtual object is a first type of virtual object, and the virtual content container includes a third virtual object that is a second type of virtual object, different from the first type of virtual object, the one or more programs further including instructions for:

while displaying the virtual content container that includes the third virtual object in the three-dimensional environment, detecting, via the one or more input devices, a second input directed to the third virtual object, wherein the second input corresponds to a request to move the third virtual object out of the virtual content container and to a second respective location in the three-dimensional environment; and in response to detecting the second input:

in accordance with a determination that the second respective location in the three-dimensional environment satisfies one or more criteria, displaying the third virtual object at the second respective location without displaying a virtual surface within the three-dimensional environment.

34. The computer system of claim 27, the one or more programs further including instructions for:

displaying a plurality of virtual objects concurrently with the virtual surface;

while displaying the plurality of virtual objects concurrently with the virtual surface:

in accordance with a determination that an orientation of the virtual surface is a first orientation relative to the three-dimensional environment, orientations of the plurality of virtual objects relative to the three-dimensional environment are a first set of orientations based on the first orientation; and in accordance with a determination that the orientation of the virtual surface is a second orientation, different from the first orientation, relative to the three-dimensional environment, the orientations of the plurality of virtual objects relative to the three-dimensional environment are a second set of orientations, different from the first set of orientations, based on the second orientation.

35. The computer system of claim 27, wherein:

displaying the virtual surface within the three-dimensional environment in response to detecting the first input directed to the first three-dimensional virtual object includes:

in accordance with a determination that an orientation of the first three- dimensional virtual object at the respective location in response to the first input being detected is a first respective orientation relative to the three-dimensional environment, displaying the virtual surface with a second respective orientation relative to the three-dimensional environment that is based on the first respective orientation; and in accordance with a determination that the orientation of the first three-dimensional virtual object at the respective location in response to the first input being detected is a third respective orientation, different from the first respective orientation, relative to the three-dimensional environment, displaying the virtual surface with a fourth respective orientation, different from the second respective orientation, relative to the three-dimensional environment that is based on the third respective orientation.

36. The computer system of claim 27, the one or more programs further including instructions for:

in response to detecting an end of the first input and in accordance with the determination that the respective location in the three-dimensional environment satisfies the one or more criteria, displaying the first three-dimensional virtual object as being included in the virtual surface.

37. The non-transitory computer readable storage medium of claim 28, wherein the virtual content container is located at a first location within the three-dimensional environment, in response to detecting the first input directed to the first three-dimensional virtual object and in accordance with the determination that the respective location of the three-dimensional environment satisfies the one or more criteria, the virtual surface has a second location within the three-dimensional environment, wherein a spatial relationship between the virtual surface and the virtual content container is a predefined spatial relationship.

38. The non-transitory computer readable storage medium of claim 28, the method further comprising:

while concurrently displaying the first three-dimensional virtual object and the virtual surface at the respective location, detecting, via the one or more input devices, a second input directed to the first three-dimensional virtual object, wherein the second input corresponds to a request to move the first three-dimensional virtual object away from the respective location; and in response to detecting the second input directed to the first three-dimensional virtual object:

in accordance with a determination that one or more second criteria are satisfied, moving the first three-dimensional virtual object away from the respective location and ceasing display of the virtual surface in the three-dimensional environment.

39. The non-transitory computer readable storage medium of claim 28, the method further comprising:

while concurrently displaying the first three-dimensional virtual object and the virtual surface at the respective location, detecting, via the one or more input devices, a second input directed to the virtual content container, wherein the second input corresponds to a request to move the virtual content container away from a current location in the three-dimensional environment; and in response to detecting the second input directed to the virtual content container:

moving the virtual content container away from the current location in the three-dimensional environment in accordance with the second input; and moving the virtual surface and the first three-dimensional virtual object away from the respective location in accordance with the second input.

40. The non-transitory computer readable storage medium of claim 28, the method further comprising:

while concurrently displaying the first three-dimensional virtual object and the virtual surface at the respective location, detecting, via the one or more input devices, a second input directed to the virtual content container, wherein the second input corresponds to a request to move the virtual content container away from a current location in the three-dimensional environment; and in response to detecting the second input directed to the virtual content container, moving the virtual content container away from the current location in the three-dimensional environment in accordance with the second input while maintaining the virtual surface and the first three-dimensional virtual object at the respective location.

41. The non-transitory computer readable storage medium of claim 28, wherein the first three-dimensional virtual object is a first type of virtual object, and the virtual content container includes a third virtual object that is a second type of virtual object, different from the first type of virtual object, the method further comprising:

while displaying the virtual content container that includes the third virtual object in the three-dimensional environment, detecting, via the one or more input devices, a second input directed to the third virtual object, wherein the second input corresponds to a request to move the third virtual object out of the virtual content container and to a second respective location in the three-dimensional environment; and in response to detecting the second input:

in accordance with a determination that the second respective location in the three-dimensional environment satisfies one or more criteria, displaying the third virtual object at the second respective location without displaying a virtual surface within the three-dimensional environment.

42. The non-transitory computer readable storage medium of claim 28, the method further comprising:

displaying a plurality of virtual objects concurrently with the virtual surface;

while displaying the plurality of virtual objects concurrently with the virtual surface:

in accordance with a determination that an orientation of the virtual surface is a first orientation relative to the three-dimensional environment, orientations of the plurality of virtual objects relative to the three-dimensional environment are a first set of orientations based on the first orientation; and in accordance with a determination that the orientation of the virtual surface is a second orientation, different from the first orientation, relative to the three-dimensional environment, the orientations of the plurality of virtual objects relative to the three-dimensional environment are a second set of orientations, different from the first set of orientations, based on the second orientation.

43. The non-transitory computer readable storage medium of claim 28, wherein:

displaying the virtual surface within the three-dimensional environment in response to detecting the first input directed to the first three-dimensional virtual object includes:

in accordance with a determination that an orientation of the first three- dimensional virtual object at the respective location in response to the first input being detected is a first respective orientation relative to the three-dimensional environment, displaying the virtual surface with a second respective orientation relative to the three-dimensional environment that is based on the first respective orientation; and in accordance with a determination that the orientation of the first three-dimensional virtual object at the respective location in response to the first input being detected is a third respective orientation, different from the first respective orientation, relative to the three-dimensional environment, displaying the virtual surface with a fourth respective orientation, different from the second respective orientation, relative to the three-dimensional environment that is based on the third respective orientation.

44. The non-transitory computer readable storage medium of claim 28, the method further comprising:

in response to detecting an end of the first input and in accordance with the determination that the respective location in the three-dimensional environment satisfies the one or more criteria, displaying the first three-dimensional virtual object as being included in the virtual surface.

* * * * *